US012291665B2

(12) United States Patent
Itano et al.

(10) Patent No.: US 12,291,665 B2
(45) Date of Patent: May 6, 2025

(54) COMPOSITION CONTAINING REFRIGERANT, USE OF SAME, REFRIGERATOR HAVING SAME, AND METHOD FOR OPERATING SAID REFRIGERATOR

(71) Applicant: DAIKIN INDUSTRIES, LTD., Osaka (JP)

(72) Inventors: Mitsushi Itano, Osaka (JP); Shun Ohkubo, Osaka (JP); Daisuke Karube, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 575 days.

(21) Appl. No.: 17/553,103

(22) Filed: Dec. 16, 2021

(65) Prior Publication Data

US 2022/0177763 A1 Jun. 9, 2022

Related U.S. Application Data

(63) Continuation of application No. PCT/JP2020/024049, filed on Jun. 19, 2020.

(30) Foreign Application Priority Data

Jun. 19, 2019 (JP) ................................ 2019-114156
Feb. 6, 2020 (JP) ................................ 2020-019121

(51) Int. Cl.
*C09K 5/04* (2006.01)

(52) U.S. Cl.
CPC ........ *C09K 5/045* (2013.01); *C09K 2205/106* (2013.01); *C09K 2205/40* (2013.01)

(58) Field of Classification Search
CPC .............. C09K 5/045; C09K 2205/106; C09K 2205/40; C09K 2205/126; C09K 2205/122
See application file for complete search history.

(56) References Cited

U.S. PATENT DOCUMENTS

2017/0002245 A1 1/2017 Fukushima
2017/0058173 A1 3/2017 Fukushima

FOREIGN PATENT DOCUMENTS

CN 106414654 2/2017
JP 2010-47754 3/2010
JP 2011-256361 12/2011
JP 2014-525975 10/2014
JP 2015-229767 12/2015
JP 2020002354 A * 1/2020 ............ C09K 5/044
WO 2005/042451 5/2005

(Continued)

OTHER PUBLICATIONS

International Search Report issued Sep. 8, 2020 in International (PCT) Application No. PCT/JP2020/024049.

(Continued)

*Primary Examiner* — Kun Kai Ma

(74) *Attorney, Agent, or Firm* — Wenderoth, Lind & Ponack, L.L.P.

(57) ABSTRACT

An object is to provide a novel low-GWP mixed refrigerant. Provided as a means for a solution is a composition comprising a refrigerant, the refrigerant comprising trans-1,2-difluoroethylene (HFO-1132(E)), difluoromethane (R32), 1,3,3,3-tetrafluoropropene (R1234ze), and carbon dioxide.

12 Claims, 19 Drawing Sheets

(56) References Cited

FOREIGN PATENT DOCUMENTS

| | | | |
|---|---|---|---|
| WO | 2011/144885 | 11/2011 | |
| WO | 2013/021174 | 2/2013 | |
| WO | 2015/141678 | 9/2015 | |
| WO | WO-2020017520 A1 * | 1/2020 | ............... B60H 1/22 |

OTHER PUBLICATIONS

International Preliminary Report on Patentability issued Dec. 21, 2021 in corresponding International (PCT) Application No. PCT/JP2020/024049.

Extended European Search Report issued Jul. 24, 2023 in corresponding European Patent Application No. 20826165.1.

* cited by examiner

COMPOSITION CONTAINING REFRIGERANT, USE OF SAME, REFRIGERATOR HAVING SAME, AND METHOD FOR OPERATING SAID REFRIGERATOR

TECHNICAL FIELD

The present disclosure relates to a composition comprising a refrigerant, use of the composition, a refrigerating machine comprising the composition, and a method for operating the refrigerating machine.

BACKGROUND ART

R410A is currently used as an air conditioning refrigerant for home air conditioners etc. R410A is a two-component mixed refrigerant of difluoromethane ($CH_2F_2$: HFC-32 or R32) and pentafluoroethane ($C_2HF_5$: HFC-125 or R125), and is a pseudo-azeotropic composition.

However, the global warming potential (GWP) of R410A is 2088. Due to growing concerns about global warming, R32, which has a GWP of 675, has been increasingly used.

For this reason, various low-GWP mixed refrigerants that can replace R410A have been proposed (PTL 1).

CITATION LIST

Patent Literature

PTL 1: WO2015/141678

SUMMARY

A composition comprising a refrigerant, the refrigerant comprising trans-1,2-difluoroethylene (HFO-1132(E)), difluoromethane (R32), 1,3,3,3-tetrafluoropropene (R1234ze), and carbon dioxide ($CO_2$).

Advantageous Effects

The refrigerant according to the present disclosure has a low GWP.

DESCRIPTION OF EMBODIMENTS

Figure 1:
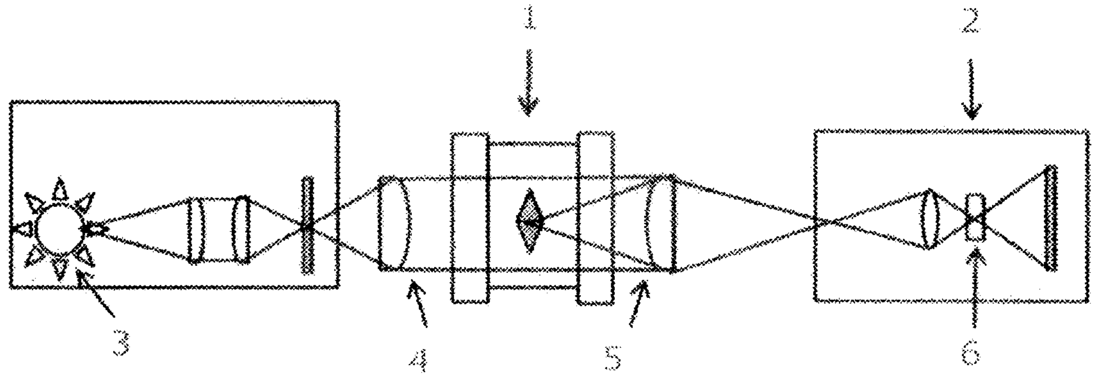
FIG. 1 is a schematic view of an apparatus used in a flammability test.

The present inventors conducted intensive studies to solve the above problem, and consequently found that a mixed refrigerant comprising trans-1,2-difluoroethylene (HFO-1132(E)), difluoromethane (R32), 1,3,3,3-tetrafluoropropene (R1234ze), and carbon dioxide ($CO_2$) has the above properties.

The present disclosure has been completed as a result of further research based on this finding. The present disclosure includes the following embodiments.

Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises one or more other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013.

1. Refrigerant 1.1 Refrigerant Component

The refrigerant according to the present disclosure comprises trans-1,2-difluoroethylene (HFO-1132(E)), trifluoroethylene (HFO-1123), difluoromethane (R32), 2,3,3,3-tetrafluoro-1-propene (R1234yf), and carbon dioxide ($CO_2$).

The refrigerant according to the present disclosure has a low GWP.

The refrigerant is preferably as follows: in the refrigerant, when the mass % of HFO-1132(E), R32, R1234ze, and $CO_2$ based on their sum is respectively represented by x, y, z, and a, (1) if $0<a\leq 0.4$, coordinates (x,y,z) in a ternary composition diagram in which the sum of HFO-1132(E), R32, and R1234ze is (100−a) mass % are within the range of a figure surrounded by straight lines LL', L'M, MN, NO, OK, KH, and HL that connect 7 points, i.e., points L, L', M, N, O, K, and H, or on the straight lines LL', L'M, MN, NO, OK, and KH (excluding the points L and H):

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point K (−2.5a+1.0, −0.25a+51.5, 1.75a+47.5), and
point H ($0.1667a^2-4.5667a+67.6$, 0.0, $-0.1667a^2+3.5667a+32.4$), (2) if $0.4\leq a\leq 7.5$, coordinates (x,y,z) in the ternary composition diagram are within the range of a figure surrounded by straight lines LL', L'M, MN, NO, OB", B"K', K'H, and HL that connect 8 points, i.e., points L, L', M, N, O, B", K', and H, or on the straight lines LL', L'M, MN, NO, OB", and K'H (excluding the points L, B", K', and H), and if $0.4\leq a\leq 1.0$, the 8 points are the following:

point L (72.0, 0.0, −a+28.0),
point L' (57.2, 10.0, −a+32.8), point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B'' (0.0, 51.4, −a+48.6),
point K' (0.0, −3.0a+52.6, 2.0a+47.4), and
point H (0.1667$a^2$−4.5667a+67.6, 0.0, −0.1667$a^2$+3.5667a+32.4), if 1.0<a≤3.0, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+36.679, 0.0175a+36.679, −a+27.6),
point O (−0.0095a+28.914, 0.0095a+51.586, −a+19.5),
point B'' (0.0, 51.4, −a+48.6),
point K' (0, −2.9a+52.5, 1.9a+47.5), and
point H (0.05$a^2$−4.55a+67.7, 0.0, −0.05$a^2$+3.55a+32.3), if 3.0<a≤5.0, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B'' (0.0, 51.4, −a+48.6),
point K' (0, −2.9a+52.5, 1.9a+47.5), and
point H (0.05$a^2$−4.55a+67.7, 0.0, −0.05$a^2$+3.55a+32.3), or if 5.0<a≤7.5, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B'' (0.0, 51.4, −a+48.6),
point K' (0, −2.8286a+52.105, 1.8286a+47.895), and
point H (0.02$a^2$−4.21a+66.75, 0.0, −0.02$a^2$+3.21a+33.25).

In this case, the refrigerant according to the present disclosure has a refrigerating capacity of 80% or more relative to that of R410A and a GWP of 350 or less, and is classified under the category of WCF lower flammability.

The refrigerant is preferably as follows: in the refrigerant, when the mass % of HFO-1132(E), R32, R1234ze, and $CO_2$ based on their sum is respectively represented by x, y, z, and a, (1) if 0<a≤5.5, coordinates (x,y,z) in a ternary composition diagram in which the sum of HFO-1132(E), R32, and R1234ze is (100−a) mass % are within the range of a figure surrounded by straight lines LL', L'M, MN, NJ, JH, and HL that connect 6 points, points L, L', M, N, J, and H, or on the straight lines LL', L'M, MN, NJ, and JH (excluding the points L and H), and if 0<a≤1.0, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J (−0.3333$a^2$−3.3667a+20.3, 36.6, 0.3333$a^2$+2.3667a+43), and
point H (0.1667$a^2$−4.5667a+67.6, 0.0, −0.1667$a^2$+3.5667a+32.4), if 1.0<a≤3.0, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J (0.05$a^2$−3.95a+20.5, 0.05$a^2$−0.25a+36.8, −0.1$a^2$+3.2a+42.7), and
point H (0.05$a^2$−4.55a+67.7, 0.0, −0.05$a^2$+3.55a+32.3), if 3.0<a≤5.0, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J (0.05$a^2$−4.05a+20.8, 36.5, −0.05$a^2$+3.05a+42.7), and
point H (0.05$a^2$−4.55a+67.7, 0.0, −0.05$a^2$+3.55a+32.3), or if 5.0<a≤5.5, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J (−3.6a+19.8, 36.5, 2.6a+43.7), and
point H (0.02$a^2$−4.21a+66.75, 0.0, −0.02$a^2$+3.21a+33.25), (2) if 5.5<a≤7.5, coordinates (x,y,z) in the ternary composition diagram are within the range of a figure surrounded by straight lines LL', L'M, MN, NB', B'K', K'H, and HL that connect 7 points, i.e., points L, L', M, N, B', K', and H, or on the straight lines LL', L'M, MN, NB', K'H, and HL (excluding the points L, B', K', and H):
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point B' (0.0, 36.5, −a+63.5),
point K' (0.0, −2.8286a+52.105, 1.8281a+47.895), and
point H (0.02$a^2$−4.21a+66.75, 0.0, −0.02$a^2$+3.21a+33.25).

In this case, the refrigerant according to the present disclosure has a refrigerating capacity of 80% or more relative to that of R410A and a GWP of 250 or less, and is classified under the category of WCF lower flammability.

The refrigerant is preferably as follows: in the refrigerant, when the mass % of HFO-1132(E), R32, R1234ze, and $CO_2$ based on their sum is respectively represented by x, y, z, and a, coordinates (x,y,z) in a ternary composition diagram in which the sum of HFO-1132 (E), R32, and R1234ze is (100−a) mass % are within the range of a figure surrounded by straight lines LL', L'M, MI, IH, and HL that connect 5 points, i.e., points L, L', M, I, and H, or on the straight lines LL', L'M, MI, and IH (excluding the points L and H), and if 0<a≤1.0, the 5 points are the following:
point L (72.0, 0.0, −a+28.0),
point L' (57.2, 10.0, −a+32.8),
point M (−0.019a+48.618, 0.019a+18.082, −a+33.3),
point I (−0.1667$a^2$−3.9333a+44.2, 18.1, 0.1667$a^2$+2.9333a+37.7), and
point H (0.1667$a^2$−4.5667a+67.6, 0.0, −0.1667$a^2$+3.5667a+32.4), if 1.0<a≤3.0, the 5 points are the following:
point L (72.0, 0.0, −a+28.0),
point L' (57.2, 10.0, −a+32.8),
point M (−0.019a+48.618, 0.019a+18.082, −a+33.3),
point I (0.05$a^2$−4.25a+44.3, 18.1, −0.05$a^2$+3.25a+37.6), and
point H (0.05$a^2$−4.55a+67.7, 0.0, −0.05$a^2$+3.55a+32.3), if 3.0<a≤5.0, the 5 points are the following:
point L (72.0, 0.0, −a+28.0),
point L' (57.2, 10.0, −a+32.8),
point M (−0.019a+48.618, 0.019a+18.082, −a+33.3),
point I (−0.05$a^2$−3.45a+42.8, 0.05$a^2$−0.45a+19.0, 2.9a+38.2), and point H $(0.05a^2-4.55a+67.7, 0.0, -0.05a^2+3.55a+32.3)$, or if $5.0<a\leq 7.5$, the 5 points are the following:

point L $(72.0, 0.0, -a+28.0)$, point L' $(57.2, 10.0, -a+32.8)$, point M $(-0.019a+48.618, 0.019a+18.082, -a+33.3)$, point I $(0.1a^2-4.85a+46.05, -0.02a^2+0.21a+17.45, -0.08a^2+3.64a+36.5)$, and point H $(0.02a^2-4.21a+66.75, 0.0, -0.02a^2+3.21a+33.25)$.

In this case, the refrigerant according to the present disclosure has a refrigerating capacity of 80% or more relative to that of R410A and a GWP of 125 or less, and is classified under the category of WCF lower flammability.

The refrigerant according to the present disclosure may further comprise 2,3,3,3-tetrafluoro-1-propene (R1234yf).

When the refrigerant according to the present disclosure further comprises R1234yf, the refrigerant is preferably as follows: when the mass % of HFO-1132(E) is x, the mass % of R32 is y, the mass % of the sum of R1234ze and R1234yf is z, and the mass % of $CO_2$ is a based on the sum of HFO-1132(E), R32, R1234ze, R1234yf, and $CO_2$, if r=R1234yf/(R1234ze+R1234yf), and $0.1<r<1.0$, coordinates (x,y,z) in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is (100−a) mass % are within the range of a figure surrounded by straight lines $L_rL'_r$, $L'_rM_r$, $M_rN_r$, $N_rO_r$, $O_rB''_r$, $B''_rK'_r$, $K'_rH_r$, and $H_rL_r$ that connect 8 points, i.e., points $L_r$, $L'_r$, $M_r$, $N_r$, $O_r$, $B''_r$, $K'_r$, and $H_r$, or on the straight lines $L_rL'_r$, $L'_rM_r$, $M_rN_r$, $N_rO_r$, $O_rB''_r$, and $K'_rH_r$ (excluding the points $L_r$, $B''_r$, $K'_r$, and $H_r$), and if $0<a\leq 1.0$, the 8 points are the following:

point $L_r$ $(72.0, 0.0, 28.0-a)$, point $L'_r$ $(57.2, 10.0, 32.8-a)$, point $M_r$ $(48.6, -0.2778r^2+0.4167r+18.061, 51.4-a-y)$, point $N_r$ $(35.7, -0.2778r^2+0.4167r+36.661, 51.4-a-y)$, point $O_r$ $(28.9, -0.2222r^2-0.1333r+51.611, 71.1-a-y)$, point $B''_r$ $(0.0, (0.463a^2-0.1852a-0.2778)r^2+(-0.6945a^2+0.2778a+0.4167)r+(0.2317a^2-0.0927a+51.361), 51.4-a-y)$, point $K'_r$ $(0.0, (0.3705a^2-0.1482a-0.6667)r^2+(-0.2217a^2+0.0887a-11.6)r+(0.0183a^2-3.0073a+52.567), 100-a-y)$, and point $H_r$ $((2.4072a^2-2.0739a-0.8889)r^2+(-2.2779a^2+1.5779a-8.4667)r+(0.0392a^2-4.5732a+67.656), 0.0, 100-a-x)$, if $1.0<a\leq 3.0$, the 8 points are the following:

point $L_r$ $(72.0, 0.0, 28.0-a)$, point $L'_r$ $(57.2, 10.0, 32.8-a)$, point $M_r$ $(48.6, (-0.1389a^2+0.6945a-0.8334)r^2+(0.2084a^2-1.0418a+1.2501)r+(-0.0695a^2+0.3475a+17.783), 51.4-a-y)$, point $N_r$ $(35.7, -0.2778r^2+0.4167r+36.661, 51.4-a-y)$, point $O_r$ $(28.9, (0.25a^2-1.25a+1.2222)r^2+(-0.275a^2+1.375a-1.2333)r+(0.025a^2-0.125a+51.711), 71.1-y-a)$, point $B''_r$ $(0.0, (0.25a^2-1.0278a+0.7778)r^2+(-0.275a^2+1.2419a-0.9668)r+(0.075a^2-0.364a+51.789), 100-a-y)$, point $K'_r$ $(0.0, (0.16667a^2+0.2222a-0.8333)r^2+(-0.3495a^2+0.3645a-11.748)r+(0.1335a^2-3.2395a+52.684), 100-a-y)$, and point $H_r$ $((-0.25003a^2+0.8613a-1.1669)r^2+(0.275a^2-1.3914a-8.0502)r+(0.0245a^2-4.4175a+67.515), 0.0, 100-a-x)$, if $3.0<a\leq 5.0$, the 8 points are the following:

point $L_r$ $(72.0, 0.0, 28.0-a)$, point $L'_r$ $(57.2, 10.0, 32.8-a)$, point $M_r$ $(48.6, 18.2, 33.2-a)$, point $N_r$ $(35.7, (-0.1389a^2+1.2501a-2.778)r^2+(0.2084a^2-1.8752a+4.167)r+(-0.0695a^2+0.6255a+35.41), 51.4-a-y)$, point $O_r$ $(28.9, (0.1389a^2-0.9723a+1.389)r^2+(-0.2083a^2+1.4585a-2.0845)r+(0.0695a^2-0.4865a+52.395), 71.1-a-y)$, point $B''_r$ $(0.0, -0.0556r^2+0.2833r+51.372, 100-a-y)$, point $K'_r$ $(0.0, (0.77775a^2-6.2775a+13.166)r^2+(-0.9665a^2+8.0155a-29.148)r+(0.189a^2-4.54a+56.086), 100-a-y)$, and point $H_r$ $((-0.72215a^2+6.3327a-13.332)r^2+(0.6835a^2-6.3015a+3.003)r+(0.039a^2-4.434a+67.434), 0.0, 100-x-a)$, or if $5.0<a\leq 7.5$, the 8 points are the following:

point $L_r$ $(72.0, 0.0, 28.0-a)$, point $L'_r$ $(57.2, 10.0, 32.8-a)$, point $M_r$ $(48.6, (0.0592a^2-0.6512a+1.776)r^2+(-0.0355a^2+0.3901a-1.062)r+(0.0029a^2-0.0323a+18.29), 51.4-a-y)$, point $N_r$ $(35.7, 36.8, 27.5-a)$, point $O_r$ $(28.9, 51.7, 19.4-a)$, point $B''_r$ $(0.0, -0.0556r^2+0.2833r+51.372, 100-a-y)$, point $K'_r$ $(0.0, (0.10373a^2-0.9189a+3.2232)r^2+(-0.1285a^2+1.2799a-16.419)r+(0.0252a^2-3.1662a+53.312), 100-a-y)$, and point $H_r$ $((0.037a^2-0.1293a-0.0008)r^2+(-0.056a^2+0.2a-11.017)r+(0.0719a^2-4.8515a+68.7), 0.0, 100-a-x)$.

In this case, the refrigerant according to the present disclosure has a refrigerating capacity of 80% or more relative to that of R410A and a GWP of 350 or less, and is classified under the category of WCF lower flammability.

When the refrigerant according to the present disclosure further comprises R1234yf, the refrigerant is preferably as follows: when the mass % of HFO-1132(E) is x, the mass % of R32 is y, the mass % of the sum of R1234ze and R1234yf is z, and the mass % of $CO_2$ is a based on the sum of HFO-1132(E), R32, R1234ze, R1234yf, and $CO_2$, if r=R1234yf/(R1234ze+R1234yf), and $0.1\leq r<1.0$, coordinates (x,y,z) in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is (100−a) mass % are within the range of a figure surrounded by straight lines $L_rL'_r$, $L'_rM_r$, $M_rI_r$, $I_rH_r$, and $H_rL_r$ that connect 5 points, i.e., points $L_r$, $L'_r$, $M_r$, $I_r$, and $H_r$, or on the straight lines $L_rL'_r$, $L'_rM_r$, $M_rI_r$, and $I_rH_r$, and if $0<a\leq 1.0$, the 5 points are the following:

point $L_r$ $(72.0, 0.0, 28.0-a)$, point $L'_r$ $(57.2, 10.0, 32.8-a)$, point $M_r$ $(48.6, -0.2778r^2+0.4167r+18.061, 51.4-a-y)$, point $I_r$ $((1.1576a^2-0.3243a-2.1111)r^2+(-0.9a^2-0.35a-10.233)r+(-0.255a^2-3.828a+44.244), 100-a-x-z, (1.1572a^2+0.3239a+1.8889)r^2+(0.9042a^2+0.3458a+10.367)r+(0.2525a^2+2.8315a+37.644))$, and point $H_r$ $((2.4072a^2-2.0739a-0.8889)r^2+(-2.2779a^2+1.5779a-8.4667)r+(0.0392a^2-4.5732a+67.656), 0.0, 100-a-x)$, if $1.0<a\leq 3.0$, the 5 points are the following:

point $L_r$ $(72.0, 0.0, 28.0-a)$, point $L'_r$ $(57.2, 10.0, 32.8-a)$, point $M_r$ $(48.6, (-0.1389a^2+0.6945a-0.8334)r^2+(0.2084a^2-1.0418a+1.2501)r+(-0.0695a^2+0.3475a+17.783), 51.4-a-y)$, point $I_r$ $((-0.08337a^2+0.8057a-2.0001)r^2+(-0.0745a^2-0.6105a-10.798)r+(0.108a^2-4.346a+44.399), 100-a-x-z, (0.33337a^2-1.5557a+2.2779)r^2+(-0.225a^2+1.508a+10.334)r+(-0.033a^2+3.121a+37.64))$, and point $H_r$ $((-0.25003a^2+0.8613a-1.1669)r^2+(0.275a^2-1.3914a-8.0502)r+(0.0245a^2-4.4175a+67.515), 0.0, 100-a-x)$, if $3.0<a\leq 5.0$, the 5 points are the following:

point $L_r$ $(72.0, 0.0, 28.0-a)$, point $L'_r$ $(57.2, 10.0, 32.8-a)$, point $M_r$ $(48.6, 18.2, 31.2-a)$, point $I_r$ $((-0.05554a^2+0.8332a-2.3331)r^2+(-0.2165a^2+1.2485a-15.097)r+(0.1715a^2-5.2775a+46.622), 100-a-x-z, (0.0556a^2-0.8329a+2.6103)r^2+(0.1915a^2-1.0235a+14.18)r+(-0.1715a^2+4.2775a+35.417))$, and point $H_r$ $((-0.72215a^2+6.3327a-13.332)r^2+(0.6835a^2-6.3015a+3.003)r+(0.039a^2-4.434a+67.434), 0.0, 100-a-x)$, or if $5.0<a\leq 7.5$, the 5 points are the following:

point $L_r$ $(72.0, 0.0, 28.0-a)$, point $L'_r$ $(57.2, 10.0, 32.8-a)$, point $M_r$ $(48.6, (0.0592a^2-0.6512a+1.776)r^2+(-0.0355a^2+0.3901a-1.062)r+(0.0029a^2-0.0323a+18.29), 51.4-a-y)$, point $I_r$ $((0.19254a^2-1.8957a+5.1093)r^2+(-0.3156a^2+3.3386a-23.07)r+(0.1097a^2-4.9961a+46.759), 100-a-x-z, (-0.0074a^2-0.4187a+2.1117)r^2+(0.0379a^2+0.1335a+12.236)r+(-0.0571a^2+3.3777a+37.055))$, and point $H_r$ $((0.037a^2-0.1293a-0.0008)r^2+(-0.056a^2+0.2a-11.017)r+(0.0719a^2-4.8515a+68.7), 0.0, 100-x-a)$.

In this case, the refrigerant according to the present disclosure has a refrigerating capacity of 80% or more relative to that of R410A and a GWP of 125 or less, and is classified under the category of WCF lower flammability.

The refrigerant according to the present disclosure may further comprise other additional refrigerants in addition to HFO-1132 (E), R32, R1234ze, $CO_2$, and R1234yf as long as the above properties and effects are not impaired. In this respect, the refrigerant according to the present disclosure preferably comprises HFO-1132(E), R32, R1234ze, and $CO_2$ in a total amount of 99.5 mass % or more, more preferably 99.75 mass % or more, and even more preferably 99.9 mass % or more, based on the entire refrigerant. Further, the refrigerant according to the present disclosure may comprise HFO-1132(E), R32, R1234ze, $CO_2$, and R1234yf in a total amount of 99.5 mass % or more, 99.75 mass % or more, or 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

1.2 Use

The refrigerant according to the present disclosure can be preferably used as a working fluid in a refrigerating machine.

The refrigerant according to the present disclosure is suitable for use as an alternative refrigerant for R410A.

2. Refrigerant Composition

The refrigerant composition according to the present disclosure comprises at least the refrigerant according to the present disclosure and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

2.1 Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2 Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

Specifically, the following compounds are preferable as the tracer.

FC-14 (tetrafluoromethane, $CF_4$)

HCC-40 (chloromethane, $CH_3Cl$)

HFC-23 (trifluoromethane, $CHF_3$)

HFC-41 (fluoromethane, $CH_3Cl$)

HFC-125 (pentafluoroethane, $CF_3CHF_2$)

HFC-134a (1,1,1,2-tetrafluoroethane, $CF_3CH_2F$)

HFC-134 (1,1,2,2-tetrafluoroethane, $CHF_2CHF_2$)

HFC-143a (1,1,1-trifluoroethane, $CF_3CH_3$)

HFC-143 (1,1,2-trifluoroethane, $CHF_2CH_2F$)

HFC-152a (1,1-difluoroethane, $CHF_2CH_3$)

HFC-152 (1,2-difluoroethane, $CH_2FCH_2F$)

HFC-161 (fluoroethane, $CH_3CH_2F$)

HFC-245fa (1,1,1,3,3-pentafluoropropane, $CF_3CH_2CHF_2$)

HFC-236fa (1,1,1,3,3,3-hexafluoropropane, $CF_3CH_2CF_3$)

HFC-236ea (1,1,1,2,3,3-hexafluoropropane, $CF_3CHFCHF_2$)

HFC-227ea (1,1,1,2,3,3,3-heptafluoropropane, $CF_3CHFCF_3$)

HCFC-22 (chlorodifluoromethane, $CHClF_2$)

HCFC-31 (chlorofluoromethane, $CH_2ClF$)

CFC-1113 (chlorotrifluoroethylene, $CF_2{=}CClF$)

HFE-125 (trifluoromethyl-difluoromethyl ether, $CF_3OCHF_2$)

HFE-134a (trifluoromethyl-fluoromethyl ether, $CF_3CH_2F$)

HFE-143a (trifluoromethyl-methyl ether, $CF_3OCH_3$)

HFE-227ea (trifluoromethyl-tetrafluoroethyl ether, $CF_3CHFCF_3$)

HFE-236fa (trifluoromethyl-trifluoroethyl ether, $CF_3OCH_2CF_3$)

The refrigerant composition according to the present disclosure may contain a tracer in a total amount of about 10 parts per million by weight (ppm) to about 1000 ppm based on the entire refrigerant composition. The refrigerant composition according to the present disclosure may preferably contain a tracer in a total amount of about 30 ppm to about 500 ppm, and more preferably about 50 ppm to about 300 ppm, based on the entire refrigerant composition.

2.3 Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4 Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5 Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

3.1 Refrigeration Oil

The refrigeration oil-containing working fluid according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, can be suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

3.2 Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises circulating the refrigerant according to the present disclosure in a refrigerating machine.

The embodiments are described above; however, it will be understood that various changes in forms and details can be made without departing from the spirit and scope of the claims.

Item 1.

A composition comprising a refrigerant, the refrigerant comprising trans-1,2-difluoroethylene (HFO-1132(E)), difluoromethane (R32), 1,3,3,3-tetrafluoropropene (R1234ze), and carbon dioxide ($CO_2$).

Item 2.

The composition according to Item 1, wherein in the refrigerant, when the mass % of HFO-1132(E), R32, R1234ze, and $CO_2$ based on their sum is respectively represented by x, y, z, and a, (1) if 0<a≤0.4, coordinates (x,y,z) in a ternary composition diagram in which the sum of HFO-1132(E), R32, and R1234ze is (100−a) mass % are within the range of a figure surrounded by straight lines LL', L'M, MN, NO, OK, KH, and HL that connect 7 points, i.e., points L, L', M, N, O, K, and H, or on the straight lines LL', L'M, MN, NO, OK, and KH (excluding the points L and H):

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point K (−2.5a+1.0, −0.25a+51.5, 1.75a+47.5), and
point H ($0.1667a^2$−4.5667a+67.6, 0.0, $-0.1667a^2$+3.5667a+32.4), (2) if 0.4≤a≤7.5, coordinates (x,y,z) in the ternary composition diagram are within the range of a figure surrounded by straight lines LL', L'M, MN, NO, OB", B"K', K'H, and HL that connect 8 points, i.e., points L, L', M, N, O, B", K', and H, or on the straight lines LL', L'M, MN, NO, OB", and K'H (excluding the points L, B", K', and H), and if 0.4≤a≤1.0, the 8 points are the following:

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0.0, −3.0a+52.6, 2.0a+47.4), and
point H ($0.1667a^2$−4.5667a+67.6, 0.0, $-0.1667a^2$+3.5667a+32.4), if 1.0<a≤3.0, the 8 points are the following:

point L (72.0, 0.0, −a+28.0),
point L' (57.2, 10.0, −a+32.8),
point M (−0.019a+48.618, 0.019a+18.082, −a+33.3),
point N (−0.0175a+36.679, 0.0175a+36.679, −a+27.6),
point O (−0.0095a+28.914, 0.0095a+51.586, −a+19.5),
point B" (0.0, 51.4, −a+48.6),
point K' (0, −2.9a+52.5, 1.9a+47.5), and
point H ($0.05a^2$−4.55a+67.7, 0.0, $-0.05a^2$+3.55a+32.3), if 3.0<a≤5.0, the 8 points are the following:

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0, −2.9a+52.5, 1.9a+47.5), and
point H ($0.05a^2$−4.55a+67.7, 0.0, $-0.05a^2$+3.55a+32.3), or if 5.0<a≤7.5, the 8 points are the following:

point L (72.0, 0.0, −a+28.0),
point L' (57.2, 10.0, −a+32.8), point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0, −2.8286a+52.105, 1.8286a+47.895), and
point H ($0.02a^2$−4.21a+66.75, 0.0, $-0.02a^2$+3.21a+33.25)

Item 3.

The composition according to Item 1, wherein in the refrigerant, when the mass % of HFO-1132(E), R32, R1234ze, and $CO_2$ based on their sum is respectively represented by x, y, z, and a, (1) if 0<a≤5.5, coordinates (x,y,z) in a ternary composition diagram in which the sum of HFO-1132(E), R32, and R1234ze is (100−a) mass % are within the range of a figure surrounded by straight lines LL', L'M, MN, NJ, JH, and HL that connect 6 points, i.e., points L, L', M, N, J, and H, or on the straight lines LL', L'M, MN, NJ, and JH (excluding the points L and H), and if 0<a≤1.0, the 6 points are the following:

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J ($-0.3333a^2$−3.3667a+20.3, 36.6, $0.3333a^2$+2.3667a+43), and
point H ($0.1667a^2$−4.5667a+67.6, 0.0, $-0.1667a^2$+3.5667a+32.4), if 1.0<a≤3.0, the 6 points are the following:

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J ($0.05a^2$−3.95a+20.5, $0.05a^2$−0.25a+36.8, $-0.1a^2$+3.2a+42.7), and
point H ($0.05a^2$−4.55a+67.7, 0.0, $-0.05a^2$+3.55a+32.3), if 3.0<a≤5.0, the 6 points are the following:

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J ($0.05a^2$−4.05a+20.8, 36.5, $-0.05a^2$+3.05a+42.7), and
point H ($0.05a^2$−4.55a+67.7, 0.0, $-0.05a^2$+3.55a+32.3), or if 5.0<a≤5.5, the 6 points are the following:

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J (−3.6a+19.8, 36.5, 2.6a+43.7), and
point H ($0.02a^2$−4.21a+66.75, 0.0, $-0.02a^2$+3.21a+33.25), (2) if 5.5<a≤7.5, coordinates (x,y,z) in the ternary composition diagram are within the range of a figure surrounded by straight lines LL', L'M, MN, NB', B'K', K'H, and HL that connect 7 points, i.e., points L, L', M, N, B', K', and H, or on the straight lines LL', L'M, MN, NB', K'H, and HL (excluding the points L, B', K', and H):

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point B' (0.0, 36.5, −a+63.5),
point K' (0.0, −2.8286a+52.105, 1.8281a+47.895), and
point H ($0.02a^2$−4.21a+66.75, 0.0, $-0.02a^2$+3.21a+33.25).

Item 4.

The composition according to Item 1, wherein in the refrigerant, when the mass % of HFO-1132(E), R32, R1234ze, and $CO_2$ based on their sum is respectively represented by x, y, z, and a, coordinates (x,y,z) in a ternary composition diagram in which the sum of HFO-1132(E), R32, and R1234ze is (100−a) mass % are within the range of a figure surrounded by straight lines LL', L'M, MI, IH, and HL that connect 5 points, i.e., points L, L', M, I, and H, or on the straight lines LL', L'M, MI, and IH (excluding the points L and H), and if 0<a≤1.0, the 5 points are the following:

point L (72.0, 0.0, −a+28.0), point L' (57.2, 10.0, −a+32.8), point M (−0.019a+48.618, 0.019a+18.082, −a+33.3), point I $(-0.1667a^2-3.9333a+44.2, 18.1, 0.1667a^2+2.9333a+37.7)$, and point H $(0.1667a^2-4.5667a+67.6, 0.0, -0.1667a^2+3.5667a+32.4)$, if 1.0<a≤3.0, the 5 points are the following:

point L (72.0, 0.0, −a+28.0), point L' (57.2, 10.0, −a+32.8), point M (−0.019a+48.618, 0.019a+18.082, −a+33.3), point I $(0.05a^2-4.25a+44.3, 18.1, -0.05a^2+3.25a+37.6)$, and point H $(0.05a^2-4.55a+67.7, 0.0, -0.05a^2+3.55a+32.3)$, if 3.0<a≤5.0, the 5 points are the following:

point L (72.0, 0.0, −a+28.0), point L' (57.2, 10.0, −a+32.8), point M (−0.019a+48.618, 0.019a+18.082, −a+33.3), point I $(-0.05a^2-3.45a+42.8, 0.05a^2-0.45a+19.0, 2.9a+38.2)$, and point H $(0.05a^2-4.55a+67.7, 0.0, -0.05a^2+3.55a+32.3)$, or if 5.0<a≤7.5, the 5 points are the following:

point L (72.0, 0.0, −a+28.0), point L' (57.2, 10.0, −a+32.8), point M (−0.019a+48.618, 0.019a+18.082, −a+33.3), point I $(0.1a^2-4.85a+46.05, -0.02a^2+0.21a+17.45, -0.08a^2+3.64a+36.5)$, and point H $(0.02a^2-4.21a+66.75, 0.0, -0.02a^2+3.21a+33.25)$.

Item 5.

The composition according to any one of Items 1 to 4, wherein the refrigerant further comprises 2,3,3,3-tetrafluoro-1-propene (R1234yf).

Item 6.

The composition according to Item 5, wherein in the refrigerant, when the mass % of HFO-1132(E) is x, the mass % of R32 is y, the mass % of the sum of R1234ze and R1234yf is z, and the mass % of $CO_2$ is a based on the sum of HFO-1132(E), R32, R1234ze, R1234yf, and $CO_2$, if r=R1234yf/(R1234ze+R1234yf), and 0.1≤r<1.0, coordinates (x,y,z) in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is (100−a) mass % are within the range of a figure surrounded by straight lines $L_rL'_r$, $L'_rM_r$, $M_rN_r$, $N_rO_r$, $O_rB''_r$, $B''_rK'$ r, $K'_rH_r$, and $H_rL_r$ that connect 8 points, i.e., points $L_r$, $L'_r$, $M_r$, $N_r$, $O_r$, $B''_r$, $K'_r$, and $H_r$, or on the straight lines $L_rL'_r$, $L'_rM_r$, $M_rN_r$, $N_rO_r$, $O_rB''_r$, and $K'_rH_r$ (excluding the points $L_r$, $B''_r$, $K'_r$, and $H_r$), and if 0<a≤1.0, the 8 points are the following:

point $L_r$ (72.0, 0.0, 28.0−a), point $L'_r$ (57.2, 10.0, 32.8−a), point $M_r$ $(48.6, -0.2778r^2+0.4167r+18.061, 51.4-a-y)$, point $N_r$ $(35.7, -0.2778r^2+0.4167r+36.661, 51.4-a-y)$, point $O_r$ $(28.9, -0.2222r^2-0.1333r+51.611, 71.1-a-y)$, point $B''_r$ $(0.0, (0.463a^2-0.1852a-0.2778) r^2+(-0.6945a^2+0.2778a+0.4167) r+(0.2317a^2-0.0927a+51.361), 51.4-a-y)$, point $K'_r$ $(0.0, (0.3705a^2-0.1482a-0.6667) r^2+(-0.2217a^2+0.0887a-11.6) r+(0.0183a^2-3.0073a+52.567), 100-a-y)$, and point $H_r$ $((2.4072a^2-2.0739a-0.8889) r^2+(-2.2779a^2+1.5779a-8.4667) r+(0.0392a^2-4.5732a+67.656), 0.0, 100-a-x)$, if 1.0<a≤3.0, the 8 points are the following:

point $L_r$ (72.0, 0.0, 28.0−a), point $L'_r$ (57.2, 10.0, 32.8−a), point $M_r$ $(48.6, (-0.1389a^2+0.6945a-0.8334) r^2+(0.2084a^2-1.0418a+1.2501) r+(-0.0695a^2+0.3475a+17.783), 51.4-a-y)$, point $N_r$ $(35.7, -0.2778r^2+0.4167r+36.661, 51.4-a-y)$, point $O_r$ $(28.9, (0.25a^2-1.25a+1.2222) r^2+(-0.275a^2+1.375a-1.2333) r+(0.025a^2-0.125a+51.711), 71.1-y-a)$, point $B''_r$ $(0.0, (0.25a^2-1.0278a+0.7778) r^2+(-0.275a^2+1.2419a-0.9668) r+(0.075a^2-0.364a+51.789), 100-a-y)$, point $K'_r$ $(0.0, (0.16667a^2+0.2222a-0.8333) r^2+(-0.3495a^2+0.3645a-11.748) r+(0.1335a^2-3.2395a+52.684), 100-a-y)$, and point $H_r$ $((-0.25003a^2+0.8613a-1.1669) r^2+(0.275a^2-1.3914a-8.0502) r+(0.0245a^2-4.4175a+67.515), 0.0, 100-a-x)$, if 3.0<a≤5.0, the 8 points are the following:

point $L_r$ (72.0, 0.0, 28.0−a), point $L'_r$ (57.2, 10.0, 32.8−a), point $M_r$ (48.6, 18.2, 33.2−a), point $N_r$ $(35.7, (-0.1389a^2+1.2501a-2.778) r^2+(0.2084a^2-1.8752a+4.167) r+(-0.0695a^2+0.6255a+35.41), 51.4-a-y)$, point $O_r$ $(28.9, (0.1389a^2-0.9723a+1.389) r^2+(-0.2083a^2+1.4585a-2.0845) r+(0.0695a^2-0.4865a+52.395), 71.1-a-y)$, point $B''_r$ $(0.0, -0.0556r^2+0.2833r+51.372, 100-a-y)$, point $K'_r$ $(0.0, (0.77775a^2-6.2775a+13.166) r^2+(-0.9665a^2+8.0155a-29.148) r+(0.189a^2-4.54a+56.086), 100-a-y)$, and point $H_r$ $((-0.72215a^2+6.3327a-13.332) r^2+(0.6835a^2-6.3015a+3.003) r+(0.039a^2-4.434a+67.434), 0.0, 100-x-a)$, or if 5.0<a≤7.5, the 8 points are the following:

point $L_r$ (72.0, 0.0, 28.0−a), point $L'_r$ (57.2, 10.0, 32.8−a), point $M_r$ $(48.6, (0.0592a^2-0.6512a+1.776) r^2+(-0.0355a^2+0.3901a-1.062) r+(0.0029a^2-0.0323a+18.29), 51.4-a-y)$, point $N_r$ (35.7, 36.8, 27.5−a), point $O_r$ (28.9, 51.7, 19.4−a), point $B''_r$ $(0.0, -0.0556r^2+0.2833r+51.372, 100-a-y)$, point $K'_r$ $(0.0, (0.10373a^2-0.9189a+3.2232) r^2+(-0.1285a^2+1.2799a-16.419) r+(0.0252a^2-3.1662a+53.312), 100-a-y)$, and point $H_r$ $((0.037a^2-0.1293a-0.0008) r^2+(-0.056a^2+0.2a-11.017) r+(0.0719a^2-4.8515a+68.7), 0.0, 100-a-x)$.

Item 7.

The composition according to Item 6, wherein in the refrigerant, when the mass % of HFO-1132(E) is x, the mass % of R32 is y, the mass % of the sum of R1234ze and R1234yf is z, and the mass % of $CO_2$ is a based on the sum of HFO-1132(E), R32, R1234ze, R1234yf, and $CO_2$, if r=R1234yf/(R1234ze+R1234yf), and 0.1≤r<1.0, coordinates (x,y,z) in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is (100−a) mass % are within the range of a figure surrounded by straight lines $L_rL'_r$, $L'_rM_r$, $M_rI_r$, $I_rH_r$, and $H_rL_r$ that connect 5 points, i.e., points $L_r$, $L'_r$, $M_r$, $I_r$, and $H_r$, or on the straight lines $L_rL'_r$, $L'_rM_r$, $M_rI_r$, and $I_rH_r$, and if 0<a≤1.0, the 5 points are the following:

point $L_r$ (72.0, 0.0, 28.0−a), point $L'_r$ (57.2, 10.0, 32.8−a), point $M_r$ (48.6, $-0.2778r^2+0.4167r+18.061$, 51.4−a−y), point $I_r$ (($1.1576a^2-0.3243a-2.1111$) $r^2$+($-0.9a^2-0.35a-10.233$) r+($-0.255a^2-3.828a+44.244$), 100−a−x−z, ($1.1572a^2+0.3239a+1.8889$) $r^2$+($0.9042a^2+0.3458a+10.367$) r+($0.2525a^2+2.8315a+37.644$)), and point $H_r$ (($2.4072a^2-2.0739a-0.8889$) $r^2$+($-2.2779a^2+1.5779a-8.4667$) r+($0.0392a^2-4.5732a+67.656$), 0.0, 100−a−x), if 1.0<a≤3.0, the 5 points are the following:

point $L_r$ (72.0, 0.0, 28.0−a), point $L'_r$ (57.2, 10.0, 32.8−a), point $M_r$ (48.6, ($-0.1389a^2+0.6945a-0.8334$) $r^2$+($0.2084a^2-1.0418a+1.2501$) r+($-0.0695a^2+0.3475a+17.783$), 51.4−a−y), point $I_r$ (($-0.08337a^2+0.8057a-2.0001$) $r^2$+($-0.0745a=-0.6105a-10.798$) r+($0.108a^2-4.346a+44.399$), 100−a−x−z, ($0.33337a^2-1.5557a+2.2779$) $r^2$+($-0.225a^2+1.508a+10.334$) r+($-0.033a^2+3.121a+37.64$)), and point $H_r$ (($-0.25003a^2+0.8613a-1.1669$) $r^2$+($0.275a^2-1.3914a-8.0502$) r+($0.0245a^2-4.4175a+67.515$), 0.0, 100−a−x), if 3.0<a≤5.0, the 5 points are the following:

point $L_r$ (72.0, 0.0, 28.0−a), point $L'_r$ (57.2, 10.0, 32.8−a), point $M_r$ (48.6, 18.2, 31.2−a), point $I_r$ (($-0.05554a^2+0.8332a-2.3331$) $r^2$+($-0.2165a^2+1.2485a-15.097$) r+($0.1715a^2-5.2775a+46.622$), 100−a−x−z, ($0.0556a^2-0.8329a+2.6103$) $r^2$+($0.1915a^2-1.0235a+14.18$) r+($-0.1715a^2+4.2775a+35.417$)), and point $H_r$ (($-0.72215a^2+6.3327a-13.332$) $r^2$+($0.6835a^2-6.3015a+3.003$) r+($0.039a^2-4.434a+67.434$), 0.0, 100−a−x), or if 5.0<a≤7.5, the 5 points are the following:

point $L_r$ (72.0, 0.0, 28.0−a), point $L'_r$ (57.2, 10.0, 32.8−a), point $M_r$ (48.6, ($0.0592a^2-0.6512a+1.776$) $r^2$+($-0.0355a^2+0.3901a-1.062$) r+($0.0029a^2-0.0323a+18.29$), 51.4−a−y), point $I_r$ (($0.19254a^2-1.8957a+5.1093$) $r^2$+($-0.3156a^2+3.3386a-23.07$) r+($0.1097a^2-4.9961a+46.759$), 100−a−x−z, ($-0.0074a^2-0.4187a+2.1117$) $r^2$+($0.0379a^2+0.1335a+12.236$) r+($-0.0571a^2+3.3777a+37.055$)), and point $H_r$ (($0.037a^2-0.1293a-0.0008$) $r^2$+($-0.056a^2+0.2a-11.017$) r+($0.0719a^2-4.8515a+68.7$), 0.0, 100−x−a).

Item 8.

The composition according to any one of Items 1 to 7, for use as a working fluid for a refrigerating machine, wherein the composition further comprises a refrigeration oil.

Item 9.

The composition according to any one of Items 1 to 7, for use as an alternative refrigerant for R410A.

Item 10.

Use of the composition according to any one of Items 1 to 7 as an alternative refrigerant for R410A.

Item 11.

A refrigerating machine comprising the composition according to any one of Items 1 to 7 as a working fluid.

Item 12.

A method for operating a refrigerating machine, comprising circulating the composition according to any one of Items 1 to 7 as a working fluid in a refrigerating machine.

EXAMPLES

The present disclosure is described in more detail below with reference to Examples. However, the present disclosure is not limited to the Examples.

Example A

Mixed refrigerants were prepared by mixing HFO-1132 (E), R32, R1234ze, and $CO_2$ at mass % based on their sum shown in Tables 1 to 6.

The GWP of R410A (R32=50%/R125=50%) and the mixed refrigerants was evaluated based on the values stated in the Intergovernmental Panel on Climate Change (IPCC), fourth report.

The GWP of HFO-1132(E), which was not stated therein, was assumed to be 1 from HFO-1132a (GWP=1 or less) and HFO-1123 (GWP=0.3, described in PTL 1). The refrigerating capacity of R410A and the mixed refrigerants was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity ratio of the mixed refrigerants relative to those of R410A were determined. The calculation conditions were as follows.

Evaporating temperature: 5° C.

Condensation temperature: 45° C.

Degree of superheating: 5 K

Degree of subcooling: 5 K

Compressor efficiency: 70%

Tables 1 to 6 show these values together with the GWP of each mixed refrigerant. The COP and refrigerating capacity are ratios relative to R410A.

The coefficient of performance (COP) was determined according to the following formula.

$$COP = \text{(refrigerating capacity or heating capacity)} / \text{power consumption}$$

TABLE 1

| Item | Unit | Com Ex1 | Com Ex2 H | Com Ex3 I | Com Ex4 J | Com Ex5 K | Com Ex6 A | Com Ex7 B | Com Ex8 A' |
|---|---|---|---|---|---|---|---|---|---|
| HFO-1132 (E) | mass % | R410A | 67.6 | 44.2 | 20.3 | 1.0 | 81.6 | 0.0 | 63.0 |
| R32 | mass % | | 0.0 | 18.1 | 35.6 | 51.5 | 18.4 | 17.8 | 37.0 |
| R1234ze | mass % | | 32.4 | 37.7 | 43.1 | 47.5 | 0.0 | 82.2 | 0.0 |
| CO2 | mass % | | 0.0 | 0.0 | 0.0 | 0.0 | 0.0 | 0.0 | 0.0 |
| GWP | — | 2088 | 3 | 125 | 250 | 350 | 125 | 125 | 250 |
| COP ratio | % (relative to R410A) | 100 | 101.4 | 101.7 | 103.0 | 104.5 | 98.7 | 107.8 | 98.7 |
| Refrigerating Capacity Ratio | % (relative to R4104) | 100 | 80.0 | 82.8 | 82.5 | 80.0 | 105.3 | 52.1 | 110.0 |
| Condensation Glide | ° C. | 0.1 | 4.5 | 6.6 | 7.4 | 6.9 | 0.3 | 10.4 | 0.1 |

| Item | Unit | Com Ex9 B' | Com Ex10 A'' | Com Ex11 B'' | Com Ex12 L | Com Ex13 L' | Com Ex14 M | Com Ex15 N | Com Ex16 O |
|---|---|---|---|---|---|---|---|---|---|
| HFO-1132 (E) | mass % | 0.0 | 48.2 | 0.0 | 72.0 | 57.2 | 48.6 | 35.7 | 28.9 |
| R32 | mass % | 36.5 | 51.8 | 51.4 | 0.0 | 10.0 | 18.1 | 36.7 | 51.6 |
| R1234ze | mass % | 63.5 | 0.0 | 48.6 | 28.0 | 32.8 | 33.3 | 27.6 | 19.5 |
| CO2 | mass % | 0.0 | 0.0 | 0.0 | 0.0 | 0.0 | 0.0 | 0.0 | 0.0 |
| GWP | — | 250 | 350 | 350 | 2 | 70 | 125 | 250 | 350 |
| COP ratio | % (relative to R410A) | 106.2 | 99.2 | 104.6 | 101.1 | 101.2 | 101.2 | 101.0 | 100.9 |
| Refrigerating Capacity Ratio | % (relative to R410A) | 68.0 | 112.1 | 79.2 | 82.6 | 83.4 | 85.5 | 92.8 | 99.7 |
| Condensation Glide | ° C | 9.5 | 0.0 | 7.0 | 3.9 | 5.4 | 5.8 | 4.7 | 3.0 |

| Item | Unit | Com Ex1 | Com Ex17 H' | Com Ex18 I' | Com Ex19 I'' | Com Ex20 J' | Com Ex21 J'' |
|---|---|---|---|---|---|---|---|
| HFO-1132 (E) | mass % | R410A | 51.5 | 39.8 | 27.6 | 16.7 | 8.6 |
| R32 | mass % | | 10.0 | 18.1 | 27.3 | 36.5 | 44.0 |
| R1234ze | mass % | | 38.5 | 42.1 | 45.1 | 46.8 | 47.4 |
| CO2 | mass % | | 0.0 | 0.0 | 0.0 | 0.0 | 0.0 |
| GWP | — | 2088 | 70 | 125 | 187 | 249 | 300 |
| COP ratio | % (relative to R410A) | 100 | 101.8 | 102.3 | 102.9 | 103.5 | 104.0 |
| Refrigerating Capacity Ratio | % (relative to R4104) | 100 | 80.0 | 80.0 | 80.0 | 80.0 | 80.0 |
| Condensation Glide | ° C. | 0.1 | 6.4 | 7.4 | 8.0 | 7.9 | 7.5 |

| Item | Unit | Com Ex22 H | Example1 I | Example2 J | Com Ex23 K' = B'' | Com Ex24 A | Com Ex25 B | Com Ex26 A' | Com Ex27 B' |
|---|---|---|---|---|---|---|---|---|---|
| HFO-1132 (E) | mass % | 65.8 | 42.6 | 18.9 | 0.0 | 81.2 | 0.0 | 62.6 | 0.0 |
| R32 | mass % | 0.0 | 18.1 | 36.6 | 51.4 | 18.4 | 17.8 | 37.0 | 36.5 |
| R1234ze | mass % | 33.8 | 38.9 | 44.1 | 48.2 | 0.0 | 81.8 | 0.0 | 63.1 |
| CO2 | mass % | 0.4 | 0.4 | 0.4 | 0.4 | 0.4 | 0.4 | 0.4 | 0.4 |
| GWP | — | 3 | 125 | 250 | 350 | 125 | 125 | 250 | 250 |
| COP ratio | % (relative to R410A) | 101.3 | 101.7 | 103.0 | 104.5 | 98.5 | 107.6 | 98.5 | 106.0 |
| Refrigerating Capacity Ratio | % (relative to R410A) | 80.0 | 82.8 | 82.5 | 80.0 | 106.1 | 53.0 | 110.7 | 68.9 |
| Condensation Glide | ° C. | 5.4 | 7.3 | 7.9 | 7.3 | 0.6 | 11.1 | 0.3 | 9.9 |

TABLE 2

| Item | Unit | Com Ex28 A'' | Com Ex29 L | Example3 L' | Example4 M | Example5 N | Example6 O |
|---|---|---|---|---|---|---|---|
| HFO-1132 (E) | mass % | 47.8 | 72.0 | 57.2 | 48.6 | 35.7 | 28.9 |
| R32 | mass % | 51.8 | 0.0 | 10.0 | 18.1 | 36.7 | 51.6 |
| R1234ze | mass % | 0.0 | 27.6 | 32.4 | 32.9 | 27.2 | 19.1 |
| CO2 | mass % | 0.4 | 0.4 | 0.4 | 0.4 | 0.4 | 0.4 |
| GWP | — | 350 | 2 | 70 | 125 | 250 | 350 |
| COP ratio | % (relative to R410A) | 99.0 | 100.8 | 100.9 | 100.9 | 100.8 | 100.8 |
| Refrigerating Capacity Ratio | % (relative to R410A) | 112.8 | 83.6 | 84.5 | 86.5 | 93.7 | 100.6 |
| Condensation Glide | ° C. | 0.2 | 4.4 | 5.8 | 6.1 | 4.9 | 3.2 |

| Item | Unit | Com Ex30 H | Example7 I | Example8 J | Com Ex31 K' | Com Ex32 A | Com Ex33 B | Com Ex34 A' | Com Ex35 B' |
|---|---|---|---|---|---|---|---|---|---|
| HFO-1132 (E) | mass % | 63.2 | 40.1 | 16.6 | 0.0 | 80.6 | 0.0 | 62.0 | 0.0 |
| R32 | mass % | 0.0 | 18.1 | 36.6 | 49.6 | 18.4 | 17.8 | 37.0 | 36.5 |
| R1234ze | mass % | 35.8 | 40.8 | 45.8 | 49.4 | 0.0 | 81.2 | 0.0 | 62.5 |
| CO2 | mass % | 1.0 | 1.0 | 1.0 | 1.0 | 1.0 | 1.0 | 1.0 | 1.0 |
| GWP | — | 3 | 125 | 250 | 338 | 125 | 125 | 250 | 250 |
| COP ratio | % (relative to R410A) | 101.1 | 101.6 | 103.0 | 104.3 | 98.2 | 107.4 | 98.2 | 105.7 |

TABLE 2-continued

| | | | | | | | | | |
|---|---|---|---|---|---|---|---|---|---|
| Refrigerating Capacity Ratio | % (relative to R410A) | 80.0 | 82.6 | 82.2 | 80.0 | 107.3 | 54.3 | 111.8 | 70.2 |
| Condensation Glide | ° C. | 6.5 | 8.2 | 8.7 | 8.1 | 1.0 | 12.1 | 0.7 | 10.5 |

| Item | Unit | Com Ex36 A'' | Com Ex37 B'' | Com Ex38 L | Example9 L' | Example10 M | Example11 N | Example12 O |
|---|---|---|---|---|---|---|---|---|
| HFO-1132 (E) | mass % | 47.2 | 0.0 | 72.0 | 57.2 | 48.6 | 35.7 | 28.9 |
| R32 | mass % | 51.8 | 51.4 | 0.0 | 10.0 | 18.1 | 36.7 | 51.6 |
| R1234ze | mass % | 0.0 | 47.6 | 27.0 | 31.8 | 32.3 | 26.6 | 18.5 |
| CO2 | mass % | 1.0 | 1.0 | 1.0 | 1.0 | 1.0 | 1.0 | 1.0 |
| GWP | — | 350 | 350 | 2 | 70 | 125 | 250 | 350 |
| COP ratio | % (relative to R410A) | 98.8 | 104.2 | 100.4 | 100.5 | 100.6 | 100.5 | 100.5 |
| Refrigerating Capacity Ratio | % (relative to R410A) | 113.8 | 81.3 | 85.3 | 86.0 | 88.0 | 95.1 | 101.9 |
| Condensation Glide | ° C. | 0.5 | 7.7 | 5.1 | 6.4 | 6.6 | 5.2 | 3.5 |

TABLE 3

| Item | Unit | Com Ex39 H | Example13 I | Example14 J | Com Ex40 K' | Com 41 A | Com Ex42 B | Com Ex43 A' | Com Ex44 B' |
|---|---|---|---|---|---|---|---|---|---|
| HFO-1132 (E) | mass % | 58.8 | 36.0 | 12.8 | 0.0 | 79.6 | 0.0 | 61.0 | 0.0 |
| R32 | mass % | 0.0 | 18.1 | 36.5 | 46.7 | 18.4 | 17.8 | 37.0 | 36.5 |
| R1234ze | mass % | 39.2 | 43.9 | 48.7 | 51.3 | 0.0 | 80.2 | 0.0 | 61.5 |
| CO2 | mass % | 2.0 | 2.0 | 2.0 | 2.0 | 2.0 | 2.0 | 2.0 | 2.0 |
| GWP | — | 3 | 125 | 250 | 318 | 125 | 125 | 250 | 250 |
| COP ratio | % (relative to R410A) | 101 | 101.7 | 103.2 | 104.2 | 97.7 | 107.0 | 97.8 | 105.2 |
| Refrigerating Capacity Ratio | % (relative to R410A) | 80.0 | 82.4 | 81.7 | 80.0 | 109.3 | 56.5 | 113.6 | 72.3 |
| Condensation Glide | ° C. | 8.5 | 9.8 | 10.0 | 9.4 | 1.7 | 13.6 | 1.2 | 11.4 |

| Item | Unit | Com Ex45 A'' | Com Ex46 B'' | Com Ex47 L | Example15 L'' | Example16 M | Example17 N | Example18 O |
|---|---|---|---|---|---|---|---|---|
| HFO-1132 (E) | mass % | 46.2 | 0.0 | 72.0 | 57.2 | 48.6 | 35.7 | 28.9 |
| R32 | mass % | 51.8 | 51.4 | 0.0 | 10.0 | 18.1 | 36.7 | 51.6 |
| R1234ze | mass % | 0.0 | 46.6 | 26.0 | 30.8 | 31.3 | 25.6 | 17.5 |
| CO2 | mass % | 2.0 | 2.0 | 2.0 | 2.0 | 2.0 | 2.0 | 2.0 |
| GWP | — | 350 | 350 | 2 | 70 | 125 | 250 | 350 |
| COP ratio | % (relative to R410A) | 98.4 | 103.8 | 99.7 | 99.9 | 100.0 | 100.0 | 100.1 |
| Refrigerating Capacity Ratio | % (relative to R410A) | 115.5 | 83.5 | 88.0 | 83.5 | 90.4 | 97.5 | 104.2 |
| Condensation Glide | ° C. | 1.0 | 8.4 | 6.2 | 7.2 | 7.3 | 5.8 | 3.9 |

| Item | Unit | Com Ex 48 H | Example19 I | Example20 J | Com Ex49 K' | Com Ex50 A | Com Ex51 B | Com Ex52 A' | Com Ex53 B' |
|---|---|---|---|---|---|---|---|---|---|
| HFO-1132 (E) | mass % | 54.5 | 32.0 | 9.1 | 0.0 | 78.6 | 0.0 | 60.0 | 0.0 |
| R32 | mass % | 0.0 | 18.1 | 36.5 | 43.8 | 18.4 | 17.8 | 37.0 | 36.5 |
| R1234ze | mass % | 42.5 | 46.9 | 51.4 | 53.2 | 0.0 | 79.2 | 0.0 | 60.5 |
| CO2 | mass % | 3.0 | 3.0 | 3.0 | 3.0 | 3.0 | 3.0 | 3.0 | 3.0 |
| GWP | — | 3 | 125 | 250 | 299 | 125 | 125 | 250 | 250 |
| COP ratio | % (relative to R410A) | 100.7 | 101.7 | 103.3 | 104.0 | 97.2 | 106.6 | 97.4 | 104.8 |
| Refrigerating Capacity Ratio | % (relative to R410A) | 80.0 | 82.2 | 81.3 | 80.0 | 111.3 | 58.8 | 115.5 | 74.5 |
| Condensation Glide | ° C. | 10.4 | 11.4 | 11.2 | 10.7 | 2.4 | 15.1 | 1.7 | 12.3 |

| Item | Unit | Com Ex54 A'' | Com Ex55 B'' | Com Ex56 L | Example21 L' | Example22 M | Example23 N | Example24 O |
|---|---|---|---|---|---|---|---|---|
| HFO-1132 (E) | mass % | 45.2 | 0.0 | 72.0 | 57.2 | 48.6 | 35.7 | 28.9 |
| R32 | mass % | 51.8 | 51.4 | 0.0 | 10.0 | 18.1 | 36.7 | 51.6 |
| R1234ze | mass % | 0.0 | 45.6 | 25.0 | 29.8 | 30.3 | 24.6 | 16.5 |
| CO2 | mass % | 3.0 | 3.0 | 3.0 | 3.0 | 3.0 | 3.0 | 3.0 |
| GWP | — | 350 | 350 | 2 | 70 | 125 | 250 | 350 |
| COP ratio | % (relative to R410A) | 98.1 | 103.4 | 99.1 | 99.4 | 99.5 | 99.5 | 99.6 |
| Refrigerating Capacity Ratio | % (relative to R410A) | 117.2 | 85.6 | 90.6 | 91.1 | 92.9 | 99.8 | 106.5 |
| Condensation Glide | ° C. | 1.5 | 9.0 | 7.1 | 8.0 | 7.9 | 6.2 | 4.3 |

TABLE 4

| Item | Unit | Com Ex57 H | Example25 I | Example26 J | Com Ex58 K' | Com Ex59 A | Com Ex60 B | Com Ex61 A' | Com Ex62 B' |
|---|---|---|---|---|---|---|---|---|---|
| HFO-1132 (E) | mass % | 50.3 | 28.2 | 5.4 | 0.0 | 77.6 | 0.0 | 59.0 | 0.0 |
| R32 | mass % | 0.0 | 18.0 | 36.5 | 40.9 | 18.4 | 17.8 | 37.0 | 36.5 |
| R1234ze | mass % | 45.7 | 49.8 | 54.1 | 55.1 | 0.0 | 78.2 | 0.0 | 59.5 |
| CO2 | mass % | 4.0 | 4.0 | 4.0 | 4.0 | 4.0 | 4.0 | 4.0 | 4.0 |
| GWP | — | 3 | 125 | 250 | 279 | 125 | 125 | 250 | 250 |
| COP ratio | % (relative to R410A) | 100.7 | 101.9 | 103.5 | 103.9 | 96.7 | 106.3 | 97.0 | 104.4 |
| Refrigerating Capacity Ratio | % (relative to R410A) | 80.0 | 82.0 | 80.8 | 80.0 | 113.3 | 61.1 | 117.3 | 76.7 |
| Condensation Glide | ° C. | 12.3 | 13.0 | 12.4 | 12.0 | 3.0 | 16.4 | 2.2 | 13.0 |

| Item | Unit | Com Ex63 A" | Com Ex64 B" | Com Ex65 L | Example27 L' | Example28 M | Example29 N | Example30 O |
|---|---|---|---|---|---|---|---|---|
| HFO-1132 (E) | mass % | 44.2 | 0.0 | 72.0 | 57.2 | 48.5 | 35.7 | 28.9 |
| R32 | mass % | 51.8 | 51.4 | 0.0 | 10.0 | 18.2 | 36.7 | 51.6 |
| R1234ze | mass % | 0.0 | 44.6 | 24.0 | 28.8 | 29.3 | 23.6 | 15.5 |
| CO2 | mass % | 4.0 | 4.0 | 4.0 | 4.0 | 4.0 | 4.0 | 4.0 |
| GWP | — | 350 | 350 | 2 | 70 | 125 | 250 | 350 |
| COP ratio | % (relative to R410A) | 97.7 | 103.0 | 98.5 | 98.8 | 99.0 | 99.1 | 99.2 |
| Refrigerating Capacity Ratio | % (relative to R410A) | 118.9 | 87.8 | 93.3 | 93.6 | 95.3 | 102.1 | 108.8 |
| Condensation Glide | ° C. | 2.0 | 9.6 | 7.9 | 8.7 | 8.5 | 6.6 | 4.7 |

TABLE 5

| Item | Unit | Com Ex66 H | Example31 I | Example32 J | Com Ex67 K' | Com Ex68 A | Com Ex69 B | Com Ex70 A' | Com Ex71 B' |
|---|---|---|---|---|---|---|---|---|---|
| HFO-1132 (E) | mass % | 46.2 | 24.3 | 1.8 | 0.0 | 76.6 | 0.0 | 58.0 | 0.0 |
| R32 | mass % | 0.0 | 18.0 | 36.5 | 38.0 | 18.4 | 17.8 | 37.0 | 36.5 |
| R1234ze | mass % | 48.8 | 52.7 | 56.7 | 57.0 | 0.0 | 77.2 | 0.0 | 58.5 |
| CO2 | mass % | 5.0 | 5.0 | 5.0 | 5.0 | 5.0 | 5.0 | 5.0 | 5.0 |
| GWP | — | 3 | 125 | 250 | 260 | 125 | 125 | 250 | 250 |
| COP ratio | % (relative to R410A) | 101 | 102.1 | 103.7 | 103.8 | 96.2 | 106.0 | 96.6 | 104.0 |
| Refrigerating Capacity Ratio | % (relative to R410A) | 80 | 81.7 | 80.2 | 80.0 | 115.2 | 63.4 | 119.1 | 78.8 |
| Condensation Glide | ° C. | 14.1 | 14.5 | 13.5 | 13.4 | 3.5 | 17.6 | 2.6 | 13.8 |

| Item | Unit | Com Ex72 A" | Com Ex73 B" | Com Ex74 L | Example33 L' | Example34 M | Example35 N | Example36 O |
|---|---|---|---|---|---|---|---|---|
| HFO-1132 (E) | mass % | 43.2 | 0.0 | 72.0 | 57.2 | 48.5 | 35.6 | 28.9 |
| R32 | mass % | 51.8 | 51.4 | 0.0 | 10.0 | 18.2 | 36.8 | 51.6 |
| R1234ze | mass % | 0.0 | 43.6 | 23.0 | 27.8 | 28.3 | 22.6 | 14.5 |
| CO2 | mass % | 5.0 | 50 | 5.0 | 5.0 | 5.0 | 5.0 | 5.0 |
| GWP | — | 350 | 350 | 2 | 70 | 125 | 250 | 350 |
| COP ratio | % (relative to R410A) | 97.4 | 102.6 | 98.0 | 98.3 | 98.5 | 98.6 | 98.8 |
| Refrigerating Capacity Ratio | % (relative to R410A) | 129.6 | 89.9 | 96.0 | 96.1 | 97.8 | 104.5 | 111.1 |
| Condensation Glide | ° C. | 2.4 | 10.1 | 8.7 | 9.3 | 9.0 | 7.0 | 5.0 |

| Item | Unit | Com Ex75 H | Example37 I | Com Ex76 K' = J = B' | Com Ex77 A | Com Ex78 B | Com Ex79 A' | Com Ex80 A" | Com Ex81 B" |
|---|---|---|---|---|---|---|---|---|---|
| HFO-1132 (E) | mass % | 44.2 | 22.4 | 0.0 | 76.1 | 0.0 | 57.5 | 42.7 | 0.0 |
| R32 | mass % | 0.0 | 18.0 | 36.5 | 18.4 | 17.8 | 37.0 | 51.8 | 51.4 |
| R1234ze | mass % | 50.3 | 54.1 | 58.0 | 0.0 | 76.7 | 0.0 | 0.0 | 43.1 |
| CO2 | mass % | 5.5 | 5.5 | 5.5 | 5.5 | 5.5 | 5.5 | 5.5 | 5.5 |
| GWP | — | 4 | 125 | 250 | 125 | 125 | 250 | 350 | 350 |
| COP ratio | % (relative to R410A) | 100.8 | 102.2 | 103.8 | 96.0 | 105.9 | 96.4 | 97.2 | 102.4 |
| Refrigerating Capacity Ratio | % (relative to R410A) | 80.0 | 81.6 | 80.0 | 116.2 | 64.5 | 120.0 | 121.5 | 91.0 |
| Condensation Glide | ° C. | 15.0 | 15.2 | 14.1 | 3.7 | 18.1 | 2.9 | 2.6 | 10.4 |

| Item | Unit | Com Ex82 L | Example38 L' | Example39 M | Example40 N | Example41 O |
|---|---|---|---|---|---|---|
| HFO-1132 (E) | mass % | 72.0 | 57.2 | 48.5 | 35.6 | 28.9 |
| R32 | mass % | 0.0 | 10.0 | 18.2 | 36.8 | 51.6 |
| R1234ze | mass % | 22.5 | 27.3 | 27.8 | 22.1 | 14.0 |
| CO2 | mass % | 5.5 | 5.5 | 5.5 | 5.5 | 5.5 |
| GWP | — | 2 | 70 | 125 | 250 | 350 |
| COP ratio | % (relative to R410A) | 97.7 | 98.0 | 98.2 | 98.4 | 98.6 |

TABLE 5-continued

| | | | | | | |
|---|---|---|---|---|---|---|
| Refrigerating Capacity Ratio | % (relative to R410A) | 97.3 | 97.4 | 99.0 | 105.6 | 112.2 |
| Condensation Glide | ° C. | 9.0 | 9.5 | 9.2 | 7.1 | 5.1 |

TABLE 6

| Item | Unit | Com Ex83 H | Example47 I | Com Ex84 K' | Com Ex85 A | Com Ex86 B | Com Ex87 A' | Com Ex88 B' | Com Ex89 A" |
|---|---|---|---|---|---|---|---|---|---|
| HFO-1132 (E) | mass % | 36.3 | 15.3 | 0.0 | 74.1 | 0.0 | 55.5 | 0.0 | 40.7 |
| R32 | mass % | 0.0 | 17.9 | 30.9 | 18.4 | 17.8 | 37.0 | 36.5 | 51.8 |
| R1234ze | mass % | 56.2 | 59.3 | 61.6 | 0.0 | 74.7 | 0.0 | 56.0 | 0.0 |
| CO2 | mass % | 7.5 | 7.5 | 7.5 | 7.5 | 7.5 | 7.5 | 7.5 | 7.5 |
| GWP | — | 4 | 125 | 212 | 125 | 125 | 250 | 250 | 350 |
| COP ratio | % (relative to R410A) | 101.2 | 102.7 | 103.8 | 95.1 | 105.3 | 95.7 | 103.1 | 96.6 |
| Refrigerating Capacity Ratio | % (relative to R410A) | 80.0 | 81.1 | 80.0 | 120.0 | 69.2 | 123.5 | 84.3 | 124.8 |
| Condensation Glide | ° C. | 18.5 | 18.0 | 16.8 | 4.6 | 20.2 | 3.6 | 15.3 | 3.3 |

| Item | Unit | Com Ex90 B" | Com Ex91 L | Example43 L' | Example44 M | Example45 N | Example46 O |
|---|---|---|---|---|---|---|---|
| HFO-1132 (E) | mass % | 0.0 | 72.0 | 57.2 | 48.5 | 35.6 | 28.8 |
| R32 | mass % | 51.4 | 0.0 | 10.0 | 18.2 | 36.8 | 51.7 |
| R1234ze | mass % | 41.1 | 20.5 | 25.3 | 25.8 | 20.1 | 12.0 |
| CO2 | mass % | 7.5 | 7.5 | 7.5 | 7.5 | 7.5 | 7.5 |
| GWP | — | 350 | 2 | 70 | 125 | 250 | 350 |
| COP ratio | % (relative to R410A) | 101.6 | 96.6 | 97.0 | 97.2 | 97.5 | 97.8 |
| Refrigerating Capacity Ratio | % (relative to R410A) | 95.4 | 102.6 | 102.4 | 103.8 | 110.3 | 116.8 |
| Condensation Glide | ° C. | 11.2 | 10.1 | 10.4 | 10.0 | 7.7 | 5.6 |

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren phctographs. A cylindrical container (inner diameter: 155 mm, length: 198 mm) equipped with two light transmission acrylic windows was used as the sample cell, and a xenon lamp was used as the light source. The propagation of flame was photographed with a schlieren system using a collimating lens and a high-speed digital video camera (frame rate: 600 fps), and recorded as video data on a PC. From the video image, flame propagation rate Sb (cm/sec) was measured. The burning velocity (Su) is expressed as the volume of unburned gas consumed by the flame surface of a unit area per unit time and was calculated by using the following formula.

$$Su = Sb * \rho u / \rho b$$

ρu: adiabatic flame temperature (unburned)

ρb: adiabatic flame temperature (burned)

ρu represents the measurement temperature, and ρb represents the combustion of combustion gas and is calculated from isobaric specific heat.

Table 7 shows the results.

TABLE 7

| Item | Unit | L | L' | M | N | O |
|---|---|---|---|---|---|---|
| HFO-1132 (E) | mass % | 72.0 | 57.2 | 48.6 | 35.7 | 28.9 |
| R32 | mass % | 0.0 | 10.0 | 18.1 | 36.7 | 51.6 |
| R1234ze | mass % | 28.0 | 32.8 | 33.3 | 27.6 | 19.5 |
| CO2 | mass % | 0.0 | 0.0 | 0.0 | 0.0 | 0.0 |
| Burning Velocity | cm/s | 10 | 10 | 10 | 10 | 10 |

| Item | Unit | L | L' | M | N | O | L | L' | M | N | O |
|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 |
| R32 | mass % | 0.0 | 10.0 | 18.1 | 36.7 | 51.6 | 0.0 | 10.0 | 18.1 | 36.7 | 51.6 |
| R1234ze | mass % | 27.6 | 32.4 | 32.9 | 27.2 | 19.1 | 27.0 | 31.8 | 32.3 | 26.6 | 18.5 |
| CO2 | mass % | 0.4 | 0.4 | 0.4 | 0.4 | 0.4 | 1.0 | 1.0 | 1.0 | 1.0 | 1.0 |
| 燃焼速度 | cm/s | 10 | 10 | 10 | 10 | 10 | 10 | 10 | 10 | 10 | 10 |

TABLE 7-continued

| Item | Unit | L | L' | M | N | O | L | L' | M | N | O |
|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 |
| R32 | mass % | 0.0 | 10.0 | 18.1 | 36.7 | 51.6 | 0.0 | 10.0 | 18.1 | 36.7 | 51.6 |
| R1234ze | mass % | 26.0 | 30.8 | 31.3 | 25.6 | 17.5 | 25.0 | 29.8 | 30.3 | 24.6 | 16.5 |
| CO2 | mass % | 2.0 | 2.0 | 2.0 | 2.0 | 2.0 | 3.0 | 3.0 | 3.0 | 3.0 | 3.0 |
| 燃焼速度 | cm/s | 10 | 10 | 10 | 10 | 10 | 10 | 10 | 10 | 10 | 10 |
| Item | Unit | L | L' | M | N | O | L | L' | M | N | O |
| HFO-1132 (E) | mass % | 72.0 | 57.2 | 48.5 | 35.7 | 28.9 | 72.0 | 57.2 | 48.5 | 35.6 | 28.9 |
| R32 | mass % | 0.0 | 10.0 | 18.2 | 36.7 | 51.6 | 0.0 | 10.0 | 18.2 | 36.8 | 51.6 |
| R1234ze | mass % | 24.0 | 28.8 | 29.3 | 23.6 | 15.5 | 23.0 | 27.3 | 28.3 | 22.6 | 14.5 |
| CO2 | mass % | 4.0 | 4.0 | 4.0 | 4.0 | 4.0 | 5.0 | 5.0 | 5.0 | 5.0 | 5.0 |
| 燃焼速度 | cm/s | 10 | 10 | 10 | 10 | 10 | 10 | 10 | 10 | 10 | 10 |
| Item | Unit | L | L' | M | N | O | L | L' | M | N | O |
| HFO-1132 (E) | mass % | 72.0 | 57.2 | 48.5 | 35.6 | 28.9 | 72.0 | 57.2 | 48.5 | 35.6 | 28.8 |
| R32 | mass % | 0.0 | 10.0 | 18.2 | 36.8 | 51.6 | 0.0 | 10.0 | 18.2 | 36.8 | 51.7 |
| R1234ze | mass % | 22.5 | 27.3 | 27.8 | 22.1 | 14.0 | 20.5 | 25.3 | 25.8 | 20.1 | 12.0 |
| CO2 | mass % | 5.5 | 5.5 | 5.5 | 5.5 | 5.5 | 7.5 | 7.5 | 7.5 | 7.5 | 7.5 |
| 燃焼速度 | cm/s | 10 | 10 | 10 | 10 | 10 | 10 | 10 | 10 | 10 | 10 |

From these results, it is understood that the refrigerant according to the present disclosure has a refrigerating capacity of 80% or more relative to that of R410A and a GWP of 350 or less, and is classified under the category of WCF lower flammability when the refrigerant is as follows: in the mixed refrigerant, when the mass % of HFO-1132(E), R32, R1234ze, and $CO_2$ based on their sum is respectively represented by x, y, z, and a, (1) if 0<a≤0.4, coordinates (x,y,z) in a ternary composition diagram in which the sum of HFO-1132(E), R32, and R1234ze is (100−a) mass % are within the range of a figure surrounded by straight lines LL', L'M, MN, NO, OK, KH, and HL that connect 7 points, i.e., points L, L', M, N, O, K, and H, or on the straight lines LL', L'M, MN, NO, OK, and KH (excluding the points L and H):

point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point K (−2.5a+1.0, −0.25a+51.5, 1.75a+47.5), and
point H ($0.1667a^2$−4.5667a+67.6, 0.0, $-0.1667a^2$+3.5667a+32.4), (2) if 0.4≤a≤7.5, coordinates (x,y,z) in the ternary composition diagram are within the range of a figure surrounded by straight lines LL', L'M, MN, NO, OB", B"K', K'H, and HL that connect 8 points, i.e., points L, L', M, N, O, B", K', and H, or on the straight lines LL', L'M, MN, NO, OB", and K'H (excluding the points L, B", K', and H), and if 0.4≤a≤1.0, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0.0, −3.0a+52.6, 2.0a+47.4), and
point H ($0.1667a^2$−4.5667a+67.6, 0.0, $-0.1667a^2$+3.5667a+32.4), if 1.0<a≤3.0, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+36.679, 0.0175a+36.679, −a+27.6),
point O (−0.0095a+28.914, 0.0095a+51.586, −a+19.5),
point B" (0.0, 51.4, −a+48.6),
point K' (0, −2.9a+52.5, 1.9a+47.5), and
point H ($0.05a^2$−4.55a+67.7, 0.0, $-0.05a^2$+3.55a+32.3), if 3.0<a≤5.0, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0, −2.9a+52.5, 1.9a+47.5), and
point H ($0.05a^2$−4.55a+67.7, 0.0, $-0.05a^2$+3.55a+32.3),
or if 5.0<a≤7.5, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0, −2.8286a+52.105, 1.8286a+47.895), and
point H ($0.02a^2$−4.21a+66.75, 0.0, $-0.02a^2$+3.21a+33.25).

It is understood that the refrigerant according to the present disclosure has a refrigerating capacity of 80% or more relative to that of R410A and a GWP of 250 or less, and is classified under the category of WCF lower flammability when the refrigerant is as follows: in the refrigerant, when the mass % of HFO-1132(E), R32, R1234ze, and $CO_2$ based on their sum is respectively represented by x, y, z, and a, (1) if 0<a≤5.5, coordinates (x,y,z) in a ternary composition diagram in which the sum of HFO-1132(E), R32, and R1234ze is (100−a) mass % are within the range of a figure surrounded by straight lines LL', L'M, MN, NJ, JH, and HL that connect 6 points, i.e., points L, L', M, N, J, and H, or on the straight lines LL', L'M, MN, NJ, and JH (excluding the points L and H), and if 0<a≤1.0, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6), point J ($-0.3333a^2-3.3667a+20.3$, 36.6, $0.3333a^2+2.3667a+43$), and point H ($0.1667a^2-4.5667a+67.6$, 0.0, $-0.1667a^2+3.5667a+32.4$), if $1.0<a\leq3.0$, the 6 points are the following:

point L (72.0, 0.0, $-a+28.0$), point L' (57.2, 10.0, $-a+32.8$), point M ($-0.019a+48.618$, $0.019a+18.082$, $-a+33.3$), point N ($-0.0175a+35.721$, $0.0175a+36.679$, $-a+27.6$), point J ($0.05a^2-3.95a+20.5$, $0.05a^2-0.25a+36.8$, $-0.1a^2+3.2a+42.7$), and point H ($0.05a^2-4.55a+67.7$, 0.0, $-0.05a^2+3.55a+32.3$), if $3.0<a\leq5.0$, the 6 points are the following:

point L (72.0, 0.0, $-a+28.0$), point L' (57.2, 10.0, $-a+32.8$), point M ($-0.019a+48.618$, $0.019a+18.082$, $-a+33.3$), point N ($-0.0175a+35.721$, $0.0175a+36.679$, $-a+27.6$), point J ($0.05a^2-4.05a+20.8$, 36.5, $-0.05a^2+3.05a+42.7$), and point H ($0.05a^2-4.55a+67.7$, 0.0, $-0.05a^2+3.55a+32.3$), or if $5.0<a\leq5.5$, the 6 points are the following:

point L (72.0, 0.0, $-a+28.0$), point L' (57.2, 10.0, $-a+32.8$), point M ($-0.019a+48.618$, $0.019a+18.082$, $-a+33.3$), point N ($-0.0175a+35.721$, $0.0175a+36.679$, $-a+27.6$), point J ($-3.6a+19.8$, 36.5, $2.6a+43.7$), and point H ($0.02a^2-4.21a+66.75$, 0.0, $-0.02a^2+3.21a+33.25$), (2) if $5.5<a\leq7.5$, coordinates (x,y,z) in the ternary composition diagram are within the range of a figure surrounded by straight lines LL', L'M, MN, NB', B'K', K'H, and HL that connect 7 points, i.e., points L, L', M, N, B', K', and H, or on the straight lines LL', L'M, MN, NB', K'H, and HL (excluding the points L, B', K', and H):

point L (72.0, 0.0, $-a+28.0$), point L' (57.2, 10.0, $-a+32.8$), point M ($-0.019a+48.618$, $0.019a+18.082$, $-a+33.3$), point N ($-0.0175a+35.721$, $0.0175a+36.679$, $-a+27.6$), point B' (0.0, 36.5, $-a+63.5$), point K' (0.0, $-2.8286a+52.105$, $1.8281a+47.895$), and point H ($0.02a^2-4.21a+66.75$, 0.0, $-0.02a^2+3.21a+33.25$).

It is understood that the refrigerant according to the present disclosure has a refrigerating capacity of 80% or more relative to that of R410A and a GWP of 125 or less, and is classified under the category of WCF lower flammability when the refrigerant is as follows: in the refrigerant, when the mass % of HFO-1132(E), R32, R1234ze, and $CO_2$ based on their sum is respectively represented by x, y, z, and a, coordinates (x,y,z) in a ternary composition diagram in which the sum of HFO-1132(E), R32, and R1234ze is (100−a) mass % are within the range of a figure surrounded by straight lines LL', L'M, MI, IH, and HL that connect 5 points, i.e., points L, L', M, I, and H, or on the straight lines LL', L'M, MI, and IH (excluding the points L and H), and if $0<a\leq1.0$, the 5 points are the following:

point L (72.0, 0.0, $-a+28.0$), point L' (57.2, 10.0, $-a+32.8$), point M ($-0.019a+48.618$, $0.019a+18.082$, $-a+33.3$), point I ($-0.1667a^2-3.9333a+44.2$, 18.1, $0.1667a^2+2.9333a+37.7$), and point H ($0.1667a^2-4.5667a+67.6$, 0.0, $-0.1667a^2+3.5667a+32.4$), if $1.0<a\leq3.0$, the 5 points are the following:

point L (72.0, 0.0, $-a+28.0$), point L' (57.2, 10.0, $-a+32.8$), point M ($-0.019a+48.618$, $0.019a+18.082$, $-a+33.3$), point I ($0.05a^2-4.25a+44.3$, 18.1, $-0.05a^2+3.25a+37.6$), and point H ($0.05a^2-4.55a+67.7$, 0.0, $-0.05a^2+3.55a+32.3$), if $3.0<a\leq5.0$, the 5 points are the following:

point L (72.0, 0.0, $-a+28.0$), point L' (57.2, 10.0, $-a+32.8$), point M ($-0.019a+48.618$, $0.019a+18.082$, $-a+33.3$), point I ($-0.05a^2-3.45a+42.8$, $0.05a^2-0.45a+19.0$, $2.9a+38.2$), and point H ($0.05a^2-4.55a+67.7$, 0.0, $-0.05a^2+3.55a+32.3$), or if $5.0<a\leq7.5$, the 5 points are the following:

point L (72.0, 0.0, $-a+28.0$), point L' (57.2, 10.0, $-a+32.8$), point M ($-0.019a+48.618$, $0.019a+18.082$, $-a+33.3$), point I ($0.1a^2-4.85a+46.05$, $-0.02a^2+0.21a+17.45$, $-0.08a^2+3.64a+36.5$), and point H ($0.02a^2-4.21a+66.75$, 0.0, $-0.02a^2+3.21a+33.25$).

Figure 2:
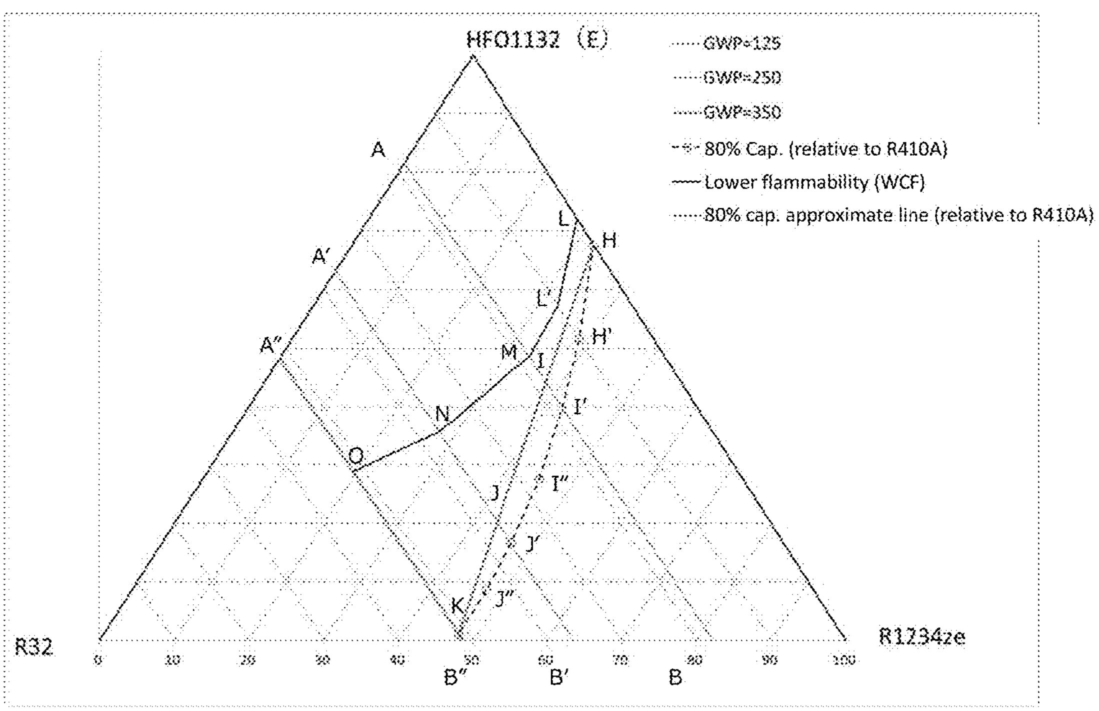
FIG. 2 is a diagram showing points L, L', M, N, O, K, J", J', I", I', H', and H, and line segments that connect these points in a ternary composition diagram in which the sum of HFO-1132(E), R32, and R1234ze is 100 mass %.
Figure 3:
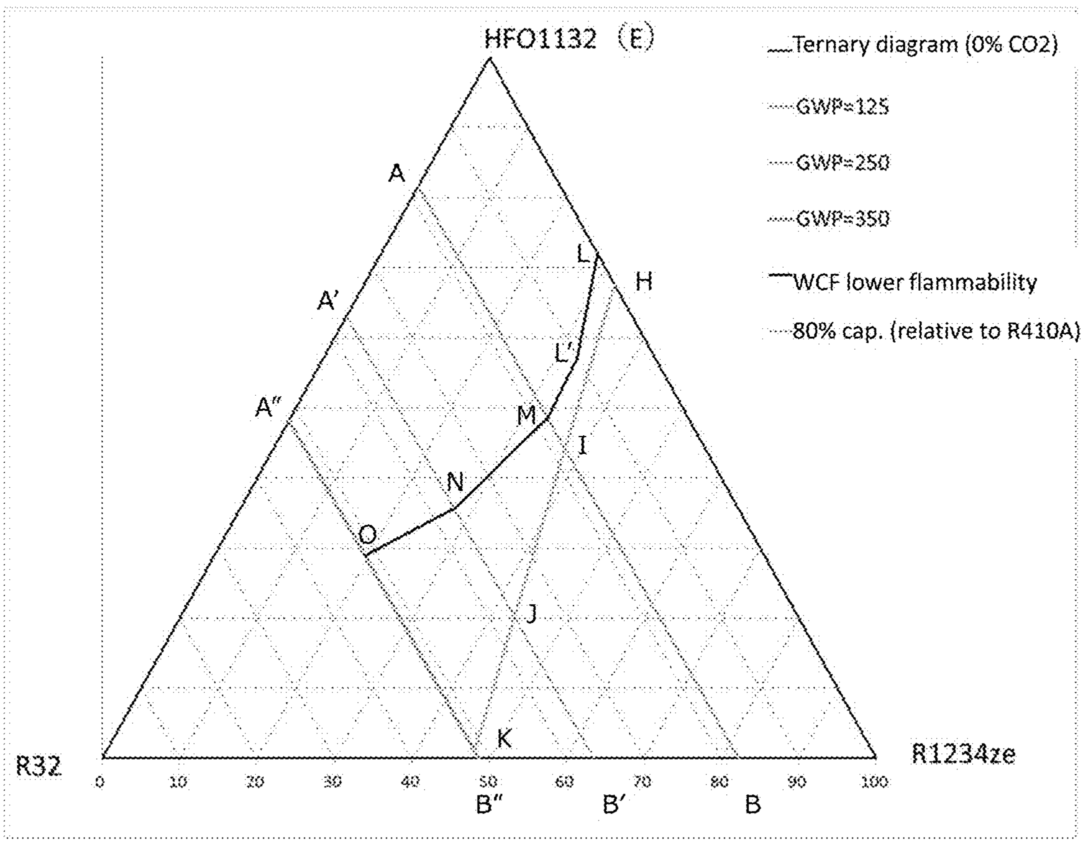
FIG. 3 is a diagram showing points L, L', M, N, O, K, and H, and line segments that connect these points in a ternary composition diagram in which the sum of HFO-1132(E), R32, and R1234ze is 100 mass %.
Figure 4:
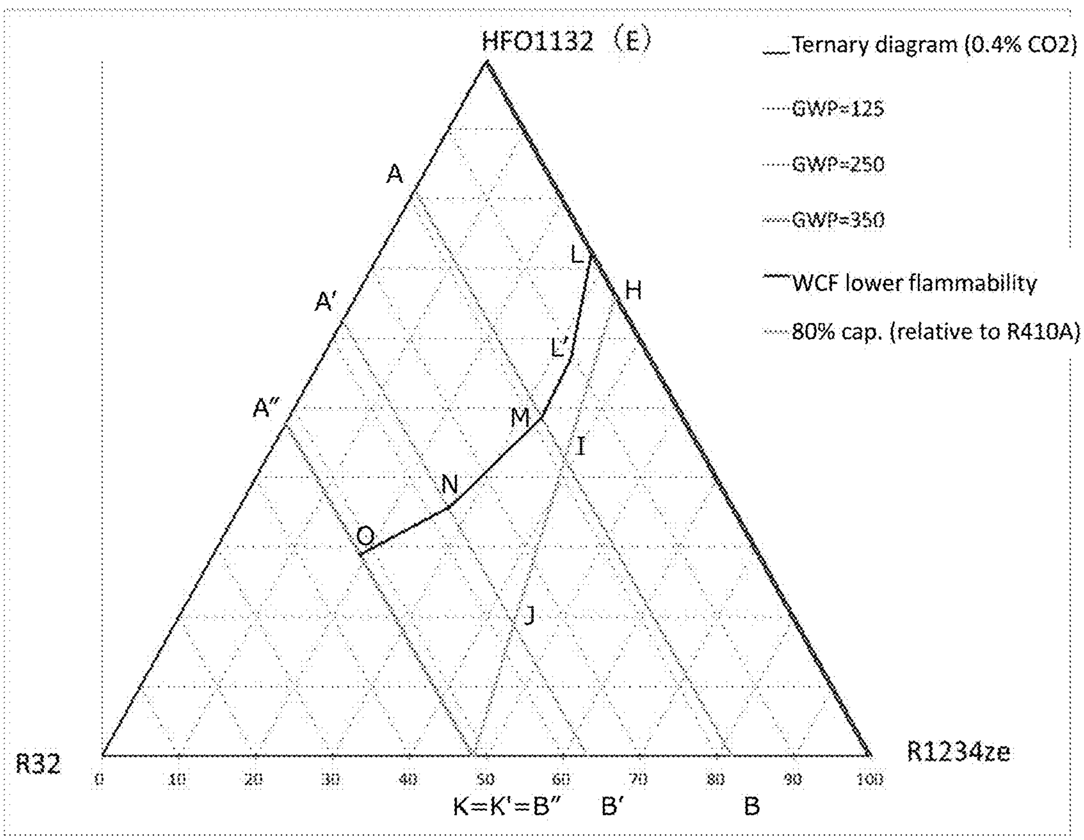
FIG. 4 is a diagram showing points L, L', M, N, O, K, and H, and line segments that connect these points in a ternary composition diagram in which the sum of HFO-1132(E), R32, and R1234ze is 99.6 mass % ($CO_2$ is present in an amount of 0.4 mass %).
Figure 5:
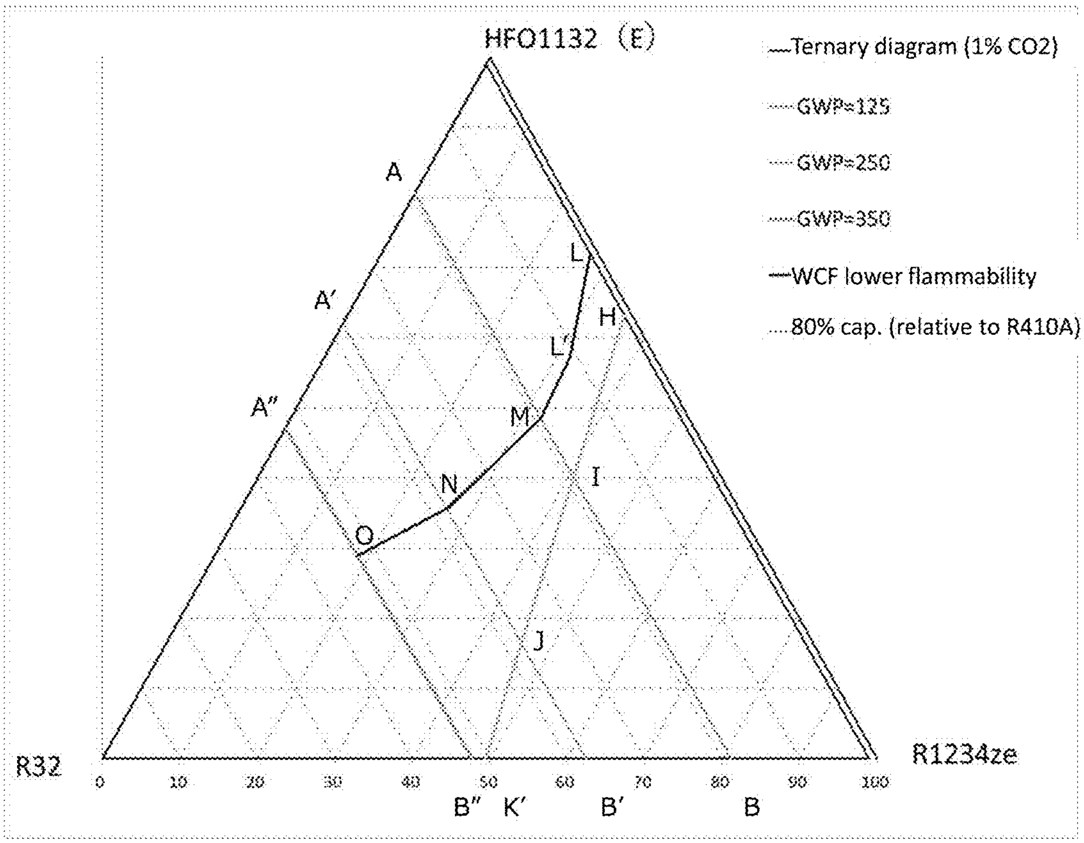
FIG. 5 is a diagram showing points L, L', M, N, O, K', and H, and line segments that connect these points in a ternary composition diagram in which the sum of HFO-1132(E), R32, and R1234ze is 99.0 mass % ($CO_2$ is present in an amount of 1.0 mass %).
Figure 6:
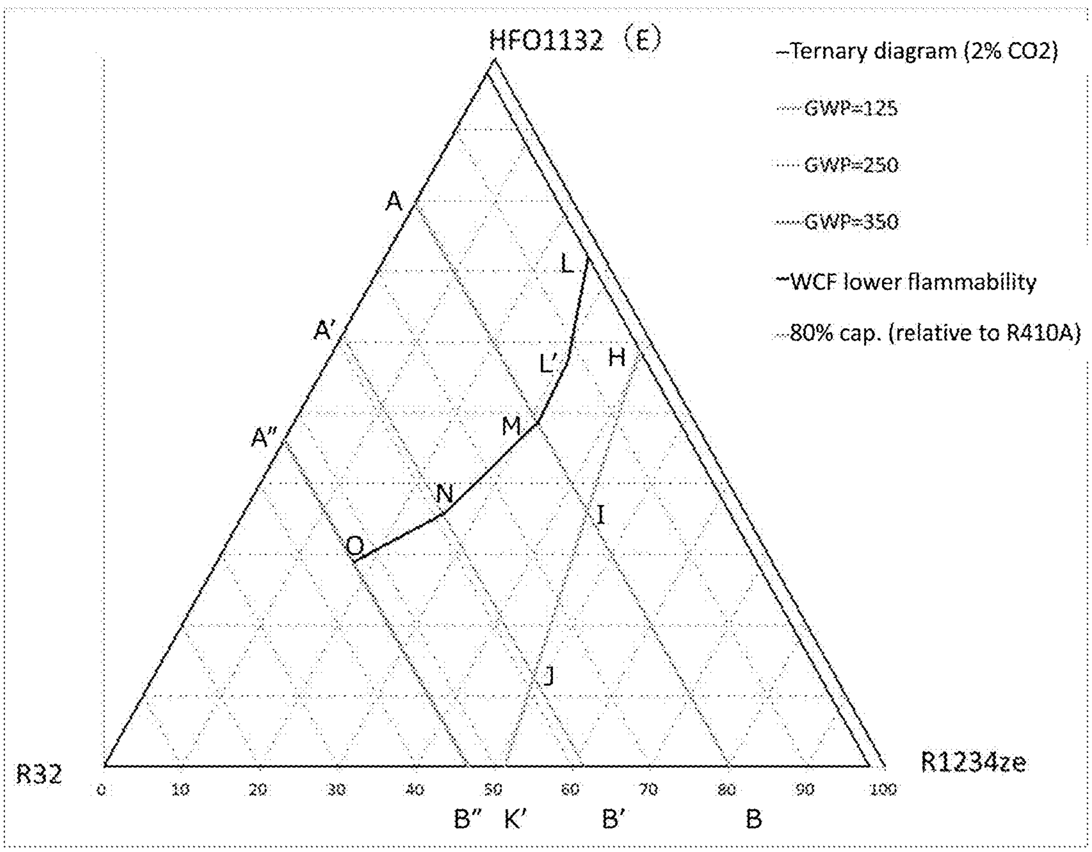
FIG. 6 is a diagram showing points L, L', M, N, O, K', and H, and line segments that connect these points in a ternary composition diagram in which the sum of HFO-1132(E), R32, and R1234ze is 98.0 mass % ($CO_2$ is present in an amount of 2.0 mass %).
Figure 7:
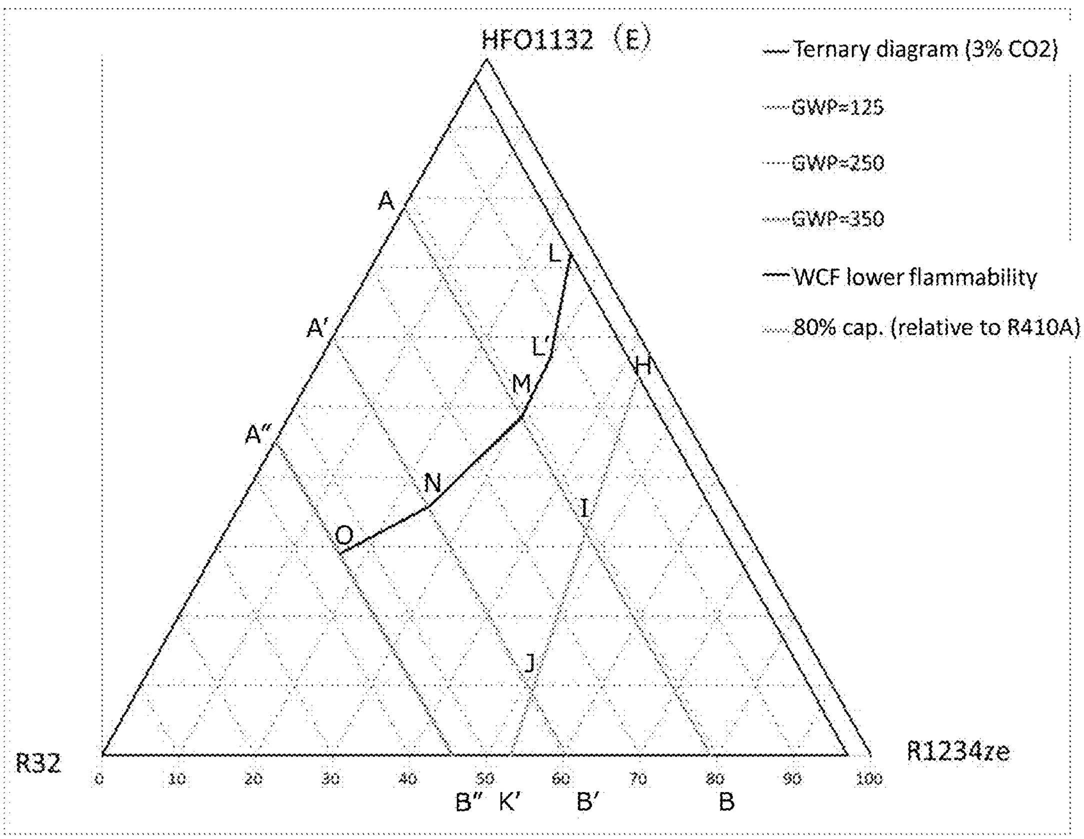
FIG. 7 is a diagram showing points L, L', M, N, O, K', and H, and line segments that connect these points in a ternary composition diagram in which the sum of HFO-1132(E), R32, and R1234ze is 97.0 mass % ($CO_2$ is present in an amount of 3.0 mass %).
Figure 8:
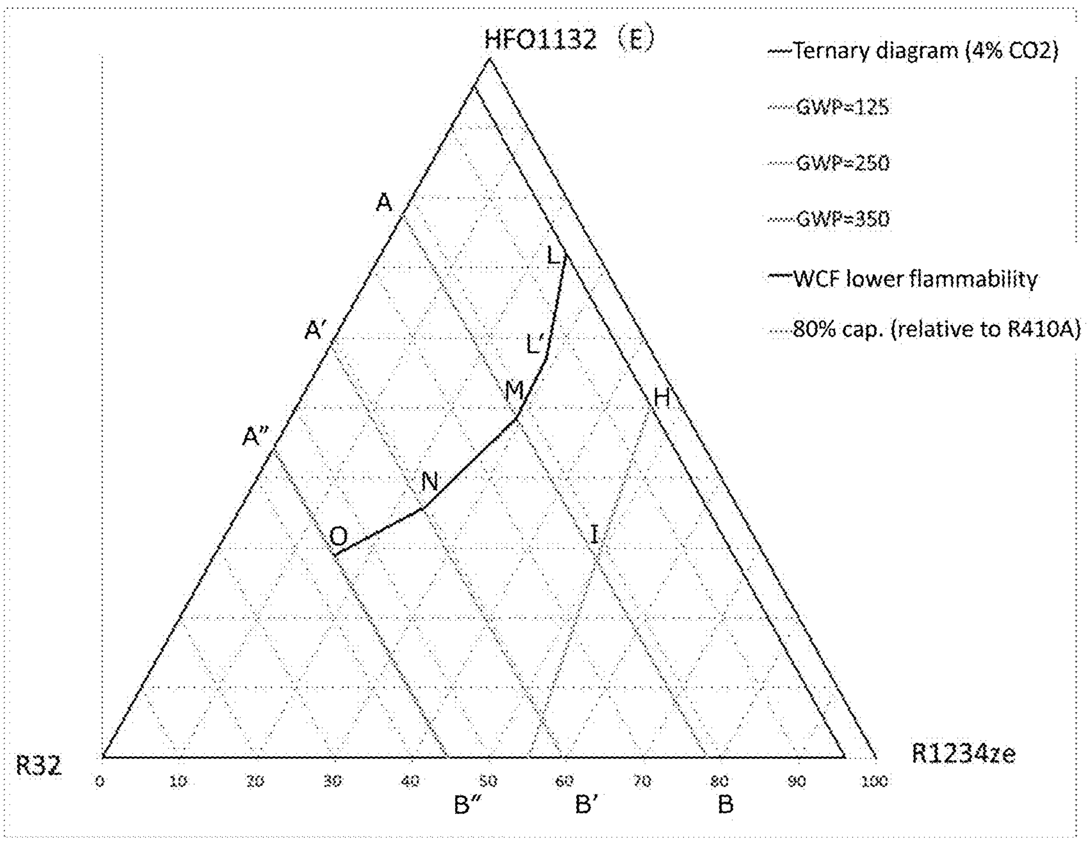
FIG. 8 is a diagram showing points L, L', M, N, O, K, and H, and line segments that connect these points in a ternary composition diagram in which the sum of HFO-1132(E), R32, and R1234ze is 96.0 mass % ($CO_2$ is present in an amount of 4.0 mass %).
Figure 9:
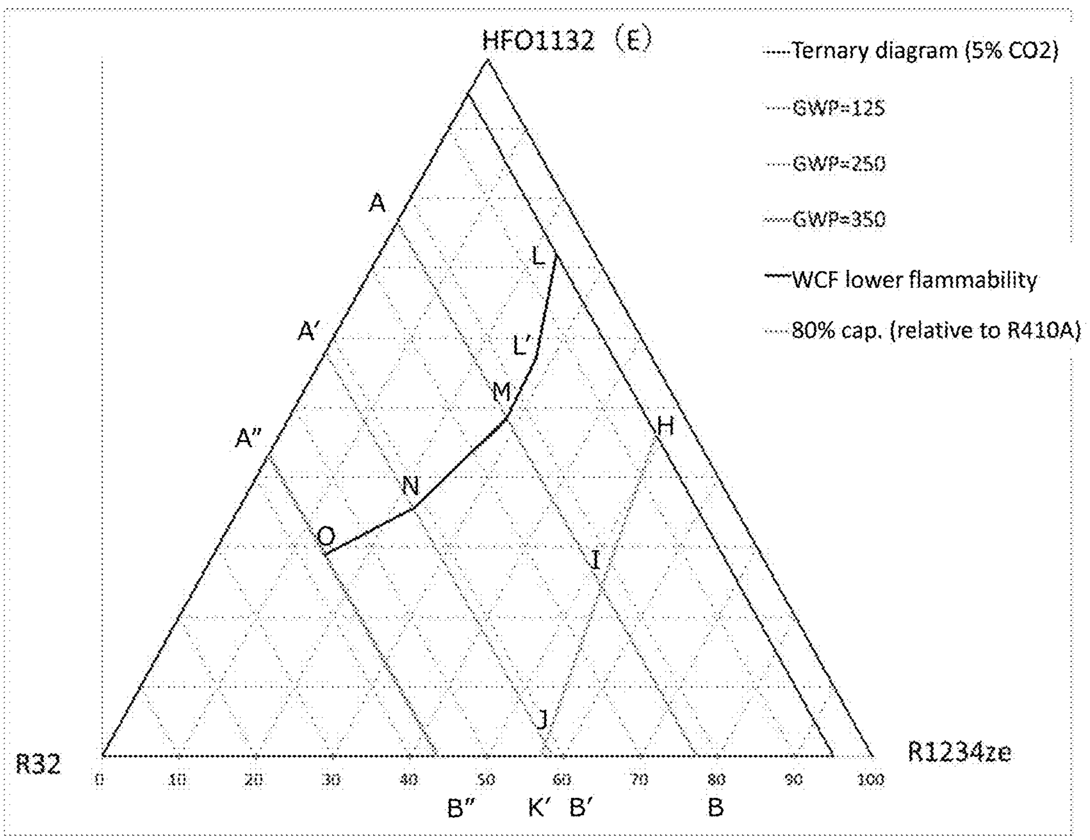
FIG. 9 is a diagram showing points L, L', M, N, O, K, and H, and line segments that connect these points in a ternary composition diagram in which the sum of HFO-1132(E), R32, and R1234ze is 95.0 mass % ($CO_2$ is present in an amount of 5.0 mass %).
Figure 10:
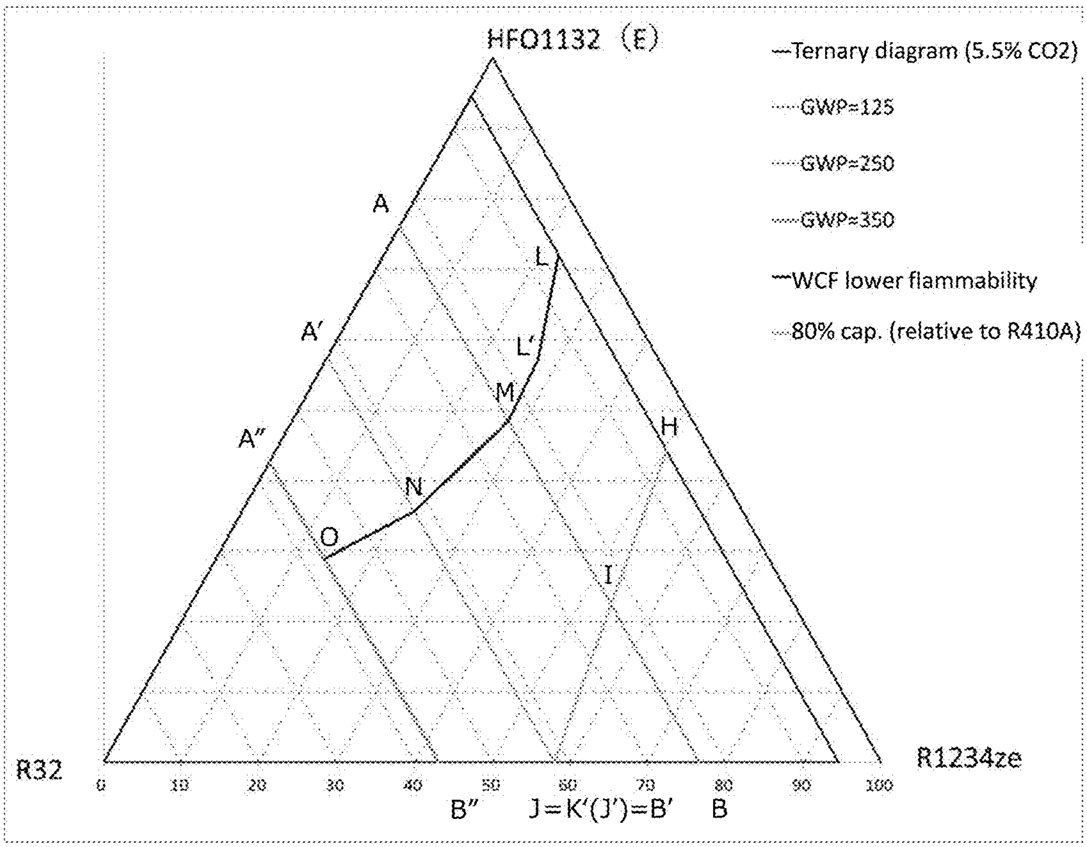
FIG. 10 is a diagram showing points L, L', M, N, O, K, and H, and line segments that connect these points in a ternary composition diagram in which the sum of HFO-1132 (E), R32, and R1234ze is 94.5 mass % ($CO_2$ is present in an amount of 5.5 mass %).
Figure 11:
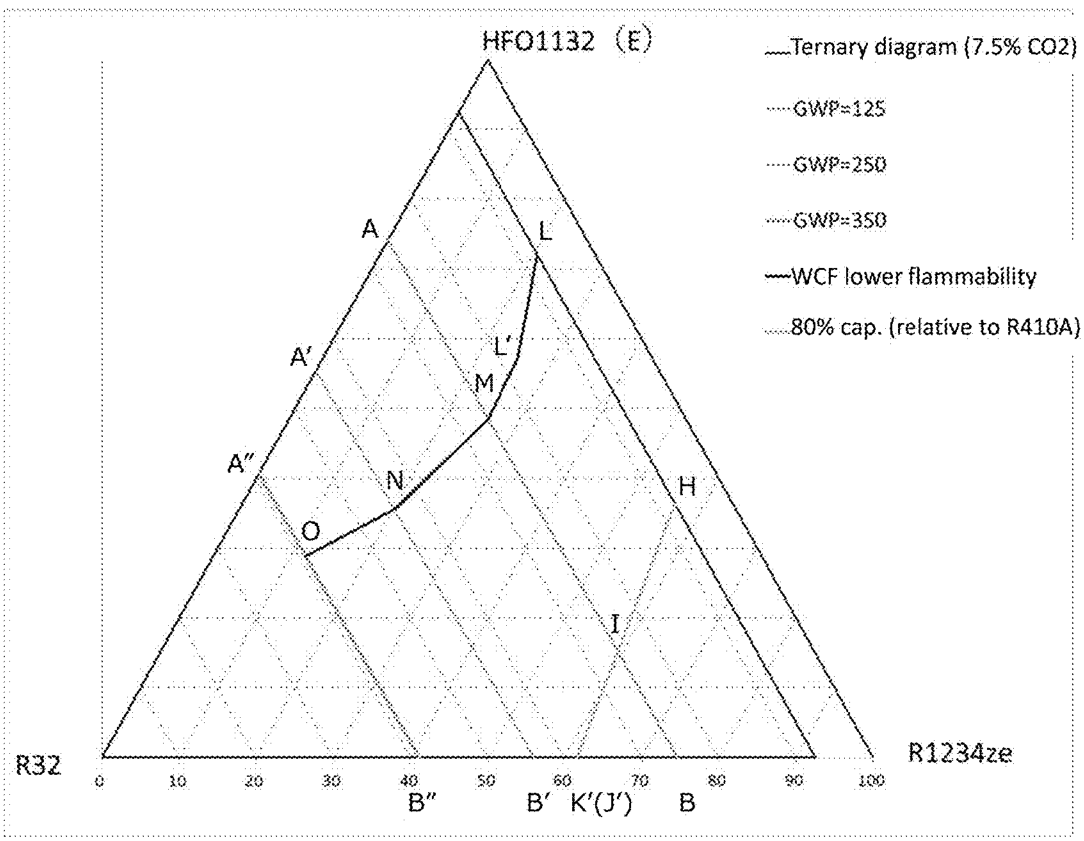
FIG. 11 is a diagram showing points L, L', M, N, O, K, and H, and line segments that connect these points in a ternary composition diagram in which the sum of HFO-1132 (E), R32, and R1234ze is 92.5 mass % ($CO_2$ is present in an amount of 7.5 mass %).
Figure 12:
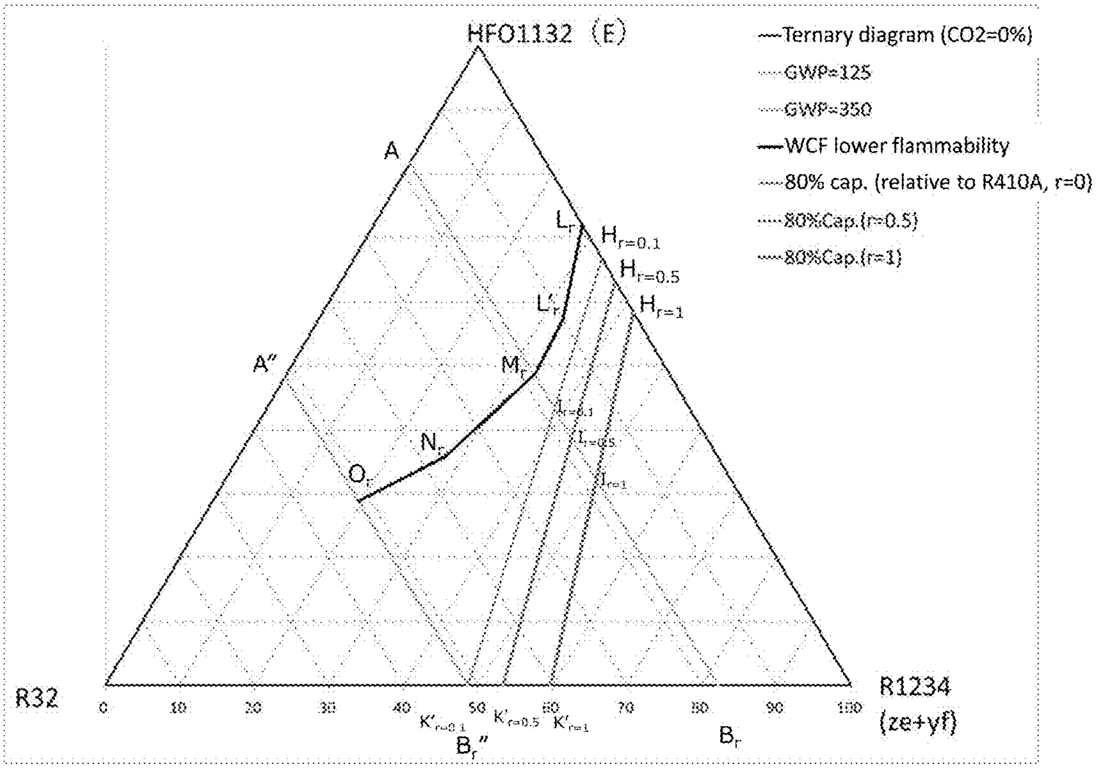
FIG. 12 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 100 mass %.
Figure 13:
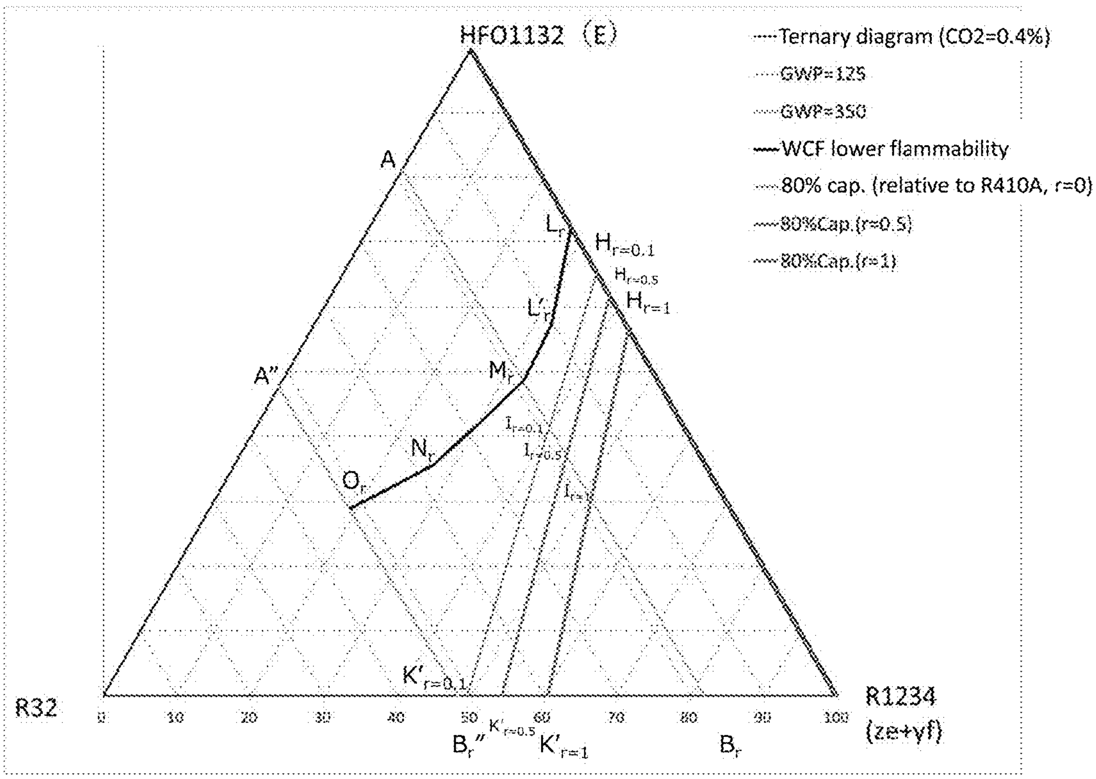
FIG. 13 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 99.6 mass %.
Figure 14:
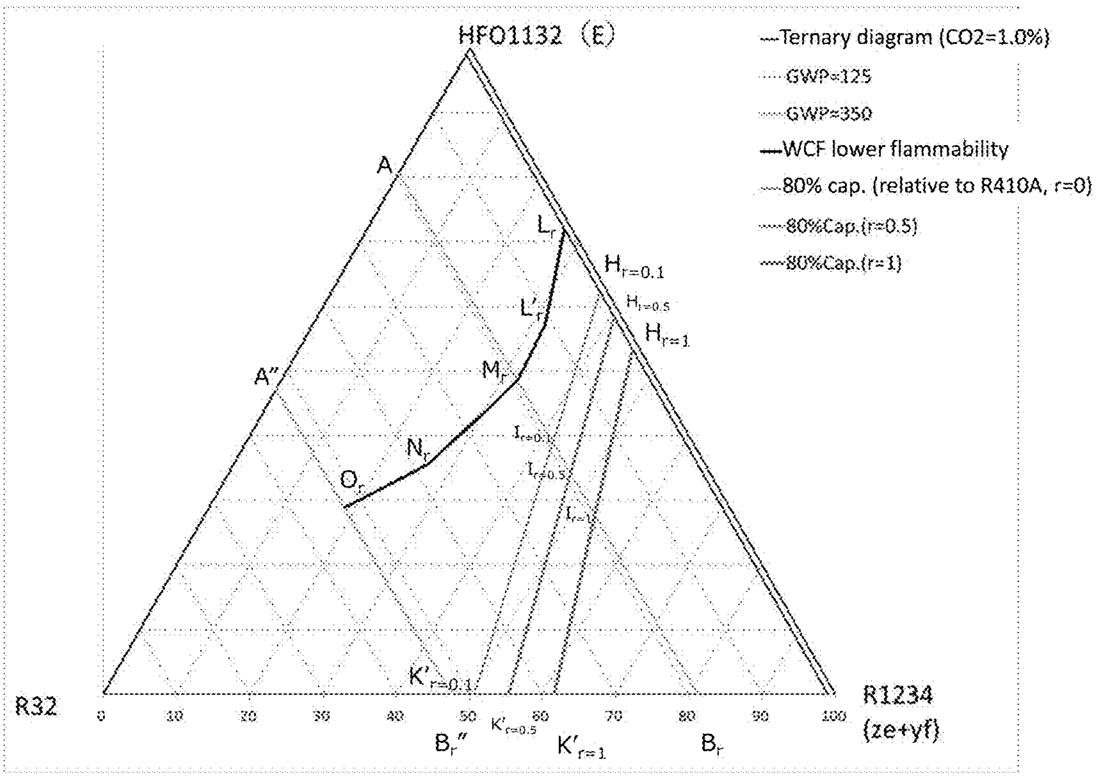
FIG. 14 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 99.0 mass %.
Figure 15:
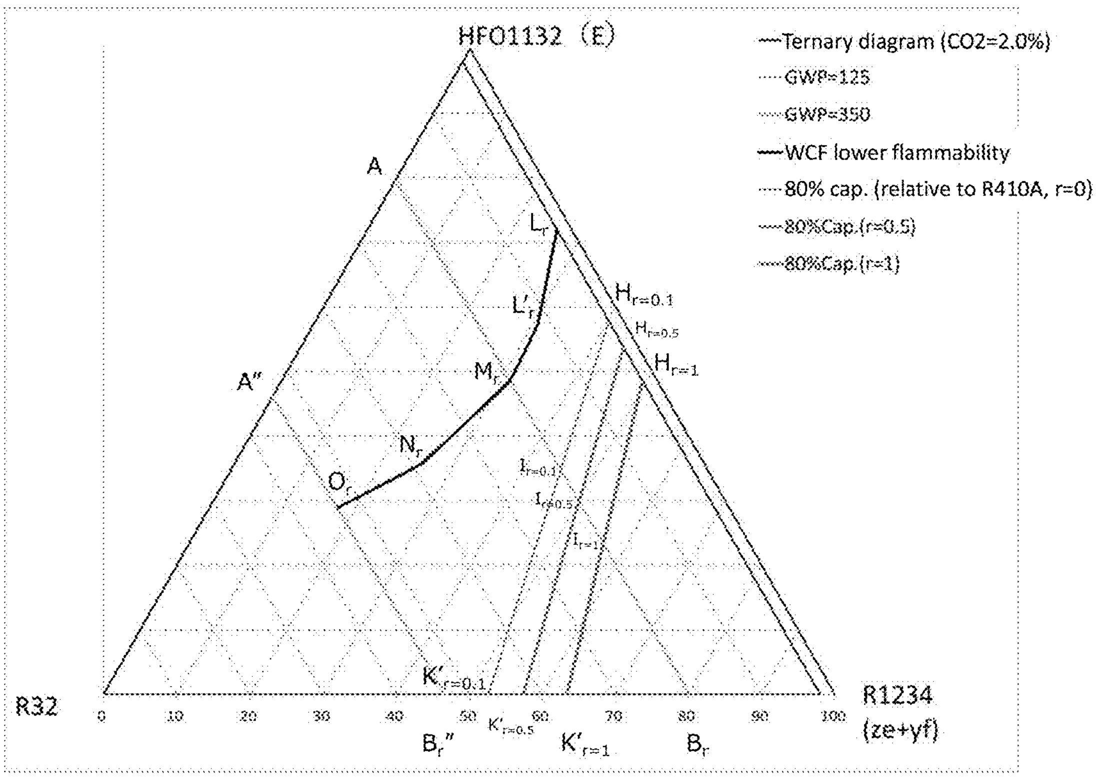
FIG. 15 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 98.0 mass %.
Figure 16:
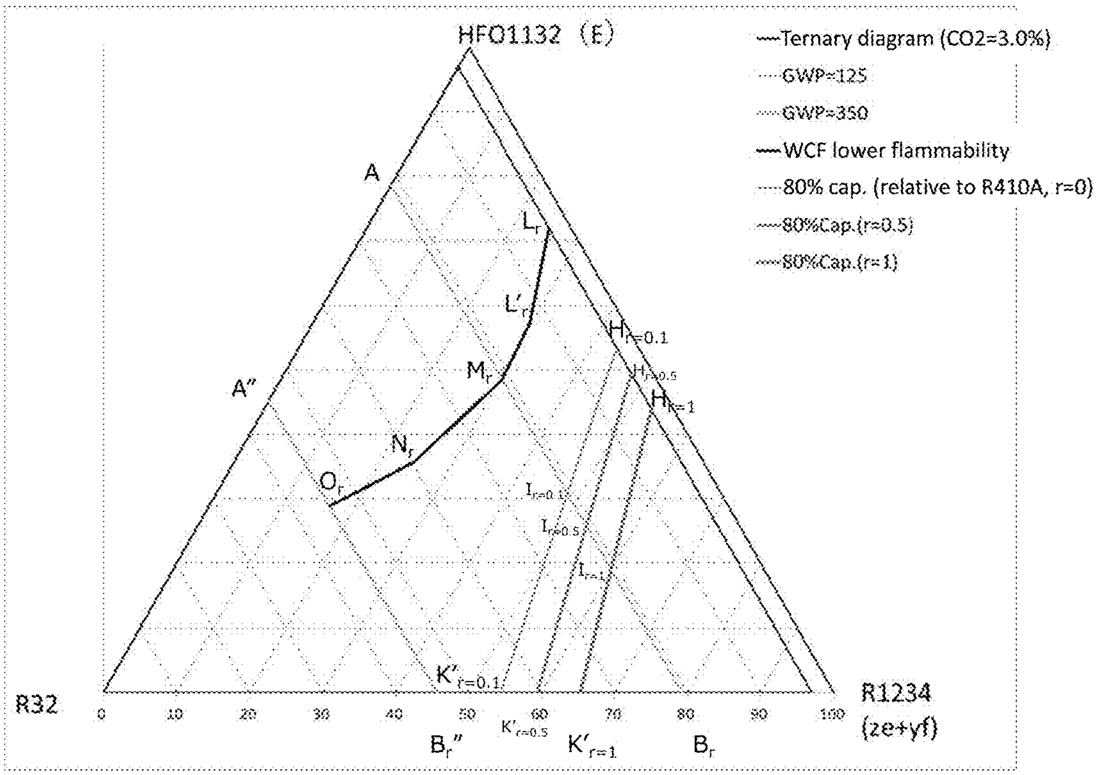
FIG. 16 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 97.0 mass %.
Figure 17:
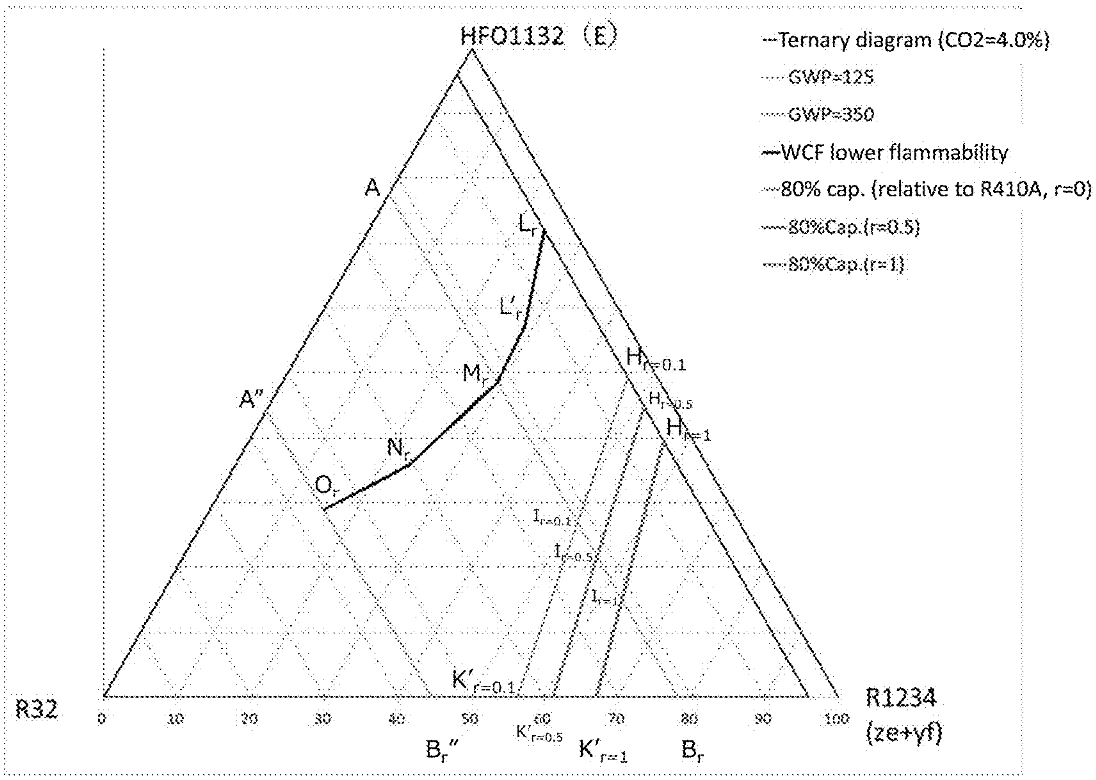
FIG. 17 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 96.0 mass %.
Figure 18:
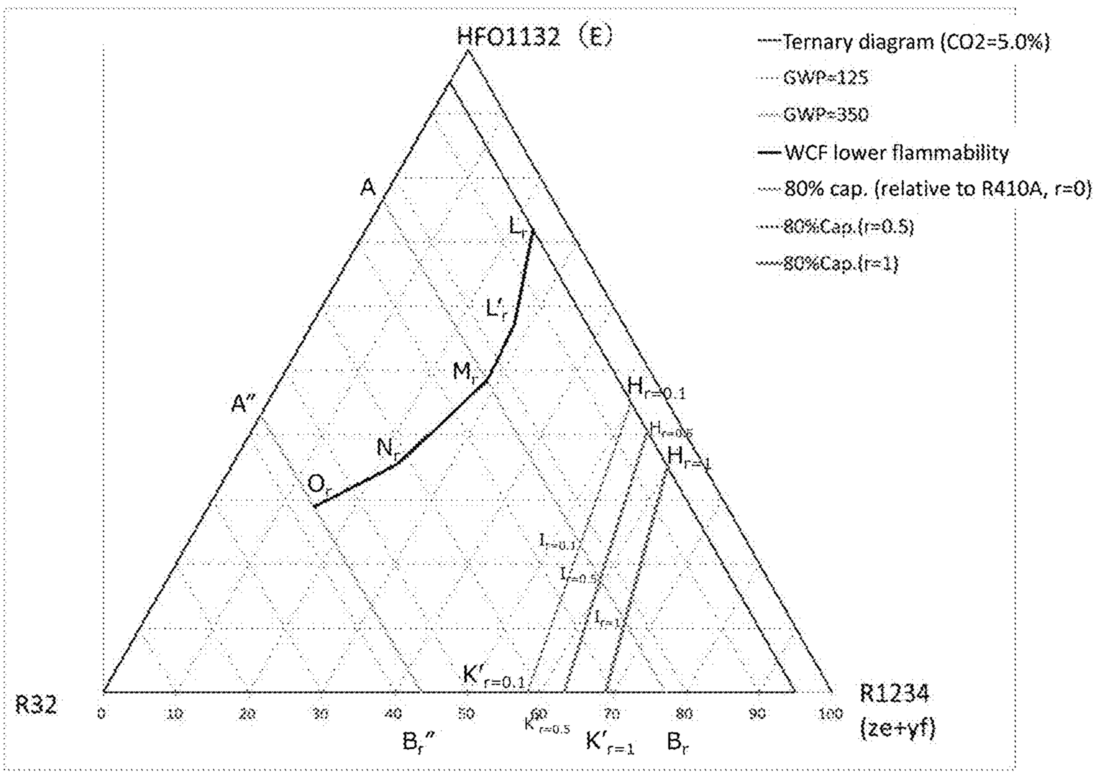
FIG. 18 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 95.0 mass %.
Figure 19:
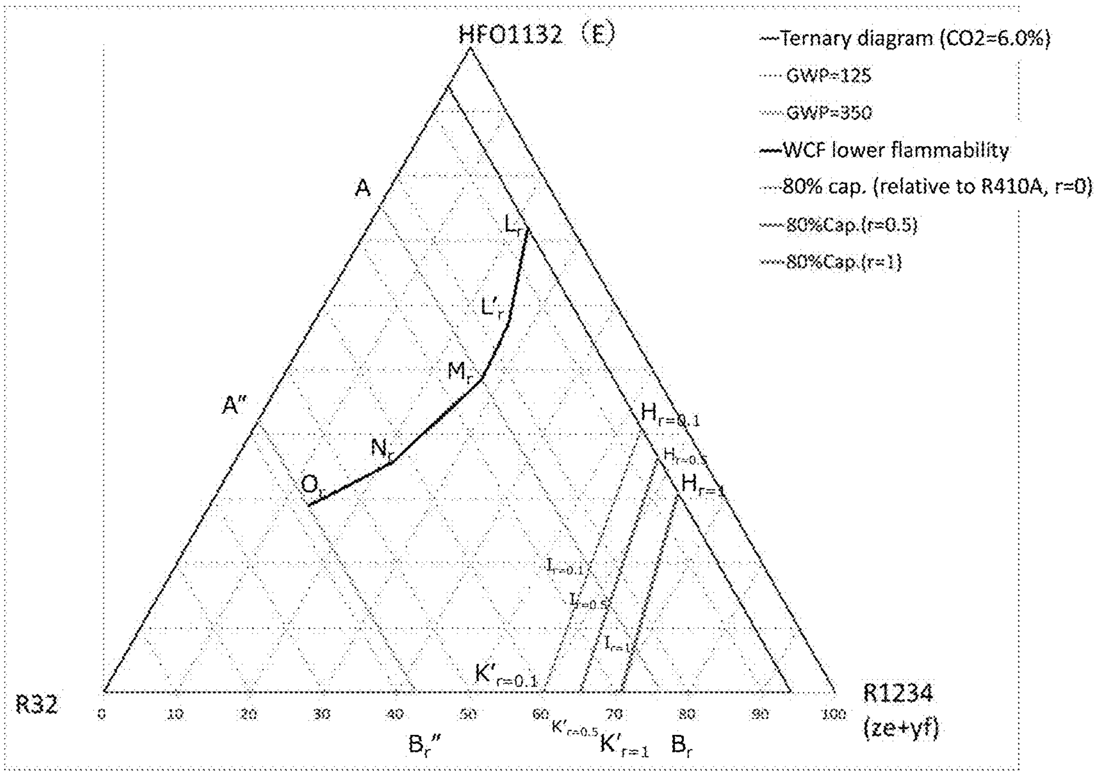
FIG. 19 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 94.0 mass %.
Figure 20:
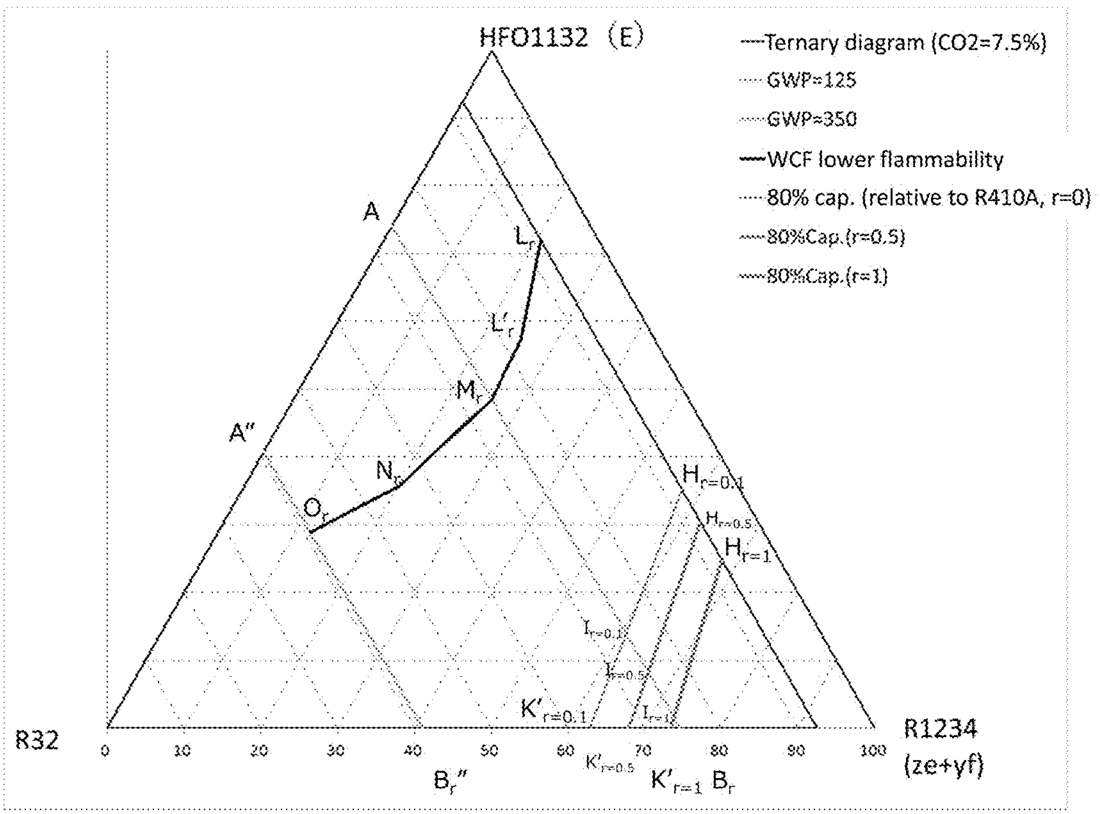
FIG. 20 is a diagram showing points $L_r$, $L'_r$, $M_r$, $N_r$, $O_r$, $B''_r$, $K'_r$, and $H_r$, and line segments that connect these points in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is 92.5 mass %.

The line segment where the refrigerating capacity is 80% relative to that of R410A is a curve that connects points K, J'', J', I'', I', H', and H, as shown in FIG. 2; however, here, straight line KH or straight line K'H, where the refrigerating capacity is 80% or more, was used instead.

The approximate expressions that indicate the coordinates of the points were each determined as shown in Tables 8 to 11 below.

TABLE 8

| | | | | | | | | | | | | | |
|---|---|---|---|---|---|---|---|---|---|---|---|---|---|
| A Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 81.6 | 81.2 | 80.6 | 80.6 | 79.6 | 78.6 | 78.6 | 77.6 | 76.6 | 76.6 | 76.1 | 74.1 |
| R32 | mass % | 18.4 | 18.4 | 18.4 | 18.4 | 18.4 | 18.4 | 18.4 | 18.4 | 18.4 | 18.4 | 18.4 | 18.4 |
| R1234ze | mass % | 0.0 | 0.0 | 0.0 | 0.0 | 0.0 | 0.0 | 0.0 | 0.0 | 0.0 | 0.0 | 0.0 | 0.0 |
| a = CO2 | | | a | | | a | | | a | | | a | |
| x = HFO-1132E Approximate Expression | | | −a + 81.6 | | | −a + 81.6 | | | −a + 81.6 | | | −a + 81.6 | |
| y = R32 Approximate Expression | | | 18.4 | | | 18.4 | | | 18.4 | | | 18.4 | |
| z = R1234ze Approximate Expression | | | 0.0 | | | 0.0 | | | 0.0 | | | 0.0 | |
| B Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 0.0 | 0.0 | 0.0 | 0.0 | 0.0 | 0.0 | 0.0 | 0.0 | 0.0 | 0.0 | 0.0 | 0.0 |
| R32 | mass % | 17.8 | 17.8 | 17.8 | 17.8 | 17.8 | 17.8 | 17.8 | 17.8 | 17.8 | 17.8 | 17.8 | 17.8 |
| R1234ze | mass % | 82.2 | 81.8 | 81.2 | 81.2 | 80.2 | 79.2 | 79.2 | 78.2 | 77.2 | 77.2 | 76.7 | 74.7 |
| a = CO2 | | | a | | | a | | | a | | | a | |
| x = HFO-1132E Approximate Expression | | | 0.0 | | | 0.0 | | | 0.0 | | | 0.0 | |

TABLE 8-continued

| | | | | | | | | | | | | | |
|---|---|---|---|---|---|---|---|---|---|---|---|---|---|
| y = R32 Approximate Expression | | | 17.8 | | | 17.8 | | | 17.8 | | | 17.8 | |
| z = R1234ze Approximate Expression | | | −a + 82.2 | | | −a + 82.2 | | | −a + 82.2 | | | −a + 82.2 | |
| A' Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 63.0 | 62.6 | 62.0 | 62.0 | 61.0 | 60.0 | 60.0 | 59.0 | 58.0 | 58.0 | 57.5 | 55.5 |
| R32 | mass % | 37.0 | 37.0 | 37.0 | 37.0 | 37.0 | 37.0 | 37.0 | 37.0 | 37.0 | 37.0 | 37.0 | 37.0 |
| R1234ze | mass % | 0.0 | 0.0 | 0.0 | 0.0 | 0.0 | 0.0 | 0.0 | 0.0 | 0.0 | 0.0 | 0.0 | 0.0 |
| a = CO2 | | | a | | | a | | | a | | | a | |
| x = HFO-1132E Approximate Expression | | | −a + 63.0 | | | −a + 63.0 | | | −a + 63.0 | | | −a + 63.0 | |
| y = R32 Approximate Expression | | | 37.0 | | | 37.0 | | | 37.0 | | | 37.0 | |
| z = R1234ze Approximate Expression | | | 0.0 | | | 0.0 | | | 0.0 | | | 0.0 | |
| B' Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 0.0 | 0.0 | 0.0 | 0.0 | 0.0 | 0.0 | 0.0 | 0.0 | 0.0 | 0.0 | 0.0 | 0.0 |
| R32 | mass % | 36.5 | 36.5 | 36.5 | 36.5 | 36.5 | 36.5 | 36.5 | 36.5 | 36.5 | 36.5 | 36.5 | 36.5 |
| R1234ze | mass % | 63.5 | 63.1 | 62.5 | 62.5 | 61.5 | 60.5 | 60.5 | 59.5 | 58.5 | 58.5 | 58.0 | 56.0 |
| a = CO2 | | | a | | | a | | | a | | | a | |
| x = HFO-1132E Approximate Expression | | | 0.0 | | | 0.0 | | | 0.0 | | | 0.0 | |
| y = R32 Approximate Expression | | | 36.5 | | | 36.5 | | | 36.5 | | | 36.5 | |
| z = R1234ze Approximate Expression | | | −a + 63.5 | | | −a + 63.5 | | | −a + 63.5 | | | −a + 63.5 | |

TABLE 9

| | | | | | | | | | | | | | |
|---|---|---|---|---|---|---|---|---|---|---|---|---|---|
| A'' Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 48.2 | 47.8 | 47.2 | 47.2 | 46.2 | 45.2 | 45.2 | 44.2 | 43.2 | 43.2 | 42.7 | 40.7 |
| R32 | mass % | 51.8 | 51.8 | 51.8 | 51.8 | 51.8 | 51.8 | 51.8 | 51.8 | 51.8 | 51.8 | 51.8 | 51.8 |
| R1234ze | mass % | 0.0 | 0.0 | 0.0 | 0.0 | 0.0 | 0.0 | 0.0 | 0.0 | 0.0 | 0.0 | 0.0 | 0.0 |
| a = CO2 | | | a | | | a | | | a | | | a | |
| x = HFO-1132E Approximate Expression | | | −a + 48.2 | | | −a + 48.2 | | | −a + 48.2 | | | −a + 48.2 | |
| y = R32 Approximate Expression | | | 51.8 | | | 51.8 | | | 51.8 | | | 51.8 | |
| z = R1234ze Approximate Expression | | | 0.0 | | | 0.0 | | | 0.0 | | | 0.0 | |
| B'' Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 0.0 | 0.0 | 0.0 | 0.0 | 0.0 | 0.0 | 0.0 | 0.0 | 0.0 | 0.0 | 0.0 | 0.0 |
| R32 | mass % | 51.4 | 51.4 | 51.4 | 51.4 | 51.4 | 51.4 | 51.4 | 51.4 | 51.4 | 51.4 | 51.4 | 51.4 |
| R1234ze | mass % | 48.6 | 48.2 | 47.6 | 47.6 | 46.6 | 45.6 | 45.6 | 44.6 | 43.6 | 43.6 | 43.1 | 41.1 |
| a = CO2 | | | a | | | a | | | a | | | a | |
| x = HFO-1132E Approximate Expression | | | 0.0 | | | 0.0 | | | 0.0 | | | 0.0 | |
| y = R32 Approximate Expression | | | 51.4 | | | 51.4 | | | 51.4 | | | 51.4 | |
| z = R1234ze Approximate Expression | | | −a + 48.6 | | | −a + 48.6 | | | −a + 48.6 | | | −a + 48.6 | |
| L Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 72.0 | 72.0 | 72.0 | 72.0 | 72.0 | 72.0 | 72.0 | 72.0 | 72.0 | 72.0 | 72.0 | 72.0 |
| R32 | mass % | 0.0 | 0.0 | 0.0 | 0.0 | 0.0 | 0.0 | 0.0 | 0.0 | 0.0 | 0.0 | 0.0 | 0.0 |
| R1234ze | mass % | 28.0 | 27.6 | 27.0 | 27.0 | 26.0 | 25.0 | 25.0 | 24.0 | 23.0 | 23.0 | 22.5 | 20.5 |
| a = CO2 | | | a | | | a | | | a | | | a | |
| x = HFO-1132E Approximate Expression | | | 72.0 | | | 72.0 | | | 72.0 | | | 72.0 | |
| y = R32 Approximate Expression | | | 0.0 | | | 0.0 | | | 0.0 | | | 0.0 | |
| z = R1234ze Approximate Expression | | | −a + 28.0 | | | −a + 28.0 | | | −a + 28.0 | | | −a + 28.0 | |
| L' Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 57.2 | 57.2 | 57.2 | 57.2 | 57.2 | 57.2 | 57.2 | 57.2 | 57.2 | 57.2 | 57.2 | 57.2 |
| R32 | mass % | 10.0 | 10.0 | 10.0 | 10.0 | 10.0 | 10.0 | 10.0 | 10.0 | 10.0 | 10.0 | 10.0 | 10.0 |
| R1234ze | mass % | 32.8 | 32.4 | 31.8 | 31.8 | 30.8 | 29.8 | 29.8 | 28.8 | 27.8 | 27.8 | 27.3 | 25.3 |
| a = CO2 | | | a | | | a | | | a | | | a | |
| x = HFO-1132E Approximate Expression | | | 57.2 | | | 57.2 | | | 57.2 | | | 57.2 | |
| y = R32 Approximate Expression | | | 10.0 | | | 10.0 | | | 10.0 | | | 10.0 | |
| z = R1234ze Approximate Expression | | | −a + 32.8 | | | −a + 32.8 | | | −a + 32.8 | | | −+B88:O126a + 32.8 | |

TABLE 10

| | | | | | | | | | | | | | |
|---|---|---|---|---|---|---|---|---|---|---|---|---|---|
| M Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 48.6 | 48.6 | 48.6 | 48.6 | 48.6 | 48.6 | 48.6 | 48.5 | 48.5 | 48.5 | 48.5 | 48.5 |
| R32 | mass % | 18.1 | 18.1 | 18.1 | 18.1 | 18.1 | 18.1 | 18.1 | 18.2 | 18.2 | 18.2 | 18.2 | 18.2 |
| R1234ze | mass % | 33.3 | 32.9 | 32.3 | 32.3 | 31.3 | 30.3 | 30.3 | 29.3 | 28.3 | 28.3 | 27.8 | 25.8 |
| a = CO2 | | | a | | | a | | | a | | | a | |
| x = HFO-1132E Approximate Expression | | | −0.019a + 48.618 | | | −0.019a + 48.618 | | | −0.019a + 48.618 | | | −0.019a + 48.618 | |
| y = R32 Approximate Expression | | | 0.019a + 18.082 | | | 0.019a + 18.082 | | | 0.019a + 18.082 | | | 0.019a + 18.082 | |
| z = R1234ze Approximate Expression | | | −a + 33.3 | | | −a + 33.3 | | | −a + 33.3 | | | −a + 33.3 | |
| N Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 35.7 | 35.7 | 35.7 | 35.7 | 35.7 | 35.7 | 35.7 | 35.7 | 35.6 | 35.6 | 35.6 | 35.6 |
| R32 | mass % | 36.7 | 36.7 | 36.7 | 36.7 | 36.7 | 36.7 | 36.7 | 36.7 | 36.8 | 36.8 | 36.8 | 36.8 |
| R1234ze | mass % | 27.6 | 27.2 | 26.6 | 26.6 | 25.6 | 24.6 | 24.6 | 23.6 | 22.6 | 22.6 | 22.1 | 20.1 |
| a = CO2 | | | a | | | a | | | a | | | a | |
| x = HFO-1132E Approximate Expression | | | −0.0175a + 35.721 | | | −0.0175a + 35.721 | | | −0.0175a + 35.721 | | | −0.0175a + 35.721 | |
| y = R32 Approximate Expression | | | 0.0175a + 36.679 | | | 0.0175a + 36.679 | | | 0.0175a + 36.679 | | | 0.0175a + 36.679 | |
| z = R1234ze Approximate Expression | | | −a + 27.6 | | | −a + 27.6 | | | −a + 27.6 | | | −a + 27.6 | |
| O Approximate Expression | | | | | | | | | | | | | |
| CO2 | mass % | 0 | 0.4 | 1 | 1 | 2 | 3 | 3 | 4 | 5 | 5 | 5.5 | 7.5 |
| HFO-1132E | mass % | 28.9 | 28.9 | 28.9 | 28.9 | 28.9 | 28.9 | 28.9 | 28.9 | 28.9 | 28.9 | 28.9 | 28.8 |
| R32 | mass % | 51.6 | 51.6 | 51.6 | 51.6 | 51.6 | 51.6 | 51.6 | 51.6 | 51.6 | 51.6 | 51.6 | 51.7 |
| R1234ze | mass % | 19.5 | 19.1 | 18.5 | 18.5 | 17.5 | 16.5 | 16.5 | 15.5 | 14.5 | 14.5 | 14 | 12 |
| a = CO2 | | | a | | | a | | | a | | | a | |
| x = HFO-1132E Approximate Expression | | | −0.0095a + 28.914 | | | −0.0095a + 28.914 | | | −0.0095a − 28.914 | | | −0.0095a + 28.914 | |
| y = R32 Approximate Expression | | | 0.0095a + 51.586 | | | 0.0095a + 51.586 | | | 0.0095a + 51.586 | | | 0.0095a + 51.586 | |
| z = R1234ze Approximate Expression | | | −a + 19.5 | | | −a + 19.5 | | | −a + 19.5 | | | −a + 19.5 | |
| H Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 67.6 | 65.8 | 63.2 | 63.2 | 58.8 | 54.5 | 54.5 | 50.3 | 46.2 | 46.2 | 44.2 | 36.3 |
| R32 | mass % | 0.0 | 0.0 | 0.0 | 0.0 | 0.0 | 0.0 | 0.0 | 0.0 | 0.0 | 0.0 | 0.0 | 0.0 |
| R1234ze | mass % | 32.4 | 33.8 | 35.8 | 35.8 | 39.2 | 42.5 | 42.5 | 45.7 | 48.8 | 48.8 | 50.3 | 56.2 |
| a = CO2 | | | a | | | a | | | a | | | a | |
| x = HFO-1132E Approximate Expression | | | $0.1667a^2 - 4.5667a + 67.6$ | | | $0.05a^2 - 4.55a + 67.7$ | | | $0.05a^2 - 4.55a + 67.7$ | | | $0.02a^2 - 4.21a + 66.75$ | |
| y = R32 Approximate Expression | | | 0.0 | | | 0.0 | | | 0.0 | | | 0.0 | |
| z = R1234ze Approximate Expression | | | $-0.1667a^2 - 3.5667a + 32.4$ | | | $-0.05a^2 + 3.55a + 32.3$ | | | $-0.05a^2 + 3.55a + 32.3$ | | | $-0.02a^2 + 3.21a + 33.25$ | |

TABLE 11

| | | | | | | | | | | | | | |
|---|---|---|---|---|---|---|---|---|---|---|---|---|---|
| I Approximate Expression | | | | | | | | | | | | | |
| CO2 | mass % | 0.0 | 0.4 | 1.0 | 1.0 | 2.0 | 3.0 | 3.0 | 4.0 | 5.0 | 5.0 | 5.5 | 7.5 |
| HFO-1132E | mass % | 44.2 | 42.6 | 40.1 | 40.1 | 36.0 | 32.0 | 32.0 | 28.2 | 24.3 | 24.3 | 22.4 | 15.3 |
| R32 | mass % | 18.1 | 18.1 | 18.1 | 18.1 | 18.1 | 18.1 | 18.1 | 18.0 | 18.0 | 18.0 | 18.0 | 17.9 |
| R1234ze | mass % | 37.7 | 38.9 | 40.8 | 40.8 | 43.9 | 46.9 | 46.9 | 49.8 | 52.7 | 52.7 | 54.1 | 59.3 |
| a = CO2 | | | a | | | a | | | a | | | a | |
| x = HFO-1132E Approximate Expression | | | $0.1667a^2 + 3.9333a + 44.2$ | | | $0.05a^2 - 4.25a + 44.3$ | | | $-0.05a^2 - 3.45a + 42.8$ | | | $0.1a^2 - 4.85a + 46.05$ | |
| y = R32 Approximate Expression | | | 18.1 | | | 18.1 | | | $0.05a^2 - 0.45a + 19.0$ | | | $-0.02a^2 + 0.21a + 17.45$ | |
| z = R1234ze Approximate Expression | | | $0.1667a^2 + 2.9333a + 37.7$ | | | $-0.05a^2 + 3.25a + 37.6$ | | | 2.9a + 38.2 | | | $-0.08a^2 + 3.64a + 36.5$ | |

TABLE 11-continued

J Approximate Expression

| | | | | | | | | | | | | |
|---|---|---|---|---|---|---|---|---|---|---|---|---|
| CO2 | mass % | 0.0 | 0.4 | 1.0 | 1.0 | 2.0 | 3.0 | 3.0 | 4.0 | 5.0 | 5.0 | 5.5 |
| HFO-1132E | mass % | 20.3 | 18.9 | 16.6 | 16.6 | 12.8 | 9.1 | 9.1 | 5.4 | 1.8 | 1.8 | 0 |
| R32 | mass % | 36.6 | 36.6 | 36.6 | 36.6 | 36.5 | 36.5 | 36.5 | 36.5 | 36.5 | 36.5 | 36.5 |
| R1234ze | mass % | 43.1 | 44.1 | 45.8 | 45.8 | 48.7 | 51.4 | 51.4 | 54.1 | 56.7 | 56.7 | 58 |
| a = CO2 | | | a | | | a | | | a | | a | |
| x = HFO-1132E Approximate Expression | | | $-0.3333a^2 - 3.3667a + 20.3$ | | | $0.053a^2 - 3.95a + 20.5$ | | | $0.05a^2 - 4.05a + 20.8$ | | $-3.6a + 19.8$ | |
| y = R32 Approximate Expression | | | 36.6 | | | $0.05a^2 - 0.25a + 36.8$ | | | 36.5 | | 36.5 | |
| z = R1234ze Approximate Expression | | | $0.3333a^2 + 2.3667a + 43.1$ | | | $-0.1a^2 + 3.2a + 42.7$ | | | $-0.05a^2 + 3.05a + 42.7$ | | $2.6a + 43.7$ | |

K and K' Approximate Expression

| | | | | | | | | | | | | | | |
|---|---|---|---|---|---|---|---|---|---|---|---|---|---|---|
| CO2 | mass % | 0.0 | 0.4 | 0.4 | 1.0 | 1.0 | 2.0 | 3.0 | 3.0 | 4.0 | 5.0 | 5.0 | 5.5 | 7.5 |
| HFO-1132E | mass % | 1.0 | 0.0 | 0.0 | 0.0 | 0.0 | 0.0 | 0.0 | 0.0 | 00 | 0.0 | 0.0 | 0.0 | 0 |
| R32 | mass % | 51.5 | 51.4 | 51.4 | 49.6 | 49.6 | 46.7 | 43.8 | 43.8 | 40.9 | 38.0 | 38.0 | 36.5 | 30.9 |
| R1234ze | mass % | 47.5 | 48.2 | 48.2 | 49.4 | 49.4 | 51.3 | 53.2 | 53.2 | 55.1 | 57.0 | 57.0 | 58.0 | 61.6 |
| a = CO2 | | a | | a | | | a | | | a | | | a | |
| x = HFO-1132E Approximate Expression | | $-2.5a + 1.0$ | | 0.0 | | | 0.0 | | | 0.0 | | | 0.0 | |
| y = R32 Approximate Expression | | $-0.25a + 51.5$ | | $-3.0a + 52.6$ | | | $-2.9a + 52.5$ | | | $-2.9a + 52.5$ | | | $-2.8286a + 52.105$ | |
| z = R1234ze Approximate Expression | | $1.75a + 47.5$ | | $2.0a + 47.4$ | | | $1.9a + 47.5$ | | | $1.9a + 47.5$ | | | $1.8286a + 47.895$ | |

Example B

Mixed refrigerants were prepared such that the mass % of HFO-1132 (E), the mass % of R32, the mass % of the sum of R1234ze and R1234yf, and the mass % of $CO_2$ were as shown in Tables 12 to 20 based on the sum of HFO-1132 (E), R32, R1234ze, R1234yf, and $CO_2$, and evaluated in the same manner as in Example A. Tables 12 to 20 show the results. The letter "r" represents R1234yf/(R1234ze+R1234yf).

TABLE 12

0% CO2

| Item | Unit | Com Ex 93 A | Com Ex 94 $B_{r=0.1}$ | Com Ex 95 A'' | Com Ex 96 $B''_{r=0.1}$ | Com Ex 97 $H_{r=0.1}$ | Com Ex 98 $I_{r=0.1}$ | Com Ex 99 $K'_{r=0.1}$ | Com Ex 100 $L_{r=0.1}$ |
|---|---|---|---|---|---|---|---|---|---|
| HFO-1132 (E) | mass % | 81.6 | 0.0 | 48.2 | 0.0 | 66.8 | 43.2 | 0.0 | 72.0 |
| R32 | mass % | 18.4 | 17.8 | 51.8 | 51.4 | 0.0 | 18.1 | 51.4 | 0.0 |
| R1234(ze + yf) | mass % | 0.0 | 82.2 | 0.0 | 48.6 | 33.2 | 38.7 | 48.6 | 28.0 |
| CO2 | mass % | 0.0 | 0.0 | 0.0 | 0.0 | 0.0 | 0.0 | 0.0 | 0.0 |
| GWP | — | 125 | 125 | 350 | 350 | 3 | 125 | 350 | 2 |
| COP ratio | % (relative to R410A) | 98.7 | 107.4 | 99.2 | 104.4 | 101.4 | 101.6 | 104.4 | 101.0 |
| Refrigerating Capacity Ratio | % (relative to R410A) | 105.3 | 53.2 | 112.1 | 80.0 | 80.0 | 82.8 | 80.0 | 83.0 |
| Condensation Glide | ° C. | 0.3 | 10.1 | 0.0 | 6.5 | 4.4 | 6.4 | 6.5 | 3.6 |

| Item | Unit | Com Ex 101 $L'_{r=0.1}$ | Com Ex 102 $M_{r=0.1}$ | Com Ex 103 $N_{r=0.1}$ | Com Ex 104 $O_{r=0.1}$ | Com Ex 105 $B_{r=0.5}$ | Com Ex 106 $B''_{r=0.5}$ | Com Ex 107 $H_{r=0.5}$ | Com Ex 108 $I_{r=0.5}$ |
|---|---|---|---|---|---|---|---|---|---|
| HFO-1132 (E) | mass % | 57.2 | 48.6 | 35.7 | 28.9 | 0.0 | 0.0 | 63.2 | 38.6 |
| R32 | mass % | 10.0 | 18.1 | 36.7 | 51.6 | 17.9 | 51.5 | 0.0 | 18.1 |
| R1234(ze + yf) | mass % | 32.8 | 33.3 | 27.6 | 19.5 | 82.1 | 48.5 | 36.8 | 43.3 |
| CO2 | mass % | 0.0 | 0.0 | 0.0 | 0.0 | 0.0 | 0.0 | 0.0 | 0.0 |
| GWP | — | 70 | 125 | 250 | 350 | 125 | 350 | 2 | 125 |
| COP ratio | % (relative to R410A) | 101.0 | 101.0 | 100.8 | 100.9 | 105.7 | 103.3 | 101.0 | 101.1 |
| Refrigerating Capacity Ratio | % (relative to R410A) | 84.0 | 86.0 | 93.3 | 100.0 | 57.6 | 83.4 | 80.0 | 82.6 |
| Condensation Glide | ° C. | 5.1 | 5.5 | 4.4 | 2.8 | 8.6 | 4.7 | 3.7 | 5.6 |

| Item | Unit | Com Ex 109 $K'_{r=0.5}$ | Com Ex 110 $L_{r=0.5}$ | Com Ex 111 $L'_{r=0.5}$ | Com Ex 112 $M_{r=0.5}$ | Com Ex 113 $N_{r=0.5}$ | Com Ex 114 $O_{r=0.5}$ | Com Ex 115 $B_{r=1}$ | Com Ex 116 $B''_{r=1}$ |
|---|---|---|---|---|---|---|---|---|---|
| HFO-1132 (E) | mass % | 0.0 | 72.0 | 57.2 | 48.6 | 35.7 | 28.9 | 0.0 | 0.0 |
| R32 | mass % | 46.6 | 0.0 | 10.0 | 18.2 | 36.8 | 51.6 | 18.1 | 51.5 |

TABLE 12-continued

0% CO2

| | | | | | | | | | |
|---|---|---|---|---|---|---|---|---|---|
| R1234(ze + yf) | mass % | 53.4 | 28.0 | 32.8 | 33.2 | 27.5 | 19.5 | 81.9 | 48.5 |
| CO2 | mass % | 0.0 | 0.0 | 0.0 | 0.0 | 0.0 | 0.0 | 0.0 | 0.0 |
| GWP | — | 317 | 2 | 70 | 125 | 250 | 350 | 125 | 350 |
| COP ratio | % (relative to R410A) | 103.5 | 100.5 | 100.3 | 100.3 | 100.3 | 100.5 | 103.6 | 102.2 |
| Refrigerating Capacity Ratio | % (relative to R410A) | 80.0 | 84.6 | 86.0 | 88.3 | 95.3 | 101.5 | 62.5 | 87.3 |
| Condensation Glide | ° C. | 5.4 | 2.7 | 3.9 | 4.1 | 3.2 | 2.1 | 6.8 | 2.7 |

| Item | Unit | Com Ex 117 $H_{r=1}$ | Com Ex 118 $I_{r=1}$ | Com Ex 119 $K'_{r=1}$ | Com Ex 120 $L_{r=1}$ | Com Ex 121 $L'_{r=1}$ | Com Ex 122 $M_{r=1}$ | Com Ex 123 $N_{r=1}$ | Com Ex 124 $O_{r=1}$ |
|---|---|---|---|---|---|---|---|---|---|
| HFO-1132 (E) | mass % | 58.3 | 31.9 | 0.0 | 72.0 | 57.2 | 48.6 | 35.7 | 28.9 |
| R32 | mass % | 0.0 | 18.2 | 40.3 | 0.0 | 10.0 | 18.2 | 36.8 | 51.7 |
| R1234(ze + yf) | mass % | 41.7 | 49.9 | 59.7 | 28.0 | 32.8 | 33.2 | 27.5 | 19.4 |
| CO2 | mass % | 0.0 | 0.0 | 0.0 | 0.0 | 0.0 | 0.0 | 0.0 | 0.0 |
| GWP | — | 2 | 125 | 274 | 2 | 69 | 125 | 250 | 350 |
| COP ratio | % (relative to R410A) | 100.3 | 100.3 | 102.2 | 99.9 | 99.5 | 99.4 | 99.6 | 100.1 |
| Refrigerating Capacity Ratio | % (relative to R410A) | 80.0 | 82.3 | 80.0 | 86.6 | 88.4 | 90.8 | 97.7 | 103.3 |
| Condensation Glide | ° C. | 2.9 | 4.4 | 4.0 | 1.7 | 2.6 | 2.7 | 1.9 | 1.2 |

TABLE 13

0.4% CO2

| Item | Unit | Com Ex 125 A | Com Ex 126 $B_{r=0.1}$ | Com Ex 127 A'' | Com Ex 128 $B''_{r=0.1}$ | Com Ex 129 $H_{r=0.1}$ | Example 47 $I_{r=0.1}$ | Com Ex 130 $K'_{r=0.1}$ | Com Ex 131 $L_{r=0.1}$ |
|---|---|---|---|---|---|---|---|---|---|
| HFO-1132 (E) | mass % | 81.2 | 0.0 | 47.7 | 0.0 | 65.0 | 41.6 | 0.0 | 72.0 |
| R32 | mass % | 18.4 | 17.8 | 51.9 | 51.4 | 0.0 | 18.1 | 50.2 | 0.0 |
| R1234(ze + yf) | mass % | 0.0 | 81.8 | 0.0 | 48.2 | 34.6 | 39.9 | 49.4 | 27.6 |
| CO2 | mass % | 0.4 | 0.4 | 0.4 | 0.4 | 0.4 | 0.4 | 0.4 | 0.4 |
| GWP | — | 125 | 125 | 350 | 350 | 3 | 125 | 342 | 2 |
| COP ratio | % (relative to R410A) | 98.5 | 107.2 | 99.0 | 104.2 | 101.2 | 101.5 | 104.3 | 100.7 |
| Refrigerating Capacity Ratio | % (relative to R410A) | 106.1 | 54.1 | 112.8 | 80.9 | 80.0 | 82.8 | 80.0 | 84.1 |
| Condensation Glide | ° C. | 0.6 | 10.7 | 0.2 | 6.8 | 5.2 | 7.0 | 7.0 | 4.1 |

| Item | Unit | Example 48 $L'_{r=0.1}$ | Example 49 $M_{r=0.1}$ | Example 50 $N_{r=0.1}$ | Example 51 $O_{r=0.1}$ | Com Ex 132 $B_{r=0.5}$ | Com Ex 133 $B''_{r=0.5}$ | Com Ex 134 $H_{r=0.5}$ | Example 52 $I_{r=0.5}$ |
|---|---|---|---|---|---|---|---|---|---|
| HFO-1132 (E) | mass % | 57.2 | 48.6 | 35.7 | 28.9 | 0.0 | 0.0 | 61.4 | 36.9 |
| R32 | mass % | 10.0 | 18.1 | 36.7 | 51.6 | 17.9 | 51.5 | 0.0 | 18.1 |
| R1234(ze + yf) | mass % | 32.4 | 32.9 | 27.2 | 19.1 | 81.7 | 48.1 | 38.2 | 44.6 |
| CO2 | mass % | 0.4 | 0.4 | 0.4 | 0.4 | 0.4 | 0.4 | 0.4 | 0.4 |
| GWP | — | 70 | 125 | 250 | 350 | 125 | 350 | 3 | 125 |
| COP ratio | % (relative to R410A) | 100.7 | 100.7 | 100.6 | 100.7 | 105.5 | 103.2 | 100.8 | 101.1 |
| Refrigerating Capacity Ratio | % (relative to R410A) | 85.0 | 87.0 | 94.2 | 100.9 | 58.5 | 84.2 | 80.0 | 82.6 |
| Condensation Glide | ° C. | 5.5 | 5.8 | 4.6 | 3.0 | 9.2 | 5.0 | 4.5 | 6.1 |

| Item | Unit | Com Ex 135 $K'_{r=0.5}$ | Com Ex 136 $L_{r=0.5}$ | Example 53 $L'_{r=0.5}$ | Example 54 $M_{r=0.5}$ | Example 55 $N_{r=0.5}$ | Example 56 $O_{r=0.5}$ | Com Ex 137 $B_{r=1}$ | Com Ex 138 $B''_{r=1}$ |
|---|---|---|---|---|---|---|---|---|---|
| HFO-1132 (E) | mass % | 0.0 | 72.0 | 57.2 | 48.6 | 35.7 | 28.9 | 0.0 | 0.0 |
| R32 | mass % | 45.4 | 0.0 | 10.0 | 18.2 | 36.8 | 51.6 | 18.1 | 51.5 |
| R1234(ze + yf) | mass % | 54.2 | 27.6 | 32.4 | 32.8 | 27.1 | 19.1 | 81.5 | 48.1 |
| CO2 | mass % | 0.4 | 0.4 | 0.4 | 0.4 | 0.4 | 0.4 | 0.4 | 0.4 |
| GWP | — | 309 | 2 | 70 | 125 | 250 | 350 | 125 | 350 |
| COP ratio | % (relative to R410A) | 103.4 | 100.2 | 100.1 | 100.0 | 100.1 | 100.4 | 103.5 | 103.2 |
| Refrigerating Capacity Ratio | % (relative to R410A) | 80.0 | 85.7 | 87.0 | 89.2 | 96.3 | 102.4 | 63.3 | 84.2 |
| Condensation Glide | ° C. | 5.9 | 3.2 | 4.3 | 4.5 | 3.5 | 2.3 | 7.3 | 4.9 |

| Item | Unit | Com Ex 139 $H_{r=1}$ | Com Ex 140 $I_{r=1}$ | Com Ex 141 $K'_{r=1}$ | Com Ex 142 $L_{r=1}$ | Com Ex 143 $L'_{r=1}$ | Com Ex 144 $M_{r=1}$ | Com Ex 145 $N_{r=1}$ | Com Ex 146 $O_{r=1}$ |
|---|---|---|---|---|---|---|---|---|---|
| HFO-1132 (E) | mass % | 56.3 | 30.1 | 0.0 | 72.0 | 57.2 | 48.6 | 35.7 | 28.9 |
| R32 | mass % | 0.0 | 18.2 | 39.1 | 0.0 | 10.0 | 18.2 | 36.8 | 51.7 |
| R1234(ze + yf) | mass % | 43.3 | 51.3 | 60.5 | 27.6 | 32.4 | 32.8 | 27.1 | 19.0 |
| CO2 | mass % | 0.4 | 0.4 | 0.4 | 0.4 | 0.4 | 0.4 | 0.4 | 0.4 |
| GWP | — | 2 | 125 | 266 | 2 | 69 | 125 | 250 | 350 |

TABLE 13-continued

| | | 0.4% $CO_2$ | | | | | | | |
|---|---|---|---|---|---|---|---|---|---|
| COP ratio | % (relative to R410A) | 100.1 | 100.3 | 102.1 | 99.7 | 99.3 | 99.2 | 99.5 | 99.9 |
| Refrigerating Capacity Ratio | % (relative to R410A) | 80.0 | 82.2 | 80.0 | 87.6 | 89.4 | 91.8 | 98.6 | 104.1 |
| Condensation Glide | ° C. | 3.5 | 4.9 | 4.5 | 2.2 | 3.0 | 3.0 | 2.2 | 1.4 |

TABLE 14

1% $CO_2$

| Item | Unit | Com Ex147 A | Com Ex148 $B_{r=0.1}$ | Com Ex149 A'' | Com Ex150 $B''_{r=0.1}$ | Com Ex151 $H_{r=0.1}$ | Example57 $I_{r=0.1}$ | Com Ex152 $K'_{r=0.1}$ | Com Ex153 $L_{r=0.1}$ |
|---|---|---|---|---|---|---|---|---|---|
| HFO-1132 (E) | mass % | 80.6 | 0.0 | 47.2 | 0.0 | 62.2 | 39.0 | 0.0 | 72.0 |
| R32 | mass % | 18.4 | 17.8 | 51.8 | 51.5 | 0.0 | 18.1 | 48.4 | 0.0 |
| R1234(ze + yf) | mass % | 0.0 | 81.2 | 0.0 | 47.5 | 36.8 | 41.9 | 50.6 | 27.0 |
| $CO_2$ | mass % | 1.0 | 1.0 | 1.0 | 1.0 | 1.0 | 1.0 | 1.0 | 1.0 |
| GWP | — | 125 | 125 | 350 | 350 | 3 | 125 | 330 | 2 |
| COP ratio | % (relative to R410A) | 98.2 | 107.0 | 98.8 | 103.9 | 101.0 | 101.5 | 104.2 | 100.3 |
| Refrigerating Capacity Ratio | % (relative to R410A) | 107.3 | 55.4 | 113.8 | 82.2 | 80.0 | 82.6 | 80.0 | 85.7 |
| Condensation Glide | ° C. | 1.0 | 11.7 | 0.5 | 7.2 | 6.4 | 8.0 | 7.8 | 4.8 |

| Item | Unit | Example58 $L'_{r=0.1}$ | Example59 $M_{r=0.1}$ | Example60 $N_{r=0.1}$ | Example61 $O_{r=0.1}$ | Com Ex154 $B_{r=0.5}$ | Com Ex155 $B'_{r=0.5}$ | Com Ex156 $H_{r=0.5}$ | Example62 $I_{r=0.5}$ |
|---|---|---|---|---|---|---|---|---|---|
| HFO-1132 (E) | mass % | 57.2 | 48.6 | 35.7 | 28.9 | 0.0 | 0.0 | 58.4 | 34.1 |
| R32 | mass % | 10.0 | 18.1 | 36.7 | 51.6 | 17.9 | 51.5 | 0.0 | 18.1 |
| R1234(ze + yf) | mass % | 31.8 | 32.3 | 26.5 | 18.5 | 81.1 | 47.5 | 40.6 | 46.8 |
| $CO_2$ | mass % | 1.0 | 1.0 | 1.0 | 1.0 | 1.0 | 1.0 | 1.0 | 1.0 |
| GWP | — | 70 | 125 | 250 | 350 | 125 | 350 | 3 | 125 |
| COP ratio | % (relative to R410A) | 100.4 | 100.4 | 100.3 | 100.4 | 105.3 | 103.0 | 100.6 | 101.0 |
| Refrigerating Capacity Ratio | % (relative to R410A) | 86.5 | 88.5 | 95.6 | 102.3 | 59.8 | 85.5 | 80.0 | 82.4 |
| Condensation Glide | ° C. | 6.1 | 6.3 | 5.0 | 3.3 | 9.9 | 5.3 | 5.6 | 7.0 |

| Item | Unit | Com Ex157 $K'_{r=0.5}$ | Com Ex158 $L_{r=0.5}$ | Example63 $L'_{r=0.5}$ | Example64 $M_{r=0.5}$ | Example65 $N_{r=0.5}$ | Example66 $O_{r=0.5}$ | Com Ex159 $B_{r=0.5}$ | Com Ex160 $B''_{r=0.5}$ |
|---|---|---|---|---|---|---|---|---|---|
| HFO-1132 (E) | mas s% | 0.0 | 72.0 | 57.2 | 48.6 | 35.7 | 28.9 | 0.0 | 0.0 |
| R32 | mass % | 43.6 | 0.0 | 10.0 | 18.2 | 36.8 | 51.6 | 18.1 | 51.5 |
| R1234(ze + yf) | mass % | 55.4 | 27.0 | 31.8 | 32.2 | 26.5 | 18.5 | 80.9 | 47.5 |
| $CO_2$ | mass % | 1.0 | 1.0 | 1.0 | 1.0 | 1.0 | 1.0 | 1.0 | 1.0 |
| GWP | — | 297 | 2 | 70 | 125 | 250 | 350 | 125 | 350 |
| COP ratio | % (relative to R410A) | 103.3 | 99.8 | 99.7 | 99.7 | 99.8 | 100.1 | 103.3 | 101.8 |
| Refrigerating Capacity Ratio | % (relative to R410A) | 80.0 | 87.3 | 88.5 | 90.7 | 97.6 | 103.7 | 64.6 | 89.4 |
| Condensation Glide | ° C. | 6.6 | 3.9 | 4.9 | 4.9 | 3.8 | 2.6 | 7.9 | 3.3 |

| Item | Unit | Com Ex161 $H_{r=1}$ | Com Ex162 $I_{r=1}$ | Com Ex163 $K'_{r=1}$ | Com Ex164 $L_{r=1}$ | Com Ex165 $L'_{r=1}$ | Com Ex166 $M_{r=1}$ | Com Ex167 $N_{r=1}$ | Com Ex168 $O_{r=1}$ |
|---|---|---|---|---|---|---|---|---|---|
| HFO-1132 (E) | mass % | 53.4 | 27.4 | 0.0 | 72.0 | 57.2 | 48.6 | 35.7 | 28.9 |
| R32 | mass % | 0.0 | 18.2 | 37.4 | 0.0 | 10.0 | 18.2 | 36.8 | 51.7 |
| R1234(ze + yf) | mass % | 45.6 | 53.4 | 61.6 | 27.0 | 31.8 | 32.2 | 26.5 | 18.4 |
| $CO_2$ | mass % | 1.0 | 1.0 | 1.0 | 1.0 | 1.0 | 1.0 | 1.0 | 1.0 |
| GWP | — | 2 | 125 | 255 | 2 | 69 | 125 | 250 | 350 |
| COP ratio | % (relative to R410A) | 99.9 | 100.3 | 102.0 | 99.3 | 99.0 | 98.9 | 99.2 | 99.7 |
| Refrigerating Capacity Ratio | % (relative to R410A) | 80.0 | 82.1 | 80.0 | 89.2 | 90.8 | 93.2 | 99.9 | 105.4 |

TABLE 14-continued

| 1% CO2 | | | | | | | | | |
|---|---|---|---|---|---|---|---|---|---|
| Condensation Glide | ° C. | 4.5 | 5.7 | 5.1 | 2.9 | 3.5 | 3.4 | 2.5 | 1.7 |

TABLE 15

| 2% CO2 | | | | | | | | | |
|---|---|---|---|---|---|---|---|---|---|
| Item | Unit | Com Ex169 A | Com Ex170 $B_{r=0.1}$ | Com Ex171 A'' | Com Ex172 $B''_{r=0.1}$ | Com Ex173 $H_{r=0.1}$ | Example67 $I_{r=0.1}$ | Com Ex174 $K'_{r=0.1}$ | Com Ex175 $L_{r=0.1}$ |
| HFO-1132 (E) | mass % | 79.6 | 0.0 | 46.2 | 0.0 | 57.8 | 34.9 | 0.0 | 72.0 |
| R32 | mass % | 18.4 | 17.8 | 51.8 | 51.4 | 0.0 | 18.1 | 45.5 | 0.0 |
| R1234(ze + yf) | mass % | 0.0 | 80.2 | 0.0 | 46.6 | 40.2 | 45.0 | 52.5 | 26.6 |
| CO2 | mass % | 2.0 | 2.0 | 2.0 | 2.0 | 2.0 | 2.0 | 2.0 | 2.0 |
| GWP | — | 125 | 125 | 350 | 350 | 3 | 125 | 310 | 2 |
| COP ratio | % (relative to R410A) | 97.7 | 106.6 | 98.4 | 103.5 | 100.8 | 101.5 | 104.0 | 99.6 |
| Refrigerating Capacity Ratio | % (relative to R410A) | 109.3 | 57.7 | 115.5 | 84.3 | 80.0 | 82.4 | 80.0 | 88.4 |
| Condensation Glide | ° C. | 1.7 | 13.2 | 1.0 | 7.9 | 8.3 | 9.6 | 9.1 | 5.9 |
| Item | Unit | Example68 $L'_{r=0.1}$ | Example69 $M_{r=0.1}$ | Example70 $N_{r=0.1}$ | Example71 $O_{r=0.1}$ | Com Ex176 $B_{r=0.5}$ | Com Ex177 $B''_{r=0.5}$ | Com Ex178 $H_{r=0.5}$ | Example72 $I_{r=0.5}$ |
| HFO-1132 (E) | mass % | 57.2 | 48.6 | 35.7 | 28.9 | 0.0 | 0.0 | 53.8 | 9.8 |
| R32 | mass % | 10.0 | 18.2 | 36.7 | 51.6 | 17.9 | 51.5 | 0.0 | 18.1 |
| R1234(ze + yf) | mass % | 30.8 | 31.2 | 25.6 | 17.5 | 80.1 | 46.5 | 44.2 | 50.1 |
| CO2 | mass % | 2.0 | 2.0 | 2.0 | 2.0 | 2.0 | 2.0 | 2.0 | 2.0 |
| GWP | — | 70 | 125 | 250 | 350 | 125 | 350 | 3 | 125 |
| COP ratio | % (relative to R410A) | 99.8 | 99.8 | 99.9 | 100.0 | 104.9 | 102.6 | 100.3 | 101.0 |
| Refrigerating Capacity Ratio | % (relative to R410A) | 89.0 | 91.0 | 97.9 | 104.6 | 62.0 | 87.6 | 80.0 | 82.1 |
| Condensation Glide | ° C. | 6.9 | 7.0 | 5.5 | 3.7 | 11.2 | 6.0 | 7.4 | 8.5 |
| Item | Unit | Com Ex179 $K'_{r=0.5}$ | Com Ex180 $L_{r=0.5}$ | Example73 $L'_{r=0.5}$ | Example74 $M_{r=0.5}$ | Example75 $N_{r=0.5}$ | Example76 $O_{r=0.5}$ | Com Ex181 $B_{r=0.5}$ | Com Ex182 $B''_{r=0.5}$ |
| HFO-1132 (E) | mass % | 0.0 | 72.0 | 57.2 | 48.6 | 35.7 | 28.9 | 0.0 | 0.0 |
| R32 | mass % | 40.6 | 0.0 | 10.0 | 18.2 | 36.8 | 51.7 | 18.1 | 51.5 |
| R1234(ze + yf) | mass % | 57.4 | 26.0 | 30.8 | 31.2 | 25.5 | 17.4 | 79.9 | 46.5 |
| CO2 | mass % | 2.0 | 2.0 | 2.0 | 2.0 | 2.0 | 2.0 | 2.0 | 2.0 |
| GWP | — | 277 | 2 | 70 | 125 | 250 | 350 | 125 | 350 |
| COP ratio | % (relative to R410A) | 103.1 | 99.2 | 99.2 | 99.2 | 99.4 | 99.7 | 102.9 | 101.5 |
| Refrigerating Capacity Ratio | % (relative to R410A) | 80.0 | 89.9 | 91.0 | 93.1 | 99.9 | 106.0 | 66.7 | 91.4 |
| Condensation Glide | ° C. | 7.8 | 5.0 | 5.7 | 5.6 | 4.3 | 3.0 | 8.9 | 3.9 |
| Item | Unit | Com Ex183 $H_{r=1}$ | Com Ex184 $I_{r=1}$ | Com Ex185 $K'_{r=1}$ | Com Ex186 $L_{r=1}$ | Com Ex187 $L'_{r=1}$ | Com Ex188 $M_{r=1}$ | Com Ex189 $N_{r=1}$ | Com Ex190 $O_{r=1}$ |
| HFO-1132 (E) | mass % | 48.6 | 23.1 | 0.0 | 72.0 | 57.2 | 48.6 | 35.7 | 28.9 |
| R32 | mass % | 0.0 | 18.2 | 34.6 | 0.0 | 10.0 | 18.2 | 36.8 | 51.7 |
| R1234(ze + yf) | mass % | 49.4 | 56.7 | 63.4 | 26.0 | 30.8 | 31.2 | 25.5 | 17.4 |
| CO2 | mass % | 2.0 | 2.0 | 2.0 | 2.0 | 2.0 | 2.0 | 2.0 | 2.0 |
| GWP | — | 2 | 125 | 236 | 2 | 69 | 125 | 250 | 350 |
| COP ratio | % (relative to R410A) | 99.7 | 100.2 | 101.7 | 98.7 | 98.5 | 98.5 | 98.8 | 99.3 |
| Refrigerating Capacity Ratio | % (relative to R410A) | 80.0 | 81.9 | 80.0 | 91.8 | 93.2 | 95.5 | 102.1 | 107.5 |

TABLE 15-continued

| | | 2% CO2 | | | | | | | |
|---|---|---|---|---|---|---|---|---|---|
| Condensation Glide | ° C. | 6.2 | 7.0 | 6.3 | 3.9 | 4.3 | 4.1 | 3.1 | 2.2 |

TABLE 16

| 3% CO2 | | | | | | | | | |
|---|---|---|---|---|---|---|---|---|---|
| Item | Unit | Com Ex191 A | Com Ex192 $B_{r=0.1}$ | Com Ex193 A" | Com Ex194 $B''_{r=0.1}$ | Com Ex195 $H_{r=0.1}$ | Example77 $I_{r=0.1}$ | Com Ex196 $K'_{r=0.1}$ | Com Ex197 $L_{r=0.1}$ |
| HFO-1132 (E) | mass % | 78.6 | 0.0 | 45.2 | 0.0 | 53.5 | 31.0 | 0.0 | 72.0 |
| R32 | mass % | 18.4 | 17.8 | 51.8 | 51.4 | 0.0 | 18.0 | 42.8 | 0.0 |
| R1234(ze + yf) | mass % | 0.0 | 79.2 | 0.0 | 45.6 | 43.5 | 48.0 | 54.2 | 25.0 |
| CO2 | mass % | 3.0 | 3.0 | 3.0 | 3.0 | 3.0 | 3.0 | 3.0 | 3.0 |
| GWP | — | 125 | 125 | 350 | 350 | 3 | 125 | 292 | 2 |
| COP ratio | % (relative to R410A) | 97.2 | 106.2 | 98.1 | 103.1 | 100.6 | 101.6 | 103.8 | 99.0 |
| Refrigerating Capacity Ratio | % (relative to R410A) | 111.3 | 59.9 | 117.2 | 86.4 | 80.0 | 82.2 | 80.0 | 91.0 |
| Condensation Glide | ° C. | 2.4 | 14.6 | 1.5 | 8.5 | 10.2 | 11.1 | 10.4 | 6.9 |
| Item | Unit | Example78 $L'_{r=0.1}$ | Example79 $M_{r=0.1}$ | Example80 $N_{r=0.1}$ | Example81 $O_{r=0.1}$ | Com Ex198 $B_{r=0.5}$ | Com Ex199 $B''_{r=0.5}$ | Com Ex200 $H_{r=0.5}$ | Example82 $I_{r=0.5}$ |
| HFO-1132 (E) | mass % | 57.2 | 48.6 | 35.7 | 28.9 | 0.0 | 0.0 | 49.4 | 25.6 |
| R32 | mass % | 10.0 | 18.2 | 36.7 | 51.6 | 18.0 | 51.5 | 0.0 | 18.1 |
| R1234(ze + yf) | mass % | 29.8 | 30.2 | 24.6 | 16.5 | 79 | 45.5 | 47.6 | 53.3 |
| CO2 | mass % | 3.0 | 3.0 | 3.0 | 3.0 | 3.0 | 3.0 | 3.0 | 3.0 |
| GWP | — | 70 | 125 | 250 | 350 | 125 | 350 | 3 | 125 |
| COP ratio | % (relative to R410A) | 99.2 | 99.3 | 99.4 | 99.6 | 104.5 | 102.2 | 100.1 | 101.1 |
| Refrigerating Capacity Ratio | % (relative to R410A) | 91.6 | 93.6 | 100.3 | 106.8 | 64.3 | 89.7 | 80.0 | 81.9 |
| Condensation Glide | ° C. | 7.7 | 7.6 | 5.9 | 4.1 | 12.4 | 6.6 | 9.2 | 9.9 |
| Item | Unit | Com Ex201 $K'_{r=0.5}$ | Com Ex202 $L_{r=0.5}$ | Example83 $L'_{r=0.5}$ | Example84 $M_{r=0.5}$ | Example85 $N_{r=0.5}$ | Example86 $O_{r=0.5}$ | Com Ex203 $B_{r=0.5}$ | Com Ex204 $B''_{r=0.5}$ |
| HFO-1132 (E) | mass % | 0.0 | 72.0 | 57.2 | 48.6 | 35.7 | 28.9 | 0.0 | 0.0 |
| R32 | mass % | 37.6 | 0.0 | 10.0 | 18.2 | 36.8 | 51.7 | 18.1 | 51.6 |
| R1234(ze + yf) | mass % | 59.4 | 25.0 | 29.8 | 30.2 | 24.5 | 16.4 | 78.9 | 45.4 |
| CO2 | mass % | 3.0 | 3.0 | 3.0 | 3.0 | 3.0 | 3.0 | 3.0 | 3.0 |
| GWP | — | 257 | 2 | 70 | 125 | 250 | 350 | 125 | 350 |
| COP ratio | % (relative to R410A) | 102.9 | 98.6 | 98.6 | 98.7 | 98.9 | 99.3 | 102.6 | 101.1 |
| Refrigerating Capacity Ratio | % (relative to R410A) | 80.0 | 92.6 | 93.5 | 95.5 | 102.2 | 102.2 | 68.9 | 93.5 |
| Condensation Glide | ° C. | 9.1 | 6.0 | 6.5 | 6.3 | 4.8 | 3.4 | 10.0 | 4.4 |
| Item | Unit | Com Ex205 $H_{r=1}$ | Com Ex206 $I_{r=1}$ | Com Ex207 $K'_{r=1}$ | Com Ex208 $L_{r=1}$ | Com Ex209 $L'_{r=1}$ | Com Ex210 $M_{r=1}$ | Com Ex211 $N_{r=1}$ | Com Ex212 $O_{r=1}$ |
| HFO-1132 (E) | mass % | 43.9 | 18.7 | 0.0 | 72.0 | 57.2 | 48.6 | 35.7 | 28.9 |
| R32 | mass % | 0.0 | 18.1 | 31.7 | 0.0 | 10.0 | 18.2 | 36.8 | 51.7 |
| R1234(ze + yf) | mass % | 53.1 | 60.2 | 65.3 | 25.0 | 29.8 | 30.2 | 24.5 | 16.4 |
| CO2 | mass % | 3.0 | 3.0 | 3.0 | 30 | 3.0 | 3.0 | 3.0 | 3.0 |
| GWP | — | 3 | 125 | 217 | 2 | 69 | 125 | 250 | 350 |
| COP ratio | % (relative to R410A) | 99.5 | 100.3 | 101.5 | 98.1 | 98.0 | 98.0 | 98.4 | 98.9 |
| Refrigerating Capacity Ratio | % (relative to R410A) | 80.0 | 81.4 | 80.0 | 94.4 | 95.7 | 97.8 | 104.3 | 109.6 |

TABLE 16-continued

| 3% CO2 | | | | | | | | | |
|---|---|---|---|---|---|---|---|---|---|
| Condensation Glide | ° C. | 7.9 | 83 | 7.5 | 4.9 | 5.1 | 4.8 | 3.6 | 2.6 |

TABLE 17

4% CO2

| Item | Unit | Com Ex213 A | Com Ex214 $B_{r=0.1}$ | Com Ex215 A'' | Com Ex216 $B''_{r=0.1}$ | Com Ex217 $H_{r=0.1}$ | Example87 $I_{r=0.1}$ | Com Ex218 $K'_{r=0.1}$ | Com Ex219 $L_{r=0.1}$ |
|---|---|---|---|---|---|---|---|---|---|
| HFO-1132 (E) | mass % | 77.6 | 0.0 | 44.2 | 0.0 | 49.2 | 26.9 | 0.0 | 72.0 |
| R32 | mass % | 18.4 | 17.8 | 51.8 | 51.4 | 0.0 | 18.0 | 39.7 | 0.0 |
| R1234(ze + yf) | mass % | 0.0 | 78.2 | 0.0 | 44.6 | 46.8 | 51.1 | 56.3 | 24.0 |
| CO2 | mass % | 4.0 | 4.0 | 4.0 | 4.0 | 4.0 | 4.0 | 4.0 | 4.0 |
| GWP | — | 125 | 125 | 350 | 350 | 3 | 125 | 271 | 2 |
| COP ratio | % (relative to R410A) | 96.7 | 105.9 | 97.7 | 102.7 | 100.6 | 101.8 | 103.7 | 98.4 |
| Refrigerating Capacity Ratio | % (relative to R410A) | 113.3 | 62.2 | 118.9 | 88.6 | 80.0 | 81.9 | 80.0 | 93.7 |
| Condensation Glide | ° C. | 3.0 | 15.9 | 2.0 | 9.1 | 12.1 | 12.7 | 11.8 | 7.7 |

| Item | Unit | Example88 $L'_{r=0.1}$ | Example89 $M_{r=0.1}$ | Example90 $N_{r=0.1}$ | Example91 $O_{r=0.1}$ | Com Ex220 $B_{r=0.5}$ | Com Ex221 $B''_{r=0.5}$ | Com Ex222 $H_{r=0.5}$ | Example92 $I_{r=0.5}$ |
|---|---|---|---|---|---|---|---|---|---|
| HFO-1132 (E) | mass % | 57.2 | 48.6 | 35.7 | 28.9 | 0.0 | 0.0 | 44.8 | 21.5 |
| R32 | mass % | 10.0 | 18.2 | 36.8 | 51.6 | 18.0 | 51.5 | 0.0 | 18.1 |
| R1234(ze + yf) | mass % | 28.8 | 29.2 | 23.5 | 15.5 | 78.0 | 44.5 | 51.2 | 56.4 |
| CO2 | mass % | 4.0 | 4.0 | 4.0 | 4.0 | 4.0 | 4.0 | 4.0 | 4.0 |
| GWP | — | 70 | 125 | 250 | 350 | 125 | 350 | 3 | 125 |
| COP ratio | % (relative to R410A) | 98.7 | 98.8 | 98.9 | 99.1 | 104.2 | 101.8 | 100.1 | 101.2 |
| Refrigerating Capacity Ratio | % (relative to R410A) | 94.1 | 95.9 | 102.7 | 109.1 | 66.6 | 91.8 | 80.0 | 81.6 |
| Condensation Glide | ° C. | 8.4 | 8.2 | 6.3 | 4.5 | 13.6 | 7.2 | 11.0 | 11.4 |

| Item | Unit | Com Ex223 $K'_{r=0.5}$ | Com Ex224 $L_{r=0.5}$ | Example93 $L'_{r=0.5}$ | Example94 $M_{r=0.5}$ | Example95 $N_{r=0.5}$ | Example96 $O_{r=0.5}$ | Com Ex225 $B_{r=0.5}$ | Com Ex226 $B''_{r=0.5}$ |
|---|---|---|---|---|---|---|---|---|---|
| HFO-1132 (E) | mass % | 0.0 | 72.0 | 57.2 | 48.6 | 35.7 | 28.9 | 0.0 | 0.0 |
| R32 | mass % | 34.8 | 0.0 | 10.0 | 18.2 | 36.8 | 51.7 | 18.0 | 51.6 |
| R1234(ze + yf) | mass % | 61.2 | 24.0 | 28.8 | 29.2 | 23.5 | 15.4 | 78.0 | 44.4 |
| CO2 | mass % | 4.0 | 4.0 | 4.0 | 4.0 | 4.0 | 4.0 | 4.0 | 4.0 |
| GWP | — | 238 | 2 | 70 | 125 | 250 | 350 | 125 | 350 |
| COP ratio | % (relative to R410A) | 102.7 | 98.0 | 98.1 | 98.2 | 98.5 | 98.9 | 102.3 | 100.8 |
| Refrigerating Capacity Ratio | % (relative to R410A) | 80.0 | 95.2 | 96.0 | 97.9 | 104.4 | 110.4 | 71.1 | 95.6 |
| Condensation Glide | ° C. | 10.4 | 6.8 | 7.2 | 6.9 | 5.3 | 3.8 | 11.0 | 5.0 |

| Item | Unit | Com Ex227 $H_{r=1}$ | Com Ex228 $I_{r=1}$ | Com Ex229 $K'_{r=1}$ | Com Ex230 $L_{r=1}$ | Com Ex231 $L'_{r=1}$ | Com Ex232 $M_{r=1}$ | Com Ex233 $N_{r=1}$ | Com Ex234 $O_{r=1}$ |
|---|---|---|---|---|---|---|---|---|---|
| HFO-1132 (E) | mass % | 39.5 | 14.8 | 0.0 | 72.0 | 57.2 | 48.6 | 35.7 | 28.9 |
| R32 | mass % | 0.0 | 18.1 | 28.9 | 0.0 | 10.0 | 18.2 | 36.8 | 51.7 |
| R1234(ze + yf) | mass % | 56.5 | 63.1 | 67.1 | 24.0 | 28.8 | 29.2 | 23.5 | 15.4 |
| CO2 | mass % | 4.0 | 4.0 | 40 | 4.0 | 4.0 | 4.0 | 4.0 | 4.0 |
| GWP | — | 3 | 125 | 198 | 2 | 69 | 125 | 250 | 350 |
| COP ratio | % (relative to R410A) | 99.4 | 100.4 | 101.3 | 98.7 | 98.5 | 98.5 | 98.8 | 99.3 |
| Refrigerating Capacity Ratio | % (relative to R410A) | 80.0 | 81.3 | 80.0 | 91.8 | 93.2 | 95.5 | 102.1 | 107.5 |
| Condensation Glide | ° C. | 9.6 | 9.6 | 6.7 | 3.9 | 4.3 | 4.1 | 3.1 | 2.2 |

TABLE 18

5% CO2

| Item | Unit | Com Ex236 A | Com Ex237 $B_{r=0.1}$ | Com Ex238 A'' | Com Ex239 $B''_{r=0.1}$ | Com Ex240 $H_{r=0.1}$ | Example97 $I_{r=0.1}$ | Com Ex241 $K'_{r=0.1}$ | Com Ex242 $L_{r=0.1}$ |
|---|---|---|---|---|---|---|---|---|---|
| HFO-1132 (E) | mass % | 76.6 | 0.0 | 43.2 | 0.0 | 45.1 | 23.1 | 0.0 | 72.0 |
| R32 | mass % | 18.4 | 17.8 | 51.8 | 51.4 | 0.0 | 18.0 | 36.8 | 0.0 |
| R1234(ze + yf) | mass % | 0.0 | 77.2 | 0.0 | 43.6 | 49.9 | 53.9 | 58.2 | 23.0 |
| CO2 | mass % | 5.0 | 5.0 | 5.0 | 5.0 | 5.0 | 5.0 | 5.0 | 5.0 |
| GWP | — | 125 | 125 | 350 | 350 | 3 | 125 | 252 | 2 |
| COP ratio | % (relative to R410A) | 96.2 | 105.6 | 97.4 | 102.3 | 100.6 | 101.9 | 103.6 | 97.9 |
| Refrigerating Capacity Ratio | % (relative to R410A) | 115.2 | 64.5 | 120.6 | 90.8 | 80.0 | 81.7 | 80.0 | 96.4 |
| Condensation Glide | ° C. | 3.5 | 17.1 | 2.4 | 9.6 | 13.9 | 14.2 | 13.1 | 8.5 |

| Item | Unit | Example98 $L'_{r=0.1}$ | Example99 $M_{r=0.1}$ | Example100 $N_{r=0.1}$ | Example101 $O_{r=0.1}$ | Com Ex243 $B_{r=0.5}$ | Com Ex244 $B''_{r=0.5}$ | Com Ex245 $H_{r=0.5}$ | Example102 $I_{r=0.5}$ |
|---|---|---|---|---|---|---|---|---|---|
| HFO-1132 (E) | mass % | 57.2 | 48.6 | 35.7 | 28.9 | 0.0 | 0.0 | 40.6 | 17.5 |
| R32 | mass % | 10.0 | 18.2 | 36.8 | 51.7 | 18.0 | 51.5 | 0.0 | 18.1 |
| R1234(ze + yf) | mass % | 27.8 | 28.2 | 22.5 | 14.4 | 77.0 | 43.5 | 54.4 | 59.4 |
| CO2 | mass % | 5.0 | 5.0 | 5.0 | 5.0 | 5.0 | 5.0 | 5.0 | 5.0 |
| GWP | — | 70 | 125 | 250 | 350 | 125 | 350 | 3 | 125 |
| COP ratio | % (relative to R410A) | 98.2 | 98.3 | 98.5 | 98.7 | 103.8 | 101.5 | 100.0 | 101.3 |
| Refrigerating Capacity Ratio | % (relative to R410A) | 96.6 | 98.3 | 105.0 | 111.4 | 68.9 | 94.0 | 80.0 | 81.4 |
| Condensation Glide | ° C. | 9.0 | 8.7 | 6.7 | 4.8 | 14.7 | 7.7 | 12.7 | 12.7 |

| Item | Unit | Com Ex246 $K'_{r=0.5}$ | Com Ex247 $L_{r=0.5}$ | Example103 $L'_{r=0.5}$ | Example104 $M_{r=0.5}$ | Example105 $N_{r=0.5}$ | Example106 $O_{r=0.5}$ | Com Ex248 $B_{r=0.5}$ | Com Ex249 $B''_{r=0.5}$ |
|---|---|---|---|---|---|---|---|---|---|
| HFO-1132 (E) | mass % | 0.0 | 72.0 | 57.2 | 48.6 | 35.7 | 28.9 | 0.0 | 0.0 |
| R32 | mass % | 31.8 | 0.0 | 10.0 | 18.2 | 36.8 | 51.7 | 18.1 | 51.6 |
| R1234(ze + yf) | mass % | 63.2 | 23.0 | 27.8 | 28.2 | 22.5 | 14.4 | 76.9 | 43.4 |
| CO2 | mass % | 5.0 | 5.0 | 5.0 | 5.0 | 5.0 | 5.0 | 5.0 | 5.0 |
| GWP | — | 218 | 2 | 70 | 125 | 250 | 350 | 125 | 350 |
| COP ratio | % (relative to R410A) | 102.6 | 97.5 | 97.6 | 97.7 | 98.1 | 98.5 | 101.9 | 100.5 |
| Refrigerating Capacity Ratio | % (relative to R410A) | 80.0 | 97.9 | 98.5 | 100.3 | 106.7 | 112.6 | 73.4 | 97.7 |
| Condensation Glide | ° C. | 11.8 | 7.6 | 7.8 | 7.4 | 5.7 | 4.2 | 11.9 | 5.5 |

| Item | Unit | Com Ex250 $H_{r=1}$ | Com Ex251 $I_{r=1}$ | Com Ex252 $K'_{r=1}$ | Com Ex253 $L_{r=1}$ | Com Ex254 $L'_{r=1}$ | Com Ex255 $M_{r=1}$ | Com Ex256 $N_{r=1}$ | Com Ex257 $O_{r=1}$ |
|---|---|---|---|---|---|---|---|---|---|
| HFO-1132 (E) | mass % | 35.1 | 10.7 | 0.0 | 72.0 | 57.2 | 48.6 | 35.7 | 28.9 |
| R32 | mass % | 0.0 | 18.1 | 26.1 | 0.0 | 10.0 | 18.2 | 36.8 | 51.7 |
| R1234(ze + yf) | mass % | 59.9 | 66.2 | 68.9 | 23.0 | 27.8 | 28.2 | 22.5 | 14.4 |
| CO2 | mass % | 5.0 | 5.0 | 5.0 | 5.0 | 5.0 | 5.0 | 5.0 | 5.0 |
| GWP | — | 3 | 125 | 217 | 2 | 69 | 125 | 250 | 350 |
| COP ratio | % (relative to R410A) | 99.3 | 100.3 | 101.5 | 98.1 | 98.0 | 98.0 | 98.4 | 98.9 |
| Refrigerating Capacity Ratio | % (relative to R410A) | 80.0 | 81.4 | 80.0 | 94.4 | 95.7 | 97.8 | 104.3 | 109.6 |
| Condensation Glide | ° C. | 11.3 | 8.3 | 7.5 | 4.9 | 5.1 | 4.8 | 3.6 | 2.6 |

TABLE 19

6% CO2

| Item | Unit | Com Ex258 A | Com Ex259 $B_{r=0.1}$ | Com Ex260 A'' | Com Ex261 $B''_{r=0.1}$ | Com Ex262 $H_{r=0.1}$ | Example107 $I_{r=0.1}$ | Com Ex263 $K'_{r=0.1}$ | Com Ex264 $L_{r=0.1}$ |
|---|---|---|---|---|---|---|---|---|---|
| HFO-1132 (E) | mass % | 75.6 | 0.0 | 43.2 | 0.0 | 41.0 | 19.3 | 0.0 | 72.0 |
| R32 | mass % | 18.4 | 17.8 | 51.8 | 51.4 | 0.0 | 18.0 | 33.9 | 0.0 |
| R1234(ze + yf) | mass % | 0.0 | 76.2 | 1.0 | 42.6 | 53.0 | 56.7 | 60.1 | 22.0 |
| CO2 | mass % | 6.0 | 6.0 | 6.0 | 6.0 | 6.0 | 6.0 | 6.0 | 6.0 |
| GWP | — | 125 | 125 | 350 | 350 | 3 | 125 | 271 | 2 |
| COP ratio | % (relative to R410A) | 96.7 | 105.9 | 97.7 | 102.7 | 100.6 | 101.8 | 103.7 | 98.4 |
| Refrigerating Capacity Ratio | % (relative to R410A) | 113.3 | 62.2 | 118.9 | 88.6 | 80.0 | 81.9 | 80.0 | 93.7 |
| Condensation Glide | ° C. | 3.0 | 15.9 | 2.0 | 9.1 | 12.1 | 12.7 | 11.8 | 7.7 |

| Item | Unit | Example108 $L'_{r=0.1}$ | Example109 $M_{r=0.1}$ | Example110 $N_{r=0.1}$ | Example111 $O_{r=0.1}$ | Com Ex265 $B_{r=0.5}$ | Com Ex266 $B''_{r=0.5}$ | Com Ex267 $H_{r=0.5}$ | Example112 $I_{r=0.5}$ |
|---|---|---|---|---|---|---|---|---|---|
| HFO-1132 (E) | mass % | 57.2 | 48.6 | 35.7 | 28.9 | 0.0 | 0.0 | 36.4 | 13.7 |
| R32 | mass % | 10.0 | 18.2 | 36.8 | 51.7 | 17.9 | 51.5 | 0.0 | 18.0 |
| R1234(ze + yf) | mass % | 26.8 | 27.2 | 21.5 | 13.4 | 76.1 | 42.5 | 57.6 | 62.3 |
| CO2 | mass % | 6.0 | 6.0 | 6.0 | 6.0 | 6.0 | 6.0 | 6.0 | 6.0 |
| GWP | — | 70 | 125 | 250 | 350 | 125 | 350 | 3 | 125 |
| COP ratio | % (relative to R410A) | 98.1 | 98.2 | 98.5 | 98.9 | 104.2 | 101.1 | 100.1 | 101.5 |
| Refrigerating Capacity Ratio | % (relative to R410A) | 96.0 | 97.9 | 104.4 | 110.4 | 66.6 | 96.1 | 80.0 | 81.1 |
| Condensation Glide | ° C. | 7.2 | 6.9 | 5.3 | 3.8 | 13.6 | 8.2 | 14.5 | 14.1 |

| Item | Unit | Com Ex268 $K'_{r=0.5}$ | Com Ex269 $L_{r=0.5}$ | Example113 $L'_{r=0.5}$ | Example114 $M_{r=0.5}$ | Example115 $N_{r=0.5}$ | Example116 $O_{r=0.5}$ | Com Ex270 $B_{r=0.5}$ | Com Ex271 $B''_{r=0.5}$ |
|---|---|---|---|---|---|---|---|---|---|
| HFO-1132 (E) | mass % | 0.0 | 72.0 | 57.2 | 48.6 | 35.7 | 28.9 | 0.0 | 0.0 |
| R32 | mass % | 28.9 | 0.0 | 16.0 | 18.2 | 36.8 | 51.7 | 18.0 | 51.6 |
| R1234(ze + yf) | mass % | 65.1 | 22.0 | 26.8 | 27.2 | 21.5 | 13.4 | 76.0 | 42.4 |
| CO2 | mass % | 6.0 | 6.0 | 6.0 | 6.0 | 6.0 | 6.0 | 6.0 | 6.0 |
| GWP | — | 198 | 2 | 70 | 125 | 250 | 350 | 125 | 350 |
| COP ratio | % (relative to R410A) | 102.5 | 98.0 | 98.1 | 98.2 | 98.5 | 98.9 | 102.3 | 100.8 |
| Refrigerating Capacity Ratio | % (relative to R410A) | 80.0 | 95.2 | 96.0 | 97.9 | 104.4 | 110.4 | 71.1 | 95.6 |
| Condensation Glide | ° C. | 13.2 | 6.8 | 72 | 6.9 | 5.3 | 3.8 | 11.0 | 5.0 |

| Item | Unit | Com Ex272 $H_{r=1}$ | Com Ex273 $I_{r=1}$ | Com Ex274 $K'_{r=1}$ | Com Ex275 $L_{r=1}$ | Com Ex276 $L'_{r=1}$ | Com Ex277 $M_{r=1}$ | Com Ex278 $N_{r=1}$ | Com Ex279 $O_{r=1}$ |
|---|---|---|---|---|---|---|---|---|---|
| HFO-1132 (E) | mass % | 30.9 | 7.0 | 0.0 | 72.0 | 57.2 | 48.6 | 35.7 | 28.9 |
| R32 | mass % | 0.0 | 18.0 | 23.3 | 0.0 | 10.0 | 18.2 | 36.8 | 51.7 |
| R1234(ze + yf) | mass % | 63.1 | 69.0 | 70.7 | 22.0 | 26.8 | 27.2 | 21.5 | 13.4 |
| CO2 | mass % | 6.0 | 6.0 | 6.0 | 6.0 | 6.0 | 6.0 | 6.0 | 6.0 |
| GWP | — | 3 | 125 | 198 | 2 | 69 | 125 | 250 | 350 |
| COP ratio | % (relative to R410A) | 99.4 | 100.4 | 101.3 | 98.7 | 98.5 | 98.5 | 98.8 | 99.3 |
| Refrigerating Capacity Ratio | % (relative to R410A) | 80.0 | 81.3 | 80.0 | 91.8 | 93.2 | 95.5 | 102.1 | 107.5 |
| Condensation Glide | ° C. | 9.6 | 9.6 | 8.7 | 3.9 | 4.3 | 4.1 | 3.1 | 2.2 |

TABLE 20

7.5% CO2

| Item | Unit | Com Ex280 A | Com Ex281 $B_{r=0.1}$ | Com Ex282 A'' | Com Ex283 $B''_{r=0.1}$ | Com Ex284 $H_{r=0.1}$ | Example117 $I_{r=0.1}$ | Com Ex285 $K'_{r=0.1}$ | Com Ex286 $L_{r=0.1}$ |
|---|---|---|---|---|---|---|---|---|---|
| HFO-1132 (E) | mass % | 74.1 | 00 | 40.7 | 0.0 | 35.1 | 13.9 | 0.0 | 72.0 |
| R32 | mass % | 18.4 | 17.8 | 51.8 | 51.4 | 0.0 | 17.9 | 29.5 | 0.0 |
| R1234(ze + yf) | mass % | 0.0 | 74.7 | 0.0 | 41.1 | 57.4 | 60.7 | 62.9 | 20.5 |
| CO2 | mass % | 7.5 | 7.5 | 7.5 | 7.5 | 7.5 | 7.5 | 7.5 | 7.5 |
| GWP | — | 125 | 125 | 350 | 350 | 4 | 125 | 204 | 2 |
| COP ratio | % (relative to R410A) | 95.1 | 104.9 | 96.6 | 101.4 | 101.0 | 102.5 | 103.5 | 96.5 |
| Refrigerating Capacity Ratio | % (relative to R410A) | 120.0 | 70.4 | 124.8 | 96.2 | 80.0 | 81.1 | 80.0 | 103.0 |
| Condensation Glide | ° C. | 4.6 | 19.6 | 3.3 | 10.8 | 18.2 | 17.6 | 16.6 | 9.9 |

| Item | Unit | Example118 $L'_{r=0.1}$ | Example119 $M_{r=0.1}$ | Example120 $N_{r=0.1}$ | Example121 $O_{r=0.1}$ | Com Ex287 $B_{r=0.5}$ | Com Ex288 $B''_{r=0.5}$ | Com Ex289 $H_{r=0.5}$ | Example122 $I_{r=0.5}$ |
|---|---|---|---|---|---|---|---|---|---|
| HFO-1132 (E) | mass % | 57.2 | 48.6 | 35.7 | 28.9 | 0.0 | 0.0 | 30.3 | 8.0 |
| R32 | mass % | 10.0 | 18.2 | 36.8 | 51.7 | 18.0 | 51.5 | 0.0 | 18.0 |
| R1234(ze + yf) | mass % | 25.3 | 25.7 | 20.0 | 11.9 | 74.5 | 41.0 | 62.2 | 66.5 |
| CO2 | mass % | 7.5 | 7.5 | 7.5 | 7.5 | 7.5 | 7.5 | 7.5 | 7.5 |
| GWP | — | 70 | 125 | 250 | 350 | 125 | 350 | 3 | 125 |
| COP ratio | % (relative to R410A) | 96.9 | 97.1 | 97.4 | 97.7 | 103.1 | 100.6 | 100.3 | 101.8 |
| Refrigerating Capacity Ratio | % (relative to R410A) | 102.9 | 104.4 | 110.8 | 117.1 | 74.7 | 99.4 | 80.0 | 80.6 |
| Condensation Glide | ° C. | 10.1 | 9.6 | 7.4 | 5.4 | 17.0 | 8.9 | 17.0 | 16.1 |

| Item | Unit | Com Ex290 $K'_{r=0.5}$ | Com Ex291 $L_{r=0.5}$ | Example123 $L'_{r=0.5}$ | Example124 $M_{r=0.5}$ | Example125 $N_{r=0.5}$ | Example126 $O_{r=0.5}$ | Com Ex292 $B_{r=0.5}$ | Com Ex293 $B''_{r=0.5}$ |
|---|---|---|---|---|---|---|---|---|---|
| HFO-1132 (E) | mass % | 0.0 | 72.0 | 57.2 | 48.6 | 35.7 | 28.9 | 0.0 | 0.0 |
| R32 | mass % | 21.5 | 0.0 | 10.0 | 18.2 | 36.8 | 51.7 | 18.0 | 51.6 |
| R1234(ze + yf) | mass % | 68.0 | 20.5 | 25.3 | 25.7 | 20.0 | 11.9 | 74.5 | 40.9 |
| CO2 | mass % | 7.5 | 7.5 | 7.5 | 7.5 | 7.5 | 7.5 | 7.5 | 7.5 |
| GWP | — | 169 | 2 | 69 | 125 | 250 | 350 | 125 | 350 |
| COP ratio | % (relative to R410A) | 102.4 | 96.2 | 96.4 | 96.6 | 97.1 | 97.5 | 101.1 | 99.7 |
| Refrigerating Capacity Ratio | % (relative to R410A) | 80.0 | 104.4 | 104.6 | 106.3 | 112.4 | 118.1 | 79.1 | 103.0 |
| Condensation Glide | ° C. | 15.3 | 9.1 | 9.0 | 8.5 | 6.5 | 4.9 | 14.0 | 6.7 |

| Item | Unit | Com Ex294 $H_{r=1}$ | Com Ex295 $I_{r=1}$ | Com Ex296 $K'_{r=1}$ | Com Ex297 $L_{r=1}$ | Com Ex298 $L'_{r=1}$ | Com Ex299 $M_{r=1}$ | Com Ex300 $N_{r=1}$ | Com Ex301 $O_{r=1}$ |
|---|---|---|---|---|---|---|---|---|---|
| HFO-1132 (E) | mass % | 24.8 | 1.4 | 0.0 | 72.0 | 57.2 | 48.6 | 35.7 | 28.9 |
| R32 | mass % | 0.0 | 18.0 | 19.1 | 0.0 | 10.0 | 18.3 | 36.8 | 51.7 |
| R1234(ze + yf) | mass % | 67.7 | 73.1 | 73.4 | 20.5 | 25.3 | 25.6 | 20.0 | 11.9 |
| CO2 | mass % | 7.5 | 7.5 | 7.5 | 7.5 | 7.5 | 7.5 | 7.5 | 7.5 |
| GWP | — | 3 | 125 | 132 | 2 | 69 | 125 | 250 | 350 |
| COP ratio | % (relative to R410A) | 99.6 | 100.9 | 101.0 | 95.8 | 95.8 | 96.0 | 96.6 | 97.3 |
| Refrigerating Capacity Ratio | % (relative to R410A) | 80.0 | 80.1 | 80.0 | 106.0 | 106.7 | 108.5 | 114.2 | 119.2 |
| Condensation Glide | ° C. | 15.4 | 13.9 | 13.7 | 8.2 | 7.7 | 7.1 | 5.4 | 4.3 |

A burning velocity test was performed for these mixed refrigerants in the same manner as in Example A. Tables 21 and 22 show the results.

TABLE 21

| Item | Unit | $L_{r=0.1}$ | $L'_{r=0.1}$ | $M_{r=0.1}$ | $N_{r=0.1}$ | $O_{r=0.1}$ | $L_{r=0.5}$ | $L'_{r=0.5}$ | $M_{r=0.5}$ | $N_{r=0.5}$ | $O_{r=0.5}$ | $L_{r=1}$ | $L'_{r=1}$ | $M_{r=1}$ | $N_{r=1}$ | $O_{r=1}$ |
|---|---|---|---|---|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 | 72.0 | 57.2 | 48.6 | 35.7 | 28.9 |
| R32 | mass % | 0.0 | 10.0 | 18.1 | 36.7 | 51.6 | 0.0 | 10.0 | 18.2 | 36.8 | 51.6 | 0.0 | 10.0 | 18.2 | 36.8 | 51.7 |
| R1234(ze + yf) | mass % | 27.6 | 32.4 | 32.9 | 27.2 | 19.1 | 27.6 | 32.4 | 32.8 | 27.1 | 19.1 | 27.6 | 32.4 | 32.8 | 27.1 | 19.0 |
| CO2 | mass % | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Burning Velocity | cm/s | 10 | 10 | 10 | 10 | 10 | 10 | 10 | 10 | 10 | 10 | 10 | 10 | 10 | 10 | 10 |

| Item | Unit | $L_{r=0.1}$ | $L'_{r=0.1}$ | $M_{r=0.1}$ | $N_{r=0.1}$ | $O_{r=0.1}$ | $L_{r=0.5}$ | $L'_{r=0.5}$ | $M_{r=0.5}$ | $N_{r=0.5}$ | $O_{r=0.5}$ | $L_{r=1}$ | $L'_{r=1}$ | $M_{r=1}$ | $N_{r=1}$ | $O_{r=1}$ |
|---|---|---|---|---|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 | 72.0 | 57.2 | 48.6 | 35.7 | 28.9 |
| R32 | mass % | 0.0 | 10.0 | 18.1 | 36.7 | 51.6 | 0.0 | 10.0 | 18.2 | 36.8 | 51.6 | 0.0 | 10.0 | 18.2 | 36.8 | 51.7 |
| R1234(ze + yf) | mass % | 27.0 | 31.8 | 32.3 | 26.6 | 18.5 | 27.0 | 31.8 | 32.2 | 26.5 | 18.5 | 27.0 | 31.8 | 32.2 | 26.5 | 18.4 |
| CO2 | mass % | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Burning Velocity | cm/s | 10 | 10 | 10 | 10 | 10 | 10 | 10 | 10 | 10 | 10 | 10 | 10 | 10 | 10 | 10 |

| Item | Unit | $L_{r=0.1}$ | $L'_{r=0.1}$ | $M_{r=0.1}$ | $N_{r=0.1}$ | $O_{r=0.1}$ | $L_{r=0.5}$ | $L'_{r=0.5}$ | $M_{r=0.5}$ | $N_{r=0.5}$ | $O_{r=0.5}$ | $L_{r=1}$ | $L'_{r=1}$ | $M_{r=1}$ | $N_{r=1}$ | $O_{r=1}$ |
|---|---|---|---|---|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 | 72.0 | 57.2 | 48.6 | 35.7 | 28.9 |
| R32 | mass % | 0.0 | 10.0 | 18.2 | 36.7 | 51.6 | 0.0 | 10.0 | 18.2 | 36.8 | 51.6 | 0.0 | 10.0 | 18.2 | 36.8 | 51.7 |
| R1234(ze + yf) | mass % | 26.0 | 30.8 | 31.2 | 25.6 | 17.5 | 26.0 | 30.8 | 31.2 | 25.5 | 17.5 | 26.0 | 30.8 | 31.2 | 25.5 | 17.4 |
| CO2 | mass % | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Burning Velocity | cm/s | 10 | 10 | 10 | 10 | 10 | 10 | 10 | 10 | 10 | 10 | 10 | 10 | 10 | 10 | 10 |

| Item | Unit | $L_{r=0.1}$ | $L'_{r=0.1}$ | $M_{r=0.1}$ | $N_{r=0.1}$ | $O_{r=0.1}$ | $L_{r=0.5}$ | $L'_{r=0.5}$ | $M_{r=0.5}$ | $N_{r=0.5}$ | $O_{r=0.5}$ | $L_{r=1}$ | $L'_{r=1}$ | $M_{r=1}$ | $N_{r=1}$ | $O_{r=1}$ |
|---|---|---|---|---|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 | 72.0 | 57.2 | 48.6 | 35.7 | 28.9 |
| R32 | mass % | 0.0 | 10.0 | 18.2 | 36.7 | 51.6 | 0.0 | 10.0 | 18.2 | 36.8 | 51.7 | 0.0 | 10.0 | 18.2 | 36.8 | 51.7 |
| R1234(ze + yf) | mass % | 25.0 | 29.8 | 30.3 | 24.6 | 16.5 | 25.0 | 29.8 | 30.2 | 24.5 | 16.5 | 25.0 | 29.8 | 30.2 | 24.5 | 16.4 |
| CO2 | mass % | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Burning Velocity | cm/s | 10 | 10 | 10 | 10 | 10 | 10 | 10 | 10 | 10 | 10 | 10 | 10 | 10 | 10 | 10 |

TABLE 22

| Item | Unit | $L_{r=0.1}$ | $L'_{r=0.1}$ | $M_{r=0.1}$ | $N_{r=0.1}$ | $O_{r=0.1}$ | $L_{r=0.5}$ | $L'_{r=0.5}$ | $M_{r=0.5}$ | $N_{r=0.5}$ | $O_{r=0.5}$ | $L_{r=1}$ | $L'_{r=1}$ | $M_{r=1}$ | $N_{r=1}$ | $O_{r=1}$ |
|---|---|---|---|---|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 | 72.0 | 57.2 | 48.6 | 35.7 | 28.9 |
| R32 | mass % | 0.0 | 10.0 | 18.2 | 36.8 | 51.6 | 0.0 | 10.0 | 18.2 | 36.8 | 51.7 | 0.0 | 10.0 | 18.2 | 36.8 | 51.7 |
| R1234(ze + yf) | mass % | 24.0 | 28.8 | 29.2 | 23.5 | 15.5 | 24.0 | 28.8 | 29.2 | 23.5 | 15.4 | 24.0 | 28.8 | 29.2 | 23.5 | 15.4 |
| CO2 | mass % | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Burning Velocity | cm/s | 10 | 10 | 10 | 10 | 10 | 10 | 10 | 10 | 10 | 10 | 10 | 10 | 10 | 10 | 10 |

| Item | Unit | $L_{r=0.1}$ | $L'_{r=0.1}$ | $M_{r=0.1}$ | $N_{r=0.1}$ | $O_{r=0.1}$ | $L_{r=0.5}$ | $L'_{r=0.5}$ | $M_{r=0.5}$ | $N_{r=0.5}$ | $O_{r=0.5}$ | $L_{r=1}$ | $L'_{r=1}$ | $M_{r=1}$ | $N_{r=1}$ | $O_{r=1}$ |
|---|---|---|---|---|---|---|---|---|---|---|---|---|---|---|---|---|
| HFO-1132 (E) | mass % | 72.0 | 57.2 | 48.6 | 35.8 | 28.9 | 72.0 | 57.2 | 48.6 | 35.7 | 28.9 | 72.0 | 57.2 | 48.6 | 35.7 | 28.9 |
| R32 | mass % | 0.0 | 10.0 | 18.2 | 36.8 | 51.7 | 0.0 | 10.0 | 18.2 | 36.8 | 51.7 | 0.0 | 10.0 | 18.2 | 36.8 | 51.7 |
| R1234(ze + yf) | mass % | 23.0 | 27.8 | 28.2 | 22.5 | 14.4 | 23.0 | 27.8 | 28.2 | 22.5 | 14.4 | 23.0 | 27.8 | 28.2 | 22.5 | 14.4 |
| CO2 | mass % | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Burning Velocity | cm/s | 10 | 10 | 10 | 10 | 10 | 10 | 10 | 10 | 10 | 10 | 10 | 10 | 10 | 10 | 10 |

| Item | Unit | $L_{r=0.1}$ | $L'_{r=0.1}$ | $M_{r=0.1}$ | $N_{r=0.1}$ | $O_{r=0.1}$ | $L_{r=0.5}$ | $L'_{r=0.5}$ | $M_{r=0.5}$ | $N_{r=0.5}$ | $O_{r=0.5}$ | $L_{r=1}$ | $L'_{r=1}$ | $M_{r=1}$ | $N_{r=1}$ | $O_{r=1}$ |
|---|---|---|---|---|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 | 72.0 | 57.2 | 48.6 | 35.7 | 28.9 |
| R32 | mass % | 0.0 | 10.0 | 18.2 | 36.8 | 51.7 | 0.0 | 10.0 | 18.2 | 36.8 | 51.7 | 0.0 | 10.0 | 18.2 | 36.8 | 51.7 |
| R1234(ze + yf) | mass % | 22.0 | 26.8 | 27.2 | 21.5 | 13.4 | 22.0 | 26.8 | 27.2 | 21.5 | 13.4 | 22.0 | 26.8 | 27.2 | 21.5 | 13.4 |
| CO2 | mass % | 6.0 | 6.0 | 6.0 | 6.0 | 6.0 | 6.0 | 6.0 | 6.0 | 6.0 | 6.0 | 6.0 | 6.0 | 6.0 | 6.0 | 6.0 |
| Burning Velocity | cm/s | 10 | 10 | 10 | 10 | 10 | 10 | 10 | 10 | 10 | 10 | 10 | 10 | 10 | 10 | 10 |

| Item | Unit | $L_{r=0.1}$ | $L'_{r=0.1}$ | $M_{r=0.1}$ | $N_{r=0.1}$ | $O_{r=0.1}$ | $L_{r=0.5}$ | $L'_{r=0.5}$ | $M_{r=0.5}$ | $N_{r=0.5}$ | $O_{r=0.5}$ | $L_{r=1}$ | $L'_{r=1}$ | $M_{r=1}$ | $N_{r=1}$ | $O_{r=1}$ |
|---|---|---|---|---|---|---|---|---|---|---|---|---|---|---|---|---|
| HFO-1132 (E) | mass % | 72.0 | 57.2 | 48.6 | 35.7 | 28.9 | 72.0 | 57.2 | 48.6 | 35.7 | 28.9 | 72.0 | 57.2 | 48.6 | 35.7 | 28.9 |
| R32 | mass % | 0.0 | 10.0 | 18.2 | 36.8 | 51.7 | 0.0 | 10.0 | 18.2 | 36.8 | 51.7 | 0.0 | 10.0 | 18.3 | 36.8 | 51.7 |
| R1234(ze + yf) | mass % | 20.5 | 25.3 | 25.7 | 20.0 | 11.9 | 20.5 | 25.3 | 25.7 | 20.0 | 11.9 | 20.5 | 25.3 | 25.6 | 20.0 | 11.9 |
| CO2 | mass % | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 |
| Burning Velocity | cm/s | 10 | 10 | 10 | 10 | 10 | 10 | 10 | 10 | 10 | 10 | 10 | 10 | 10 | 10 | 10 |

From these results, it is understood that the refrigerant according to the present disclosure has a refrigerating capacity of 80% or more relative to that of R410A and a GWP of 350 or less, and is classified under the category of WCF lower flammability when the refrigerant is as follows: in the mixed refrigerant, when the mass % of HFO-1132(E) is x, the mass % of R32 is y, the mass % of the sum of R1234ze and R1234yf is z, and the mass % of $CO_2$ is a based on the sum of HFO-1132(E), R32, R1234ze, R1234yf, and $CO_2$, if r=R1234yf/(R1234ze+R1234yf), and 0.1<r<1.0, coordinates (x,y,z) in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is (100−a) mass % are within the range of a figure surrounded by straight lines $L_rL'_r$, $L'_rM_r$, $M_rN_r$, $N_rO_r$, $O_rB''_r$, $B''_rK'_r$, $K'_rH_r$, and $H_rL_r$ that connect 8 points, i.e., points $L_r$, $L'_r$, $M_r$, $N_r$, $O_r$, $B''_r$, $K'_r$, and $H_r$, or on the straight lines $L_rL'_r$, $L'_rM_r$, $M_rN_r$, $N_rO_r$, $O_rB''_r$, and $K'_rH_r$ (excluding the points $L_r$, $B''_r$, $K'_r$, and $H_r$), and if 0<a≤1.0, the 8 points are as follows:

point $L_r$ (72.0, 0.0, 28.0−a), point $L'_r$ (57.2, 10.0, 32.8−a), point $M_r$ (48.6, $-0.2778r^2+0.4167r+18.061$, 51.4−a−y), point $N_r$ (35.7, $-0.2778r^2+0.4167r+36.661$, 51.4−a−y), point $O_r$ (28.9, −0.2222r2−0.1333r+51.611, 71.1−a−y), point $B''_r$ (0.0, $(0.463a^2-0.1852a-0.2778)r^2+(-0.6945a^2+0.2778a+0.4167)r+(0.2317a^2-0.0927a+51.361)$, 51.4−a−y), point $K'_r$ (0.0, $(0.3705a^2-0.1482a-0.6667)r^2+(-0.2217a^2+0.0887a-11.6)r+(0.0183a^2-3.0073a+52.567)$, 100−a−y), and point $H_r$ ($(2.4072a^2-2.0739a-0.8889)r^2+(-2.2779a^2+1.5779a-8.4667)r+(0.0392a^2-4.5732a+67.656)$, 0.0, 100−a−x), if 1.0<a≤3.0, the 8 points are as follows:

point $L_r$ (72.0, 0.0, 28.0−a), point $L'_r$ (57.2, 10.0, 32.8−a), point $M_r$ (48.6, $(-0.1389a^2+0.6945a-0.8334)r^2+(0.2084a^2-1.0418a+1.2501)r+(-0.0695a^2+0.3475a+17.783)$, 51.4−a−y), point $N_r$ (35.7, $-0.2778r^2+0.4167r+36.661$, 51.4−a−y), point $O_r$ (28.9, (0.25a2−1.25a+1.2222) $r^2$+(−0.275a2+1.375a−1.2333) r+(0.025a2−0.125a+51.711), 71.1−y−a), point $B''_r$ (0.0, $(0.25a^2-1.0278a+0.7778)r^2+(-0.275a^2+1.2419a-0.9668)r+(0.075a^2-0.364a+51.789)$, 100−a−y), point $K'_r$ (0.0, $(0.16667a^2+0.2222a-0.8333)r^2+(-0.3495a^2+0.3645a-11.748)r+(0.1335a^2-3.2395a+52.684)$, 100−a−y), and point $H_r$ ($(-0.25003a^2+0.8613a-1.1669)r^2+(0.275a^2-1.3914a-8.0502)r+(0.0245a^2-4.4175a+67.515)$, 0.0, 100−a−x), if 3.0<a≤5.0, the 8 points are as follows:

point $L_r$ (72.0, 0.0, 28.0−a), point $L'_r$ (57.2, 10.0, 32.8−a), point $M_r$ (48.6, 18.2, 33.2−a), point $N_r$ (35.7, $(-0.1389a^2+1.2501a-2.778)r^2+(0.2084a^2-1.8752a+4.167)r+(-0.0695a^2+0.6255a+35.41)$, 51.4−a−y), point $O_r$ (28.9, $(0.1389a^2-0.9723a+1.389)r^2+(-0.2083a^2+1.4585a-2.0845)r+(0.0695a^2-0.4865a+52.395)$, 71.1−a−y), point $B''_r$ (0.0, $-0.0556r^2+0.2833r+51.372$, 100−a−y), point $K'_r$ (0.0, $(0.77775a^2-6.2775a+13.166)r^2+(-0.9665a^2+8.0155a-29.148)r+(0.189a^2-4.54a+56.086)$, 100−a−y), and point $H_r$ ($(-0.72215a^2+6.3327a-13.332)r^2+(0.6835a^2-6.3015a+3.003)r+(0.039a^2-4.434a+67.434)$, 0.0, 100−x−a), or if 5.0<a≤7.5, the 8 points are as follows:

point $L_r$ (72.0, 0.0, 28.0−a), point L', (57.2, 10.0, 32.8−a), point $M_r$ (48.6, $(0.0592a^2-0.6512a+1.776)r^2+(-0.0355a^2+0.3901a-1.062)r+(0.0029a^2-0.0323a+18.29)$, 51.4−a−y), point $N_r$ (35.7, 36.8, 27.5−a), point $O_r$ (28.9, 51.7, 19.4−a), point $B''_r$ (0.0, $-0.0556r^2+0.2833r+51.372$, 100−a−y), point $K'_r$ (0.0, $(0.10373a^2-0.9189a+3.2232)r^2+(-0.1285a^2+1.2799a-16.419)r+(0.0252a^2-3.1662a+53.312)$, 100−a−y), and point $H_r$ ($(0.037a^2-0.1293a-0.0008)r^2+(-0.056a^2+0.2a-11.017)r+(0.0719a^2-4.8515a+68.7)$, 0.0, 100−a−x).

It is also understood that the refrigerant according to the present disclosure has a refrigerating capacity of 80% or more relative to that of R410A and a GWP of 125 or less, and is classified under the category of WCF lower flammability when the refrigerant is as follows: in the mixed refrigerant, when the mass % of HFO-1132(E) is x, the mass % of R32 is y, the mass % of the sum of R1234ze and R1234yf is z, and the mass % of $CO_2$ is a based on the sum of HFO-1132(E), R32, R1234ze, R1234yf, and $CO_2$, if r=R1234yf/(R1234ze+R1234yf), and 0.1 r<1.0, coordinates (x,y,z) in a ternary composition diagram having HFO-1132(E) as a first vertex, R32 as a second vertex, and the sum of 1234ze and R1234yf as a third vertex in which the sum of HFO-1132(E), R32, R1234ze, and R1234yf is (100−a) mass % are within the range of a figure surrounded by straight lines $L_rL'_r$, $L'_rM_r$, $M_rI_r$, $I_rH_r$, and $H_rL_r$ that connect 5 points, i.e., points $L_r$, $L'_r$, $M_r$, $I_r$, and $H_r$, or on the straight lines $L_rL'_r$, $L'_rM_r$, $M_rI_r$, and $I_rH_r$, and if 0<a≤1.0, the 5 points are as follows:

point $L_r$ (72.0, 0.0, 28.0−a), point $L'_r$ (57.2, 10.0, 32.8−a), point $M_r$ (48.6, $-0.2778r^2+0.4167r+18.061$, 51.4−a−y), point $I_r$ ($(1.1576a^2-0.3243a-2.1111)r^2+(-0.9a^2-0.35a-10.233)r+(-0.255a^2-3.828a+44.244)$, 100−a−x−z, $(1.1572a^2+0.3239a+1.8889)r^2+(0.9042a^2+0.3458a+10.367)r+(0.2525a^2+2.8315a+37.644)$), and point $H_r$ ($(2.4072a^2-2.0739a-0.8889)r^2+(-2.2779a^2+1.5779a-8.4667)r+(0.0392a^2-4.5732a+67.656)$, 0.0, 100−a−x), if 1.0<a≤3.0, the 5 points are as follows:

point $L_r$ (72.0, 0.0, 28.0−a), point $L'_r$ (57.2, 10.0, 32.8−a), point $M_r$ (48.6, $(-0.1389a^2+0.6945a-0.8334)r^2+(0.2084a^2-1.0418a+1.2501)r+(-0.0695a^2+0.3475a+17.783)$, 51.4−a−y), point $I_r$ ($(-0.08337a^2+0.8057a-2.0001)r^2+(-0.0745a^2-0.6105a-10.798)r+(0.108a^2-4.346a+44.399)$, 100−a−x−z, $(0.33337a^2-1.5557a+2.2779)r^2+(-0.225a^2+1.508a+10.334)r+(-0.033a^2+3.121a+37.64)$), and point $H_r$ ($(-0.25003a^2+0.8613a-1.1669)r^2+(0.275a^2-1.3914a-8.0502)r+(0.0245a^2-4.4175a+67.515)$, 0.0, 100−a−x), if 3.0<a≤5.0, the 5 points are as follows:

point $L_r$ (72.0, 0.0, 28.0−a), point $L'_r$ (57.2, 10.0, 32.8−a), point $M_r$ (48.6, 18.2, 31.2−a), point $I_r$ ($(-0.05554a^2+0.8332a-2.3331)r^2+(-0.2165a^4+1.2485a-15.097)r+(0.1715a^2-5.2775a+46.622)$, 100− a−x−z, $(0.0556a^2-0.8329a+2.6103)r^2+(0.1915a^2-1.0235a+14.18)r+(-0.1715a^2+4.2775a+35.417)$), and point $H_r$ $((-0.72215a^2+6.3327a-13.332)r^2+(0.6835a^2-6.3015a+3.003)r+(0.039a^2-4.434a+67.434)$, 0.0, 100−a−x), or if 5.0<a≤7.5, the 5 points are as follows:

point $L_r$ (72.0, 0.0, 28.0−a), point $L'_r$ (57.2, 10.0, 32.8−a), point $M_r$ (48.6, $(0.0592a^2-0.6512a+1.776)r^2+(-0.0355a^2+0.3901a-1.062)r+(0.0029a^2-0.0323a+18.29)$, 51.4−a−y), point $I_r$ $((0.19254a^2-1.8957a+5.1093)r^2+(-0.3156a^2+3.3386a-23.07)r+(0.1097a^2-4.9961a+46.759)$, 100−a−x−z, $(-0.0074a^2-0.4187a+2.1117)r^2+(0.0379a^2+0.1335a+12.236)r+(-0.0571a^2+3.3777a+37.055)$), and point $H_r$ $((0.037a^2-0.1293a-0.0008)r^2+(-0.056a^2+0.2a-11.017)r+(0.0719a^2-4.8515a+68.7)$, 0.0, 100−x−a).

The approximate expressions that indicate the coordinates of the points were each determined as shown below.

TABLE 23

Point $L_r$

Approximate Expression Using r

| Item | | Unit | $L_r$(r = R1234ze/(R1234ze + R1234yf)) 0.1 | 0.5 | 1.0 | 0.1 | 0.5 | 1.0 | 0.1 | 0.5 | 1.0 |
|---|---|---|---|---|---|---|---|---|---|---|---|
| Specific Coordinates | HFO-1132E | mass % | 72.0 | 72.0 | 72.0 | 72.0 | 72.0 | 72.0 | 72.0 | 72.0 | 72.0 |
| | R32 | mass % | 0.0 | 0.0 | 0.0 | 0.0 | 0.0 | 0.0 | 0.0 | 0.0 | 0.0 |
| | R1234(ze + yf) | mass % | 28.0 | 28.0 | 28.0 | 27.6 | 27.6 | 27.6 | 27.0 | 27.0 | 27.0 |
| | a = CO2 | mass % | | 0.0 | | | 0.4 | | | 1.0 | |
| r | x = HFO-1132E Approximate Expression | | | 72.0 | | | 72.0 | | | 72.0 | |
| Approximate | y = R32 Approximate Expression | | | 0.0 | | | 0.0 | | | 0.0 | |
| Expression | R1234(ze + yf) Approximate Expression | | | 28.0 | | | 27.6 | | | 27.0 | |
| Specific | HFO-1132E | mass % | 72.0 | 72.0 | 72.0 | 72.0 | 72.0 | 72.0 | 72.0 | 72.0 | 72.0 |
| Coordinates | R32 | mass % | 0.0 | 0.0 | 0.0 | 0.0 | 0.0 | 0.0 | 0.0 | 0.0 | 0.0 |
| | R1234(ze + yf) | mass % | 26.0 | 26.0 | 26.0 | 25.0 | 25.0 | 25.0 | 24.0 | 24.0 | 24.0 |
| | a = CO2 | mass % | | 2.0 | | | 3.0 | | | 4.0 | |
| r | x = HFO-1132E Approximate Expression | | | 72.0 | | | 72.0 | | | 72.0 | |
| Approximate | y = R32 Approximate Expression | | | 0.0 | | | 0.0 | | | 0.0 | |
| Expression | z = R1234(ze + yf) Approximate Expression | | | 26.0 | | | 25.0 | | | 24.0 | |
| Specific | HFO-1132 (E) | mass % | 72.0 | 72.0 | 72.0 | 72.0 | 72.0 | 72.0 | 72.0 | 72.0 | 72.0 |
| Coordinates | R32 | mass % | 0.0 | 0.0 | 0.0 | 0.0 | 0.0 | 0.0 | 0.0 | 0.0 | 0.0 |
| | R1234(ze + yf) | mass % | 23.0 | 23.0 | 23.0 | 22.0 | 22.0 | 22.0 | 20.5 | 20.5 | 20.5 |
| | a = CO2 | mass % | | 5.0 | | | 6.0 | | | 7.5 | |
| r | x = HFO-1132E Approximate Expression | | | 72.0 | | | 72.0 | | | 72.0 | |
| Approximate | y = R32 Approximate Expression | | | 0.0 | | | 0.0 | | | 0.0 | |
| Expression | z = R1234(ze + yf) Approximate Expression | | | 23.0 | | | 22.0 | | | 20.5 | |

Approximate Expression Using r and a
(0 < a ≤ 7.5)

| Item | Unit | $L_r$(r = R1234yf/(R1234(yf + ze)) | | | | | | | | | | | |
|---|---|---|---|---|---|---|---|---|---|---|---|---|---|
| CO2 | mass % | 0.0 | 0.4 | 1.0 | 1.0 | 2.0 | 3.0 | 3.0 | 4.0 | 5.0 | 5.0 | 6.0 | 7.5 |
| HFO-1132 E | mass % | 72.0 | 72.0 | 72.0 | 72.0 | 72.0 | 72.0 | 72.0 | 72.0 | 72.0 | 72.0 | 72.0 | 72.0 |
| R32 | mass % | 0.0 | 0.0 | 0.0 | 0.0 | 0.0 | 0.0 | 0.0 | 0.0 | 0.0 | 0.0 | 0.0 | 0.0 |
| R1234(ze + yf) | mass % | 28.0 | 27.6 | 27.0 | 27.0 | 26.0 | 25.0 | 25.0 | 24.0 | 23.0 | 23.0 | 22.0 | 20.5 |
| a = CO2 | | a | | | | | | | | | | | |
| x = HFO-1132E Approximate Expression | | 72.0 | | | | | | | | | | | |
| y = R32 Approximate Expression | | 0.0 | | | | | | | | | | | |
| z = R1234ze Approximate Expression | | −a + 28.0 | | | | | | | | | | | |

TABLE 24

Point $L'_r$

Approximate Expression Using r

| Item | | Unit | $L_r$ (r = R1234ze/(R1234ze + R1234yf)) 0.1 | 0.5 | 1.0 | 0.1 | 0.5 | 1.0 | 0.1 | 0.5 | 1.0 |
|---|---|---|---|---|---|---|---|---|---|---|---|
| Specific Coordinates | HFO-1132E | mass % | 57.2 | 57.2 | 57.2 | 57.2 | 57.2 | 57.2 | 57.2 | 57.2 | 57.2 |
| | R32 | mass % | 10.0 | 10.0 | 10.0 | 10.0 | 10.0 | 10.0 | 10.0 | 10.0 | 10.0 |
| | R1234(ze + yf) | mass % | 32.8 | 32.8 | 32.8 | 32.4 | 32.4 | 32.4 | 31.8 | 31.8 | 31.8 |
| | a = CO2 | mass % | | 0.0 | | | 57.2 | | | 57.2 | |
| r | x = HFO-1132E Approximate Expression | | | 10.0 | | | 10.0 | | | 10.0 | |
| Approximate | y = R32 Approximate Expression | | | 32.8 | | | 32.4 | | | 31.8 | |
| Expression | R1234(ze + yf) Approximate Expression | | | 28.0 | | | 27.6 | | | 27.0 | |
| Specific | HFO-1132E | mass % | 57.2 | 57.2 | 57.2 | 57.2 | 57.2 | 57.2 | 57.2 | 57.2 | 57.2 |

TABLE 24-continued

| Point $L'_r$ | | | | | | | | | | | |
|---|---|---|---|---|---|---|---|---|---|---|---|
| Coordinates | R32 | mass % | 10.0 | 10.0 | 10.0 | 10.0 | 10.0 | 10.0 | 10.0 | 10.0 | 10.0 |
| | R1234(ze + yf) | mass % | 30.8 | 30.8 | 30.8 | 29.8 | 29.8 | 29.8 | 28.8 | 28.8 | 28.8 |
| | a = CO2 | mass % | | 57.2 | | | 57.2 | | | 57.2 | |
| r | x = HFO-1132E Approximate Expression | | | 10.0 | | | 10.0 | | | 10.0 | |
| Approximate | y = R32 Approximate Expression | | | 30.8 | | | 29.8 | | | 28.8 | |
| Expression | z = R1234(ze + yf) Approximate Expression | | | 26.0 | | | 25.0 | | | 24.0 | |
| Specific | HFO-1132 (E) | mass % | 57.2 | 57.2 | 57.2 | 57.2 | 57.2 | 57.2 | 57.2 | 57.2 | 57.2 |
| Coordinates | R32 | mass % | 10.0 | 10.0 | 10.0 | 10.0 | 10.0 | 10.0 | 10.0 | 10.0 | 10.0 |
| | R1234(ze + yf) | mass % | 27.8 | 27.8 | 27.8 | 26.8 | 26.8 | 26.8 | 25.3 | 25.3 | 25.3 |
| | a = CO2 | mass % | | 5.0 | | | 6.0 | | | 7.5 | |
| r | x = HFO-1132E Approximate Expression | | | 57.2 | | | 57.2 | | | 57.2 | |
| Approximate | y = R32 Approximate Expression | | | 10.0 | | | 10.0 | | | 10.0 | |
| Expression | z = R1234(ze + yf) Approximate Expression | | | 27.8 | | | 26.8 | | | 25.3 | |

Approximate Expression Using r and a
(0 < a ≤ 7.5)

| Item | Unit | $L'_r$ (r = R1234yf/(R1234(yf + ze)) | | | | | | | | | | | |
|---|---|---|---|---|---|---|---|---|---|---|---|---|---|
| CO2 | mass % | 0.0 | 0.4 | 1.0 | 1.0 | 2.0 | 3.0 | 3.0 | 4.0 | 5.0 | 5.0 | 6.0 | 7.5 |
| HFO-1132 E | mass % | 57.2 | 57.2 | 57.2 | 57.2 | 57.2 | 57.2 | 57.2 | 57.2 | 57.2 | 57.2 | 57.2 | 57.2 |
| R32 | mass % | 10.0 | 10.0 | 10.0 | 10.0 | 10.0 | 10.0 | 10.0 | 10.0 | 10.0 | 10.0 | 10.0 | 10.0 |
| R1234(ze + yf) | mass % | 32.8 | 32.4 | 31.8 | 31.8 | 30.8 | 29.8 | 29.8 | 28.8 | 27.8 | 27.8 | 26.8 | 25.3 |
| a = CO2 | | | | | | | a | | | | | | |
| x = HFO-1132E Approximate Expression | | | | | | | 57.2 | | | | | | |
| y = R32 Approximate Expression | | | | | | | 10.0 | | | | | | |
| z = R1234ze Approximate Expression | | | | | | | −a + 32.8 | | | | | | |

TABLE 25

Point $M_r$
Approximate Expression Using r and a (0 < a ≤ 1.0)

| Item | | Unit | $M_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| Specific | HFO-1132 E | mass % | 48.6 | 48.6 | 48.6 | 48.6 | 48.6 | 48.6 | 48.6 | 48.6 | 48.6 |
| Coordinates | R32 | mass % | 18.1 | 18.2 | 18.2 | 18.1 | 18.2 | 18.2 | 18.1 | 18.2 | 18.2 |
| | R1234(ze + yf) | mass % | 33.3 | 33.2 | 33.2 | 32.9 | 32.8 | 32.8 | 32.3 | 32.2 | 32.2 |
| | a = CO2 | mass % | | 0.0 | | | 0.4 | | | 1.0 | |
| r | x = HFO-1132E Approximate Expression | | | | | | 48.6 | | | | |
| Approximate | y = R32 Approximate Expression | | | | | | $-0.2778r^2 + 0.4167r + 18.061$ | | | | |
| Expression | z = R1234(ze + yf) Approximate Expression | | | | | | 51.4 − a − y | | | | |

(1.0 < a ≤ 3.0)

| Item | | Unit | $M_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| Approximate | HFO-1132 E | mass % | 48.6 | 48.6 | 48.6 | 48.6 | 48.6 | 48.6 | 48.6 | 48.6 | 48.6 |
| Expression of | R32 | mass % | 18.1 | 18.2 | 18.2 | 18.2 | 18.2 | 18.2 | 18.2 | 18.2 | 18.2 |
| x, y, z Using a | R1234(ze + yf) | mass % | 32.3 | 32.2 | 32.2 | 31.2 | 31.2 | 31.2 | 30.2 | 30.2 | 30.2 |
| and r | a = CO2 | mass % | 1.0 | 1.0 | 1.0 | 2.0 | 2.0 | 2.0 | 3.0 | 3.0 | 3.0 |
| | x = HFO-1132E Approximate Expression | | | 48.6 | | | 48.6 | | | 48.6 | |
| | y = R32 Approximate Expression | | | $-0.2778r^2 + 0.4167r + 18.061$ | | | 18.2 | | | 18.2 | |
| | z = R1234(ze + yf) Approximate Expression | | | 48.6 | | | 48.6 | | | 48.6 | |
| Approximate | y | a = CO2 | | 1.0 | | | 2.0 | | | 3.0 | |
| Expression of | | Quadric Coefficient | | -0.2778 | | | 0.0 | | | 0.0 | |
| x, y, z Using a | | Linear Coefficient | | 0.4167 | | | 0.0 | | | 0.0 | |
| and r | | Zeroth Order Coefficient | | 18.061 | | | 18.2 | | | 18.2 | |
| | x Approximate Expression | | | | | | 48.6 | | | | |
| | y Approximate Expression | | | | | | $(-0.1389a^2 + 0.6945a - 0.8334)r^2 + (0.2084a^2 - 1.0418a + 1.2501)r + (-0.0695a^2 + 0.3475a + 17.783)$ | | | | |
| | z Approximate Expression | | | | | | 51.4 − a − y | | | | |

TABLE 25-continued

| Point $M_r$. Approximate Expression Using r and a (3.0 < a ≤ 5.0) | | | | | | | | | | | |
|---|---|---|---|---|---|---|---|---|---|---|---|
| | | | $M_r$ (r = R1234ze/(R1234ze + R1234yf)) | | | | | | | | |
| Item | | Unit | 0.1 | 0.5 | 1.0 | 0.1 | 0.5 | 1.0 | 0.1 | 0.5 | 1.0 |
| Approximate Expression of x, y, z Using a and r | HFO-1132 E | mass % | 48.6 | 48.6 | 48.6 | 48.6 | 48.6 | 48.6 | 48.6 | 48.6 | 48.6 |
| | R32 | mass % | 18.2 | 18.2 | 18.2 | 18.2 | 18.2 | 18.2 | 18.2 | 18.2 | 18.2 |
| | R1234(ze + yf) | mass % | 30.2 | 30.2 | 30.2 | 29.2 | 29.2 | 29.2 | 28.2 | 28.2 | 28.2 |
| | a = CO2 | mass % | 3.0 | 3.0 | 3.0 | 4.0 | 4.0 | 4.0 | 5.0 | 5.0 | 5.0 |
| | x = HFO-1132E Approximate Expression | | | 48.6 | | | 48.6 | | | 48.6 | |
| | y = R32 Approximate Expression | | | 18.2 | | | 18.2 | | | 18.2 | |
| | z = R1234(ze + yf) Approximate Expression | | | 33.2 − a | | | 33.2 − a | | | 33.2 − a | |

TABLE 26

| Point $M_r$. Approximate Expression Using r and a (5.0 < a ≤ 7.5) | | | | | | | | | | | |
|---|---|---|---|---|---|---|---|---|---|---|---|
| | | | $M_r$ (r = R1234ze/(R1234ze + R1234yf)) | | | | | | | | |
| Item | | Unit | 0.1 | 0.5 | 1.0 | 0.1 | 0.5 | 1.0 | 0.1 | 0.5 | 1.0 |
| Approximate Expression of x, y, z Using a and r | HFO-1132 E | mass % | 48.6 | 48.6 | 48.6 | 48.6 | 48.6 | 48.6 | 48.6 | 48.6 | 48.6 |
| | R32 | mass % | 18.2 | 18.2 | 18.2 | 18.2 | 18.2 | 18.2 | 18.2 | 18.2 | 18.3 |
| | R1234(ze + yf) | mass % | 28.2 | 28.2 | 28.2 | 27.2 | 27.2 | 27.2 | 25.7 | 25.7 | 25.6 |
| | a = CO2 | mass % | 5.0 | 5.0 | 5.0 | 6.0 | 6.0 | 6.0 | 7.5 | 7.5 | 7.5 |
| r | x = HFO-1132E Approximate Expression | | | 48.6 | | | 48.6 | | | 48.6 | |
| | y = R32 Approximate Expression | | | 18.2 | | | 18.2 | | | $0.222r^2 - 0.1333r + 18.211$ | |
| | z = R1234(ze + yf) Approximate Expression | | | 28.2 | | | 27.2 | | | 25.7 | |
| Approximate Expression of x, y, z Using a and r | y | a = CO2 | | 5.0 | | | 6.0 | | | 7.5 | |
| | | Quadric Coefficient | | 0 | | | 0 | | | 0.222 | |
| | | Linear Coefficient | | 0 | | | 0 | | | −0.133 | |
| | | Zeroth Order Coefficient | | 18.2 | | | 18.2 | | | 18.211 | |
| | x Approximate Expression | | 48.6 | | | | | | | | |
| | y Approximate Expression | | $(0.0592a^2 - 0.6512a + 1.776)r^2 + (-0.0355a^2 - 0.3901a - 1.062)r + (0.0029a^2 - 0.0323a + 18.29)$ | | | | | | | | |
| | z Approximate Expression | | 51.4 − a − y | | | | | | | | |

TABLE 27

| Point $N_r$. Approximate Expression Using r and a (0 < a ≤ 1.0) | | | | | | | | | | | |
|---|---|---|---|---|---|---|---|---|---|---|---|
| | | | $N_r$ (r = R1234ze/(R1234ze + R1234yf)) | | | | | | | | |
| Item | | Unit | 0.1 | 0.5 | 1.0 | 0.1 | 0.5 | 1.0 | 0.1 | 0.5 | 1.0 |
| Specific Coordinates | HFO-1132 E | mass % | 35.7 | 35.7 | 35.7 | 35.7 | 35.7 | 35.7 | 35.7 | 35.7 | 35.7 |
| | R32 | mass % | 36.7 | 36.8 | 36.8 | 36.7 | 36.8 | 36.8 | 36.7 | 36.8 | 36.8 |
| | R1234(ze + yf) | mass % | 27.6 | 27.5 | 27.5 | 27.2 | 27.1 | 27.1 | 26.6 | 26.5 | 26.5 |
| | a = CO2 | mass % | 0.0 | 0.0 | 0.0 | 0.4 | 0.4 | 0.4 | 1.0 | 1.0 | 1.0 |
| r Approximate Expression | x = HFO-1132E Approximate Expression | | 35.7 | | | | | | | | |
| | y = R32 Approximate Expression | | $-0.2778r^2 + 0.4167r + 36.661$ | | | | | | | | |
| | z = R1234(ze + yf) Approximate Expression | | 51.4 − a − y | | | | | | | | |

TABLE 27-continued

Point $N_r$

Approximate Expression Using r and a (1.0 < a ≤ 3.0)

| Item | | Unit | $N_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| Specific Coordinates | HFO-1132 E | mass % | 35.7 | 35.7 | 35.7 | 35.7 | 35.7 | 35.7 | 35.7 | 35.7 | 35.7 |
| | R32 | mass % | 36.7 | 36.8 | 36.8 | 36.7 | 36.8 | 36.8 | 36.7 | 36.8 | 36.8 |
| | R1234(ze + yf) | mass % | 26.6 | 26.5 | 26.5 | 25.6 | 25.5 | 25.5 | 24.6 | 24.5 | 24.5 |
| | a = CO2 | mass % | 1.0 | 1.0 | 1.0 | 2.0 | 2.0 | 2.0 | 3.0 | 3.0 | 3.0 |
| r Approximate Expression | x = HFO-1132E Approximate Expression | | | | | | 35.7 | | | | |
| | y = R32 Approximate Expression | | | | | | $-0.2778r^2 + 0.4167r + 36.661$ | | | | |
| | z = R1234(ze + yf) Approximate Expression | | | | | | 51.4 − a − y | | | | |

(3.0 < a ≤ 5.0)

| Item | | Unit | $N_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| Approximate Expression of x, y, z Using a and r | HFO-1132 E | mass % | 35.7 | 35.7 | 35.7 | 35.7 | 35.7 | 35.7 | 35.7 | 35.7 | 35.7 |
| | R32 | mass % | 36.7 | 36.8 | 36.8 | 36.8 | 36.8 | 36.8 | 36.8 | 36.8 | 36.8 |
| | R1234(ze + yf) | mass % | 24.6 | 24.5 | 24.5 | 23.5 | 23.5 | 23.5 | 22.5 | 22.5 | 22.5 |
| | a = CO2 | mass % | 3.0 | 3.0 | 3.0 | 4.0 | 4.0 | 4.0 | 5.0 | 5.0 | 5.0 |
| | x = HFO-1132E Approximate Expression | | | 35.7 | | | 35.7 | | | 35.7 | |
| | y = R32 Approximate Expression | | | $-0.2778r^2 + 0.4167r + 36.661$ | | | 36.8 | | | 36.8 | |
| | z = R1234(ze + yf) Approximate Expression | | | 64.3−a−y | | | 64.3−a−y | | | 64.3−a−y | |
| Approximate Expression of x, y, z Using a and r | y | a = CO2 | | 3.0 | | | 4.0 | | | 5.0 | |
| | | Quadric Coefficient | | −0.2778 | | | 0.0 | | | 0.0 | |
| | | Linear Coefficient | | 0.4167 | | | 0.0 | | | 0.0 | |
| | | Zeroth Order Coefficient | | 36.661 | | | 36.8 | | | 36.8 | |
| | x Approximate Expression | | | | | | 35.7 | | | | |
| | y Approximate Expression | | | | | | $(-0.1389a^2 + 1.2501a - 2.778)r^2 + (0.2084a^2 - 1.87525 + 4.167)r + (-0.0695a^2 + 0.6255a + 35.41)$ | | | | |
| | z Approximate Expression | | | | | | 51.4 − y − a + B82:O108B81:O108B80:O108B77:O108B102AB68:O108 | | | | |

TABLE 28

Point Nr

Approximate Expression Using r and a (5.0 < a ≤ 7.5)

| Item | | Unit | $N_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| Approximate Expression of x, y, z Using a and r | HFO-1132E | mass % | 35.7 | 35.7 | 35.7 | 35.7 | 35.7 | 35.7 | 35.7 | 35.7 | 35.7 |
| | R32 | mass % | 36.8 | 36.8 | 36.8 | 36.8 | 36.8 | 36.8 | 36.8 | 36.8 | 36.8 |
| | R1234(ze + yf) | mass % | 22.5 | 22.5 | 22.5 | 21.5 | 21.5 | 21.5 | 20.0 | 20.0 | 20.0 |
| | a = CO2 | mass % | 5.0 | 5.0 | 5.0 | 6.0 | 6.0 | 6.0 | 7.5 | 7.5 | 7.5 |
| | x = HFO-1132E Approximate Expression | | | | | | 35.7 | | | | |
| | y = R32 Approximate Expression | | | | | | 36.8 | | | | |
| | z = R1234(ze + yf) Approximate Expression | | | | | | 27.5-a | | | | |

TABLE 29

| Point Or<br>Approximate Expression Using r and a | | | | | | | | | | | |
|---|---|---|---|---|---|---|---|---|---|---|---|
| | | | $O_i$ (r = R1234ze/(R1234ze + R1234yf)) | | | | | | | | |
| Item | | Unit | 0.1 | 0.5 | 1.0 | 0.1 | 0.5 | 1.0 | 0.1 | 0.5 | 1.0 |
| (0 < a ≤ 1.0) | | | | | | | | | | | |
| Specific Coordinates | HFO-1132E | mass % | 28.9 | 28.9 | 28.9 | 28.9 | 28.9 | 28.9 | 28.9 | 28.9 | 28.9 |
| | R32 | mass % | 51.6 | 51.6 | 51.7 | 51.6 | 51.6 | 51.7 | 51.6 | 51.6 | 51.7 |
| | R1234(ze + yf) | mass % | 19.5 | 19.5 | 19.4 | 19.1 | 19.1 | 19.0 | 18.5 | 18.5 | 18.4 |
| | a = CO2 | mass % | 0.0 | 0.0 | 0.0 | 0.4 | 0.4 | 0.4 | 1.0 | 1.0 | 1.0 |
| r Approximate Expression | x = HFO-1132E Approximate Expression | | 28.9 | | | | | | | | |
| | y = R32 Approximate Expression | | $-0.2222r^2 - 0.1333r + 51.611$ | | | | | | | | |
| | z = R1234(ze + yf) Approximate Expression | | 71.1-a-y | | | | | | | | |
| (1.0 < a ≤ 3.0) | | | | | | | | | | | |
| Specific Coordinates | HFO-1132E | mass % | 28.9 | 28.9 | 28.9 | 28.9 | 28.9 | 28.9 | 28.9 | 28.9 | 28.9 |
| | R32 | mass % | 51.6 | 51.6 | 51.7 | 51.6 | 51.7 | 51.7 | 51.6 | 51.7 | 51.7 |
| | R1234(ze + yf) | mass % | 18.5 | 18.5 | 18.4 | 17.5 | 17.4 | 17.4 | 16.5 | 16.4 | 16.4 |
| | a = CO2 | mass % | 1.0 | 1.0 | 1.0 | 2.0 | 2.0 | 2.0 | 3.0 | 3.0 | 3.0 |
| r Approximate Expression | x = HFO-1132E Approximate Expression | | 28.9 | | | 28.9 | | | 28.9 | | |
| | y = R32 Approximate Expression | | $0.2222r^2 - 0.1333r + 51.611$ | | | $-0.2778r^2 + 0.4167r + 51.561$ | | | $-0.2778r^2 + 0.4167r + 51.561$ | | |
| | z = R1234(ze + yf) Approximate Expression | | 71.1-a-y | | | 71.1-a-y | | | 71.1-a-y | | |
| Approximate Expression of x, y, z Using a and r | y | a = CO2 | 1.0 | | | 2.0 | | | 3.0 | | |
| | | Quadric Coefficent | 0.2222 | | | −0.2778 | | | −0.2778 | | |
| | | Linear Coefficient | −0.1333 | | | 0.4167 | | | 0.4167 | | |
| | | Zeroth Order Coefficient | 51.611 | | | 51.561 | | | 51.561 | | |
| | x Approximate Expression | | 28.9 | | | | | | | | |
| | y Approximate Expression | | $(0.25a^2 - 1.25a + 1.2222)r^2 + (-0.275a^2 + 1.375a - 1.2333)r + (0.025a^2 - 0.125a + 51.711)$ | | | | | | | | |
| | z Approximate Expression | | 71.1-y-a | | | | | | | | |

TABLE 30

| Point Qr<br>Approximate Expression Using r and a | | | | | | | | | | | |
|---|---|---|---|---|---|---|---|---|---|---|---|
| | | | $O_i$ (r = R1234ze/(R1234ze + R1234yf)) | | | | | | | | |
| Item | | Unit | 0.1 | 0.5 | 1.0 | 0.1 | 0.5 | 1.0 | 0.1 | 0.5 | 1.0 |
| (3.0 < a ≤ 5.0) | | | | | | | | | | | |
| Specific Coordinates | HFO-1132E | mass % | 28.9 | 28.9 | 28.9 | 28.9 | 28.9 | 28.9 | 28.9 | 28.9 | 28.9 |
| | R32 | mass % | 51.6 | 51.7 | 51.7 | 51.6 | 51.7 | 51.7 | 51.7 | 51.7 | 51.7 |
| | R1234(ze + yf) | mass % | 16.5 | 16.4 | 16.4 | 15.5 | 15.4 | 15.4 | 14.4 | 14.4 | 14.4 |
| | a = CO2 | mass % | 3.0 | 3.0 | 3.0 | 4.0 | 4.0 | 4.0 | 5.0 | 5.0 | 5.0 |
| r Approximate Expression | x = HFO-1132E Approximate Expression | | 28.9 | | | 28.9 | | | 28.9 | | |
| | y = R32 Approximate Expression | | $-0.2778r^2 + 0.4167r + 51.561$ | | | $-2.778r^2 + 0.4167r + 51.561$ | | | 51.7 | | |
| | z = R1234(ze + yf) Approximate Expression | | 71.1-a-y | | | 71.1-a-y | | | 71.1-a-y | | |
| Approximate Expression of x, y, z Using a and r | y | a = CO2 | 3.0 | | | 4.0 | | | 5.0 | | |
| | | Quadric Coefficent | −0.2778 | | | −0.2778 | | | 0.0 | | |
| | | Linear Coefficient | 0.4167 | | | 0.4167 | | | 0.0 | | |
| | | Zeroth Order Coefficient | 51.561 | | | 51.561 | | | 51.7 | | |

TABLE 30-continued

| Point Qr Approximate Expression Using r and a | | | | | | | | | | | |
|---|---|---|---|---|---|---|---|---|---|---|---|
| | | | $O_i$ (r = R1234ze/(R1234ze + R1234yf)) | | | | | | | | |
| Item | | Unit | 0.1 | 0.5 | 1.0 | 0.1 | 0.5 | 1.0 | 0.1 | 0.5 | 1.0 |
| | x Approximate Expression | | 28.9 | | | | | | | | |
| | y Approximate Expression | | $(0.1389a^2 - 0.9723a + 1.389)r^2 + (-0.2083a^2 + 1.4585a - 2.0845)r + (0.0695a^2 - 0.4865a + 52.395)$ | | | | | | | | |
| | z Approximate Expression | | 71.1-a-y | | | | | | | | |
| | | | (5.0 < a ≤ 7.5) | | | | | | | | |
| Approximate Expression of x, y, z Using a and r | HFO-1132E | mass % | 28.9 | 28.9 | 28.9 | 28.9 | 28.9 | 28.9 | 28.9 | 28.9 | 28.9 |
| | R32 | mass % | 51.7 | 51.7 | 51.7 | 51.7 | 51.7 | 51.7 | 51.7 | 51.7 | 51.7 |
| | R1234(ze + yf) | mass % | 14.4 | 14.4 | 14.4 | 13.4 | 13.4 | 13.4 | 11.9 | 11.9 | 11.9 |
| | a = CO2 | mass % | 5.0 | 5.0 | 5.0 | 6.0 | 6.0 | 6.0 | 7.5 | 7.5 | 7.5 |
| | x = HFO-1132E Approximate Expression | | 28.9 | | | | | | | | |
| | y = R32 Approximate Expression | | 51.7 | | | | | | | | |
| | z = R1234(ze + yf) Approximate Expression | | 19.4-a | | | | | | | | |

TABLE 31

| Point B''r Approximate Expression Using r and a | | | | | | | | | | | |
|---|---|---|---|---|---|---|---|---|---|---|---|
| | | | $B''_r$ (r = R1234ze/(R1234ze + R1234yf)) | | | | | | | | |
| Item | | Unit | 0.1 | 0.5 | 1.0 | 0.1 | 0.5 | 1.0 | 0.1 | 0.5 | 1.0 |
| | | | (0 < a ≤ 1.0) | | | | | | | | |
| Approximate Expression of x, y, z Using a and r | HFO-1132E | mass % | 0.0 | 0.0 | 0.0 | 0.0 | 0.0 | 0.0 | 0.0 | 0.0 | 0.0 |
| | R32 | mass % | 51.4 | 51.5 | 51.5 | 51.4 | 51.5 | 51.5 | 51.5 | 51.5 | 51.5 |
| | R1234(ze + yf) | mass % | 48.6 | 48.5 | 48.5 | 48.2 | 48.1 | 48.1 | 47.5 | 47.5 | 47.5 |
| | a = CO2 | mass % | 0.0 | 0.0 | 0.0 | 0.4 | 0.4 | 0.4 | 1.0 | 1.0 | 1.0 |
| | x = HFO-1132E Approximate Expression | | 0.0 | | | 0.0 | | | 0.0 | | |
| | y = R32 Approximate Expression | | $-0.2778r^2 + 0.4167r + 51.361$ | | | $-0.2778r^2 + 0.4167r + 51.361$ | | | 51.5 | | |
| | z = R1234(ze + yf) Approximate Expression | | 100-a-y | | | 100-a-y | | | 100-a-y | | |
| Approximate Expression of x, y, z Using a and r | y | a = CO2 | 0.0 | | | 0.4 | | | 1.0 | | |
| | | Quadric Coefficient | −0.2778 | | | −0.2778 | | | 0.0 | | |
| | | Linear Coefficient | 0.4167 | | | 0.4167 | | | 0.0 | | |
| | | Zeroth Order Coefficient | 51.361 | | | 51.361 | | | 51.5 | | |
| | x Approximate Expression | | 0.0 | | | | | | | | |
| | y Approximate Expression | | $(0.463a^2 - 0.1852a - 0.2778)r^2 + (-0.6945a^2 + 0.2778a + 0.4167)r + (0.2317a^2 - 0.0927a + 51.361)$ | | | | | | | | |
| | z Approximate Expression | | 51.4-a-y | | | | | | | | |
| | | | (1.0 < a ≤ 3.0) | | | | | | | | |
| Approximate Expression of x, y, z Using a and r | HFO-1132E | mass % | 0.0 | 0.0 | 0.0 | 0.0 | 0.0 | 0.0 | 0.0 | 0.0 | 0.0 |
| | R32 | mass % | 51.5 | 51.5 | 51.5 | 51.4 | 51.5 | 51.5 | 51.4 | 51.5 | 51.6 |
| | R1234(ze + yf) | mass % | 47.5 | 47.5 | 47.5 | 46.6 | 46.5 | 46.5 | 45.6 | 45.5 | 45.4 |
| | a = CO2 | mass % | 1.0 | 1.0 | 1.0 | 2.0 | 2.0 | 2.0 | 3.0 | 3.0 | 3.0 |
| | x = HFO-1132E Approximate Expression | | 0.0 | | | 0.0 | | | 0.0 | | |
| | y = R32 Approximate Expression | | 51.5 | | | $-0.02778r^2 + 0.4167r + 51.361$ | | | $-0.0556r^2 + 0.2833r + 51.372$ | | |
| | z = R1234(ze + yf) Approximate Expression | | 100-a-y | | | 100-a-y | | | 100-a-y | | |
| Approximate Expression of x, y, z Using a and r | y | a = CO2 | 1.0 | | | 2.0 | | | 3.0 | | |
| | | Quadric Coefficient | 0.0 | | | −0.2778 | | | −0.0556 | | |
| | | Linear Coefficient | 0.0 | | | 0.4167 | | | 0.2833 | | |
| | | Zeroth Order Coefficient | 51.5 | | | 51.361 | | | 51.372 | | |
| | x Approximate Expression | | 0.0 | | | | | | | | |
| | y Approximate Expression | | $(0.25a^2 - 1.0278a + 0.7778)r^2 + (-0.275a^2 + 1.2419a - 0.9668)r + (0.075a^2 - 0.364a + 51.789)$ | | | | | | | | |
| | z Approximate Expression | | 100-a-y | | | | | | | | |

TABLE 32

Point B"r
Approximate Expression Using r and a

| | Item | Unit | B"$_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| (3.0 < a ≤ 5.0) | | | | | | | | | | | |
| Approximate Expression of x, y, z Using a and r | HFO-1132E | mass % | 0.0 | 0.0 | 0.0 | 0.0 | 0.0 | 0.0 | 0.0 | 0.0 | 0.0 |
| | R32 | mass % | 51.4 | 51.5 | 51.6 | 51.4 | 51.5 | 51.6 | 51.4 | 51.5 | 51.6 |
| | R1234(ze + yf) | mass % | 45.6 | 45.5 | 45.4 | 44.6 | 44.5 | 44.4 | 43.6 | 43.5 | 43.4 |
| | a = CO2 | mass % | 3.0 | 3.0 | 3.0 | 4.0 | 4.0 | 4.0 | 5.0 | 5.0 | 5.0 |
| | x = HFO-1132E Approximate Expression | | 0.0 | | | | | | | | |
| | y = R32 Approximate Expression | | $-0.0556r^2 + 0.2833r + 51.372$ | | | | | | | | |
| | z = R1234(ze + yf) Approximate Expression | | 100-a-y | | | | | | | | |
| (5.0 < a ≤ 7.5) | | | | | | | | | | | |
| Specific Coordinates | HFO-1132E | mass % | 0.0 | 0.0 | 0.0 | 0.0 | 0.0 | 0.0 | 0.0 | 0.0 | 0.0 |
| | R32 | mass % | 51.4 | 51.5 | 51.6 | 51.4 | 51.5 | 51.6 | 51.4 | 51.5 | 51.6 |
| | R1234(ze + yf) | mass % | 43.6 | 43.5 | 43.4 | 42.6 | 42.5 | 42.4 | 41.1 | 41.0 | 40.9 |
| | a = CO2 | mass % | 5.0 | 5.0 | 5.0 | 6.0 | 6.0 | 6.0 | 7.5 | 7.5 | 7.5 |
| r Approximate Expression | x = HFO-1132E Approximate Expression | | 0.0 | | | | | | | | |
| | y = R32 Approximate Expression | | $-0.0556r^2 + 0.2833r + 51.372$ | | | | | | | | |
| | z = R1234(ze + yf) Approximate Expression | | 100.0-a-y | | | | | | | | |

TABLE 33

Point Hr
Approximate Expression Using r and a

| | Item | Unit | H$_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| (0 < a ≤ 1.0) | | | | | | | | | | | |
| Specfic Coordinates | HFO-1132E | mass % | 66.8 | 63.2 | 58.3 | 65.0 | 61.4 | 56.3 | 62.2 | 58.4 | 53.4 |
| | R32 | mass % | 0.0 | 0.0 | 0.0 | 0.0 | 0.0 | 0.0 | 0.0 | 0.0 | 0.0 |
| | R1234(ze + yf) | mass % | 33.2 | 36.8 | 41.7 | 34.6 | 38.2 | 43.3 | 36.8 | 40.6 | 45.6 |
| | CO2 | mass % | 0.0 | 0.0 | 0.0 | 0.4 | 0.4 | 0.4 | 1.0 | 1.0 | 1.0 |
| r Approximate Expression | x = HFO-1132E Approximate Expression | | $-0.8889r^2 - 8.4667r + 67.656$ | | | $-1.3333r^2 - 8.2r + 65.833$ | | | $-0.5556r^2 - 9.1667r + 63.122$ | | |
| | y = R32 Approximate Expression | | 0.0 | | | 0.0 | | | 0.0 | | |
| | z = R1234(ze + yf) Approximate Expression | | 100-a-x | | | 100-a-x | | | 100-a-x | | |
| Approximate Expression of x, y, z Using a and r | x | a = CO2 | 0.0 | | | 0.4 | | | 1.0 | | |
| | | Quadric Coefficient | −0.8889 | | | −1.3333 | | | −0.5556 | | |
| | | Linear Coefficient | −8.4667 | | | −8.2 | | | −9.1667 | | |
| | | Zeroth Order Coefficient | 67.656 | | | 65.833 | | | 63.122 | | |
| | x Approximate Expression | | $(2.4072a^2 - 2.0739a - 0.8889)r^2 + (-2.2779a^2 + 1.5779a - 8.4667)r + (0.0392a^2 - 4.5732a + 67.656)$ | | | | | | | | |
| | y Approximate Expression | | 0.0 | | | | | | | | |
| | z Approximate Expression | | 100-a-x | | | | | | | | |
| (1.0 < a ≤ 3.0) | | | | | | | | | | | |
| Specific Coordinates | HFO-1132E | mass % | 62.2 | 58.4 | 53.4 | 57.8 | 53.8 | 48.6 | 53.5 | 49.4 | 43.9 |
| | R32 | mass % | 0.0 | 0.0 | 0.0 | 0.0 | 0.0 | 0.0 | 0.0 | 0.0 | 0.0 |
| | R1234(ze + yf) | mass % | 36.8 | 40.6 | 45.6 | 40.2 | 44.2 | 49.4 | 43.5 | 47.6 | 53.1 |
| | CO2 | mass % | 1.0 | 1.0 | 1.0 | 2.0 | 2.0 | 2.0 | 3.0 | 3.0 | 3.0 |
| r Approximate Expression | x = HFO-1132E Approximate Expression | | $-0.5556r^2 - 9.1667r + 63.122$ | | | $-0.4444r^2 - 9.7333r + 58.778$ | | | $-0.8333r^2 - 9.75r + 54.483$ | | |
| | y = Approximate Expression | | 0.0 | | | 0.0 | | | 0.0 | | |
| | z = R1234(ze + yf) Approximate Expression | | 100-a-x | | | 100-a-x | | | 100-a-x | | |
| Approximate Expression of x, y, z Using a and r | x | a = CO2 | 1.0 | | | 2.0 | | | 3.0 | | |
| | | Quadric Coefficient | −0.5556 | | | −0.4444 | | | −0.8333 | | |
| | | Linear Coefficient | −9.1667 | | | −9.7333 | | | −9.75 | | |
| | | Zeroth Order Coefficient | 63.122 | | | 58.778 | | | 54.483 | | |

TABLE 33-continued

Point Hr
Approximate Expression Using r and a

| Item | | Unit | $H_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| | x Approximate Expression | | $(-0.25003a^2 + 0.8613a - 1.1669)r^2 + (0.275a^2 - 1.3914a - 8.0502)r + (0.0245a^2 - 4.4175a + 67.515)$ | | | | | | | | |
| | y Approximate Expression | | 0.0 | | | | | | | | |
| | z Approximate Expression | | 100-a-x | | | | | | | | |

TABLE 34

Point Hr
Approximate Expression Using r and a

| Item | | Unit | $H_r$ (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| (3.0 < a ≤ 5.0) | | | | | | | | | | | |
| Specific Coordinates | HFO-1132E | mass % | 53.5 | 49.4 | 43.9 | 49.2 | 44.8 | 39.5 | 45.1 | 40.6 | 35.1 |
| | R32 | mass % | 0.0 | 0.0 | 0.0 | 0.0 | 0.0 | 0.0 | 0.0 | 0.0 | 0.0 |
| | R1234(ze + yf) | mass % | 43.5 | 47.6 | 53.1 | 46.8 | 51.2 | 56.5 | 49.9 | 54.4 | 59.9 |
| | CO2 | mass % | 3.0 | 3.0 | 3.0 | 4.0 | 4.0 | 4.0 | 5.0 | 5.0 | 5.0 |
| r Approximate Expression | x = HFO-1132E Approximate Expression | | $-0.8333r^2 - 9.75r + 54.483$ | | | $0.4444r^2 - 11.267r - 50.322$ | | | $0.2778r^2 - 11.417r + 46.239$ | | |
| | y = R32 Approximate Expression | | 0.0 | | | 0.0 | | | 0.0 | | |
| | z = R1234(ze + yf) Approximate Expression | | 100-a-x | | | 100-a-x | | | 100-a-x | | |
| Approximate Expression of x, y, z Using a and r | x | a = CO2 | 3.0 | | | 4.0 | | | 5.0 | | |
| | | Quadric Coefficient | −0.8333 | | | 0.4444 | | | 0.2778 | | |
| | | Linear Coefficient | −9.75 | | | −11.267 | | | −11.417 | | |
| | | Zeroth Order Coefficient | 54.483 | | | 50.322 | | | 46.239 | | |
| | x Approximate Expression | | $(-0.72215a^2 + 6.3327a - 13.332)r^2 + (0.6835a^2 - 63015a + 3.003)r + (0.039a^2 - 4.434a + 67.434)$ | | | | | | | | |
| | y Approximate Expression | | 0.0 | | | | | | | | |
| | z Approximate Expression | | 100-a-x | | | | | | | | |
| (5.0 < a ≤ 7.5) | | | | | | | | | | | |
| Specific Coordinates | HFO-1132E | mass % | 45.1 | 40.6 | 35.1 | 41.0 | 36.4 | 30.9 | 35.1 | 30.3 | 24.8 |
| | R32 | mass % | 0.0 | 0.0 | 0.0 | 0.0 | 0.0 | 0.0 | 0.0 | 0.0 | 0.0 |
| | R1234(ze + yf) | mass % | 49.9 | 54.4 | 59.9 | 53.0 | 57.6 | 63.1 | 57.4 | 62.2 | 67.7 |
| | CO2 | mass % | 5.0 | 5.0 | 5.0 | 6.0 | 6.0 | 6.0 | 7.5 | 7.5 | 7.5 |
| r Approximate Expression | x = HFO-1132E Approximate Expression | | $0.2778r^2 - 11.417r + 46.239$ | | | $0.5556r^2 - 11.833r + 42.178$ | | | $1.1111r^2 - 12.667r + 36.356$ | | |
| | y = R32 Approximate Expression | | 0.0 | | | 0.0 | | | 0.0 | | |
| | z = R1234(ze + yf) Approximate Expression | | 100-a-x | | | 100-a-x | | | 100-a-x | | |
| Approximate Expression of x, y, z Using a and r | x | a = CO2 | 5.0 | | | 6.0 | | | 7.5 | | |
| | | Quadric Coefficient | 0.2778 | | | 0.5556 | | | 1.1111 | | |
| | | Linear Coefficient | −11.417 | | | −11.833 | | | −12.667 | | |
| | | Zeroth Order Coefficient | 46.239 | | | 42.178 | | | 36.356 | | |
| | x Approximate Expression | | $(0.037a^2 - 0.1293a - 0.0008)r^2 + (-0.056a^2 + 0.2a - 11.017)r + (0.0719a^2 - 4.8515a + 68.7)$ | | | | | | | | |
| | y Approximate Expression | | 0.0 | | | | | | | | |
| | z Approximate Expression | | 100-a-x | | | | | | | | |

TABLE 35

Point K'r
Approximate Expression Using r and a

| Item | | Unit | K'r (r = R1234ze/(R1234ze + R1234yf)) 0.1 | 0.5 | 1.0 | 0.1 | 0.5 | 1.0 | 0.1 | 0.5 | 1.0 |
|---|---|---|---|---|---|---|---|---|---|---|---|
| (0 < a ≤ 1.0) | | | | | | | | | | | |
| Specific Coordinates | HFO-1132E | mass % | 0.0 | 0.0 | 0.0 | 0.0 | 0.0 | 0.0 | 0.0 | 0.0 | 0.0 |
| | R32 | mass % | 51.4 | 46.6 | 40.3 | 50.2 | 45.4 | 39.1 | 48.4 | 43.6 | 37.4 |
| | R1234(ze + yf) | mass % | 48.6 | 53.4 | 59.7 | 49.4 | 54.2 | 60.5 | 50.6 | 55.4 | 61.6 |
| | CO2 | mass % | 0.0 | 0.0 | 0.0 | 0.4 | 0.4 | 0.4 | 1.0 | 1.0 | 1.0 |
| r Approximate Expression | x = HFO-1132E Approximate Expression | | | 0.0 | | | 0.0 | | | 0.0 | |
| | y = R32 Approximate Expression | | | $-0.6667r^2 - 11.6r + 52.567$ | | | $-0.6667r^2 - 11.6r + 51.367$ | | | $-0.4444r^2 - 11.733r + 49.578$ | |
| | z = R1234(ze + yf) Approximate Expression | | | 100-a-y | | | 100-a-y | | | 100-a-y | |
| Approximate Expression of x, y, z Using a and r | y | a = CO2 | | 0.0 | | | 0.4 | | | 1.0 | |
| | | Quadric Coefficient | | −0.6667 | | | −0.6667 | | | −0.4444 | |
| | | Linear Coefficient | | −11.6 | | | −11.6 | | | −11.733 | |
| | | Zeroth Order Coefficient | | 52.567 | | | 51.367 | | | 49.578 | |
| | x Approximate Expression | | | | | | 0.0 | | | | |
| | y Approximate Expresson | | | | | | $(0.3705a^2 - 0.1482a - 0.6667)r^2 + (-0.2217a^2 + 0.0887a - 11.6)r + (0.0183a^2 - 3.0073a + 52.567)$ | | | | |
| | z Approximate Expression | | | | | | 100-a-y | | | | |
| (1.0 < a ≤ 3.0) | | | | | | | | | | | |
| Specific Coordinates | HFO-1132E | mass % | 0.0 | 0.0 | 0.0 | 0.0 | 0.0 | 0.0 | 0.0 | 0.0 | 0.0 |
| | R32 | mass % | 48.4 | 43.6 | 37.4 | 45.5 | 40.6 | 34.6 | 42.8 | 37.6 | 31.7 |
| | R1234(ze + yf) | mass % | 50.6 | 55.4 | 61.6 | 52.5 | 57.4 | 63.4 | 54.4 | 59.4 | 65.3 |
| | CO2 | mass % | 1.0 | 1.0 | 1.0 | 2.0 | 2.0 | 2.0 | 3.0 | 3.0 | 3.0 |
| r Approximate Expression | x = HFO-1132E Approximate Expression | | | 0.0 | | | 0.0 | | | 0.0 | |
| | y = R32 Approximate Expression | | | $-0.4444r^2 - 11.733r + 49.578$ | | | $0.2778r^2 - 12.417r + 46.739$ | | | $1.3333r^2 - 13.8r + 44.167$ | |
| | z = R1234(ze + yf) Approximate Expression | | | 100-a-y | | | 100-a-y | | | 100-a-y | |
| Approximate Expression of x, y, z Using a and r | y | a = CO2 | | 1.0 | | | 2.0 | | | 3.0 | |
| | | Quadric Coefficient | | −0.4444 | | | 0.2778 | | | 1.3333 | |
| | | Linear Coefficient | | −11.733 | | | −12.417 | | | −13.8 | |
| | | Zeroth Order Coefficient | | 49.578 | | | 46.739 | | | 44.167 | |
| | x Approximate Expression | | | | | | 0.0 | | | | |
| | y Approximate Expression | | | | | | $(0.16667a^2 + 0.2222a - 0.8333)r^2 + (-0.3495a^2 + 0.3645a - 11.748)r + (0.1335a^2 - 3.2395a + 52.684)$ | | | | |
| | z Approximate Expression | | | | | | 100-a-y | | | | |

TABLE 36

Point K'r
Approximate Expression Using r and a

| Item | | Unit | K'r (r = R1234ze/(R1234ze + R1234yf)) 0.1 | 0.5 | 1.0 | 0.1 | 0.5 | 1.0 | 0.1 | 0.5 | 1.0 |
|---|---|---|---|---|---|---|---|---|---|---|---|
| (3.0 < a ≤ 5.0) | | | | | | | | | | | |
| Specific Coordinates | HFO-1132E | mass % | 0.0 | 0.0 | 0.0 | 0.0 | 0.0 | 0.0 | 0.0 | 0.0 | 0.0 |
| | R32 | mass % | 42.8 | 37.6 | 31.7 | 39.7 | 34.8 | 28.9 | 36.8 | 31.3 | 26.1 |
| | R1234(ze + yf) | mass % | 54.4 | 59.4 | 65.3 | 56.3 | 61.2 | 67.1 | 58.2 | 63.2 | 68.9 |
| | CO2 | mass % | 3.0 | 3.0 | 3.0 | 4.0 | 4.0 | 4.0 | 5.0 | 5.0 | 5.0 |
| r Approximate Expression | x = HFO-1132E Approximate Expression | | | 0.0 | | | 0.0 | | | 0.0 | |
| | y = R32 Approximate Expression | | | $1.3333r^2 - 13.8r + 44.167$ | | | $0.5r^2 - 12.55r + 40.95$ | | | $1.2222r^2 - 13.233r + 38.111$ | |
| | z = R1234(ze + yf) Approximate Expression | | | 100-a-y | | | 100-a-y | | | 100-a-y | |
| Approximate Expression of x, y, z Using a and r | y | a = CO2 | | 3.0 | | | 4.0 | | | 5.0 | |
| | | Quadric Coefficient | | 1.3333 | | | 0.5 | | | 1.2222 | |
| | | Linear Coefficient | | −13.8 | | | −12.55 | | | −13.233 | |
| | | Zeroth Order Coefficient | | 44.167 | | | 40.95 | | | 38.111 | |

TABLE 36-continued

Point K'r
Approximate Expression Using r and a

| Item | | Unit | K'r (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| | x Approximate Expression | | 0.0 | | | | | | | | |
| | y Approximate Expression | | $(0.77775a^2 - 6.2775a + 13.166)r^2 + (-0.9665a^2 + 8.0155a - 29.148)r + (0.189a^2 - 4.54a + 56.086)$ | | | | | | | | |
| | z Approximate Expression | | 100-a-y | | | | | | | | |
| | | | (5.0 < a ≤ 7.5) | | | | | | | | |
| Specific Coordinates | HFO-1132E | mass % | 0.0 | 0.0 | 0.0 | 0.0 | 0.0 | 0.0 | 0.0 | 0.0 | 0.0 |
| | R32 | mass % | 36.8 | 31.8 | 26.1 | 33.9 | 28.9 | 23.3 | 29.6 | 24.5 | 19.1 |
| | R1234(ze + yf) | mass % | 58.2 | 63.2 | 68.9 | 60.1 | 65.1 | 70.7 | 62.9 | 68.0 | 73.4 |
| | CO2 | mass % | 5.0 | 5.0 | 5.0 | 6.0 | 6.0 | 6.0 | 7.5 | 7.5 | 7.5 |
| r Approximate Expression | x = HFO-1132E Approximate Expression | | 0.0 | | | 0.0 | | | 0.0 | | |
| | y = R32 Approximate Expression | | $1.2222r^2 - 13.233r + 38.111$ | | | $1.4444r^2 - 13.367r + 35.222$ | | | $2.1667r^2 - 14.05r + 30.983$ | | |
| | z = R1234(ze + yf) Approximate Expression | | 100-a-y | | | 100-a-y | | | 100-a-y | | |
| Approximate Expression of x, y, z Using a and r | y | a = CO2 | 5.0 | | | 6.0 | | | 7.5 | | |
| | | Quadric Coefficient | 1.2222 | | | 1.4444 | | | 2.1667 | | |
| | | Linear Coefficient | −13.233 | | | −13.367 | | | −14.05 | | |
| | | Zeroth Order Coefficient | 38.111 | | | 35.222 | | | 30.983 | | |
| | x Approximate Expression | | 0.0 | | | | | | | | |
| | y Approximate Expression | | $(0.10373a^2 - 0.9189a + 3.2232)r^2 + (-0.1285a^2 + 1.2799a - 16.419)r + (0.0252a^2 - 3.1662a + 53.312)$ | | | | | | | | |
| | z Approximate Expression | | 100-a-y | | | | | | | | |

TABLE 37

Point Ir
Approximate Expression Using r and a
(0 < a ≤1.0)

| Item | | Unit | Ir (r = R1234ze/(R1234ze + R1234yf)) | | | | | | | | |
|---|---|---|---|---|---|---|---|---|---|---|---|
| | | | 0.1 | 0.5 | 1.0 | 0.1 | 0.5 | 1.0 | 0.1 | 0.5 | 1.0 |
| Specific Coordinates | HFO-1132E | mass % | 43.2 | 38.6 | 31.9 | 41.6 | 36.9 | 30.1 | 39.0 | 34.1 | 27.4 |
| | R32 | mass % | 18.1 | 18.1 | 18.2 | 18.1 | 18.1 | 18.2 | 18.1 | 18.1 | 18.2 |
| | R1234(ze + yf) | mass % | 38.7 | 43.3 | 49.9 | 39.9 | 44.6 | 51.3 | 41.9 | 46.8 | 53.4 |
| | CO2 | mass % | 0.0 | 0.0 | 0.0 | 0.4 | 0.4 | 0.4 | 1.0 | 1.0 | 1.0 |
| r Approximate Expression | x = HFO-1132E Approximate Expression | | $-2.1111r^2 - 10.233r + 44.244$ | | | $-2.0556r^2 - 10.517r + 42.672$ | | | $-1.2778r^2 - 11.483r + 40.161$ | | |
| | y = R32 Approximate Expression | | 100-a-x-z | | | 100-a-x-z | | | 100-a-x-z | | |
| | z = R1234(ze + yf) Approximate Expression | | $1.8889r^2 + 10.367r + 37.644$ | | | $1.8333r^2 + 10.65r + 38.817$ | | | $1.0556r^2 + 11.617r + 40.728$ | | |
| Approximate Expression of x, y, z Using a and r | x | a = CO2 | 0.0 | | | 0.4 | | | 1.0 | | |
| | | Quadric Coefficient | −2.1111 | | | −2.0556 | | | −1.2778 | | |
| | | Linear Coefficient | −10.233 | | | −10.517 | | | −11.483 | | |
| | | Zeroth Order Coefficient | 44.244 | | | 42.672 | | | 40.161 | | |
| | z | a = CO2 | 0.0 | | | 0.4 | | | 1.0 | | |
| | | Quadric Coefficient | 1.8889 | | | 1.8333 | | | 1.0556 | | |
| | | Linear Coefficient | 10.367 | | | 10.65 | | | 11.617 | | |
| | | Zeroth Order Coefficient | 37.644 | | | 38.817 | | | 40.728 | | |
| | x Approximate Expression | | $(1.1576a^2 - 0.3243a - 2.1111)r^2 + (-0.9a^2 - 035a - 10.233)r + (-0.255a^2 - 3.828a + 44.244)$ | | | | | | | | |
| | y Approximate Expression | | 100-a-x-z | | | | | | | | |
| | z Approximate Expression | | $(-1.1572a^2 + 0.3239a + 1.8889)r^2 + (0.9042a^2 + 0.3458a + 10.367)r + (0.2525a^2 + 2.8315a + 37.644)$ | | | | | | | | |

TABLE 38

Point Ir
Approximate Expression Using r and a
(1.0 < a ≤ 3.0)

| | | | $I_r$ (r = R1234ze/(R1234ze + R1234yf)) | | | | | | | | |
|---|---|---|---|---|---|---|---|---|---|---|---|
| Item | | Unit | 0.1 | 0.5 | 1.0 | 0.1 | 0.5 | 1.0 | 0.1 | 0.5 | 1.0 |
| Specific Coordinates | HFO-1132E | mass % | 39.0 | 34.1 | 27.4 | 34.9 | 29.8 | 23.1 | 31.0 | 25.6 | 18.7 |
| | R32 | mass % | 18.1 | 18.1 | 18.2 | 18.1 | 18.1 | 18.2 | 18.0 | 18.1 | 18.1 |
| | R1234(ze + yf) | mass % | 41.9 | 46.8 | 53.4 | 45.0 | 50.1 | 56.7 | 48.0 | 53.3 | 60.2 |
| | CO2 | mass % | 1.0 | 1.0 | 1.0 | 2.0 | 2.0 | 2.0 | 3.0 | 3.0 | 3.0 |
| r Approximate Expression | x = HFO-1132E Approximate Expression | | $-1.2778r^2 - 11.483r + 40.161$ | | | $-0.7222r^2 - 12.317r + 36.139$ | | | $-0.3333r^2 - 13.3r + 32.333$ | | |
| | y = R32 Approximate Expression | | 100-a-x-z | | | 100-a-x-z | | | 100-a-x-z | | |
| | z = R1234(ze + yf) Approximate Expression | | $1.0556r^2 + 11.617r + 40.728$ | | | $0.5r^2 + 12.45r + 43.75$ | | | $0.6111r^2 + 12.883r + 46.706$ | | |
| aとrによる x, y, z Approximate Expression | x | a = CO2 | 1.0 | | | 2.0 | | | 3.0 | | |
| | | Quadric Coefficient | −1.2778 | | | −0.7222 | | | −0.3333 | | |
| | | Linear Coefficient | −11.483 | | | −12.317 | | | −13.3 | | |
| | | Zeroth Order Coefficient | 40.161 | | | 36.139 | | | 32.333 | | |
| | z | a = CO2 | 1.0 | | | 2.0 | | | 3.0 | | |
| | | Quadric Coefficient | 1.0556 | | | 0.5 | | | 0.6111 | | |
| | | Linear Coefficient | 11.617 | | | 12.45 | | | 12.833 | | |
| | | Zeroth Order Coefficient | 40.728 | | | 43.75 | | | 46.705 | | |
| | x Approximate Expression | | $(-0.08337a^2 + 0.8057a - 2.0001)r^2 + (-0.0745a^2 - 0.6105a - 10.798)r + (0.108a^2 - 4.346a + 44.399)$ | | | | | | | | |
| | y Approximate Expression | | 100-a-x-z | | | | | | | | |
| | z Approximate Expression | | $(0.33337a^2 - 1.5557a + 2.2779)r^2 + (-0.225a^2 + 1.508a + 10.334)r + (-0.033a^2 + 3.121a + 37.64)$ | | | | | | | | |

TABLE 39

Point Ir
Approximate Expression Using r and a
(3.0 < a ≤ 5.0)

| | | | $I_r$ (r = R1234ze/(R1234ze + R1234yf)) | | | | | | | | |
|---|---|---|---|---|---|---|---|---|---|---|---|
| Item | | Unit | 0.1 | 0.5 | 1.0 | 0.1 | 0.5 | 1.0 | 0.1 | 0.5 | 1.0 |
| Specific Coordinates | HFO-1132E | mass % | 31.0 | 25.6 | 18.7 | 26.9 | 21.5 | 14.8 | 23.1 | 17.5 | 10.7 |
| | R32 | mass % | 18.0 | 18.1 | 18.1 | 18.0 | 18.1 | 18.1 | 18.0 | 18.1 | 18.1 |
| | R1234(ze + yf) | mass % | 48.0 | 53.3 | 60.2 | 51.1 | 56.4 | 63.1 | 53.9 | 59.4 | 66.2 |
| | CO2 | mass % | 3.0 | 3.0 | 3.0 | 4.0 | 4.0 | 4.0 | 5.0 | 5.0 | 5.0 |
| r Approximate Expression | x = HFO-1132E Approximate Expression | | $-0.3333r^2 - 13.3r + 32.333$ | | | $0.1111r^2 - 13.567r + 28.256$ | | | $0.4444r^2 + 14.267r + 24.522$ | | |
| | y = R32 Approximate Expression | | 100-x-z-a | | | 100-x-z-a | | | 100-x-z-a | | |
| | z = R1234(ze + yf) Approximate Expression | | $0.6111r^2 + 12.883r + 46.706$ | | | $0.1667r^2 + 13.15r + 49.783$ | | | $-0.1667r^2 + 13.85r + 52.517$ | | |
| Approximate Expression of x, y, z Using a and r | x | a = CO2 | 3.0 | | | 4.0 | | | 5.0 | | |
| | | Quadric Coefficient | −0.3333 | | | 0.1111 | | | 0.4444 | | |
| | | Linear Coefficient | −13.3 | | | −13.567 | | | −14.267 | | |
| | | Zeroth Order Coefficient | 32.333 | | | 28.256 | | | 24.522 | | |
| | z | a = CO2 | 3.0 | | | 4.0 | | | 5.0 | | |
| | | Quadric Coefficient | 0.6111 | | | 0.1667 | | | −0.1667 | | |
| | | Linear Coefficient | 12.833 | | | 13.15 | | | 13.85 | | |
| | | Zeroth Order Coefficient | 46.706 | | | 49.783 | | | 52.517 | | |
| | x Approximate Expression | | $(-0.05554a^2 + 0.8332a - 2.3331)r^2 + (-0.2165a^2 + 1.2485a - 15.097)r + (0.1715a^2 - 5.2775a + 46.622)$ | | | | | | | | |
| | y Approximate Expression | | 100-x-z-a | | | | | | | | |
| | z Approximate Expression | | $(0.0556a^2 - 0.8329a + 2.6103)r^2 + (0.1915a^2 - 1.0235a + 14.18)r + (-0.1715a^2 + 4.2775a + 35.417)$ | | | | | | | | |

TABLE 40

| Point Ir | | | | | | | | | | | |
|---|---|---|---|---|---|---|---|---|---|---|---|
| | | | $I_r$ (r = R1234ze/(R1234ze + R1234yf)) | | | | | | | | |
| | Item | Unit | 0.1 | 0.5 | 1.0 | 0.1 | 0.5 | 1.0 | 0.1 | 0.5 | 1.0 |
| Specific Coordinates | HFO-1132E | mass % | 23.1 | 17.5 | 10.7 | 19.3 | 13.7 | 7.0 | 13.9 | 8.0 | 1.4 |
| | R32 | mass % | 18.0 | 18.1 | 18.1 | 18.0 | 18.0 | 18.0 | 17.9 | 18.0 | 18.0 |
| | R1234(ze + yf) | mass % | 53.9 | 59.4 | 66.2 | 56.7 | 62.3 | 69.0 | 60.7 | 66.5 | 73.1 |
| | CO2 | mass % | 5.0 | 5.0 | 5.0 | 6.0 | 6.0 | 6.0 | 7.5 | 7.5 | 7.5 |
| r Approximate Expression | x = HFO-1132E Approximate Expression | | $0.4444r^2 - 14.267r + 24.522$ | | | $0.6667r^2 - 14.4r + 20.733$ | | | $1.7222r^2 - 15.783r + 15.461$ | | |
| | y = R32 Approximate Expression | | 100-a-x-z | | | 100-a-x-z | | | 100-a-x-z | | |
| | z = R1234(ze + yf) Approximate Expression | | $-0.1667r^2 + 13.85r + 52.517$ | | | $-0.6667r^2 + 14.4r + 55.267$ | | | $-1.4444r^2 + 15.367r + 59.178$ | | |
| aとr による x, y, z Approximate Expression | x | a = CO2 | 5.0 | | | 6.0 | | | 7.5 | | |
| | | Quadric Coefficient | 0.4444 | | | 0.6667 | | | 1.7222 | | |
| | | Linear Coefficient | −14.267 | | | −14.4 | | | −15.783 | | |
| | | Zeroth Order Coefficient | 24.522 | | | 20.733 | | | 15.461 | | |
| | z | a = CO2 | 5.0 | | | 6.0 | | | 7.5 | | |
| | | Quadric Coefficient | −0.1667 | | | −0.6667 | | | −1.4444 | | |
| | | Linear Coefficient | 13.85 | | | 14.4 | | | 15.367 | | |
| | | Zeroth Order Coefficient | 52.517 | | | 55.267 | | | 59.178 | | |
| | x Approximate Expression | | $(0.19254a^2 - 1.8957a + 5.1093)r^2 + (-0.3156a^2 + 3.3386a - 23.07)r + (0.1097a^2 - 4.9961a + 46.759)$ | | | | | | | | |
| | y Approximate Expression | | 100-a-x-z | | | | | | | | |
| | z Approximate Expression | | $(-0.0074a^2 - 0.4187a + 2.1117)r^2 + (0.0379a^2 + 0.1335a + 12.236)r + (-0.0571a^2 + 3.3777a + 37.055)$ | | | | | | | | |

Example C

Mixed refrigerants were prepared such that the mass % of HFO-1132(E), the mass % of R32, the mass % of the sum of R1234ze and R1234yf, and the mass % of $CO_2$ were as shown in Tables 41 to 72 based on the sum of HFO-1132(E), R32, R1234ze, R1234yf, and $CO_2$, and evaluated in the same manner as in Example A. Tables 41 to 72 show the results. The letter "r" represents R1234yf/(R1234ze+R1234yf).

TABLE 41

0.4% $CO_2$
r = 0

| Item | Unit | Com Ex302 | Example127 | Com Ex303 | Com Ex304 | Example128 | Example129 | Com Ex305 |
|---|---|---|---|---|---|---|---|---|
| HFO-1132 (E) | mass % | 10.0 | 10.0 | 10.0 | 20.0 | 20.0 | 20.0 | 20.0 |
| R32 | mass % | 54.6 | 49.6 | 39.6 | 54.6 | 49.6 | 39.6 | 29.6 |
| R1234(ze + yf) (r = 0) | mass % | 35.0 | 40.0 | 50.0 | 25.0 | 30.0 | 40.0 | 50.0 |
| CO2 | mass % | 0.4 | 0.4 | 0.4 | 0.4 | 0.4 | 0.4 | 0.4 |
| GWP | — | 371 | 337 | 270 | 370 | 337 | 270 | 203 |
| COP ratio | % (relative to R410A) | 101 | 103.2 | 104.0 | 101.6 | 101.9 | 102.6 | 103.6 |
| Refrigerating Capacity Ratio | % (relative to R410A) | 90 | 86.0 | 78.6 | 96.7 | 93.1 | 85.5 | 77.7 |
| Condensation Glide | ° C. | 5.6 | 6.5 | 8.6 | 4.1 | 5.1 | 7.1 | 9.1 |

| Item | Unit | Com Ex306 | Exemple130 | Example131 | Com Ex307 | Com Ex308 | Example132 | Com Ex309 |
|---|---|---|---|---|---|---|---|---|
| HFO-1132 (E) | mass % | 30.0 | 30.0 | 30.0 | 30.0 | 40.0 | 40.0 | 40.0 |
| R32 | mass % | 54.6 | 44.6 | 34.6 | 19.6 | 34.6 | 24.6 | 14.6 |
| R1234(ze + yf) (r = 0) | mass % | 15.0 | 25.0 | 35.0 | 50.0 | 25.0 | 35.0 | 45.0 |
| CO2 | mass % | 0.4 | 0.4 | 0.4 | 0.4 | 0.4 | 0.4 | 0.4 |
| GWP | — | 370 | 303 | 236 | 136 | 235 | 169 | 102 |
| COP ratio | % (relative to R410A) | 100.5 | 100.9 | 101.6 | 103.2 | 100.4 | 101.3 | 102.4 |
| Refrigerating Capacity Ratio | % (relative to R410A) | 103.5 | 96.1 | 88.3 | 76.0 | 94.8 | 86.7 | 78.1 |
| Condensation Glide | ° C. | 2.5 | 4.4 | 6.4 | 9.3 | 4.5 | 6.5 | 8.3 |

| Item | Unit | Com Ex310 | Example133 | Com Ex311 | Com Ex312 | Example134 | Com Ex313 |
|---|---|---|---|---|---|---|---|
| HFO-1132 (E) | mass % | 50.0 | 50.0 | 50.0 | 60.0 | 60.0 | 60.0 |
| R32 | mass % | 19.6 | 14.6 | 9.6 | 12.1 | 7.1 | 2.1 |
| R1234(ze + yf) (r = 0) | mass % | 30.0 | 35.0 | 40.0 | 27.5 | 32.5 | 37.5 |
| CO2 | mass % | 0.4 | 0.4 | 0.4 | 0.4 | 0.4 | 0.4 |
| GWP | — | 135 | 101 | 68 | 84 | 50 | 17 |
| COP ratio | % (relative to R410A) | 100.6 | 101.2 | 101.7 | 100.4 | 101.0 | 101.6 |
| Refrigerating Capacity Ratio | % (relative to R410A) | 88.7 | 84.3 | 79.7 | 88.1 | 83.4 | 78.6 |
| Condensation Glide | ° C. | 5.6 | 6.5 | 7.2 | 5.0 | 5.7 | 6.2 |

TABLE 42

0.4% $CO_2$
r = 0.25

| Item | Unit | Com Ex314 | Example135 | Com Ex315 | Com Ex316 | Example136 | Example137 | Com Ex317 |
|---|---|---|---|---|---|---|---|---|
| HFO-1132 (E) | mass % | 10.0 | 10.0 | 10.0 | 20.0 | 20.0 | 20.0 | 20.0 |
| R32 | mass % | 54.6 | 49.6 | 34.6 | 54.6 | 49.6 | 39.6 | 24.6 |
| R1234(ze + yf) (r = 0.25) | mass % | 35.0 | 40.0 | 55.0 | 25.0 | 30.0 | 40.0 | 55.0 |
| CO2 | mass % | 0.4 | 0.4 | 0.4 | 0.4 | 0.4 | 0.4 | 0.4 |
| GWP | — | 371 | 337 | 237 | 370 | 331 | 210 | 169 |
| COP ratio | % (relative to R410A) | 102.4 | 102.6 | 103.7 | 101.3 | 101.5 | 102.0 | 103.3 |
| Refrigerating Capacity Ratio | % (relative to R410A) | 91.3 | 87.8 | 76.9 | 97.9 | 94.5 | 87.3 | 75.7 |
| Condensation Glide | ° C. | 4.7 | 5.5 | 8.2 | 3.5 | 4.3 | 6.0 | 8.7 |

| Item | Unit | Com Ex318 | Example138 | Example139 | Com Ex319 | Com Ex320 | Example140 | Com Ex321 |
|---|---|---|---|---|---|---|---|---|
| HFO-1132 (E) | mass % | 30.0 | 30.0 | 30.0 | 30.0 | 40.0 | 40.0 | 40.0 |
| R32 | mass % | 54.6 | 44.6 | 34.6 | 19.6 | 34.6 | 24.6 | 9.6 |
| R1234(ze + yf) (r = 0.25) | mass % | 15.0 | 25.0 | 35.0 | 50.0 | 25.0 | 35.0 | 50.0 |
| CO2 | mass % | 0.4 | 0.4 | 0.4 | 0.4 | 0.4 | 0.4 | 0.4 |
| GWP | — | 370 | 303 | 236 | 135 | 235 | 168 | 68 |
| COP ratio | % (relative to R410A) | 100.4 | 100.7 | 101.1 | 102.4 | 100.1 | 100.8 | 102.3 |
| Refrigerating Capacity Ratio | % (relative to R410A) | 104.2 | 97.3 | 89.9 | 77.9 | 96.0 | 88.1 | 75.3 |
| Condensation Glide | ° C. | 2.2 | 3.7 | 5.4 | 8.1 | 3.9 | 5.6 | 7.8 |

| Item | Unit | Com Ex322 | Example141 | Com Ex323 | Com Ex324 | Example142 | Com Ex325 |
|---|---|---|---|---|---|---|---|
| HFO-1132 (E) | mass % | 50.0 | 50.0 | 50.0 | 60.0 | 60.0 | 60.0 |
| R32 | mass % | 19.6 | 14.6 | 4.6 | 12.1 | 7.1 | 0.0 |
| R1234(ze + yf) (r = 0.25) | mass % | 30.0 | 35.0 | 45.0 | 27.5 | 32.5 | 39.6 |
| CO2 | mass % | 0.4 | 0.4 | 0.4 | 0.4 | 0.4 | 0.4 |
| GWP | — | 134 | 101 | 34 | 84 | 50 | 3 |
| COP ratio | % (relative to R410A) | 100.2 | 100.7 | 101.7 | 100.1 | 100.6 | 101.3 |
| Refrigerating Capacity Ratio | % (relative to R410A) | 89.9 | 85.6 | 76.6 | 89.2 | 84.7 | 77.9 |
| Condensation Glide | ° C. | 4.8 | 5.6 | 6.7 | 4.4 | 5.0 | 5.4 |

TABLE 43

0.4% $CO_2$
r = 0.5

| Item | Unit | Com Ex326 | Example143 | Example144 | Com Ex327 | Com Ex328 | Example145 | Example146 |
|---|---|---|---|---|---|---|---|---|
| HFO-1132 (E) | mass % | 10.0 | 10.0 | 10.0 | 10.0 | 20.0 | 20.0 | 20.0 |
| R32 | mass % | 54.6 | 49.6 | 39.6 | 34.6 | 54.6 | 49.6 | 39.6 |
| R1234 (ze + yf) (r = 0.5) | mass % | 35.0 | 40.0 | 50.0 | 55.0 | 25.0 | 30.0 | 40.0 |
| CO2 | mass % | 0.4 | 0.4 | 0.4 | 0.4 | 0.4 | 0.4 | 0.4 |
| GWP | — | 370 | 337 | 270 | 236 | 370 | 337 | 270 |
| COP ratio | % (relative to R410A) | 102 | 102.1 | 102.5 | 102.9 | 101.1 | 101.2 | 101.4 |
| Refrigerating Capacity Ratio | % (relative to R410A) | 93 | 89.6 | 82.7 | 79.0 | 99.0 | 95.8 | 89.0 |
| Condensation Glide | ° C. | 3.8 | 4.5 | 6.1 | 6.9 | 2.8 | 3.5 | 5.0 |

| Item | Unit | Com Ex329 | Com Ex330 | Example147 | Example148 | Com Ex331 | Com Ex332 | Example149 |
|---|---|---|---|---|---|---|---|---|
| HFO-1132 (E) | mass % | 20.0 | 30.0 | 30.0 | 30.0 | 30.0 | 40.0 | 40.0 |
| R32 | mass % | 24.6 | 54.6 | 39.6 | 29.6 | 19.6 | 34.6 | 24.6 |
| R1234 (ze + yf) (r = 0.5) | mass % | 55.0 | 15.0 | 30.0 | 40.0 | 50.0 | 25.0 | 35.0 |
| CO2 | mass % | 0.4 | 0.4 | 0.4 | 0.4 | 0.4 | 0.4 | 0.4 |
| GWP | — | 169 | 370 | 269 | 202 | 135 | 235 | 168 |
| COP ratio | % (relative to R410A) | 102.4 | 100.2 | 100.5 | 100.9 | 101.7 | 99.8 | 100.3 |
| Refrigerating Capacity Ratio | % (relative to R410A) | 77.7 | 104.9 | 95.0 | 87.7 | 79.8 | 97.1 | 89.6 |
| Condensation Glide | ° C. | 7.4 | 1.8 | 3.8 | 5.3 | 6.9 | 3.2 | 4.7 |

TABLE 43-continued

| Item | Unit | Example150 | Com Ex333 | Com Ex334 | Example151 | Example152 | Com Ex335 | Com Ex336 | Example153 |
|---|---|---|---|---|---|---|---|---|---|
| HFO-1132 (E) | mass % | 40.0 | 40.0 | 50.0 | 50.0 | 50.0 | 50.0 | 60.0 | 60.0 |
| R32 | mass % | 19.6 | 9.6 | 19.6 | 14.6 | 9.6 | 4.6 | 12.1 | 7.1 |
| R1234 (ze + yf) (r = 0.5) | mass % | 40.0 | 50.0 | 30.0 | 35.0 | 40.0 | 45.0 | 27.5 | 32.5 |
| CO2 | mass % | 0.4 | 0.4 | 0.4 | 0.4 | 0.4 | 0.4 | 0.4 | 0.4 |
| GWP | — | 135 | 68 | 134 | 101 | 67 | 34 | 84 | 50 |
| COP ratio | % (relative to R410A) | 100.6 | 101.6 | 99.8 | 100.2 | 100.7 | 101.1 | 99.7 | 100.2 |
| Refrigerating Capacity Ratio | % (relative to R410A) | 85.6 | 77.1 | 91.1 | 87.0 | 82.7 | 78.1 | 90.3 | 85.9 |
| Condensation Glide | ° C. | 5.5 | 6.7 | 4.1 | 4.8 | 5.3 | 5.7 | 3.7 | 4.2 |

TABLE 44

0.4% $CO_2$
r = 0.75

| Item | Unit | Com Ex337 | Example154 | Example155 | Com Ex338 | Com Ex339 | Example156 | Example157 | Com Ex340 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 54.6 | 49.6 | 39.6 | 29.6 | 54.6 | 49.6 | 39.6 | 24.6 |
| R1234 (ze + yf) (r = 0.75) | mass % | 35.0 | 40.0 | 50.0 | 60.0 | 25.0 | 30.0 | 40.0 | 55.0 |
| CO2 | mass % | 0.4 | 0.4 | 0.4 | 0.4 | 0.4 | 0.4 | 0.4 | 0.4 |
| GWP | — | 370 | 337 | 270 | 203 | 370 | 336 | 269 | 169 |
| COP ratio | % (relative to R410A) | 101.6 | 101.7 | 101.9 | 102.9 | 100.8 | 100.8 | 100.9 | 101.6 |
| Refrigerating Capacity Ratio | % (relative to R410A) | 94.4 | 91.3 | 84.7 | 77.4 | 100.2 | 97.2 | 90.7 | 79.7 |
| Condensation Glide | ° C. | 3.0 | 3.5 | 4.9 | 6.4 | 2.3 | 2.8 | 4.0 | 6.2 |

| Item | Unit | Com Ex341 | Example158 | Example159 | Com Ex342 | Com Ex343 | Example160 | Example161 | Com Ex344 |
|---|---|---|---|---|---|---|---|---|---|
| HFO-1132 (E) | mass % | 30.0 | 30.0 | 30.0 | 30.0 | 40.0 | 40.0 | 40.0 | 40.0 |
| R32 | mass % | 54.6 | 39.6 | 29.6 | 14.6 | 34.6 | 24.6 | 19.6 | 9.6 |
| R1234 (ze + yf) (r = 0.75) | mass % | 15.0 | 30.0 | 40.0 | 55.0 | 25.0 | 35.0 | 40.0 | 50.0 |
| CO2 | mass % | 0.4 | 0.4 | 0.4 | 0.4 | 0.4 | 0.4 | 0.4 | 0.4 |
| GWP | — | 370 | 269 | 202 | 101 | 235 | 168 | 135 | 57 |
| COP ratio | % (relative to R410A) | 100.1 | 100.1 | 100.4 | 101.3 | 99.6 | 99.8 | 100.1 | 100.9 |
| Refrigerating Capacity Ratio | % (relative to R410A) | 105.6 | 96.3 | 89.3 | 77.5 | 98.2 | 91.0 | 87.1 | 78.7 |
| Condensation Glide | ° C. | 1.4 | 3.0 | 4.3 | 6.4 | 2.6 | 3.9 | 4.5 | 5.7 |

| Item | Unit | Com Ex345 | Example162 | Example163 | Com Ex346 | Com Ex347 | Example164 |
|---|---|---|---|---|---|---|---|
| HFO-1132 (E) | mass % | 50.0 | 50.0 | 50.0 | 50.0 | 60.0 | 60.0 |
| R32 | mass % | 19.6 | 14.6 | 9.6 | 4.6 | 12.1 | 7.1 |
| R1234 (ze + yf) (r = 0.75) | mass % | 30.0 | 35.0 | 40.0 | 45.0 | 27.5 | 32.5 |
| CO2 | mass % | 0.4 | 0.4 | 0.4 | 0.4 | 0.4 | 0.4 |
| GWP | — | 134 | 101 | 67 | 34 | 84 | 50 |
| COP ratio | % (relative to R410A) | 99.5 | 99.8 | 100.1 | 100.6 | 99.4 | 99.8 |
| Refrigerating Capacity Ratio | % (relative to R410A) | 92.3 | 88.3 | 84.1 | 79.7 | 91.3 | 87.1 |
| Condensation Glide | ° C. | 3.4 | 4.0 | 4.5 | 4.9 | 3.1 | 3.5 |

TABLE 45

1% $CO_2$
r = 0

| Item | Unit | Com Ex348 | Example165 | Com Ex349 | Com Ex350 | Example166 | Example167 | Com Ex351 |
|---|---|---|---|---|---|---|---|---|
| HFO-1132 (E) | mass % | 10.0 | 10.0 | 10.0 | 20.0 | 20.0 | 20.0 | 20.0 |
| R32 | mass % | 54.0 | 49.0 | 39.0 | 54.0 | 49.0 | 39.0 | 29.0 |
| R1234 (ze + yf) (r = 0) | mass % | 35.0 | 40.0 | 50.0 | 25.0 | 30.0 | 40.0 | 50.0 |
| CO2 | mass % | 1.0 | 1.0 | 1.0 | 1.0 | 1.0 | 1.0 | 1.0 |
| GWP | — | 367 | 333 | 266 | 366 | 333 | 266 | 199 |
| COP ratio | % (relative to R410A) | 103 | 102.9 | 103.8 | 101.4 | 101.6 | 102.3 | 103.3 |
| Refrigerating Capacity Ratio | % (relative to R410A) | 91 | 86.9 | 79.4 | 97.6 | 94.0 | 86.4 | 78.6 |
| Condensation Glide | ° C. | 6.0 | 7.0 | 9.1 | 4.5 | 5.5 | 7.6 | 9.7 |

| Item | Unit | Com Ex352 | Example168 | Example169 | Com Ex353 | Com Ex354 | Example170 | Com Ex355 |
|---|---|---|---|---|---|---|---|---|
| HFO-1132 (E) | mass % | 30.0 | 30.0 | 30.0 | 30.0 | 40.0 | 40.0 | 40.0 |
| R32 | mass % | 54.0 | 39.0 | 29.0 | 19.0 | 34.0 | 24.0 | 14.0 |
| R1234 (ze + yf) (r = 0) | mass % | 15.0 | 30.0 | 40.0 | 50.0 | 25.0 | 35.0 | 45.0 |
| CO2 | mass % | 1.0 | 1.0 | 1.0 | 1.0 | 1.0 | 1.0 | 1.0 |
| GWP | — | 366 | 265 | 198 | 132 | 231 | 165 | 98 |
| COP ratio | % (relative to R410A) | 100.3 | 101.0 | 101.8 | 103.0 | 100.2 | 101.0 | 102.1 |
| Refrigerating Capacity Ratio | % (relative to R410A) | 104.4 | 93.2 | 85.2 | 76.9 | 95.8 | 87.6 | 79.0 |
| Condensation Glide | ° C. | 2.9 | 5.8 | 8.0 | 10.0 | 5.0 | 7.1 | 9.0 |

| Item | Unit | Com Ex356 | Example171 | Com Ex357 | Com Ex358 | Example172 | Com Ex359 |
|---|---|---|---|---|---|---|---|
| HFO-1132 (E) | mass % | 50.0 | 50.0 | 50.0 | 60.0 | 60.0 | 60.0 |
| R32 | mass % | 24.0 | 14.0 | 4.0 | 11.5 | 6.5 | 0.0 |
| R1234 (ze + yf) (r = 0) | mass % | 25.0 | 35.0 | 45.0 | 27.5 | 32.5 | 39.0 |
| CO2 | mass % | 1.0 | 1.0 | 1.0 | 1.0 | 1.0 | 1.0 |
| GWP | — | 164 | 97 | 30 | 80 | 46 | 3 |
| COP ratio | % (relative to R410A) | 99.9 | 100.9 | 102.1 | 100.1 | 100.7 | 101.4 |
| Refrigerating Capacity Ratio | % (relative to R410A) | 93.9 | 85.2 | 75.9 | 89.0 | 84.4 | 78.1 |
| Condensation Glide | ° C. | 5.2 | 7.1 | 8.5 | 5.6 | 6.4 | 7.1 |

TABLE 46

1% $CO_2$
r = 0.25

| Item | Unit | Com Ex360 | Example173 | Com Ex361 | Com Ex362 | Example174 | Example175 | Com Ex363 |
|---|---|---|---|---|---|---|---|---|
| HFO-1132 (E) | mass % | 10.0 | 10.0 | 10.0 | 20.0 | 20.0 | 20.0 | 20.0 |
| R32 | mass % | 54.0 | 49.0 | 34.0 | 54.0 | 49.0 | 39.0 | 24.0 |
| R1234 (ze + yf) (r = 0.25) | mass % | 35.0 | 40.0 | 55.0 | 25.0 | 30.0 | 40.0 | 55.0 |
| CO2 | mass % | 1.0 | 1.0 | 1.0 | 1.0 | 1.0 | 1.0 | 1.0 |
| GWP | — | 367 | 333 | 233 | 366 | 333 | 266 | 165 |
| COP ratio | % (relative to R410A) | 102.2 | 102.4 | 103.5 | 101.1 | 101.3 | 101.7 | 103.0 |
| Refrigerating Capacity Ratio | % (relative to R410A) | 92.2 | 88.7 | 77.7 | 98.8 | 95.4 | 88.1 | 76.6 |
| Condensation Glide | ° C. | 5.1 | 6.0 | 8.8 | 3.9 | 4.7 | 6.5 | 9.4 |

| Item | Unit | Com Ex364 | Example176 | Example177 | Com Ex365 | Com Ex366 | Example178 | Com Ex367 |
|---|---|---|---|---|---|---|---|---|
| HFO-1132 (E) | mass % | 30.0 | 30.0 | 30.0 | 30.0 | 40.0 | 40.0 | 40.0 |
| R32 | mass % | 54.0 | 39.0 | 29.0 | 19.0 | 34.0 | 24.0 | 9.0 |
| R1234 (ze + yf) (r = 0.25) | mass % | 15.0 | 30.0 | 40.0 | 50.0 | 25.0 | 35.0 | 50.0 |
| CO2 | mass % | 1.0 | 1.0 | 1.0 | 1.0 | 1.0 | 1.0 | 1.0 |
| GWP | — | 366 | 265 | 198 | 131 | 231 | 164 | 64 |

TABLE 46-continued

| | | | | | | | | |
|---|---|---|---|---|---|---|---|---|
| COP ratio | % (relative to R410A) | 100.1 | 100.6 | 101.2 | 102.2 | 99.9 | 100.5 | 102.0 |
| Refrigerating Capacity Ratio | % (relative to R410A) | 105.1 | 94.5 | 86.9 | 78.8 | 96.9 | 89.0 | 76.2 |
| Condensation Glide | ° C. | 2.5 | 5.0 | 6.9 | 8.7 | 4.3 | 6.2 | 8.5 |

| Item | Unit | Com Ex368 | Example179 | Com Ex369 | Com Ex370 | Example180 |
|---|---|---|---|---|---|---|
| HFO-1132 (E) | mass % | 50.0 | 50.0 | 50.0 | 60.0 | 60.0 |
| R32 | mass % | 24.0 | 14.0 | 4.0 | 11.5 | 6.5 |
| R1234 (ze + yf) (r = 0.25) | mass % | 25.0 | 35.0 | 45.0 | 27.5 | 32.5 |
| CO2 | mass % | 1.0 | 1.0 | 1.0 | 1.0 | 1.0 |
| GWP | — | 164 | 97 | 30 | 80 | 46 |
| COP ratio | % (relative to R410A) | 99.6 | 100.4 | 101.4 | 99.8 | 100.3 |
| Refrigerating Capacity Ratio | % (relative to R410A) | 95.0 | 86.6 | 77.5 | 90.2 | 85.7 |
| Condensation Glide | ° C. | 4.5 | 6.2 | 7.5 | 5.0 | 5.6 |

TABLE 47

| | | 1% $CO_2$ r = 0.5 | | | | | | |
|---|---|---|---|---|---|---|---|---|
| Item | Unit | Com Ex371 | Example181 | Example182 | Com Ex372 | Com Ex373 | Example183 | Com Ex184 |
| HFO-1132 (E) | mass % | 10.0 | 10.0 | 10.0 | 10.0 | 20.0 | 20.0 | 20.0 |
| R32 | mass % | 54.0 | 49.0 | 39.0 | 29.0 | 54.0 | 49.0 | 39.0 |
| R1234 (ze + yf) (r = 0.5) | mass % | 35.0 | 40.0 | 50.0 | 60.0 | 25.0 | 30.0 | 40.0 |
| CO2 | mass % | 1.0 | 1.0 | 1.0 | 1.0 | 1.0 | 1.0 | 1.0 |
| GWP | — | 366 | 333 | 266 | 199 | 366 | 332 | 265 |
| COP ratio | % (relative to R410A) | 102 | 101.9 | 102.3 | 103.0 | 100.8 | 100.9 | 101.2 |
| Refrigerating Capacity Ratio | % (relative to R410A) | 94 | 90.5 | 83.5 | 76.1 | 100.0 | 96.7 | 89.9 |
| Condensation Glide | ° C. | 4.2 | 5.0 | 6.6 | 8.3 | 3.2 | 3.9 | 5.5 |

| Item | Unit | Com Ex374 | Com Ex375 | Example185 | Example186 | Com Ex376 | Com Ex377 | Example187 |
|---|---|---|---|---|---|---|---|---|
| HFO-1132 (E) | mass % | 20.0 | 30.0 | 30.0 | 30.0 | 30.0 | 40.0 | 40.0 |
| R32 | mass % | 24.0 | 54.0 | 39.0 | 29.0 | 14.0 | 34.0 | 24.0 |
| R1234 (ze + yf) (r = 0.5) | mass % | 55.0 | 15.0 | 30.0 | 40.0 | 55.0 | 25.0 | 35.0 |
| CO2 | mass % | 1.0 | 1.0 | 1.0 | 1.0 | 1.0 | 1.0 | 1.0 |
| GWP | — | 165 | 366 | 265 | 198 | 98 | 231 | 164 |
| COP ratio | % (relative to R410A) | 102.2 | 100.0 | 100.2 | 100.7 | 101.9 | 99.6 | 100.0 |
| Refrigerating Capacity Ratio | % (relative to R410A) | 78.6 | 105.8 | 95.9 | 88.6 | 76.5 | 98.0 | 90.5 |
| Condensation Glide | ° C. | 8.0 | 2.1 | 4.2 | 5.8 | 8.2 | 3.7 | 5.2 |

| Item | Unit | Com Ex378 | Com Ex379 | Example188 | Com Ex380 | Com Ex381 | Example189 |
|---|---|---|---|---|---|---|---|
| HFO-1132 (E) | mass % | 40.0 | 50.0 | 50.0 | 50.0 | 60.0 | 60.0 |
| R32 | mass % | 9.0 | 24.0 | 14.0 | 4.0 | 11.5 | 6.5 |
| R1234 (ze + yf) (r = 0.5) | mass % | 50.0 | 25.0 | 35.0 | 45.0 | 27.5 | 32.5 |
| CO2 | mass % | 1.0 | 1.0 | 1.0 | 1.0 | 1.0 | 1.0 |
| GWP | — | 64 | 164 | 97 | 30 | 80 | 46 |
| COP ratio | % (relative to R410A) | 101.3 | 99.3 | 99.9 | 100.8 | 99.5 | 99.9 |
| Refrigerating Capacity Ratio | % (relative to R410A) | 78.0 | 96.0 | 88.0 | 79.1 | 91.3 | 86.9 |
| Condensation Glide | ° C. | 7.4 | 3.9 | 5.3 | 6.5 | 4.3 | 4.9 |

TABLE 48

1% $CO_2$
r = 0.75

| Item | Unit | Com Ex382 | Example190 | Example191 | Com Ex383 | Com Ex384 | Example192 | Example193 | Example194 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 54.0 | 49.0 | 39.0 | 24.0 | 54.0 | 49.0 | 39.0 | 29.0 |
| R1234 (ze + yf) (r = 0.75) | mass % | 35.0 | 40.0 | 50.0 | 65.0 | 25.0 | 30.0 | 40.0 | 50.0 |
| CO2 | mass % | 1.0 | 1.0 | 1.0 | 1.0 | 1.0 | 1.0 | 1.0 | 1.0 |
| GWP | — | 366 | 333 | 266 | 165 | 366 | 332 | 265 | 198 |
| COP ratio | % (relative to R410A) | 101.4 | 101.5 | 101.6 | 102.5 | 100.6 | 100.6 | 100.7 | 101.0 |
| Refrigerating Capacity Ratio | % (relative to R410A) | 95.3 | 92.2 | 85.5 | 74.3 | 101.1 | 98.1 | 91.6 | 84.4 |
| Condensation Glide | ° C. | 3.4 | 4.0 | 5.4 | 7.8 | 2.6 | 3.2 | 4.4 | 6.0 |

| Item | Unit | Com Ex385 | Com Ex386 | Example195 | Example196 | Example197 | Com Ex387 | Com Ex388 | Example198 |
|---|---|---|---|---|---|---|---|---|---|
| HFO-1132 (E) | mass % | 20.0 | 30.0 | 30.0 | 30.0 | 30.0 | 30.0 | 40.0 | 40.0 |
| R32 | mass % | 19.0 | 54.0 | 39.0 | 29.0 | 19.0 | 9.0 | 34.0 | 24.0 |
| R1234 (ze + yf) (r = 0.75) | mass % | 60.0 | 15.0 | 30.0 | 40.0 | 50.0 | 60.0 | 25.0 | 35.0 |
| CO2 | mass % | 1.0 | 1.0 | 1.0 | 1.0 | 1.0 | 1.0 | 1.0 | 1.0 |
| GWP | — | 131 | 365 | 265 | 198 | 131 | 64 | 231 | 164 |
| COP ratio | % (relative to R410A) | 101.8 | 99.8 | 99.9 | 100.1 | 100.7 | 101.6 | 99.3 | 99.6 |
| Refrigerating Capacity Ratio | % (relative to R410A) | 76.6 | 106.5 | 97.2 | 90.2 | 82.5 | 73.9 | 99.1 | 91.9 |
| Condensation Glide | ° C. | 7.6 | 1.8 | 3.4 | 4.8 | 6.3 | 7.6 | 3.0 | 4.4 |

| Item | Unit | Example199 | Com Ex389 | Com Ex390 | Example200 | Example201 | Com Ex391 | Example202 |
|---|---|---|---|---|---|---|---|---|
| HFO-1132 (E) | mass % | 40.0 | 40.0 | 50.0 | 50.0 | 50.0 | 60.0 | 60.0 |
| R32 | mass % | 14.0 | 4.0 | 24.0 | 14.0 | 4.0 | 11.5 | 6.5 |
| R1234 (ze + yf) (r = 0.75) | mass % | 45.0 | 55.0 | 25.0 | 35.0 | 45.0 | 27.5 | 32.5 |
| CO2 | mass % | 1.0 | 1.0 | 1.0 | 1.0 | 1.0 | 1.0 | 1.0 |
| GWP | — | 97 | 30 | 164 | 97 | 30 | 79 | 46 |
| COP ratio | % (relative to R410A) | 100.2 | 101.1 | 99.0 | 99.5 | 100.3 | 99.1 | 99.5 |
| Refrigerating Capacity Ratio | % (relative to R410A) | 84.0 | 75.1 | 97.1 | 89.3 | 80.6 | 92.3 | 88.1 |
| Condensation Glide | ° C. | 5.8 | 6.8 | 3.2 | 4.5 | 5.6 | 3.7 | 4.2 |

TABLE 49

2% $CO_2$
r = 0

| Item | Unit | Com Ex392 | Example203 | Com Ex393 | Com Ex394 | Example204 | Example205 | Com Ex395 |
|---|---|---|---|---|---|---|---|---|
| HFO-1132 (E) | mass % | 10.0 | 10.0 | 10.0 | 20.0 | 20.0 | 20.0 | 20.0 |
| R32 | mass % | 58.0 | 48.0 | 33.0 | 58.0 | 48.0 | 38.0 | 23.0 |
| R1234 (ze + yf) (r = 0) | mass % | 30.0 | 40.0 | 55.0 | 20.0 | 30.0 | 40.0 | 55.0 |
| CO2 | mass % | 2.0 | 2.0 | 2.0 | 2.0 | 2.0 | 2.0 | 2.0 |
| GWP | — | 393 | 327 | 226 | 393 | 326 | 259 | 159 |
| COP ratio | % (relative to R410A) | 102 | 102.6 | 104.0 | 100.8 | 101.2 | 101.9 | 103.6 |
| Refrigerating Capacity Ratio | % (relative to R410A) | 96 | 88.4 | 77.0 | 102.7 | 95.5 | 87.9 | 76.0 |
| Condensation Glide | ° C. | 5.8 | 7.8 | 11.2 | 4.2 | 6.2 | 8.4 | 11.8 |

| Item | Unit | Com Ex396 | Example206 | Example207 | Com Ex397 | Com Ex398 | Example208 | Com Ex399 |
|---|---|---|---|---|---|---|---|---|
| HFO-1132 (E) | mass % | 30.0 | 30.0 | 30.0 | 30.0 | 40.0 | 40.0 | 40.0 |
| R32 | mass % | 58.0 | 38.0 | 28.0 | 18.0 | 38.0 | 23.0 | 8.0 |
| R1234 (ze + yf) (r = 0) | mass % | 10.0 | 30.0 | 40.0 | 50.0 | 20.0 | 35.0 | 50.0 |
| CO2 | mass % | 2.0 | 2.0 | 2.0 | 2.0 | 2.0 | 2.0 | 2.0 |
| GWP | — | 392 | 259 | 192 | 125 | 258 | 158 | 57 |

TABLE 49-continued

| | | | | | | | | |
|---|---|---|---|---|---|---|---|---|
| COP ratio | % (relative to R410A) | 99.8 | 100.6 | 101.4 | 102.6 | 99.5 | 100.5 | 102.3 |
| Refrigerating Capacity Ratio | % (relative to R410A) | 109.5 | 94.7 | 86.8 | 78.4 | 101.3 | 89.1 | 76.0 |
| Condensation Glide | ° C. | 2.6 | 6.6 | 8.9 | 11.0 | 4.7 | 8.0 | 10.9 |

| Item | Unit | Com Ex400 | Example209 | Com Ex401 | Com Ex402 | Example210 |
|---|---|---|---|---|---|---|
| HFO-1132 (E) | mass % | 50.0 | 50.0 | 50.0 | 60.0 | 60.0 |
| R32 | mass % | 23.0 | 13.0 | 3.0 | 13.0 | 5.5 |
| R1234 (ze + yf) (r = 0) | mass % | 25.0 | 35.0 | 45.0 | 25.0 | 32.5 |
| CO2 | mass % | 2.0 | 2.0 | 2.0 | 2.0 | 2.0 |
| GWP | — | 157 | 90 | 23 | 90 | 40 |
| COP ratio | % (relative to R410A) | 99.4 | 100.4 | 101.5 | 99.4 | 100.1 |
| Refrigerating Capacity Ratio | % (relative to R410A) | 95.5 | 86.8 | 77.5 | 92.9 | 86.0 |
| Condensation Glide | ° C. | 6.0 | 8.1 | 9.8 | 5.1 | 7.5 |

TABLE 50

| | | 2% $CO_2$ r = 0.25 | | | | | | | |
|---|---|---|---|---|---|---|---|---|---|
| Item | Unit | Com Ex403 | Example211 | Example212 | Com Ex404 | Com Ex405 | Example213 | Example214 | Com Ex406 |
| HFO-1132 (E) | mass % | 10.0 | 10.0 | 10.0 | 10.0 | 20.0 | 20.0 | 20.0 | 20.0 |
| R32 | mass % | 58.0 | 48.0 | 38.0 | 28.0 | 58.0 | 48.0 | 38.0 | 23.0 |
| R1234 (ze + yf) (r = 0.25) | mass % | 30.0 | 40.0 | 50.0 | 60.0 | 20.0 | 30.0 | 40.0 | 55.0 |
| CO2 | mass % | 2.0 | 2.0 | 2.0 | 2.0 | 2.0 | 2.0 | 2.0 | 2.0 |
| GWP | — | 393 | 326 | 259 | 192 | 393 | 326 | 259 | 158 |
| COP ratio | % (relative to R410A) | 101.7 | 102.0 | 102.7 | 103.6 | 100.6 | 100.9 | 101.4 | 102.7 |
| Refrigerating Capacity Ratio | % (relative to R410A) | 97.0 | 90.2 | 82.9 | 75.3 | 103.7 | 96.9 | 89.6 | 78.0 |
| Condensation Glide | ° C. | 5.0 | 6.8 | 8.8 | 10.5 | 3.7 | 5.4 | 7.3 | 10.4 |

| Item | Unit | Com Ex407 | Example215 | Example216 | Example217 | Com Ex408 | Com Ex409 | Example218 | Example219 |
|---|---|---|---|---|---|---|---|---|---|
| HFO-1132 (E) | mass % | 30.0 | 30.0 | 30.0 | 30.0 | 30.0 | 40.0 | 40.0 | 40.0 |
| R32 | mass % | 58.0 | 43.0 | 33.0 | 23.0 | 13.0 | 38.0 | 23.0 | 13.0 |
| R1234 (ze + yf) (r = 0.25) | mass % | 10.0 | 25.0 | 35.0 | 45.0 | 55.0 | 20.0 | 35.0 | 45.0 |
| CO2 | mass % | 2.0 | 2.0 | 2.0 | 2.0 | 2.0 | 2.0 | 2.0 | 2.0 |
| GWP | — | 392 | 292 | 225 | 158 | 91 | 258 | 158 | 91 |
| COP ratio | % (relative to R410A) | 99.7 | 100.0 | 100.5 | 101.3 | 102.3 | 99.2 | 100.1 | 101.0 |
| Refrigerating Capacity Ratio | % (relative to R410A) | 110.0 | 99.7 | 92.3 | 84.4 | 76.0 | 102.2 | 90.6 | 82.2 |
| Condensation Glide | ° C. | 2.4 | 4.8 | 6.7 | 8.8 | 10.6 | 4.1 | 7.0 | 8.9 |

| Item | Unit | Com Ex410 | Com Ex411 | Example220 | Example221 | Com Ex412 | Example222 |
|---|---|---|---|---|---|---|---|
| HFO-1132 (E) | mass % | 40.0 | 50.0 | 50.0 | 50.0 | 60.0 | 60.0 |
| R32 | mass % | 8.0 | 23.0 | 13.0 | 0.0 | 13.0 | 5.5 |
| R1234 (ze + yf) (r = 0.25) | mass % | 50.0 | 25.0 | 35.0 | 48.0 | 25.0 | 32.5 |
| CO2 | mass % | 2.0 | 2.0 | 2.0 | 2.0 | 2.0 | 2.0 |
| GWP | — | 57 | 157 | 90 | 3 | 90 | 40 |
| COP ratio | % (relative to R410A) | 101.5 | 99.1 | 99.9 | 101.2 | 99.1 | 99.7 |
| Refrigerating Capacity Ratio | % (relative to R410A) | 77.8 | 96.6 | 88.2 | 76.3 | 94.0 | 87.3 |
| Condensation Glide | ° C. | 9.7 | 5.3 | 7.2 | 9.0 | 5.5 | 6.7 |

TABLE 51

| 2% $CO_2$ r = 0.5 | | | | | | | | | |
|---|---|---|---|---|---|---|---|---|---|
| Item | Unit | Com Ex413 | Example223 | Example224 | Com Ex414 | Com Ex415 | Example225 | Example226 | Example227 |
| HFO-1132 (E) | mass % | 10.0 | 10.0 | 10.0 | 10.0 | 20.0 | 20.0 | 20.0 | 20.0 |
| R32 | mass % | 58.0 | 48.0 | 38.0 | 28.0 | 58.0 | 48.0 | 38.0 | 28.0 |
| R1234 (ze + yf) (r = 0.5) | mass % | 30.0 | 40.0 | 50.0 | 60.0 | 20.0 | 30.0 | 40.0 | 50.0 |
| CO2 | mass % | 2.0 | 2.0 | 2.0 | 2.0 | 2.0 | 2.0 | 2.0 | 2.0 |
| GWP | — | 393 | 326 | 259 | 192 | 393 | 326 | 259 | 192 |
| COP ratio | % (relative to R410A) | 101 | 101.6 | 102.0 | 102.7 | 100.4 | 100.5 | 100.8 | 101.4 |
| Refrigerating Capacity Ratio | % (relative to R410A) | 98 | 91.9 | 85.0 | 77.5 | 104.6 | 98.3 | 91.4 | 84.0 |
| Condensation Glide | ° C. | 4.2 | 5.7 | 7.4 | 9.3 | 3.2 | 4.6 | 6.2 | 8.1 |

| Item | Unit | Com Ex416 | Com Ex417 | Example228 | Example229 | Example230 | Com Ex418 | Com Ex419 | Example231 |
|---|---|---|---|---|---|---|---|---|---|
| HFO-1132 (E) | mass % | 20.0 | 30.0 | 30.0 | 30.0 | 30.0 | 30.0 | 40.0 | 40.0 |
| R32 | mass % | 18.0 | 58.0 | 43.0 | 33.0 | 23.0 | 13.0 | 38.0 | 23.0 |
| R1234 (ze + yf) (r = 0.5) | mass % | 60.0 | 10.0 | 25.0 | 35.0 | 45.0 | 55.0 | 20.0 | 35.0 |
| CO2 | mass % | 2.0 | 2.0 | 2.0 | 2.0 | 2.0 | 2.0 | 2.0 | 2.0 |
| GWP | — | 125 | 392 | 292 | 225 | 158 | 91 | 258 | 157 |
| COP ratio | % (relative to R410A) | 102.3 | 99.5 | 99.7 | 100.0 | 100.6 | 101.5 | 99.0 | 99.6 |
| Refrigerating Capacity Ratio | % (relative to R410A) | 76.0 | 110.4 | 100.9 | 93.8 | 86.2 | 78.0 | 103.2 | 92.0 |
| Condensation Glide | ° C. | 9.9 | 2.1 | 4.1 | 5.7 | 7.6 | 9.3 | 3.6 | 6.1 |

| Item | Unit | Example232 | Com Ex420 | Com Ex421 | Example233 | Example234 | Com Ex422 | Example235 |
|---|---|---|---|---|---|---|---|---|
| HFO-1132 (E) | mass % | 40.0 | 40.0 | 50.0 | 50.0 | 50.0 | 60.0 | 60.0 |
| R32 | mass % | 13.0 | 3.0 | 23.0 | 13.0 | 0.0 | 13.0 | 5.5 |
| R1234 (ze + yf) (r = 0.5) | mass % | 45.0 | 55.0 | 25.0 | 35.0 | 48.0 | 25.0 | 32.5 |
| CO2 | mass % | 2.0 | 2.0 | 2.0 | 2.0 | 2.0 | 2.0 | 2.0 |
| GWP | — | 90 | 23 | 157 | 90 | 3 | 90 | 39 |
| COP ratio | % (relative to R410A) | 100.4 | 101.4 | 98.8 | 99.5 | 100.7 | 98.8 | 99.4 |
| Refrigerating Capacity Ratio | % (relative to R410A) | 83.9 | 74.9 | 97.6 | 89.6 | 77.8 | 95.0 | 88.5 |
| Condensation Glide | ° C. | 7.8 | 9.1 | 4.6 | 5.3 | 8.0 | 4.9 | 5.9 |

TABLE 52

| 2% $CO_2$ r = 0.75 | | | | | | | | | |
|---|---|---|---|---|---|---|---|---|---|
| Item | Unit | Com Ex423 | Example236 | Example237 | Com Ex424 | Com Ex425 | Example238 | Example239 | Example240 |
| HFO-1132 (E) | mass % | 10.0 | 10.0 | 10.0 | 10.0 | 20.0 | 20.0 | 20.0 | 20.0 |
| R32 | mass % | 58.0 | 48.0 | 38.0 | 23.0 | 58.0 | 48.0 | 38.0 | 28.0 |
| R1234 (ze + yf) (r = 0.75) | mass % | 30.0 | 40.0 | 50.0 | 65.0 | 20.0 | 30.0 | 40.0 | 50.0 |
| CO2 | mass % | 2.0 | 2.0 | 2.0 | 2.0 | 2.0 | 2.0 | 2.0 | 2.0 |
| GWP | — | 393 | 326 | 259 | 158 | 393 | 326 | 259 | 191 |
| COP ratio | % (relative to R410A) | 101.0 | 101.1 | 101.3 | 102.2 | 100.2 | 100.2 | 100.3 | 100.7 |
| Refrigerating Capacity Ratio | % (relative to R410A) | 99.8 | 93.7 | 86.9 | 75.7 | 105.5 | 99.6 | 93.0 | 85.9 |
| Condensation Glide | ° C. | 3.5 | 4.7 | 6.2 | 8.8 | 2.7 | 3.8 | 5.2 | 6.8 |

| Item | Unit | Com Ex426 | Com Ex427 | Example241 | Example242 | Example243 | Com Ex428 | Com Ex429 | Example244 |
|---|---|---|---|---|---|---|---|---|---|
| HFO-1132 (E) | mass % | 20.0 | 30.0 | 30.0 | 30.0 | 30.0 | 30.0 | 40.0 | 40.0 |
| R32 | mass % | 13.0 | 58.0 | 43.0 | 33.0 | 23.0 | 8.0 | 38.0 | 23.0 |
| R1234 (ze + yf) (r = 0.75) | mass % | 65.0 | 10.0 | 25.0 | 35.0 | 45.0 | 60.0 | 20.0 | 35.0 |

TABLE 52-continued

| | | | | | | | | | |
|---|---|---|---|---|---|---|---|---|---|
| CO2 | mass % | 2.0 | 2.0 | 2.0 | 2.0 | 2.0 | 2.0 | 2.0 | 2.0 |
| GWP | — | 91 | 392 | 292 | 225 | 158 | 57 | 258 | 157 |
| COP ratio | % (relative to R410A) | 101.9 | 99.4 | 99.4 | 99.6 | 100.0 | 101.2 | 98.8 | 99.2 |
| Refrigerating Capacity Ratio | % (relative to R410A) | 73.7 | 110.9 | 102.0 | 95.3 | 87.9 | 75.4 | 104.1 | 93.4 |
| Condensation Glide | ° C. | 9.4 | 1.9 | 3.5 | 4.8 | 6.4 | 8.8 | 3.1 | 5.2 |

| Item | Unit | Example245 | Com Ex430 | Com Ex431 | Example246 | Example247 | Com Ex432 | Example248 |
|---|---|---|---|---|---|---|---|---|
| HFO-1132 (E) | mass % | 40.0 | 40.0 | 50.0 | 50.0 | 50.0 | 60.0 | 60.0 |
| R32 | mass % | 13.0 | 0.0 | 23.0 | 13.0 | 3.0 | 13.0 | 5.5 |
| R1234 (ze + yf) (r = 0.75) | mass % | 45.0 | 58.0 | 25.0 | 35.0 | 45.0 | 25.0 | 32.5 |
| CO2 | mass % | 2.0 | 2.0 | 2.0 | 2.0 | 2.0 | 2.0 | 2.0 |
| GWP | — | 90 | 3 | 157 | 90 | 23 | 89 | 39 |
| COP ratio | % (relative to R410A) | 99.8 | 101.0 | 98.5 | 99.0 | 99.8 | 98.5 | 99.0 |
| Refrigerating Capacity Ratio | % (relative to R410A) | 85.5 | 73.7 | 98.7 | 90.9 | 82.2 | 96.0 | 89.7 |
| Condensation Glide | ° C. | 6.7 | 8.2 | 4.0 | 5.4 | 6.7 | 4.3 | 5.2 |

TABLE 53

3% $CO_2$
r = 0

| Item | Unit | Com Ex433 | Example249 | Com Ex434 | Com Ex435 | Example250 | Example251 | Com Ex436 |
|---|---|---|---|---|---|---|---|---|
| HFO-1132 (E) | mass % | 10.0 | 10.0 | 10.0 | 20.0 | 20.0 | 20.0 | 20.0 |
| R32 | mass % | 57.0 | 47.0 | 32.0 | 57.0 | 47.0 | 37.0 | 22.0 |
| R1234 (ze + yf) (r = 0) | mass % | 30.0 | 40.0 | 55.0 | 20.0 | 30.0 | 40.0 | 55.0 |
| CO2 | mass % | 3.0 | 3.0 | 3.0 | 3.0 | 3.0 | 3.0 | 3.0 |
| GWP | — | 387 | 320 | 219 | 386 | 319 | 252 | 152 |
| COP ratio | % (relative to R410A) | 102 | 102.2 | 103.7 | 100.4 | 100.9 | 101.6 | 103.2 |
| Refrigerating Capacity Ratio | % (relative to R410A) | 97 | 89.8 | 78.4 | 104.2 | 97.0 | 89.4 | 77.4 |
| Condensation Glide | ° C. | 6.4 | 8.6 | 12.1 | 4.8 | 6.9 | 9.2 | 12.8 |

| Item | Unit | Com Ex437 | Example252 | Example253 | Com Ex438 | Com Ex439 | Example254 | Com Ex440 |
|---|---|---|---|---|---|---|---|---|
| HFO-1132 (E) | mass % | 30.0 | 30.0 | 30.0 | 30.0 | 40.0 | 40.0 | 40.0 |
| R32 | mass % | 57.0 | 37.0 | 27.0 | 12.0 | 37.0 | 22.0 | 7.0 |
| R1234 (ze + yf) (r = 0) | mass % | 10.0 | 30.0 | 40.0 | 55.0 | 20.0 | 35.0 | 50.0 |
| CO2 | mass % | 3.0 | 3.0 | 3.0 | 3.0 | 3.0 | 3.0 | 3.0 |
| GWP | — | 386 | 252 | 185 | 85 | 251 | 151 | 51 |
| COP ratio | % (relative to R410A) | 99.4 | 100.2 | 101.0 | 102.8 | 99.0 | 100.2 | 101.9 |
| Refrigerating Capacity Ratio | % (relative to R410A) | 111.1 | 96.2 | 88.3 | 75.6 | 102.9 | 90.7 | 77.6 |
| Condensation Glide | ° C. | 3.1 | 7.3 | 9.7 | 13.1 | 5.3 | 8.8 | 12.1 |

| Item | Unit | Com Ex441 | Example255 | Com Ex442 | Com Ex443 | Example256 |
|---|---|---|---|---|---|---|
| HFO-1132 (E) | mass % | 50.0 | 50.0 | 50.0 | 60.0 | 60.0 |
| R32 | mass % | 22.0 | 12.0 | 0.0 | 12.0 | 4.5 |
| R1234 (ze + yf) (r = 0) | mass % | 25.0 | 35.0 | 47.0 | 25.0 | 32.5 |
| CO2 | mass % | 3.0 | 3.0 | 3.0 | 3.0 | 3.0 |
| GWP | — | 151 | 84 | 3 | 83 | 33 |
| COP ratio | % (relative to R410A) | 99.0 | 100.0 | 101.3 | 98.9 | 99.7 |
| Refrigerating Capacity Ratio | % (relative to R410A) | 97.1 | 88.4 | 77.2 | 94.6 | 87.7 |
| Condensation Glide | ° C. | 6.7 | 9.0 | 11.3 | 7.0 | 8.5 |

TABLE 54

3% $CO_2$
r = 0.25

| Item | Unit | Com Ex444 | Example257 | Example258 | Com Ex445 | Com Ex446 | Example259 | Example260 |
|---|---|---|---|---|---|---|---|---|
| HFO-1132 (E) | mass % | 10.0 | 10.0 | 10.0 | 10.0 | 20.0 | 20.0 | 20.0 |
| R32 | mass % | 57.0 | 47.0 | 37.0 | 27.0 | 57.0 | 47.0 | 37.0 |
| R1234 (ze + yf) (r = 0.25) | mass % | 30.0 | 40.0 | 50.0 | 60.0 | 30.0 | 30.0 | 40.0 |
| CO2 | mass % | 3.0 | 3.0 | 3.0 | 3.0 | 3.0 | 3.0 | 3.0 |
| GWP | — | 387 | 320 | 253 | 186 | 386 | 319 | 252 |
| COP ratio | % (relative to R410A) | 101.3 | 101.7 | 102.3 | 103.3 | 100.2 | 100.5 | 101.0 |
| Refrigerating Capacity Ratio | % (relative to R410A) | 98.5 | 91.6 | 84.4 | 76.7 | 105.2 | 98.4 | 91.1 |
| Condensation Glide | ° C. | 5.6 | 7.5 | 9.6 | 11.8 | 4.3 | 6.1 | 8.1 |

| Item | Unit | Example261 | Com Ex447 | Com Ex448 | Example262 | Example263 | Com Ex449 | Com Ex450 |
|---|---|---|---|---|---|---|---|---|
| HFO-1132 (E) | mass % | 20.0 | 20.0 | 30.0 | 30.0 | 30.0 | 30.0 | 40.0 |
| R32 | mass % | 27.0 | 17.0 | 57.0 | 37.0 | 27.0 | 12.0 | 37.0 |
| R1234 (ze + yf) (r = 0.25) | mass % | 50.0 | 60.0 | 10.0 | 30.0 | 40.0 | 55.0 | 20.0 |
| CO2 | mass % | 3.0 | 3.0 | 3.0 | 3.0 | 3.0 | 3.0 | 3.0 |
| GWP | — | 185 | 118 | 386 | 252 | 185 | 84 | 251 |
| COP ratio | % (relative to R410A) | 101.8 | 102.9 | 99.3 | 99.8 | 100.4 | 101.9 | 98.8 |
| Refrigerating Capacity Ratio | % (relative to R410A) | 83.5 | 75.4 | 111.6 | 97.6 | 90.0 | 77.6 | 103.8 |
| Condensation Glide | ° C. | 10.3 | 12.5 | 2.9 | 6.4 | 8.6 | 11.8 | 4.7 |

| Item | Unit | Example264 | Example265 | Com Ex451 | Com Ex452 | Example266 | Com Ex453 | Example267 |
|---|---|---|---|---|---|---|---|---|
| HFO-1132 (E) | mass % | 40.0 | 40.0 | 40.0 | 50.0 | 50.0 | 60.0 | 60.0 |
| R32 | mass % | 22.0 | 12.0 | 2.0 | 22.0 | 12.0 | 12.0 | 4.5 |
| R1234 (ze + yf) (r = 0.25) | mass % | 35.0 | 45.0 | 55.0 | 25.0 | 35.0 | 25.0 | 32.5 |
| CO2 | mass % | 3.0 | 3.0 | 3.0 | 3.0 | 3.0 | 3.0 | 3.0 |
| GWP | — | 151 | 84 | 17 | 150 | 83 | 83 | 33 |
| COP ratio | % (relative to R410A) | 99.7 | 100.6 | 101.6 | 98.7 | 99.5 | 98.6 | 99.3 |
| Refrigerating Capacity Ratio | % (relative to R410A) | 92.2 | 83.8 | 74.7 | 98.2 | 89.8 | 95.6 | 89.0 |
| Condensation Glide | ° C. | 7.9 | 10.0 | 11.7 | 6.1 | 8.1 | 6.4 | 7.8 |

TABLE 55

3% $CO_2$
r = 0.5

| Item | Unit | Com Ex454 | Example268 | Example269 | Com Ex455 | Com Ex456 | Example270 | Example271 | Example272 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 57.0 | 47.0 | 37.0 | 22.0 | 57.0 | 47.0 | 37.0 | 27.0 |
| R1234 (ze + yf) (r = 0.5) | mass % | 30.0 | 40.0 | 50.0 | 65.0 | 20.0 | 30.0 | 40.0 | 50.0 |
| CO2 | mass % | 3.0 | 3.0 | 3.0 | 3.0 | 3.0 | 3.0 | 3.0 | 3.0 |
| GWP | — | 386 | 319 | 252 | 152 | 386 | 319 | 252 | 185 |
| COP ratio | % (relative to R410A) | 101 | 101.2 | 101.6 | 102.8 | 100.0 | 100.2 | 100.4 | 101.0 |
| Refrigerating Capacity Ratio | % (relative to R410A) | 100 | 93.4 | 86.4 | 74.9 | 106.2 | 99.8 | 92.9 | 85.4 |
| Condensation Glide | ° C. | 4.8 | 6.4 | 8.3 | 11.3 | 3.8 | 5.2 | 7.0 | 9.0 |

| Item | Unit | Com Ex457 | Com Ex458 | Example273 | Example274 | Example275 | Com Ex459 | Com Ex460 | Example276 |
|---|---|---|---|---|---|---|---|---|---|
| HFO-1132 (E) | mass % | 20.0 | 30.0 | 30.0 | 30.0 | 30.0 | 30.0 | 40.0 | 40.0 |
| R32 | mass % | 17.0 | 57.0 | 37.0 | 27.0 | 17.0 | 7.0 | 37.0 | 22.0 |
| R1234 (ze + yf) (r = 0.5) | mass % | 60.0 | 10.0 | 30.0 | 40.0 | 50.0 | 60.0 | 20.0 | 35.0 |

TABLE 55-continued

| | | | | | | | | | |
|---|---|---|---|---|---|---|---|---|---|
| CO2 | mass % | 3.0 | 3.0 | 3.0 | 3.0 | 3.0 | 3.0 | 3.0 | 3.0 |
| GWP | — | 118 | 386 | 252 | 185 | 118 | 51 | 251 | 151 |
| COP ratio | % (relative to R410A) | 101.9 | 99.2 | 99.4 | 99.9 | 100.6 | 101.6 | 98.6 | 99.2 |
| Refrigerating Capacity Ratio | % (relative to R410A) | 77.5 | 112.0 | 99.0 | 91.6 | 83.7 | 75.0 | 104.8 | 93.6 |
| Condensation Glide | ° C. | 11.0 | 2.6 | 5.6 | 7.5 | 9.5 | 11.2 | 4.2 | 6.9 |

| Item | Unit | Example277 | Com Ex461 | Com Ex462 | Example278 | Example279 | Com Ex463 | Example280 |
|---|---|---|---|---|---|---|---|---|
| HFO-1132 (E) | mass % | 40.0 | 40.0 | 50.0 | 50.0 | 50.0 | 60.0 | 60.0 |
| R32 | mass % | 12.0 | 2.0 | 22.0 | 12.0 | 2.0 | 12.0 | 4.5 |
| R1234 (ze + yf) (r = 0.5) | mass % | 45.0 | 55.0 | 25.0 | 35.0 | 45.0 | 25.0 | 32.5 |
| CO2 | mass % | 3.0 | 3.0 | 3.0 | 3.0 | 3.0 | 3.0 | 3.0 |
| GWP | — | 84 | 17 | 150 | 83 | 16 | 83 | 33 |
| COP ratio | % (relative to R410A) | 100.0 | 100.9 | 98.4 | 99.0 | 99.9 | 98.3 | 98.9 |
| Refrigerating Capacity Ratio | % (relative to R410A) | 85.5 | 76.4 | 99.2 | 91.2 | 82.3 | 96.7 | 90.2 |
| Condensation Glide | ° C. | 8.8 | 10.4 | 5.4 | 7.2 | 8.8 | 5.7 | 7.0 |

TABLE 56

| | | 3% $CO_2$ r = 0.75 | | | | | | | |
|---|---|---|---|---|---|---|---|---|---|
| Item | Unit | Com Ex464 | Example281 | Example282 | Example283 | Com Ex465 | Com Ex466 | Example284 | Example285 |
| HFO-1132 (E) | mass % | 10.0 | 10.0 | 10.0 | 10.0 | 10.0 | 20.0 | 20.0 | 20.0 |
| R32 | mass % | 57.0 | 47.0 | 37.0 | 27.0 | 22.0 | 57.0 | 47.0 | 37.0 |
| R1234 (ze + yf) (r = 0.75) | mass % | 30.0 | 40.0 | 50.0 | 60.0 | 65.0 | 20.0 | 30.0 | 40.0 |
| CO2 | mass % | 3.0 | 3.0 | 3.0 | 3.0 | 3.0 | 3.0 | 3.0 | 3.0 |
| GWP | — | 386 | 319 | 252 | 185 | 152 | 386 | 319 | 252 |
| COP ratio | % (relative to R410A) | 100.7 | 100.7 | 100.9 | 101.5 | 101.9 | 99.8 | 99.8 | 99.9 |
| Refrigerating Capacity Ratio | % (relative to R410A) | 101.3 | 95.2 | 88.4 | 81.0 | 77.1 | 107.1 | 101.1 | 94.5 |
| Condensation Glide | ° C. | 4.1 | 5.4 | 7.0 | 8.8 | 9.8 | 3.3 | 4.4 | 5.9 |

| Item | Unit | Example286 | Com Ex467 | Com Ex468 | Example287 | Example288 | Example289 | Com Ex469 | Com Ex470 |
|---|---|---|---|---|---|---|---|---|---|
| HFO-1132 (E) | mass % | 20.0 | 20.0 | 30.0 | 30.0 | 30.0 | 30.0 | 30.0 | 40.0 |
| R32 | mass % | 27.0 | 12.0 | 57.0 | 37.0 | 27.0 | 17.0 | 7.0 | 37.0 |
| R1234 (ze + yf) (r = 0.75) | mass % | 50.0 | 65.0 | 10.0 | 30.0 | 40.0 | 50.0 | 60.0 | 20.0 |
| CO2 | mass % | 3.0 | 3.0 | 3.0 | 3.0 | 3.0 | 3.0 | 3.0 | 3.0 |
| GWP | — | 185 | 84 | 386 | 251 | 184 | 117 | 50 | 251 |
| COP ratio | % (relative to R410A) | 100.3 | 101.6 | 99.1 | 99.1 | 99.3 | 99.9 | 100.8 | 98.4 |
| Refrigerating Capacity Ratio | % (relative to R410A) | 87.3 | 75.2 | 112.5 | 100.3 | 93.2 | 85.5 | 76.9 | 105.7 |
| Condensation Glide | ° C. | 7.7 | 10.5 | 2.4 | 4.8 | 6.4 | 8.2 | 10.0 | 3.7 |

| Item | Unit | Example290 | Example291 | Com Ex471 | Com Ex472 | Example292 | Example293 | Com Ex473 | Example294 |
|---|---|---|---|---|---|---|---|---|---|
| HFO-1132 (E) | mass % | 40.0 | 40.0 | 40.0 | 50.0 | 50.0 | 50.0 | 60.0 | 50.0 |
| R32 | mass % | 22.0 | 12.0 | 2.0 | 22.0 | 12.0 | 2.0 | 12.0 | 4.5 |
| R1234 (ze + yf) (r = 0.75) | mass % | 35.0 | 45.0 | 55.0 | 25.0 | 35.0 | 45.0 | 25.0 | 32.5 |
| CO2 | mass % | 3.0 | 3.0 | 3.0 | 3.0 | 3.0 | 3.0 | 3.0 | 3.0 |
| GWP | — | 151 | 83 | 16 | 150 | 83 | 16 | 83 | 32 |
| COP ratio | % (relative to R410A) | 98.7 | 99.4 | 100.2 | 98.1 | 98.6 | 99.4 | 98.1 | 98.5 |
| Refrigerating Capacity Ratio | % (relative to R410A) | 95.0 | 87.1 | 78.1 | 100.3 | 92.5 | 83.8 | 97.7 | 91.4 |
| Condensation Glide | ° C. | 6.0 | 7.7 | 9.2 | 4.7 | 6.3 | 7.8 | 5.1 | 6.2 |

TABLE 57

4% $CO_2$
r = 0

| Item | Unit | Com Ex474 | Example295 | Example296 | Com Ex475 | Com Ex476 | Example297 | Example298 | Example299 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 56.0 | 46.0 | 36.0 | 26.0 | 56.0 | 46.0 | 36.0 | 26.0 |
| R1234 (ze + yf) (r = 0) | mass % | 30.0 | 40.0 | 50.0 | 60.0 | 20.0 | 30.0 | 40.0 | 50.0 |
| CO2 | mass % | 4.0 | 4.0 | 4.0 | 4.0 | 4.0 | 4.0 | 4.0 | 4.0 |
| GWP | — | 380 | 313 | 246 | 179 | 379 | 313 | 246 | 179 |
| COP ratio | % (relative to R410A) | 101 | 101.9 | 102.8 | 104.0 | 100.1 | 100.5 | 101.2 | 102.3 |
| Refrigerating Capacity Ratio | % (relative to R410A) | 98.6 | 91.3 | 83.8 | 75.9 | 105.8 | 98.5 | 90.9 | 83.0 |
| Condensation Glide | ° C. | 7.1 | 9.4 | 11.8 | 14.3 | 5.4 | 7.6 | 10.0 | 12.6 |

| Item | Unit | Com Ex477 | Com Ex478 | Example300 | Example301 | Example302 | Com Ex479 | Com Ex480 | Example303 |
|---|---|---|---|---|---|---|---|---|---|
| HFO-1132 (E) | mass % | 20.0 | 30.0 | 30.0 | 30.0 | 30.0 | 30.0 | 40.0 | 40.0 |
| R32 | mass % | 16.0 | 56.0 | 41.0 | 31.0 | 21.0 | 11.0 | 36.0 | 26.0 |
| R1234 (ze + yf) (r = 0) | mass % | 60.0 | 10.0 | 25.0 | 35.0 | 45.0 | 55.0 | 20.0 | 30.0 |
| CO2 | mass % | 4.0 | 4.0 | 4.0 | 4.0 | 4.0 | 4.0 | 4.0 | 4.0 |
| GWP | — | 112 | 379 | 279 | 212 | 145 | 78 | 245 | 178 |
| COP ratio | % (relative to R410A) | 103.5 | 99.0 | 99.5 | 100.2 | 101.2 | 102.5 | 98.6 | 99.3 |
| Refrigerating Capacity Ratio | % (relative to R410A) | 74.7 | 112.6 | 101.6 | 93.8 | 85.7 | 77.1 | 104.4 | 96.4 |
| Condensation Glide | ° C. | 15.0 | 3.6 | 6.8 | 9.2 | 11.8 | 14.2 | 5.9 | 8.4 |

| Item | Unit | Example304 | Com Ex481 | Com Ex482 | Example305 | Example306 | Com Ex483 | Example307 |
|---|---|---|---|---|---|---|---|---|
| HFO-1132 (E) | mass % | 40.0 | 40.0 | 50.0 | 50.0 | 50.0 | 60.0 | 60.0 |
| R32 | mass % | 16.0 | 1.0 | 21.0 | 11.0 | 6.0 | 11.0 | 3.5 |
| R1234 (ze + yf) (r = 0) | mass % | 40.0 | 55.0 | 25.0 | 35.0 | 40.0 | 25.0 | 32.5 |
| CO2 | mass % | 4.0 | 4.0 | 4.0 | 4.0 | 4.0 | 4.0 | 4.0 |
| GWP | — | 111 | 10 | 144 | 77 | 43 | 76 | 26 |
| COP ratio | % (relative to R410A) | 100.3 | 102.4 | 98.6 | 99.5 | 100.1 | 98.5 | 99.2 |
| Refrigerating Capacity Ratio | % (relative to R410A) | 88.0 | 74.4 | 98.6 | 90.0 | 85.5 | 96.2 | 89.4 |
| Condensation Glide | ° C. | 10.9 | 14.2 | 7.5 | 10.0 | 11.1 | 7.9 | 9.6 |

TABLE 58

4% $CO_2$
r = 0.25

| Item | Unit | Com Ex484 | Example308 | Example309 | Com Ex485 | Com Ex486 | Example310 | Example311 | Example312 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 56.0 | 45.0 | 36.0 | 26.0 | 56.0 | 46.0 | 36.0 | 26.0 |
| R1234 (ze + yf) (r = 0.25) | mass % | 30.0 | 40.0 | 50.0 | 60.0 | 20.0 | 30.0 | 40.0 | 50.0 |
| CO2 | mass % | 4.0 | 4.0 | 4.0 | 4.0 | 4.0 | 4.0 | 4.0 | 4.0 |
| GWP | | 380 | 313 | 246 | 179 | 379 | 312 | 245 | 178 |
| COP ratio | % (relative to R410A) | 101.0 | 101.3 | 102.0 | 103.0 | 99.9 | 100.1 | 100.6 | 101.4 |
| Refrigerating Capacity Ratio | % (relative to R410A) | 100.1 | 93.1 | 85.8 | 78.2 | 106.8 | 99.9 | 92.6 | 85.0 |
| Condensation Glide | ° C. | 6.3 | 8.2 | 10.5 | 12.8 | 4.8 | 6.7 | 8.9 | 11.2 |

| Item | Unit | Com Ex487 | Com Ex488 | Example313 | Example314 | Example315 | Com Ex489 | Com Ex490 | Example316 |
|---|---|---|---|---|---|---|---|---|---|
| HFO-1132 (E) | mass % | 20.0 | 30.0 | 30.0 | 30.0 | 30.0 | 30.0 | 40.0 | 40.0 |
| R32 | mass % | 16.0 | 56.0 | 41.0 | 31.0 | 21.0 | 6.0 | 36.0 | 26.0 |
| R1234 (ze + yf) (r = 0.25) | mass % | 60.0 | 10.0 | 26.0 | 36.0 | 45.0 | 60.0 | 20.0 | 30.0 |
| CO2 | mass % | 4.0 | 4.0 | 4.0 | 4.0 | 4.0 | 4.0 | 4.0 | 4.0 |
| GWP | | 112 | 379 | 278 | 212 | 145 | 44 | 245 | 178 |
| COP ratio | % (relative to R410A) | 102.5 | 98.9 | 99.2 | 99.7 | 100.5 | 102.1 | 98.4 | 98.9 |

TABLE 58-continued

| | | | | | | | | |
|---|---|---|---|---|---|---|---|---|
| Refrigerating Capacity Ratio | % (relative to R410A) | 76.9 | 113.1 | 102.8 | 95.4 | 87.5 | 74.6 | 105.4 | 97.7 |
| Condensation Glide | ° C. | 13.5 | 3.4 | 6.0 | 8.2 | 10.6 | 13.9 | 5.3 | 7.5 |

| Item | Unit | Example317 | Com Ex491 | Com Ex492 | Example318 | Example319 | Com Ex493 | Example320 |
|---|---|---|---|---|---|---|---|---|
| HFO-1132 (E) | mass % | 40.0 | 40.0 | 50.0 | 50.0 | 50.0 | 60.0 | 60.0 |
| R32 | mass % | 16.0 | 1.0 | 21.0 | 11.0 | 5.0 | 11.0 | 3.5 |
| R1234 (ze + yf) (r = 0.25) | mass % | 40.0 | 55.0 | 25.0 | 35.0 | 40.0 | 25.0 | 32.5 |
| CO2 | mass % | 4.0 | 4.0 | 4.0 | 4.0 | 4.0 | 4.0 | 4.0 |
| GWP | | 111 | 10 | 144 | 77 | 43 | 76 | 26 |
| COP ratio | % (relative to R410A) | 99.7 | 101.2 | 98.2 | 99.0 | 99.5 | 98.2 | 98.8 |
| Refrigerating Capacity Ratio | % (relative to R410A) | 89.6 | 75.3 | 99.8 | 91.4 | 87.0 | 97.3 | 90.6 |
| Condensation Glide | ° C. | 9.8 | 12.9 | 6.8 | 9.0 | 10.1 | 7.2 | 8.8 |

TABLE 59

4% CO3
r = 0.5

| Item | Unit | Com Ex494 | Example321 | Example322 | Com Ex495 | Com Ex496 | Example323 | Example324 | Example325 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 56.0 | 46.0 | 36.0 | 21.0 | 56.0 | 46.0 | 36.0 | 26.0 |
| R1234 (ze + yf) (r = 0.5) | mass % | 30.0 | 40.0 | 50.0 | 65.0 | 20.0 | 30.0 | 40.0 | 50.0 |
| CO2 | mass % | 4.0 | 4.0 | 4.0 | 4.0 | 4.0 | 4.0 | 4.0 | 4.0 |
| GWP | | 380 | 313 | 246 | 145 | 379 | 312 | 245 | 178 |
| COP ratio | % (relative to R410A) | 101 | 100.8 | 101.3 | 102.5 | 99.7 | 99.8 | 100.1 | 100.7 |
| Refrigerating Capacity Ratio | % (relative to R410A) | 101 | 94.9 | 87.9 | 76.4 | 107.7 | 101.3 | 94.4 | 86.9 |
| Condensation Glide | ° C. | 5.5 | 7.1 | 9.1 | 12.3 | 4.3 | 5.9 | 7.7 | 9.8 |

| Item | Unit | Com Ex477 | Com Ex478 | Example300 | Example301 | Example302 | Com Ex479 | Com Ex480 | Example303 |
|---|---|---|---|---|---|---|---|---|---|
| HFO-1132 (E) | mass % | 20.0 | 30.0 | 30.0 | 30.0 | 30.0 | 30.0 | 40.0 | 40.0 |
| R32 | mass % | 16.0 | 56.0 | 41.0 | 31.0 | 21.0 | 6.0 | 36.0 | 26.0 |
| R1234 (ze + yf) (r = 0.5) | mass % | 60.0 | 10.0 | 25.0 | 35.0 | 45.0 | 60.0 | 20.0 | 30.0 |
| CO2 | mass % | 4.0 | 4.0 | 4.0 | 4.0 | 4.0 | 4.0 | 4.0 | 4.0 |
| GWP | | 111 | 379 | 278 | 211 | 144 | 44 | 244 | 177 |
| COP ratio | % (relative to R410A) | 101.6 | 98.8 | 98.9 | 99.2 | 99.8 | 101.3 | 98.2 | 98.5 |
| Refrigerating Capacity Ratio | % (relative to R410A) | 78.9 | 113.6 | 104.0 | 96.9 | 89.3 | 76.6 | 106.3 | 99.0 |
| Condensation Glide | ° C. | 12.0 | 3.1 | 5.3 | 7.2 | 9.3 | 12.4 | 4.8 | 6.7 |

| Item | Unit | Example330 | Com Ex501 | Com Ex502 | Example331 | Example332 | Com Ex503 | Example333 |
|---|---|---|---|---|---|---|---|---|
| HFO-1132 (E) | mass % | 40.0 | 40.0 | 50.0 | 50.0 | 50.0 | 60.0 | 60.0 |
| R32 | mass % | 16.0 | 1.0 | 21.0 | 11.0 | 6.0 | 11.0 | 3.5 |
| R1234 (ze + yf) (r = 0.5) | mass % | 40.0 | 55.0 | 25.0 | 35.0 | 40.0 | 25.0 | 32.5 |
| CO2 | mass % | 4.0 | 4.0 | 4.0 | 4.0 | 4.0 | 4.0 | 4.0 |
| GWP | | 110 | 10 | 144 | 77 | 43 | 76 | 26 |
| COP ratio | % (relative to R410A) | 99.1 | 100.5 | 97.9 | 98.6 | 99.0 | 97.9 | 98.4 |
| Refrigerating Capacity Ratio | % (relative to R410A) | 91.2 | 78.0 | 100.9 | 92.8 | 88.5 | 98.3 | 91.9 |
| Condensation Glide | ° C. | 8.7 | 11.6 | 6.1 | 8.1 | 9.1 | 6.6 | 8.0 |

TABLE 60

4% $CO_2$
r = 0.75

| Item | Unit | Com Ex504 | Example334 | Example335 | Example336 | Com Ex505 | Com Ex506 | Example337 | Example338 |
|---|---|---|---|---|---|---|---|---|---|
| HFO-1132 (E) | mass % | 10.0 | 10.0 | 10.0 | 10.0 | 10.0 | 20.0 | 20.0 | 20.0 |
| R32 | mass % | 56.0 | 46.0 | 35.0 | 26.0 | 16.0 | 56.0 | 46.0 | 36.0 |
| R1234 (ze + yf) (r = 0.75) | mass % | 30.0 | 40.0 | 50.0 | 60.0 | 70.0 | 20.0 | 30.0 | 40.0 |
| CO2 | mass % | 4.0 | 4.0 | 4.0 | 4.0 | 4.0 | 4.0 | 4.0 | 4.0 |
| GWP | | 379 | 312 | 245 | 178 | 111 | 379 | 312 | 245 |
| COP ratio | % (relative to R410A) | 100.3 | 100.4 | 100.6 | 101.2 | 102.1 | 99.4 | 99.4 | 99.6 |
| Refrigerating Capacity Ratio | % (relative to R410A) | 102.8 | 96.7 | 89.9 | 82.5 | 74.4 | 108.7 | 102.7 | 96.1 |
| Condensation Glide | ° C. | 4.7 | 6.0 | 7.7 | 9.8 | 11.9 | 3.8 | 5.0 | 6.6 |

| Item | Unit | Example339 | Com Ex507 | Com Ex508 | Example340 | Example341 | Example342 | Com Ex509 | Com Ex510 |
|---|---|---|---|---|---|---|---|---|---|
| HFO-1132 (E) | mass % | 20.0 | 20.0 | 30.0 | 30.0 | 30.0 | 30.0 | 30.0 | 40.0 |
| R32 | mass % | 26.0 | 11.0 | 56.0 | 41.0 | 31.0 | 21.0 | 1.0 | 36.0 |
| R1234 (ze + yf) (r = 0.75) | mass % | 50.0 | 65.0 | 10.0 | 25.0 | 35.0 | 45.0 | 65.0 | 20.0 |
| CO2 | mass % | 4.0 | 4.0 | 4.0 | 4.0 | 4.0 | 4.0 | 4.0 | 4.0 |
| GWP | | 178 | 77 | 379 | 278 | 211 | 144 | 10 | 244 |
| COP ratio | % (relative to R410A) | 100.0 | 101.2 | 98.7 | 98.6 | 98.8 | 99.2 | 100.9 | 98.0 |
| Refrigerating Capacity Ratio | % (relative to R410A) | 88.8 | 76.7 | 114.1 | 105.1 | 98.4 | 91.0 | 73.6 | 107.3 |
| Condensation Glide | ° C. | 8.5 | 11.6 | 2.9 | 4.7 | 6.2 | 8.1 | 11.9 | 4.3 |

| Item | Unit | Example343 | Example344 | Example345 | Com Ex511 | Example346 | Example347 | Com Ex512 | Examp1e348 |
|---|---|---|---|---|---|---|---|---|---|
| HFO-1132 (E) | mass % | 40.0 | 40.0 | 40.0 | 50.0 | 50.0 | 50.0 | 60.0 | 60.0 |
| R32 | mass % | 26.0 | 16.0 | 6.0 | 21.0 | 11.0 | 6.0 | 11.0 | 3.5 |
| R1234 (ze + yf) (r = 0.75) | mass % | 30.0 | 40.0 | 50.0 | 25.0 | 35.0 | 40.0 | 25.0 | 32.5 |
| CO2 | mass % | 4.0 | 4.0 | 4.0 | 4.0 | 4.0 | 4.0 | 4.0 | 4.0 |
| GWP | | 177 | 110 | 43 | 143 | 76 | 43 | 76 | 26 |
| COP ratio | % (relative to R410A) | 98.1 | 98.6 | 99.4 | 97.7 | 98.2 | 98.5 | 97.6 | 98.1 |
| Refrigerating Capacity Ratio | % (relative to R410A) | 100.3 | 92.7 | 84.3 | 101.9 | 94.1 | 89.9 | 99.3 | 93.1 |
| Condensation Glide | ° C. | 5.8 | 7.7 | 9.6 | 5.4 | 7.2 | 8.1 | 5.9 | 7.2 |

TABLE 61

5% $CO_2$
r = 0

| Item | Unit | Com Ex513 | Example349 | Example350 | Com Ex514 | Com Ex515 | Example351 | Example352 | Example353 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 55.0 | 45.0 | 35.0 | 25.0 | 55.0 | 45.0 | 35.0 | 25.0 |
| R1234 (ze + yf) (r = 0) | mass % | 30.0 | 40.0 | 50.0 | 60.0 | 20.0 | 30.0 | 40.0 | 50.0 |
| CO2 | mass % | 5.0 | 5.0 | 5.0 | 5.0 | 5.0 | 5.0 | 5.0 | 5.0 |
| GWP | | 373 | 306 | 239 | 173 | 373 | 306 | 239 | 172 |
| COP ratio | % (relative to R410A) | 101 | 101.5 | 102.5 | 103.7 | 99.7 | 100.1 | 100.9 | 101.9 |
| Refrigerating Capacity Ratio | % (relative to R410A) | 100 | 92.8 | 85.2 | 77.3 | 107.3 | 100.0 | 92.4 | 84.5 |
| Condensation Glide | ° C. | 7.7 | 10.1 | 12.7 | 15.3 | 5.9 | 8.2 | 10.8 | 13.5 |

| Item | Unit | Com Ex516 | Com Ex517 | Example354 | Example355 | Example356 | Com Ex518 | Com Ex519 | Example357 |
|---|---|---|---|---|---|---|---|---|---|
| HFO-1132 (E) | mass % | 20.0 | 30.0 | 30.0 | 30.0 | 30.0 | 30.0 | 40.0 | 40.0 |
| R32 | mass % | 15.0 | 55.0 | 40.0 | 30.0 | 20.0 | 10.0 | 35.0 | 25.0 |
| R1234 (ze + yf) (r = 0) | mass % | 60.0 | 10.0 | 25.0 | 35.0 | 46.0 | 55.0 | 20.0 | 30.0 |
| CO2 | mass % | 5.0 | 5.0 | 5.0 | 5.0 | 5.0 | 5.0 | 5.0 | 5.0 |
| GWP | | 105 | 372 | 272 | 205 | 138 | 71 | 238 | 171 |
| COP ratio | % (relative to R410A) | 103.2 | 98.6 | 99.1 | 99.8 | 100.9 | 102.1 | 98.2 | 98.9 |

TABLE 61-continued

| | | | | | | | | | |
|---|---|---|---|---|---|---|---|---|---|
| Refrigerating Capacity Ratio | % (relative to R410A) | 76.2 | 114.2 | 103.2 | 95.3 | 87.2 | 78.7 | 106.0 | 97.9 |
| Condensation Glide | ° C. | 15.1 | 4.1 | 7.4 | 10.0 | 12.7 | 15.3 | 6.5 | 9.1 |

| Item | Unit | Example358 | Com Ex520 | Com Ex521 | Example359 | Example360 | Com Ex522 | Example361 |
|---|---|---|---|---|---|---|---|---|
| HFO-1132 (E) | mass % | 40.0 | 40.0 | 50.0 | 50.0 | 50.0 | 60.0 | 60.0 |
| R32 | mass % | 15.0 | 0.0 | 20.0 | 10.0 | 5.0 | 10.0 | 2.5 |
| R1234 (ze + yf) (r = 0) | mass % | 40.0 | 55.0 | 25.0 | 35.0 | 40.0 | 25.0 | 32.5 |
| CO2 | mass % | 5.0 | 5.0 | 5.0 | 5.0 | 5.0 | 5.0 | 5.0 |
| GWP | | 104 | 4 | 137 | 70 | 37 | 70 | 19 |
| COP ratio | % (relative to R410A) | 99.9 | 101.7 | 98.3 | 99.1 | 99.7 | 98.0 | 98.8 |
| Refrigerating Capacity Ratio | % (relative to R410A) | 89.6 | 76.0 | 100.2 | 91.6 | 87.1 | 97.9 | 91.0 |
| Condensation Glide | ° C. | 11.8 | 15.4 | 8.2 | 10.8 | 12.1 | 8.7 | 10.5 |

TABLE 62

5% $CO_2$
r = 0.25

| Item | Unit | Com Ex523 | Example362 | Example363 | Com Ex524 | Com Ex525 | Example364 | Example365 | Example366 |
|---|---|---|---|---|---|---|---|---|---|
| HFO-1132 (E) | mass % | 10.0 | 10.0 | 10.0 | 10.0 | 10.0 | 20.0 | 20.0 | 20.0 |
| R32 | mass % | 55.0 | 45.0 | 35.0 | 20.0 | 55.0 | 45.0 | 35.0 | 25.0 |
| R1234 (ze + yf) (r = 0.25) | mass % | 30.0 | 40.0 | 50.0 | 65.0 | 20.0 | 30.0 | 40.0 | 50.0 |
| CO2 | mass % | 5.0 | 5.0 | 5.0 | 5.0 | 5.0 | 5.0 | 5.0 | 5.0 |
| GWP | | 373 | 306 | 239 | 139 | 373 | 306 | 239 | 172 |
| COP ratio | % (relative to R410A) | 100.6 | 101.0 | 101.7 | 103.2 | 99.5 | 99.8 | 100.3 | 101.1 |
| Refrigerating Capacity Ratio | % (relative to R410A) | 101.6 | 94.6 | 87.3 | 75.6 | 108.3 | 101.5 | 94.2 | 86.5 |
| Condensation Glide | ° C. | 6.9 | 9.0 | 11.3 | 15.0 | 5.4 | 7.3 | 9.6 | 12.1 |
| **Item** | **Unit** | **Com Ex526** | **Com Ex527** | **Example367** | **Example368** | **Example369** | **Com Ex528** | **Com Ex529** | **Example370** |
| HFO-1132 (E) | mass % | 20.0 | 30.0 | 30.0 | 30.0 | 30.0 | 30.0 | 40.0 | 40.0 |
| R32 | mass % | 10.0 | 55.0 | 40.0 | 30.0 | 20.0 | 5.0 | 35.0 | 25.0 |
| R1234 (ze + yf) (r = 0.25) | mass % | 65.0 | 10.0 | 25.0 | 36.0 | 45.0 | 60.0 | 20.0 | 30.0 |
| CO2 | mass % | 5.0 | 5.0 | 5.0 | 5.0 | 5.0 | 5.0 | 5.0 | 5.0 |
| GWP | | 71 | 372 | 272 | 205 | 138 | 37 | 238 | 171 |
| COP ratio | % (relative to R410A) | 102.8 | 98.5 | 98.8 | 99.3 | 100.1 | 101.8 | 98.0 | 98.5 |
| Refrigerating Capacity Ratio | % (relative to R410A) | 74.0 | 114.7 | 104.4 | 96.9 | 89.4 | 76.2 | 107.0 | 99.3 |
| Condensation Glide | ° C. | 15.7 | 3.8 | 6.6 | 8.9 | 11.4 | 15.0 | 5.9 | 8.2 |
| **Item** | **Unit** | **Example371** | **Example372** | **Com Ex530** | **Com Ex531** | **Example373** | **Example374** | **Com Ex532** | **Example375** |
| HFO-1132 (E) | mass % | 40.0 | 40.0 | 40.0 | 50.0 | 50.0 | 50.0 | 60.0 | 60.0 |
| R32 | mass % | 15.0 | 5.0 | 0.0 | 20.0 | 10.0 | 5.0 | 10.0 | 2.5 |
| R1234 (ze + yf) (r = 0.25) | mass % | 40.0 | 50.0 | 55.0 | 25.0 | 35.0 | 40.0 | 25.0 | 32.5 |
| CO2 | mass % | 5.0 | 5.0 | 5.0 | 5.0 | 5.0 | 5.0 | 5.0 | 5.0 |
| GWP | | 104 | 37 | 3 | 137 | 70 | 37 | 70 | 19 |
| COP ratio | % (relative to R410A) | 99.3 | 100.3 | 100.8 | 97.8 | 98.6 | 99.1 | 97.7 | 92.3 |
| Refrigerating Capacity Ratio | % (relative to R410A) | 91.2 | 82.5 | 77.9 | 101.4 | 93.0 | 88.7 | 98.9 | 92.3 |
| Condensation Glide | ° C. | 10.7 | 18.1 | 14.2 | 7.6 | 9.9 | 11.1 | 8.0 | 9.7 |

TABLE 63

| 5% $CO_2$ r = 0.5 | | | | | | | | | |
|---|---|---|---|---|---|---|---|---|---|
| Item | Unit | Com Ex533 | Example376 | Example377 | Com Ex534 | Com Ex535 | Example378 | Example379 | Example380 |
| HFO-1132 (E) | mass % | 10.0 | 10.0 | 10.0 | 10.0 | 20.0 | 20.0 | 20.0 | 20.0 |
| R32 | mass % | 55.0 | 45.0 | 35.0 | 20.0 | 55.0 | 45.0 | 35.0 | 25.0 |
| R1234 (ze + yf) (r = 0.5) | mass % | 30.0 | 40.0 | 50.0 | 65.0 | 20.0 | 30.0 | 40.0 | 50.0 |
| CO2 | mass % | 5.0 | 5.0 | 5.0 | 5.0 | 5.0 | 5.0 | 5.0 | 5.0 |
| GWP | | 373 | 306 | 239 | 138 | 373 | 306 | 239 | 172 |
| COP ratio | % (relative to R410A) | 100 | 100.5 | 100.9 | 102.2 | 99.3 | 99.4 | 99.7 | 100.3 |
| Refrigerating Capacity Ratio | % (relative to R410A) | 103 | 96.4 | 89.4 | 77.9 | 109.3 | 102.9 | 95.9 | 88.5 |
| Condensation Glide | ° C. | 6.0 | 7.8 | 9.9 | 13.4 | 4.8 | 6.5 | 8.4 | 10.7 |
| Item | Unit | Com Ex536 | Com Ex537 | Example381 | Example382 | Example383 | Com Ex538 | Com Ex539 | Example384 |
| HFO-1132 (E) | mass % | 20.0 | 30.0 | 30.0 | 30.0 | 30.0 | 30.0 | 40.0 | 40.0 |
| R32 | mass % | 10.0 | 55.0 | 40.0 | 30.0 | 20.0 | 5.0 | 35.0 | 25.0 |
| R1234 (ze + yf) (r = 0.5) | mass % | 65.0 | 10.0 | 25.0 | 35.0 | 45.0 | 60.0 | 20.0 | 30.0 |
| CO2 | mass % | 5.0 | 5.0 | 5.0 | 5.0 | 5.0 | 5.0 | 5.0 | 5.0 |
| GWP | | 71 | 382 | 282 | 205 | 138 | 37 | 238 | 171 |
| COP ratio | % (relative to R410A) | 101.8 | 98.4 | 98.5 | 98.8 | 99.5 | 100.9 | 97.8 | 98.1 |
| Refrigerating Capacity Ratio | % (relative to R410A) | 76.2 | 115.2 | 105.6 | 98.4 | 90.8 | 78.1 | 107.9 | 100.6 |
| Condensation Glide | ° C. | 14.2 | 3.6 | 5.9 | 7.9 | 10.2 | 13.6 | 5.4 | 7.3 |
| Item | Unit | Example385 | Example386 | Com Ex540 | Example387 | Example388 | Com Ex541 | Example389 | |
| HFO-1132 (E) | mass % | 40.0 | 40.0 | 50.0 | 50.0 | 50.0 | 60.0 | 60.0 | |
| R32 | mass % | 15.0 | 5.0 | 20.0 | 10.0 | 5.0 | 10.0 | 2.5 | |
| R1234 (ze + yf) (r = 0.5) | mass % | 40.0 | 50.0 | 25.0 | 35.0 | 40.0 | 25.0 | 32.5 | |
| CO2 | mass % | 5.0 | 5.0 | 5.0 | 5.0 | 5.0 | 5.0 | 5.0 | |
| GWP | | 104 | 37 | 137 | 70 | 36 | 69 | 19 | |
| COP ratio | % (relative to R410A) | 98.7 | 99.6 | 97.5 | 98.2 | 98.6 | 97.4 | 98.0 | |
| Refrigerating Capacity Ratio | % (relative to R410A) | 92.8 | 94.3 | 102.5 | 94.4 | 90.1 | 100.0 | 93.6 | |
| Condensation Glide | ° C. | 9.6 | 11.8 | 6.8 | 9.0 | 10.1 | 7.4 | 8.9 | |

TABLE 64

| 5% $CO_2$ r = 0.75 | | | | | | | | | |
|---|---|---|---|---|---|---|---|---|---|
| Item | Unit | Com Ex542 | Example390 | Example391 | Example392 | Com Ex543 | Com Ex544 | Example393 | Example394 |
| HFO-1132 (E) | mass % | 10.0 | 10.0 | 10.0 | 10.0 | 10.0 | 20.0 | 20.0 | 20.0 |
| R32 | mass % | 55.0 | 45.0 | 35.0 | 25.0 | 15.0 | 55.0 | 45.0 | 35.0 |
| R1234 (ze + yf) (r = 0.75) | mass % | 30.0 | 40.0 | 50.0 | 60.0 | 70.0 | 20.0 | 30.0 | 40.0 |
| CO2 | mass % | 5.0 | 5.0 | 5.0 | 5.0 | 5.0 | 5.0 | 5.0 | 5.0 |
| GWP | | 373 | 306 | 239 | 172 | 105 | 372 | 305 | 238 |
| COP ratio | % (relative to R410A) | 100.0 | 100.0 | 100.3 | 100.9 | 101.8 | 99.1 | 99.1 | 99.2 |
| Refrigerating Capacity Ratio | % (relative to R410A) | 104.4 | 98.2 | 91.3 | 84.0 | 75.9 | 110.2 | 104.2 | 97.6 |
| Condensation Glide | ° C. | 5.3 | 6.7 | 8.5 | 10.7 | 13.0 | 4.3 | 5.6 | 7.3 |
| Item | Unit | Com Ex395 | Com Ex545 | Com Ex546 | Example396 | Example397 | Example398 | Com Ex547 | Example399 |
| HFO-1132 (E) | mass % | 20.0 | 20.0 | 30.0 | 30.0 | 30.0 | 30.0 | 30.0 | 40.0 |
| R32 | mass % | 25.0 | 5.0 | 55.0 | 40.0 | 30.0 | 20.0 | 10.0 | 35.0 |
| R1234 (ze + yf) (r = 0.75) | mass % | 50.0 | 70.0 | 10.0 | 25.0 | 35.0 | 45.0 | 55.0 | 20.0 |
| CO2 | mass % | 5.0 | 5.0 | 5.0 | 5.0 | 5.0 | 5.0 | 5.0 | 5.0 |
| GWP | | 171 | 37 | 372 | 271 | 204 | 137 | 70 | 238 |
| COP ratio | % (relative to R410A) | 99.6 | 101.4 | 98.3 | 98.3 | 98.4 | 98.8 | 99.7 | 97.6 |

TABLE 64-continued

| | | | | | | | | | |
|---|---|---|---|---|---|---|---|---|---|
| Refrigerating Capacity Ratio | % (relative to R410A) | 90.3 | 73.6 | 115.7 | 106.7 | 99.9 | 92.5 | 84.4 | 108.9 |
| Condensation Glide | ° C. | 9.3 | 13.8 | 3.3 | 5.2 | 6.9 | 8.9 | 11.2 | 4.8 |

| Item | Unit | Example400 | Example401 | Example402 | Com Ex548 | Example403 | Example404 | Com Ex549 | Example405 |
|---|---|---|---|---|---|---|---|---|---|
| HFO-1132 (E) | mass % | 40.0 | 40.0 | 40.0 | 50.0 | 50.0 | 50.0 | 60.0 | 60.0 |
| R32 | mass % | 25.0 | 15.0 | 5.0 | 20.0 | 10.0 | 5.0 | 10.0 | 2.5 |
| R1234 (ze + yf) (r = 0.75) | mass % | 30.0 | 40.0 | 50.0 | 25.0 | 35.0 | 40.0 | 25.0 | 32.5 |
| CO2 | mass % | 5.0 | 5.0 | 5.0 | 5.0 | 5.0 | 5.0 | 5.0 | 5.0 |
| GWP | | 171 | 104 | 36 | 137 | 70 | 36 | 69 | 19 |
| COP ratio | % (relative to R410A) | 97.7 | 98.2 | 99.0 | 97.2 | 97.8 | 98.1 | 97.2 | 97.7 |
| Refrigerating Capacity Ratio | % (relative to R410A) | 101.9 | 94.3 | 85.9 | 103.5 | 95.8 | 91.6 | 101.0 | 94.8 |
| Condensation Glide | ° C. | 6.5 | 8.5 | 10.6 | 6.1 | 9.1 | 9.1 | 6.7 | 8.1 |

TABLE 65

5.59% $CO_2$
r = 0

| Item | Unit | Com Ex550 | Example406 | Example407 | Com Ex551 | Com Ex552 | Example408 | Example409 | Example410 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 54.5 | 44.5 | 34.5 | 24.5 | 54.5 | 44.5 | 34.5 | 24.5 |
| R1234 (ze + yf) (r = 0) | mass % | 30.0 | 40.0 | 50.0 | 60.0 | 20.0 | 30.0 | 40.0 | 50.0 |
| CO2 | mass % | 5.5 | 5.5 | 5.5 | 5.5 | 5.5 | 5.5 | 5.5 | 5.5 |
| GWP | | 370 | 303 | 236 | 169 | 369 | 302 | 236 | 169 |
| COP ratio | % (relative to R410A) | 101 | 101.4 | 102.3 | 103.6 | 99.5 | 100.0 | 100.7 | 101.8 |
| Refrigerating Capacity Ratio | % (relative to R410A) | 101 | 93.5 | 85.9 | 78.1 | 108.1 | 100.8 | 93.1 | 85.2 |
| Condensation Glide | ° C. | 8.0 | 10.4 | 13.1 | 15.8 | 6.2 | 8.5 | 11.1 | 13.9 |

| Item | Unit | Com Ex553 | Com Ex554 | Example411 | Example412 | Example413 | Example414 | Com Ex555 | Com Ex556 |
|---|---|---|---|---|---|---|---|---|---|
| HFO-1132 (E) | mass % | 20.0 | 30.0 | 30.0 | 30.0 | 3.0 | 30.0 | 30.0 | 40.0 |
| R32 | mass % | 14.5 | 54.5 | 44.5 | 34.5 | 24.5 | 14.5 | 4.5 | 34.5 |
| R1234 (ze + yf) (r = 0) | mass % | 60.0 | 10.0 | 20.0 | 30.0 | 40.0 | 50.0 | 60.0 | 20.0 |
| CO2 | mass % | 5.5 | 5.5 | 5.5 | 5.5 | 5.5 | 5.5 | 5.5 | 5.5 |
| GWP | | 102 | 369 | 302 | 235 | 168 | 101 | 34 | 265 |
| COP ratio | % (relative to R410A) | 103.1 | 98.4 | 98.7 | 99.2 | 100.1 | 101.3 | 102.6 | 98.0 |
| Refrigerating Capacity Ratio | % (relative to R410A) | 76.9 | 115.0 | 107.7 | 100.0 | 92.1 | 83.8 | 74.9 | 106.8 |
| Condensation Glide | ° C. | 16.6 | 4.3 | 6.4 | 8.9 | 11.7 | 14.5 | 17.0 | 6.8 |

| Item | Unit | Example415 | Example416 | Example417 | Com Ex557 | Example418 | Example419 | Com Ex558 | Example420 |
|---|---|---|---|---|---|---|---|---|---|
| HFO-1132 (E) | mass % | 40.0 | 40.0 | 40.0 | 50.0 | 50.0 | 50.0 | 60.0 | 60.0 |
| R32 | mass % | 24.5 | 14.5 | 4.5 | 19.5 | 14.5 | 4.5 | 9.5 | 4.5 |
| R1234 (ze + yf) (r = 0) | mass % | 30.0 | 40.0 | 50.0 | 25.0 | 30.0 | 40.0 | 25.0 | 30.0 |
| CO2 | mass % | 5.5 | 5.5 | 5.5 | 5.5 | 5.5 | 5.5 | 5.5 | 5.5 |
| GWP | | 168 | 101 | 34 | 134 | 100 | 33 | 66 | 33 |
| COP ratio | % (relative to R410A) | 98.7 | 98.7 | 100.9 | 97.9 | 98.4 | 99.5 | 97.8 | 98.3 |
| Refrigerating Capacity Ratio | % (relative to R410A) | 98.7 | 90.4 | 81.5 | 101.0 | 96.8 | 87.9 | 98.7 | 94.2 |
| Condensation Glide | ° C. | 9.4 | 12.2 | 14.8 | 8.5 | 9.9 | 12.6 | 9.0 | 10.3 |

TABLE 66

| 5.5% $CO_2$ r = 0.25 | | | | | | | | | |
|---|---|---|---|---|---|---|---|---|---|
| Item | Unit | Com Ex559 | Example421 | Example422 | Com Ex560 | Com Ex561 | Example423 | Example424 | Example425 |
| HFO-1132 (E) | mass % | 10.0 | 10.0 | 10.0 | 10.0 | 20.0 | 20.0 | 20.0 | 20.0 |
| R32 | mass % | 54.0 | 44.0 | 34.0 | 19.0 | 54.0 | 44.0 | 34.0 | 24.0 |
| R1234 (ze + yf) (r = 0.25) | mass % | 30.0 | 40.0 | 50.0 | 65.0 | 20.0 | 30.0 | 40.0 | 50.0 |
| CO2 | mass % | 6.0 | 6.0 | 6.0 | 6.0 | 6.0 | 6.0 | 6.0 | 6.0 |
| GWP | | 366 | 299 | 232 | 132 | 366 | 299 | 232 | 165 |
| COP ratio | % (relative to R410A) | 100.3 | 100.7 | 101.4 | 103.0 | 99.1 | 99.4 | 99.9 | 100.8 |
| Refrigerating Capacity Ratio | % (relative to R410A) | 103.1 | 96.1 | 88.8 | 77.1 | 109.9 | 103.0 | 95.7 | 88.0 |
| Condensation Glide | ° C. | 7.5 | 9.6 | 12.1 | 16.0 | 5.9 | 7.9 | 10.3 | 12.9 |
| Item | Unit | Com Ex562 | Com Ex563 | Example426 | Example427 | Example428 | Example429 | Com Ex564 | Com Ex565 |
| HFO-1132 (E) | mass % | 20.0 | 30.0 | 30.0 | 30.0 | 30.0 | 30.0 | 30.0 | 40.0 |
| R32 | mass % | 9.0 | 54.0 | 44.0 | 34.0 | 24.0 | 14.0 | 0.0 | 34.0 |
| R1234 (ze + yf) (r = 0.25) | mass % | 65.0 | 10.0 | 20.0 | 30.0 | 40.0 | 50.0 | 64.0 | 20.0 |
| CO2 | mass % | 6.0 | 6.0 | 6.0 | 6.0 | 6.0 | 6.0 | 6.0 | 6.0 |
| GWP | | 65 | 365 | 298 | 232 | 165 | 98 | 4 | 231 |
| COP ratio | % (relative to R410A) | 102.5 | 98.1 | 98.3 | 98.6 | 99.3 | 100.3 | 101.8 | 97.6 |
| Refrigerating Capacity Ratio | % (relative to R410A) | 75.6 | 116.3 | 109.5 | 102.2 | 94.6 | 86.5 | 74.0 | 108.5 |
| Condensation Glide | ° C. | 16.9 | 4.3 | 6.1 | 8.4 | 10.9 | 13.6 | 17.1 | 6.5 |
| Item | Unit | Example430 | Example431 | Example432 | Com Ex566 | Example433 | Example434 | Com Ex567 | Example435 |
| HFO-1132 (E) | mass % | 40.0 | 40.0 | 40.0 | 50.0 | 50.0 | 50.0 | 60.0 | 60.0 |
| R32 | mass % | 24.0 | 14.0 | 24.0 | 14.0 | 4.0 | 4.0 | 14.0 | 4.0 |
| R1234 (ze + yf) (r = 0.25) | mass % | 30.0 | 40.0 | 50.0 | 20.0 | 30.0 | 40.0 | 20.0 | 30.0 |
| CO2 | mass % | 6.0 | 6.0 | 6.0 | 6.0 | 6.0 | 6.0 | 6.0 | 6.0 |
| GWP | | 164 | 97 | 30 | 164 | 97 | 30 | 96 | 29 |
| COP ratio | % (relative to R410A) | 98.1 | 98.9 | 100.0 | 97.1 | 97.8 | 98.7 | 96.9 | 97.7 |
| Refrigerating Capacity Ratio | % (relative to R410A) | 100.9 | 92.8 | 84.2 | 107.0 | 98.9 | 90.3 | 104.8 | 96.3 |
| Condensation Glide | ° C. | 8.9 | 11.5 | 14.1 | 6.9 | 9.4 | 12.0 | 7.5 | 10.0 |

TABLE 67

| 5.5% $CO_2$ r = 0.5 | | | | | | | | | |
|---|---|---|---|---|---|---|---|---|---|
| Item | Unit | Com Ex568 | Example436 | Example437 | Example438 | Com Ex569 | Com Ex570 | Example439 | Example440 |
| HFO-1132 (E) | mass % | 10.0 | 10.0 | 10.0 | 10.0 | 10.0 | 20.0 | 20.0 | 20.0 |
| R32 | mass % | 54.0 | 44.0 | 34.0 | 24.0 | 14.0 | 54.0 | 44.0 | 34.0 |
| R1234 (ze + yf) (r = 0.5) | mass % | 30.0 | 40.0 | 50.0 | 60.0 | 70.0 | 20.0 | 30.0 | 40.0 |
| CO2 | mass % | 6.0 | 6.0 | 6.0 | 6.0 | 6.0 | 6.0 | 6.0 | 6.0 |
| GWP | | 366 | 299 | 232 | 265 | 98 | 366 | 299 | 232 |
| COP ratio | % (relative to R410A) | 100 | 100.1 | 100.6 | 101.4 | 102.5 | 98.9 | 99.0 | 99.3 |
| Refrigerating Capacity Ratio | % (relative to R410A) | 105 | 97.9 | 90.9 | 83.3 | 75.2 | 110.9 | 104.4 | 97.4 |
| Condensation Glide | ° C. | 6.6 | 8.5 | 10.7 | 13.1 | 15.6 | 5.3 | 7.0 | 9.1 |
| Item | Unit | Example441 | Com Ex571 | Com Ex572 | Example442 | Example443 | Example444 | Example445 | Com Ex573 |
| HFO-1132 (E) | mass % | 20.0 | 20.0 | 30.0 | 30.0 | 30.0 | 30.0 | 30.0 | 40.0 |
| R32 | mass % | 24.0 | 9.0 | 54.0 | 44.0 | 34.0 | 24.0 | 14.0 | 34.0 |
| R1234 (ze + yf) (r = 0.5) | mass % | 50.0 | 65.0 | 10.0 | 20.0 | 30.0 | 40.0 | 50.0 | 20.0 |
| CO2 | mass % | 6.0 | 6.0 | 6.0 | 6.0 | 6.0 | 6.0 | 6.0 | 6.0 |
| GWP | | 165 | 64 | 365 | 29 | 231 | 164 | 97 | 231 |
| COP ratio | % (relative to R410A) | 100.0 | 101.5 | 98.0 | 98.1 | 98.3 | 98.7 | 99.6 | 97.4 |

TABLE 67-continued

| | | | | | | | | | |
|---|---|---|---|---|---|---|---|---|---|
| Refrigerating Capacity Ratio | % (relative to R410A) | 90.0 | 77.7 | 116.8 | 110.5 | 103.6 | 96.2 | 88.4 | 109.5 |
| Condensation Glide | ° C. | 11.5 | 15.3 | 4.0 | 5.6 | 7.5 | 9.7 | 12.2 | 5.9 |
| Item | Unit | Example446 | Example447 | Example448 | Com Ex574 | Example449 | Example450 | Com Ex575 | Example451 |
| HFO-1132 (E) | mass % | 40.0 | 40.0 | 40.0 | 50.0 | 50.0 | 50.0 | 60.0 | 60.0 |
| R32 | mass % | 15.0 | 5.0 | 5.0 | 24.0 | 14.0 | 4.0 | 14.0 | 4.0 |
| R1234 (ze + yf) (r = 0.5) | mass % | 39.0 | 49.0 | 50.0 | 20.0 | 3.0 | 40.0 | 20.0 | 30.0 |
| CO2 | mass % | 6.0 | 6.0 | 6.0 | 6.0 | 6.0 | 6.0 | 6.0 | 6.0 |
| GWP | | 104 | 37 | 37 | 164 | 94 | 30 | 96 | 29 |
| COP ratio | % (relative to R410A) | 98.3 | 99.2 | 99.6 | 96.9 | 97.4 | 98.2 | 96.7 | 97.4 |
| Refrigerating Capacity Ratio | % (relative to R410A) | 95.2 | 86.8 | 84.3 | 107.9 | 100.2 | 91.8 | 105.7 | 97.4 |
| Condensation Glide | ° C. | 10.1 | 12.6 | 11.8 | 6.4 | 8.6 | 11.0 | 7.0 | 9.3 |

TABLE 68

5.5% $CO_2$
r = 0.75

| Item | Unit | Com Ex576 | Example452 | Example453 | Example454 | Com Ex577 | Com Ex578 | Example455 | Example456 |
|---|---|---|---|---|---|---|---|---|---|
| HFO-1132 (E) | mass % | 10.0 | 10.0 | 10.0 | 10.0 | 10.0 | 20.0 | 20.0 | 20.0 |
| R32 | mass % | 54.0 | 44.0 | 34.0 | 24.0 | 9.0 | 54.0 | 44.0 | 34.0 |
| R1234 (ze + yf) (r = 0.75) | mass % | 30.0 | 40.0 | 50.0 | 60.0 | 70.0 | 20.0 | 30.0 | 40.0 |
| CO2 | mass % | 6.0 | 6.0 | 6.0 | 6.0 | 6.0 | 6.0 | 6.0 | 6.0 |
| GWP | | 366 | 299 | 232 | 165 | 64 | 366 | 299 | 232 |
| COP ratio | % (relative to R410A) | 99.6 | 99.7 | 99.9 | 100.6 | 102.0 | 98.7 | 98.7 | 98.8 |
| Refrigerating Capacity Ratio | % (relative to R410A) | 105.9 | 99.7 | 92.8 | 85.4 | 72.8 | 11.8 | 105.8 | 99.1 |
| Condensation Glide | ° C. | 5.8 | 7.3 | 9.3 | 11.5 | 15.2 | 4.8 | 6.2 | 7.9 |
| Item | Unit | Example457 | Example458 | Com Ex579 | Com Ex580 | Example459 | Example460 | Example461 | Example462 |
| HFO-1132 (E) | mass % | 20.0 | 20.0 | 20.0 | 30.0 | 30.0 | 30.0 | 30.0 | 30.0 |
| R32 | mass % | 24.0 | 14.0 | 4.0 | 54.0 | 44.0 | 34.0 | 24.0 | 14.0 |
| R1234 (ze + yf) (r = 0.75) | mass % | 50.0 | 60.0 | 70.0 | 10.0 | 20.0 | 30.0 | 40.0 | 50.0 |
| CO2 | mass % | 6.0 | 6.0 | 6.0 | 6.0 | 6.0 | 6.0 | 6.0 | 6.0 |
| GWP | | 165 | 97 | 30 | 365 | 298 | 231 | 164 | 97 |
| COP ratio | % (relative to R410A) | 99.3 | 100.1 | 101.1 | 97.9 | 97.9 | 97.9 | 98.2 | 98.9 |
| Refrigerating Capacity Ratio | % (relative to R410A) | 91.9 | 84.0 | 75.1 | 117.3 | 11.5 | 105.0 | 978 | 90.1 |
| Condensation Glide | ° C. | 10.1 | 12.6 | 15.0 | 3.8 | 5.0 | 6.6 | 8.6 | 10.9 |
| Item | Unit | Example463 | Com Ex581 | Example464 | Example465 | Example466 | Com Ex582 | Example467 | Example468 |
| HFO-1132 (E) | mass % | 30.0 | 40.0 | 40.0 | 40.0 | 40.0 | 50.0 | 50.0 | 50.0 |
| R32 | mass % | 4.0 | 34.0 | 24.0 | 14.0 | 4.0 | 24.0 | 14.0 | 4.0 |
| R1234 (ze + yf) (r = 0.75) | mass % | 60.0 | 20.0 | 30.0 | 40.0 | 50.0 | 20.0 | 30.0 | 40.0 |
| CO2 | mass % | 6.0 | 6.0 | 6.0 | 6.0 | 6.0 | 6.0 | 6.0 | 6.0 |
| GWP | | 30 | 231 | 164 | 97 | 30 | 163 | 96 | 29 |
| COP ratio | % (relative to R410A) | 99.8 | 97.2 | 97.3 | 97.8 | 98.7 | 96.7 | 97.0 | 97.7 |
| Refrigerating Capacity Ratio | % (relative to R410A) | 81.6 | 110.4 | 103.5 | 95.9 | 87.6 | 108.8 | 101.4 | 93.2 |
| Condensation Glide | ° C. | 13.4 | 5.4 | 7.1 | 9.3 | 11.6 | 5.8 | 7.8 | 10.0 |

| Item | Unit | Com Ex583 | Example469 |
|---|---|---|---|
| HFO-1132 (E) | mass % | 60.0 | 60.0 |
| R32 | mass % | 14.0 | 4.0 |
| R1234 (ze + yf) (r = 0.75) | mass % | 20.0 | 30.0 |
| CO2 | mass % | 6.0 | 6.0 |
| GWP | | 96 | 29 |
| COP ratio | % (relative to R410A) | 96.5 | 97.0 |

TABLE 68-continued

| | | | |
|---|---|---|---|
| Refrigerating Capacity Ratio | % (relative to R410A) | 106.5 | 98.6 |
| Condensation Glide | ° C. | 6.5 | 8.5 |

TABLE 69

7.5% $CO_2$
r = 0

| Item | Unit | Com Ex584 | Example470 | Example471 | Com Ex585 | Com Ex586 | Example472 | Example473 | Example474 |
|---|---|---|---|---|---|---|---|---|---|
| HFO-1132 (E) | mass % | 10.0 | 10.0 | 10.0 | 10.0 | 20.0 | 20.0 | 20.0 | 20.0 |
| R32 | mass % | 57.5 | 42.5 | 32.5 | 17.5 | 57.5 | 42.5 | 32.5 | 22.5 |
| R1234 (ze + yf) (r = 0) | mass % | 25.0 | 40.0 | 50.0 | 65.0 | 15.0 | 30.0 | 40.0 | 50.0 |
| CO2 | mass % | 7.5 | 7.5 | 7.5 | 7.5 | 7.5 | 7.5 | 7.5 | 7.5 |
| GWP | | 390 | 289 | 223 | 122 | 389 | 289 | 222 | 155 |
| COP ratio | % (relative to R410A) | 100 | 100.7 | 101.7 | 103.8 | 98.7 | 99.2 | 100.0 | 101.2 |
| Refrigerating Capacity Ratio | % (relative to R410A) | 107 | 96.5 | 88.9 | 76.9 | 114.7 | 103.8 | 96.1 | 88.2 |
| Condensation Glide | ° C. | 8.0 | 11.8 | 14.7 | 19.1 | 6.1 | 9.6 | 12.5 | 15.5 |
| Item | Unit | Com Ex587 | Com Ex588 | Example475 | Example476 | Example477 | Example478 | Com Ex589 | Com Ex590 |
| HFO-1132 (E) | mass % | 20.0 | 30.0 | 30.0 | 30.0 | 30.0 | 30.0 | 30.0 | 40.0 |
| R32 | mass % | 7.5 | 57.5 | 42.5 | 32.5 | 22.5 | 12.5 | 0.0 | 37.5 |
| R1234 (ze + yf) (r = 0) | mass % | 65.0 | 5.0 | 20.0 | 30.0 | 40.0 | 50.0 | 62.5 | 15.0 |
| CO2 | mass % | 7.5 | 7.5 | 7.5 | 7.5 | 7.5 | 7.5 | 7.5 | 7.5 |
| GWP | | 55 | 389 | 288 | 222 | 155 | 88 | 4 | 255 |
| COP ratio | % (relative to R410A) | 103.2 | 97.5 | 97.9 | 98.5 | 99.4 | 100.7 | 102.3 | 97.0 |
| Refrigerating Capacity Ratio | % (relative to R410A) | 75.6 | 121.6 | 110.8 | 103.1 | 9.1 | 86.9 | 75.7 | 113.8 |
| Condensation Glide | ° C. | 20.0 | 4.2 | 7.4 | 10.1 | 13.1 | 16.3 | 19.9 | 6.5 |
| Item | Unit | Example479 | Example480 | Example481 | Com Ex591 | Example482 | Example483 | Com Ex592 | Example484 |
| HFO-1132 (E) | mass % | 40.0 | 40.0 | 40.0 | 50.0 | 50.0 | 50.0 | 50.0 | 60.0 |
| R32 | mass % | 22.5 | 12.5 | 2.5 | 22.5 | 12.5 | 2.5 | 12.5 | 2.5 |
| R1234 (ze + yf) (r = 0) | mass % | 30.0 | 40.0 | 50.0 | 20.0 | 30.0 | 40.0 | 20.0 | 30.0 |
| CO2 | mass % | 7.5 | 7.5 | 7.5 | 7.5 | 7.5 | 7.5 | 7.5 | 7.5 |
| GWP | | 154 | 87 | 20 | 154 | 87 | 20 | 86 | 19 |
| COP ratio | % (relative to R410A) | 97.9 | 99.0 | 100.2 | 96.7 | 97.6 | 98.7 | 96.5 | 97.5 |
| Refrigerating Capacity Ratio | % (relative to R410A) | 101.8 | 93.5 | 84.7 | 108.4 | 100.0 | 91.2 | 106.3 | 97.5 |
| Condensation Glide | ° C. | 10.7 | 13.8 | 16.8 | 8.4 | 11.3 | 14.4 | 9.0 | 12.0 |

TABLE 70

7.5% $CO_2$
r = 0.25

| Item | Unit | Com Ex593 | Example485 | Example486 | Example487 | Com Ex594 | Com Ex595 | Example488 | Example489 |
|---|---|---|---|---|---|---|---|---|---|
| HFO-1132 (E) | mass % | 10.0 | 10.0 | 10.0 | 10.0 | 10.0 | 20.0 | 20.0 | 20.0 |
| R32 | mass % | 57.5 | 42.5 | 32.5 | 22.5 | 12.5 | 57.5 | 42.5 | 32.5 |
| R1234 (ze + yf) (r = 0.25) | mass % | 25.0 | 40.0 | 50.0 | 60.0 | 70.0 | 15.0 | 30.0 | 40.0 |
| CO2 | mass % | 7.5 | 7.5 | 7.5 | 7.5 | 7.5 | 7.5 | 7.5 | 7.5 |
| GWP | | 390 | 289 | 222 | 155 | 88 | 389 | 289 | 222 |
| COP ratio | % (relative to R410A) | 99.6 | 100.2 | 100.9 | 102.0 | 103.2 | 98.5 | 98.9 | 99.4 |
| Refrigerating Capacity Ratio | % (relative to R410A) | 108.7 | 98.4 | 91.0 | 83.4 | 75.1 | 115.5 | 105.3 | 98.0 |
| Condensation Glide | ° C. | 7.3 | 10.6 | 13.2 | 16.1 | 18.9 | 5.7 | 8.7 | 11.3 |

TABLE 70-continued

| Item | Unit | Example490 | Com Ex596 | Com Ex597 | Example491 | Example492 | Example493 | Example494 | Com Ex598 |
|---|---|---|---|---|---|---|---|---|---|
| HFO-1132 (E) | mass % | 20.0 | 20.0 | 30.0 | 30.0 | 30.0 | 30.0 | 30.0 | 40.0 |
| R32 | mass % | 22.5 | 7.5 | 57.5 | 42.5 | 32.5 | 22.5 | 12.5 | 37.5 |
| R1234 (ze + yf) (r = 0.25) | mass % | 50.0 | 65.0 | 5.0 | 20.0 | 30.0 | 40.0 | 50.0 | 15.0 |
| CO2 | mass % | 7.5 | 7.5 | 7.5 | 7.5 | 7.5 | 7.5 | 7.5 | 7.5 |
| GWP | | 155 | 54 | 389 | 288 | 221 | 154 | 88 | 254 |
| COP ratio | % (relative to R410A) | 100.3 | 102.1 | 97.5 | 97.7 | 98.1 | 98.8 | 99.8 | 96.8 |
| Refrigerating Capacity Ratio | % (relative to R410A) | 90.3 | 77.9 | 121.9 | 111.9 | 104.6 | 96.9 | 88.9 | 114.6 |
| Condensation Glide | ° C. | 14.1 | 18.5 | 4.1 | 6.9 | 9.2 | 12.0 | 14.9 | 6.1 |

| Item | Unit | Example495 | Example496 | Example497 | Com Ex599 | Example498 | Example499 | Com Ex600 | Example500 |
|---|---|---|---|---|---|---|---|---|---|
| HFO-1132 (E) | mass % | 40.0 | 40.0 | 40.0 | 50.0 | 50.0 | 50.0 | 60.0 | 60.0 |
| R32 | mass % | 22.5 | 12.5 | 2.5 | 22.5 | 12.5 | 2.5 | 12.5 | 2.5 |
| R1234 (ze + yf) (r = 0.25) | mass % | 30.0 | 40.0 | 50.0 | 20.0 | 30.0 | 40.0 | 20.0 | 30.0 |
| CO2 | mass % | 7.5 | 7.5 | 7.5 | 7.5 | 7.5 | 7.5 | 7.5 | 7.5 |
| GWP | | 154 | 87 | 20 | 154 | 87 | 20 | 86 | 19 |
| COP ratio | % (relative to R410A) | 97.5 | 98.4 | 99.5 | 96.5 | 97.2 | 98.1 | 96.3 | 97.1 |
| Refrigerating Capacity Ratio | % (relative to R410A) | 103.2 | 95.2 | 86.6 | 109.4 | 101.3 | 92.8 | 107.3 | 98.8 |
| Condensation Glide | ° C. | 9.8 | 12.0 | 15.6 | 7.8 | 10.5 | 13.3 | 8.0 | 11.2 |

TABLE 71

| | | 7.5% $CO_2$ r = 0.5 | | | | | | | |
|---|---|---|---|---|---|---|---|---|---|
| Item | Unit | Com Ex601 | Example501 | Example502 | Example503 | Com Ex602 | Com Ex603 | Example504 | Example505 |
| HFO-1132 (E) | mass % | 10.0 | 10.0 | 10.0 | 10.0 | 10.0 | 20.0 | 20.0 | 20.0 |
| R32 | mass % | 57.5 | 42.5 | 32.5 | 22.5 | 12.5 | 57.5 | 42.5 | 32.5 |
| R1234 (ze + yf) (r = 0.5) | mass % | 25.0 | 40.0 | 50.0 | 60.0 | 70.0 | 15.0 | 30.0 | 40.0 |
| CO2 | mass % | 7.5 | 7.5 | 7.5 | 7.5 | 7.5 | 7.5 | 7.5 | 7.5 |
| GWP | | 390 | 289 | 222 | 155 | 88 | 389 | 289 | 222 |
| COP ratio | % (relative to R410A) | 99 | 99.6 | 100.1 | 101.0 | 102.1 | 98.3 | 98.5 | 98.8 |
| Refrigerating Capacity Ratio | % (relative to R410A) | 110 | 100.2 | 93.1 | 85.6 | 77.5 | 116.2 | 106.7 | 99.7 |
| Condensation Glide | ° C. | 6.6 | 9.4 | 11.8 | 14.5 | 17.3 | 5.3 | 7.9 | 10.1 |

| Item | Unit | Example506 | Example507 | Com Ex604 | Com Ex605 | Example508 | Example509 | Example510 | Example511 |
|---|---|---|---|---|---|---|---|---|---|
| HFO-1132 (E) | mass % | 20.0 | 20.0 | 20.0 | 30.0 | 30.0 | 30.0 | 30.0 | 30.0 |
| R32 | mass % | 22.5 | 12.5 | 2.5 | 57.5 | 42.5 | 32.5 | 22.5 | 12.5 |
| R1234 (ze + yf) (r = 0.5) | mass % | 50.0 | 60.0 | 70.0 | 5.0 | 20.0 | 30.0 | 40.0 | 50..0 |
| CO2 | mass % | 7.5 | 7.5 | 7.5 | 7.5 | 7.5 | 7.5 | 7.5 | 7.5 |
| GWP | | 155 | 88 | 21 | 289 | 288 | 221 | 154 | 87 |
| COP ratio | % (relative to R410A) | 99.5 | 100.6 | 101.6 | 97.4 | 97.5 | 97.7 | 98.2 | 99.1 |
| Refrigerating Capacity Ratio | % (relative to R410A) | 92.3 | 84.3 | 75.5 | 122.1 | 112.9 | 106.0 | 98.6 | 90.7 |
| Condensation Glide | ° C. | 12.7 | 15.5 | 18.3 | 3.9 | 6.3 | 8.3 | 10.8 | 13.5 |

| Item | Unit | Example512 | Com Ex606 | Example513 | Example514 | Example515 | Com Ex607 | Example516 | Example517 |
|---|---|---|---|---|---|---|---|---|---|
| HFO-1132 (E) | mass % | 30.0 | 40.0 | 40.0 | 40.0 | 40.0 | 50.0 | 50.0 | 50.0 |
| R32 | mass % | 2.5 | 37.5 | 22.5 | 12.5 | 2.5 | 22.5 | 12.5 | 2.5 |
| R1234 (ze + yf) (r = 0.5) | mass % | 60.0 | 15.0 | 30.0 | 40.0 | 50.0 | 20.0 | 30.0 | 40.0 |
| CO2 | mass % | 7.5 | 7.5 | 7.5 | 7.5 | 7.5 | 7.5 | 7.5 | 7.5 |
| GWP | | 20 | 254 | 154 | 87 | 20 | 153 | 86 | 19 |
| COP ratio | % (relative to R410A) | 100.1 | 96.7 | 97.1 | 97.8 | 98.8 | 96.3 | 96.8 | 97.6 |
| Refrigerating Capacity Ratio | % (relative to R410A) | 82.2 | 115.4 | 104.6 | 96.8 | 88.4 | 110.3 | 102.6 | 94.3 |
| Condensation Glide | ° C. | 16.4 | 5.7 | 8.9 | 11.5 | 14.3 | 7.2 | 9.6 | 12.3 |

TABLE 71-continued

| Item | Unit | Com Ex608 | Example518 |
|---|---|---|---|
| HFO-1132 (E) | mass % | 60.0 | 60.0 |
| R32 | mass % | 12.5 | 2.5 |
| R1234 (ze + yf) (r = 0.5) | mass % | 20.0 | 30.0 |
| CO2 | mass % | 7.5 | 7.5 |
| GWP | | 86 | 19 |
| COP ratio | % (relative to R410A) | 96.0 | 96.8 |
| Refrigerating Capacity Ratio | % (relative to R410A) | 108.2 | 100.0 |
| Condensation Glide | ° C. | 7.9 | 10.5 |

TABLE 72

| | | 7.5% $CO_2$ r = 0.75 | | | | | | | |
|---|---|---|---|---|---|---|---|---|---|
| Item | Unit | Com Ex609 | Example519 | Example520 | Example521 | Com Ex610 | Com Ex611 | Example522 | Example523 |
| HFO-1132 (E) | mass % | 10.0 | 10.0 | 10.0 | 10.0 | 10.0 | 20.0 | 20.0 | 20.0 |
| R32 | mass % | 57.5 | 42.5 | 32.5 | 22.5 | 7.5 | 57.5 | 42.5 | 32.5 |
| R1234 (ze + yf) (r = 0.75) | mass % | 25.0 | 40.0 | 50.0 | 60.0 | 75.0 | 15.0 | 30.0 | 40.0 |
| CO2 | mass % | 7.5 | 7.5 | 7.5 | 7.5 | 7.5 | 7.5 | 7.5 | 7.5 |
| GWP | | 389 | 289 | 222 | 155 | 54 | 389 | 289 | 221 |
| COP ratio | % (relative to R410A) | 99.1 | 99.2 | 99.4 | 100.1 | 101.7 | 98.2 | 98.1 | 98.3 |
| Refrigerating Capacity Ratio | % (relative to R410A) | 111.1 | 102.0 | 95.1 | 87.7 | 75.1 | 117.0 | 108.1 | 101.4 |
| Condensation Glide | ° C. | 5.9 | 8.3 | 10.4 | 12.9 | 17.1 | 4.9 | 7.0 | 8.9 |
| Item | Unit | Example524 | Example525 | Com Ex612 | Com Ex613 | Example526 | Example527 | Example528 | Example529 |
| HFO-1132 (E) | mass % | 20.0 | 20.0 | 20.0 | 30.0 | 30.0 | 30.0 | 30.0 | 30.0 |
| R32 | mass % | 22.5 | 12.5 | 0.0 | 57.5 | 42.5 | 32.5 | 22.5 | 12.5 |
| R1234 (ze + yf) (r = 0.75) | mass % | 50.0 | 60.0 | 72.5 | 5.0 | 20.0 | 30.0 | 40.0 | 50.0 |
| CO2 | mass % | 7.5 | 7.5 | 7.5 | 7.5 | 7.5 | 7.5 | 7.5 | 7.5 |
| GWP | | 154 | 87 | 4 | 389 | 288 | 221 | 154 | 87 |
| COP ratio | % (relative to R410A) | 98.8 | 99.7 | 100.9 | 97.4 | 97.3 | 97.3 | 97.6 | 98.4 |
| Refrigerating Capacity Ratio | % (relative to R410A) | 94.2 | 86.3 | 75.0 | 122.4 | 113.8 | 107.3 | 100.2 | 92.5 |
| Condensation Glide | ° C. | 11.3 | 14.0 | 17.5 | 3.8 | 5.7 | 7.5 | 9.6 | 12.2 |
| Item | Unit | Example530 | Com Ex614 | Example531 | Example531 | Example532 | Com Ex615 | Example533 | Example534 |
| HFO-1132 (E) | mass % | 30.0 | 40.0 | 40.0 | 40.0 | 40.0 | 50.0 | 50.0 | 50.0 |
| R32 | mass % | 2.5 | 37.5 | 22.5 | 12.5 | 2.5 | 22.5 | 12.5 | 2.5 |
| R1234 (ze + yf) (r = 0.75) | mass % | 60.0 | 15.0 | 30.0 | 40.0 | 50.0 | 20.0 | 30.0 | 40.0 |
| CO2 | mass % | 7.5 | 7.5 | 7.5 | 7.5 | 7.5 | 7.5 | 7.5 | 7.5 |
| GWP | | 20 | 254 | 154 | 87 | 20 | 153 | 86 | 19 |
| COP ratio | % (relative to R410A) | 99.4 | 96.5 | 96.7 | 97.3 | 98.1 | 96.0 | 9.4 | 97.2 |
| Refrigerating Capacity Ratio | % (relative to R410A) | 84.0 | 116.1 | 105.9 | 98.3 | 90.0 | 111.2 | 103.8 | 95.7 |
| Condensation Glide | ° C. | 15.0 | 5.3 | 8.1 | 10.4 | 13.1 | 6.7 | 8.8 | 11.3 |

| Item | Unit | Com Ex616 | Example535 |
|---|---|---|---|
| HFO-1132 (E) | mass % | 60.0 | 60.0 |
| R32 | mass % | 12.5 | 2.5 |
| R1234 (ze + yf) (r = 0.75) | mass % | 20.0 | 30.0 |
| CO2 | mass % | 7.5 | 7.5 |
| GWP | | 86 | 19 |
| COP ratio | % (relative to R410A) | 95.8 | 96.4 |
| Refrigerating Capacity Ratio | % (relative to R410A) | 109.0 | 101.1 |
| Condensation Glide | ° C. | 7.4 | 9.7 |

DESCRIPTION OF THE REFERENCE NUMERALS

1: Sample cell
2: High-speed camera
3: Xenon lamp
4: Collimating lens
5: Collimating lens
6: Ring filter

The invention claimed is:

1. A composition comprising a refrigerant, the refrigerant comprising trans-1,2-difluoroethylene (HFO-1132 (E)), difluoromethane (R32), 1,3,3,3-tetrafluoropropene (R1234ze), and carbon dioxide ($CO_2$).

2. The composition according to claim 1,
wherein
in the refrigerant, when the mass % of HFO-1132 (E), R32, R1234ze, and $CO_2$ based on their sum is respectively represented by x, y, z, and a,
(1) if 0<a≤0.4, coordinates (x,y,z) in a ternary composition diagram in which the sum of HFO-1132 (E), R32, and R1234ze is (100−a) mass % are within the range of a figure surrounded by straight lines LL', L'M, MN, NO, OK, KH, and HL that connect 7 points, i.e., points L, L', M, N, O, K, and H, or on the straight lines LL', L'M, MN, NO, OK, and KH (excluding the points L and H):
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point K (−2.5a+1.0, −0.25a+51.5, 1.75a+47.5), and
point H ($0.1667a^2$−4.5667a+67.6, 0.0, $-0.1667a^2$+3.5667a+32.4),
(2) if 0.4≤a≤7.5, coordinates (x,y,z) in the ternary composition diagram are within the range of a figure surrounded by straight lines LL', L'M, MN, NO, OB", B"K', K'H, and HL that connect 8 points, i.e., points L, L', M, N, O, B", K', and H, or on the straight lines LL', L'M, MN, NO, OB", and K'H (excluding the points L, B", K', and H), and
if 0.4≤a≤1.0, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0.0, −3.0a+52.6, 2.0a+47.4), and
point H ($0.1667a^2$−4.5667a+67.6, 0.0, $-0.1667a^2$+3.5667a+32.4),
if 1.0<a≤3.0, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+36.679, 0.0175a+36.679, −a+27.6),
point O (−0.0095a+28.914, 0.0095a+51.586, −a+19.5),
point B" (0.0, 51.4, −a+48.6),
point K' (0, −2.9a+52.5, 1.9a+47.5), and
point H ($0.05a^2$−4.55a+67.7, 0.0, $-0.05a^2$+3.55a+32.3),
if 3.0<a≤5.0, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0, −2.9a+52.5, 1.9a+47.5), and
point H ($0.05a^2$−4.55a+67.7, 0.0, $-0.05a^2$+3.55a+32.3), or
if 5.0<a≤7.5, the 8 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point O (−0.0095a+28.914, 0.0095a+51.586, −a+19.5),
point B" (0.0, 51.4, −a+48.6),
point K' (0, −2.8286a+52.105, 1.8286a+47.895), and
point H ($0.02a^2$−4.21a+66.75, 0.0, $-0.02a^2$+3.21a+33.25).

3. The composition according to claim 1,
wherein
in the refrigerant, when the mass % of HFO-1132 (E), R32, R1234ze, and $CO_2$ based on their sum is respectively represented by x, y, z, and a,
(1) if 0<a≤5.5, coordinates (x,y,z) in a ternary composition diagram in which the sum of HFO-1132 (E), R32, and R1234ze is (100−a) mass % are within the range of a figure surrounded by straight lines LL', L'M, MN, NJ, JH, and HL that connect 6 points, i.e., points L, L', M, N, J, and H, or on the straight lines LL', L'M, MN, NJ, and JH (excluding the points L and H), and
if 0<a≤1.0, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J ($-0.3333a^2$−3.3667a+20.3, 36.6, $0.3333a^2$+2.3667a+43), and
point H ($0.1667a^2$−4.5667a+67.6, 0.0, $-0.1667a^2$+3.5667a+32.4),
if 1.0<a≤3.0, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J ($0.05a^2$−3.95a+20.5, $0.05a^2$−0.25a+36.8, $-0.1a^2$+3.2a+42.7), and
point H ($0.05a^2$−4.55a+67.7, 0.0, $-0.05a^2$+3.55a+32.3),
if 3.0<a≤5.0, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J ($0.05a^2$−4.05a+20.8, 36.5, $-0.05a^2$+3.05a+42.7), and
point H ($0.05a^2$−4.55a+67.7, 0.0, $-0.05a^2$+3.55a+32.3), or
if 5.0<a≤5.5, the 6 points are the following:
point L (72.0, 0.0, −a+28.0),
point L' (57.2, 10.0, −a+32.8),
point M (−0.019a+48.618, 0.019a+18.082, −a+33.3),
point N (−0.0175a+35.721, 0.0175a+36.679, −a+27.6),
point J (−3.6a+19.8, 36.5, 2.6a+43.7), and
point H ($0.02a^2$−4.21a+66.75, 0.0, $-0.02a^2$+3.21a+33.25),
(2) if 5.5<a≤7.5, coordinates (x,y,z) in the ternary composition diagram are within the range of a figure surrounded by straight lines LL', L'M, MN, NB', B'K', K'H, and HL that connect 7 points, i.e., points L, L', M, N, B', K', and H, or on the straight lines LL', L'M, MN, NB', K'H, and HL (excluding the points L, B', K', and H):

point L (72.0, 0.0, −a+28.0), point L' (57.2, 10.0, −a+32.8), point M (−0.019a+48.618, 0.019a+18.082, −a+33.3), point N (−0.0175a+35.721, 0.0175a+36.679, −a+27.6), point B' (0.0, 36.5, −a+63.5), point K' (0.0, −2.8286a+52.105, 1.8281a+47.895), and point H ($0.02a^2$−4.21a+66.75, 0.0, $-0.02a^2$+3.21a+33.25).

4. The composition according to claim 1, wherein in the refrigerant, when the mass % of HFO-1132 (E), R32, R1234ze, and $CO_2$ based on their sum is respectively represented by x, y, z, and a, coordinates (x,y,z) in a ternary composition diagram in which the sum of HFO-1132 (E), R32, and R1234ze is (100−a) mass % are within the range of a figure surrounded by straight lines LL', L'M, MI, IH, and HL that connect 5 points, i.e., points L, L', M, I, and H, or on the straight lines LL', L'M, MI, and IH (excluding the points L and H), and if 0<a≤1.0, the 5 points are the following:

point L (72.0, 0.0, −a+28.0), point L' (57.2, 10.0, −a+32.8), point M (−0.019a+48.618, 0.019a+18.082, −a+33.3), point I ($-0.1667a^2$−3.9333a+44.2, 18.1, $0.1667a^2$+2.9333a+37.7), and point H ($0.1667a^2$−4.5667a+67.6, 0.0, $-0.1667a^2$+3.5667a+32.4), if 1.0<a≤3.0, the 5 points are the following:

point L (72.0, 0.0, −a+28.0), point L' (57.2, 10.0, −a+32.8), point M (−0.019a+48.618, 0.019a+18.082, −a+33.3), point I ($0.05a^2$−4.25a+44.3, 18.1, $-0.05a^2$+3.25a+37.6), and point H ($0.05a^2$−4.55a+67.7, 0.0, $-0.05a^2$+3.55a+32.3), if 3.0<a≤5.0, the 5 points are the following:

point L (72.0, 0.0, −a+28.0), point L' (57.2, 10.0, −a+32.8), point M (−0.019a+48.618, 0.019a+18.082, −a+33.3), point I ($-0.05a^2$−3.45a+42.8, $0.05a^2$−0.45a+19.0, 2.9a+38.2), and point H ($0.05a^2$−4.55a+67.7, 0.0, $-0.05a^2$+3.55a+32.3), or if 5.0<a≤7.5, the 5 points are the following:

point L (72.0, 0.0, −a+28.0), point L' (57.2, 10.0, −a+32.8), point M (−0.019a+48.618, 0.019a+18.082, −a+33.3), point I ($0.1a^2$−4.85a+46.05, $-0.02a^2$+0.21a+17.45, $-0.08a^2$+3.64a+36.5), and point H ($0.02a^2$−4.21a+66.75, 0.0, $-0.02a^2$+3.21a+33.25).

5. The composition according to claim 1, wherein the refrigerant further comprises 2,3,3,3-tetrafluoro-1-propene (R1234yf).

6. The composition according to claim 5, wherein in the refrigerant, when the mass % of HFO-1132 (E) is x, the mass % of R32 is y, the mass % of the sum of R1234ze and R1234yf is z, and the mass % of $CO_2$ is a based on the sum of HFO-1132 (E), R32, R1234ze, R1234yf, and $CO_2$, if r=R1234yf/(R1234ze+R1234yf), and 0.1≤r<1.0, coordinates (x,y,z) in a ternary composition diagram having HFO-1132 (E) as a first vertex, R32 as a second vertex, and the sum of 1234ze and R1234yf as a third vertex in which the sum of HFO-1132 (E), R32, R1234ze, and R1234yf is (100−a) mass % are within the range of a figure surrounded by straight lines $L_rL'_r$, $L'_rM_r$, $M_rN_r$, $N_rO_r$, $O_rB''_r$, $B''_rK'_r$, $K'_rH_r$, and $H_rL_r$, that connect 8 points, i.e., points $L_r$, $L'_r$, $M_r$, $N_r$, $O_r$, $B''_r$, $K'_r$, and $H_r$, or on the straight lines $L_rL'_r$, $L'_rM_r$, $M_rN_r$, $N_rO_r$, $O_rB''_r$, and $K'_rH_r$ (excluding the points $L_r$, $B''_r$, $K'_r$, and $H_r$), and if 0<a≤1.0, the 8 points are the following:

point $L_r$ (72.0, 0.0, 28.0−a), point $L'_r$(57.2, 10.0, 32.8−a), point $M_r$ (48.6, $-0.2778r^2$+0.4167r+18.061, 51.4−a−y), point $N^r$ (35.7, $-0.2778r^2$+0.4167r+36.661, 51.4−a−y), point $O_r$ (28.9, $-0.2222r^2$−0.1333r+51.611, 71.1−a−y), point $B''_r$ (0.0, ($0.463a^2$−0.1852a−0.2778) $r^2$+($-0.6945a^2$+0.2778a+0.4167) r+($0.2317a^2$−0.0927a+51.361), 51.4−a−y), point $K'_r$ (0.0, ($0.3705a^2$−0.1482a−0.6667) $r^2$+($-0.2217a^2$+0.0887a−11.6) r+($0.0183a^2$-3.0073a+52.567), 100−a−y), and point $H_r$ (($2.4072a^2$−2.0739a−0.8889) $r^2$+($-2.2779a^2$+1.5779a−8.4667) r+($0.0392a^2$-4.5732a+67.656), 0.0, 100−a−x), if 1.0<a≤3.0, the 8 points are the following:

point $L_r$ (72.0, 0.0, 28.0−a), point $L'_r$ (57.2, 10.0, 32.8−a), point $M_r$ (48.6, ($-0.1389a^2$+0.6945a−0.8334) $r^2$+($0.2084a^2$−1.0418a+1.2501) r+($-0.0695a^2$+0.3475a+17.783), 51.4−a−y), point $N_r$ (35.7, $-0.2778r_2$+0.4167r+36.661, 51.4−a−y), point $O_r$ (28.9, ($0.25a^2$−1.25a+1.2222) $r_2$+($-0.275a^2$+1.375a−1.2333) r+($0.025a^2$−0.125a+51.711), 71.1−y−a), point $B''_r$ (0.0, ($0.25a^2$−1.0278a+0.7778) $r^2$+($-0.275a^2$+1.2419a−0.9668) r+($0.075a^2$-0.364a+51.789), 100−a−y), point $K'_r$ (0.0, ($0.16667a^2$+0.2222a−0.8333) $r^2$+($-0.3495a^2$+0.3645a−11.748) r+($0.1335a^2$-3.2395a+52.684), 100−a−y), and point $H_r$ (($-0.25003a^2$+0.8613a−1.1669) $r^2$+($0.275a^2$−1.3914a−8.0502) r+($0.0245a^2$-4.4175a+67.515), 0.0, 100−a−x), if 3.0<a≤5.0, the 8 points are the following:

point $L_r$ (72.0, 0.0, 28.0−a), point $L'_r$ (57.2, 10.0, 32.8−a), point $M_r$ (48.6, 18.2, 33.2−a), point $N_r$ (35.7, ($-0.1389a^2$+1.2501a−2.778) $r^2$+($0.2084a^2$−1.8752a+4.167) r+($-0.0695a^2$+0.6255a+35.41), 51.4−a−y), point $O_r$ (28.9, ($0.1389a^2$−0.9723a+1.389) $r^2$+($-0.2083a_2$+1.4585a−2.0845) r+($0.0695a^2$-0.4865a+52.395), 71.1−a−y), point $B''_r$ (0.0, $-0.0556r^2$+0.2833r+51.372, 100−a−y), point $K'_r$ (0.0, ($0.77775a^2$−6.2775a+13.166) $r^2$+($-0.9665a^2$+8.0155a−29.148) r+($0.189a^2$-4.54a+56.086), 100−a−y), and point $H_r$ (($-0.72215a^2$+6.3327a−13.332) $r^2$+($0.6835a^2$−6.3015a+3.003) r+($0.039a^2$−4.434a+67.434), 0.0, 100−x−a), or if 5.0<a≤7.5, the 8 points are the following:

point $L_r$ (72.0, 0.0, 28.0−a), point $L'_r$ (57.2, 10.0, 32.8−a), point $M_r$ (48.6, ($0.0592a^2$−0.6512a+1.776) $r^2$+($-0.0355a^2$+0.3901a−1.062) r+($0.0029a^2$-0.0323a+18.29), 51.4−a−y), point $N_r$ (35.7, 36.8, 27.5−a), point $O_r$ (28.9, 51.7, 19.4−a), point $B''_r$ (0.0, $-0.0556r^2+0.2833r+51.372$, 100−a−y), point $K'_r$ (0.0, $(0.10373a^2-0.9189a+3.2232)r^2+(-0.1285a^2+1.2799a-16.419)r+(0.0252a^2-3.1662a+53.312)$, 100−a−y), and point $H_r$ ($(0.037a^2-0.1293a-0.0008)r^2+(-0.056a^2+0.2a-11.017)r+(0.0719a^2-4.8515a+68.7)$, 0.0, 100−a−x).

7. The composition according to claim 6, wherein in the refrigerant, when the mass % of HFO-1132 (E) is x, the mass % of R32 is y, the mass % of the sum of R1234ze and R1234yf is z, and the mass % of $CO_2$ is a based on the sum of HFO-1132 (E), R32, R1234ze, R1234yf, and $CO_2$, if r=R1234yf/(R1234ze+R1234yf), and $0.1\le r<1.0$, coordinates (x,y,z) in a ternary composition diagram having HFO-1132 (E) as a first vertex, R32 as a second vertex, and the sum of 1234ze and R1234yf as a third vertex in which the sum of HFO-1132 (E), R32, R1234ze, and R1234yfis (100−a) mass % are within the range of a figure surrounded by straight lines $L_rL'_r$, $L'_rM_r$, $M_rI_r$, $I_rH_r$, and $H_rL_r$ that connect 5 points, i.e., points $L_r$, $L'_r$, $M_r$, $I_r$, and $H_r$, or on the straight lines $L_rL'_r$, $L'_rM_r$, $M_rL_r$, and $I_rH_r$, and if $0<a\le1.0$, the 5 points are the following:

point $L_r$ (72.0, 0.0, 28.0−a), point $L'_r$ (57.2, 10.0, 32.8−a), point $M_r$ (48.6, $-0.2778r_2+0.4167r+18.061$, 51.4−a−y), point $I_r$ ($(1.1576a^2-0.3243a-2.1111)r^2+(-0.9a^2-0.35a-10.233)r+(-0.255a^2-3.828a+44.244)$, 100−a−x−z, $(1.1572a^2+0.3239a+1.8889)r^2+(0.9042a_2+0.3458a+10.367)r+(0.2525a^2+2.8315a+37.644)$), and point $H_r$ ($(2.4072a^2-2.0739a-0.8889)r^2+(-2.2779a^2+1.5779a-8.4667)r+(0.0392a^2-4.5732a+67.656)$, 0.0, 100−a−x), if $1.0<a\le3.0$, the 5 points are the following:

point $L_r$ (72.0, 0.0, 28.0−a), point $L'_r$ (57.2, 10.0, 32.8−a), point $M_r$ (48.6, $(-0.1389a^2+0.6945a-0.8334)r^2+(0.2084a^2-1.0418a+1.2501)r+(-0.0695a_2+0.3475a+17.783)$, 51.4−a−y), point $I_r$ ($(-0.08337a^2+0.8057a-2.0001)r^2+(-0.0745a^2-0.6105a-10.798)r+(0.108a^2-4.346a+44.399)$, 100−a−x−z, $(0.33337a^2-1.5557a+2.2779)r^2+(-0.225a^2+1.508a+10.334)r+(-0.033a^2+3.121a+37.64)$), and point $H_r$ ($(-0.25003a^2+0.8613a-1.1669)r^2+(0.275a^2-1.3914a-8.0502)r+(0.0245a^2-4.4175a+67.515)$, 0.0, 100−a−x), if $3.0<a\le5.0$, the 5 points are the following:

point $L_r$ (72.0, 0.0, 28.0−a), point $L'_r$ (57.2, 10.0, 32.8−a), point $M_r$ (48.6, 18.2, 31.2−a), point $I_r$ ($(-0.05554a^2+0.8332a-2.3331)r^2+(-0.2165a^2+1.2485a-15.097)r+(0.1715a^2-5.2775a+46.622)$, 100−a−x−z, $(0.0556a^2-0.8329a+2.6103)r^2+(0.1915a^2-1.0235a+14.18)r+(-0.1715a^2+4.2775a+35.417)$), and point $H_r$ ($(-0.72215a^2+6.3327a-13.332)r^2+(0.6835a^2-6.3015a+3.003)r+(0.039a^2-4.434a+67.434)$, 0.0, 100−a−x), or if $5.0<a\le7.5$, the 5 points are the following:

point $L_r$ (72.0, 0.0, 28.0−a), point $L'_r$ (57.2, 10.0, 32.8−a), point $M_r$ (48.6, $(0.0592a^2-0.6512a+1.776)r^2+(-0.0355a^2+0.3901a-1.062)r+(0.0029a^2-0.0323a+18.29)$, 51.4−a−y), point $I_r$ ($(0.19254a^2-1.8957a+5.1093)r^2+(-0.3156a^2+3.3386a-23.07)r+(0.1097a^2-4.9961a+46.759)$, 100−a−x−z, $(-0.0074a^2-0.4187a+2.1117)r^2+(0.0379a^2+0.1335a+12.236)r+(-0.0571a^2+3.3777a+37.055)$), and point $H_r$ ($(0.037a^2-0.1293a-0.0008)r^2+(-0.056a^2+0.2a-11.017)r+(0.0719a^2-4.8515a+68.7)$, 0.0, 100−x−a).

8. The composition according to claim 1, for use as a working fluid for a refrigerating machine, wherein the composition further comprises a refrigeration oil.

9. The composition according to claim 1, for use as an alternative refrigerant for R410A.

10. A method for operating a refrigerator comprising circulating the composition according to claim 1 in a refrigerator designed for R410A.

11. A refrigerating machine comprising the composition according to claim 1 as a working fluid.

12. A method for operating a refrigerating machine, comprising circulating the composition according to claim 1 as a working fluid in a refrigerating machine.

* * * * *